US006546393B1

(12) United States Patent
Khan

(10) Patent No.: US 6,546,393 B1
(45) Date of Patent: Apr. 8, 2003

(54) SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

(75) Inventor: Umair Khan, Fremont, CA (US)

(73) Assignee: Clickmarks, Inc., Fremont, CA (US)

( * ) Notice: Subject to any disclaimer, the term of this patent is extended or adjusted under 35 U.S.C. 154(b) by 0 days.

(21) Appl. No.: 09/414,992

(22) Filed: Oct. 7, 1999

(51) Int. Cl.⁷ .............................................. G06F 17/30
(52) U.S. Cl. ......................................... 707/10; 709/203
(58) Field of Search ........................... 707/501, 1, 203, 707/201, 4, 10; 709/203

(56) References Cited

U.S. PATENT DOCUMENTS

| | | | | |
|---|---|---|---|---|
| 6,032,162 A | * | 2/2000 | Burke ......................... | 707/501 |
| 6,163,778 A | * | 12/2000 | Fogg et al. .................... | 707/10 |
| 6,314,423 B1 | * | 11/2001 | Himmel et al. ................ | 707/10 |
| 6,321,228 B1 | * | 11/2001 | Crandall et al. ............... | 707/10 |
| 6,324,566 B1 | * | 11/2001 | Himmel et al. ............. | 709/203 |

OTHER PUBLICATIONS

Keller et al. "A Bookmarking Service for Organizing and Sharing URLs," Computer Networks and ISDN Systems. vol. 29, No. 8–13, pp. 1103–1114, Sep. 1997.*
Maarek et al. Automatically Organizing Bookmarks Per Contents; Computer Networks and ISDN Systems; vol. 28, No. 7–11, pp. 1321–1333, May 1996.*

* cited by examiner

Primary Examiner—Charles Rones
(74) Attorney, Agent, or Firm—Silicon Valley IP Group, LLC; Dominic M. Kotab

(57) ABSTRACT

A system, method and article of manufacture are provided for generating a prioritized network site directory. A link to a site on a network is generated. The site is then added to a site directory that includes a set of categories. The site is categorized into one of the categories of the site directory. The site is also ranked in the category. Sub-categories may also be created into which the site is categorized under one of the categories of the site directory. The site may additionally be ranked in the category according to: the number of generated links to the site, the frequency that the site is accessed by selection of the generated links, and/or polling.

20 Claims, 30 Drawing Sheets

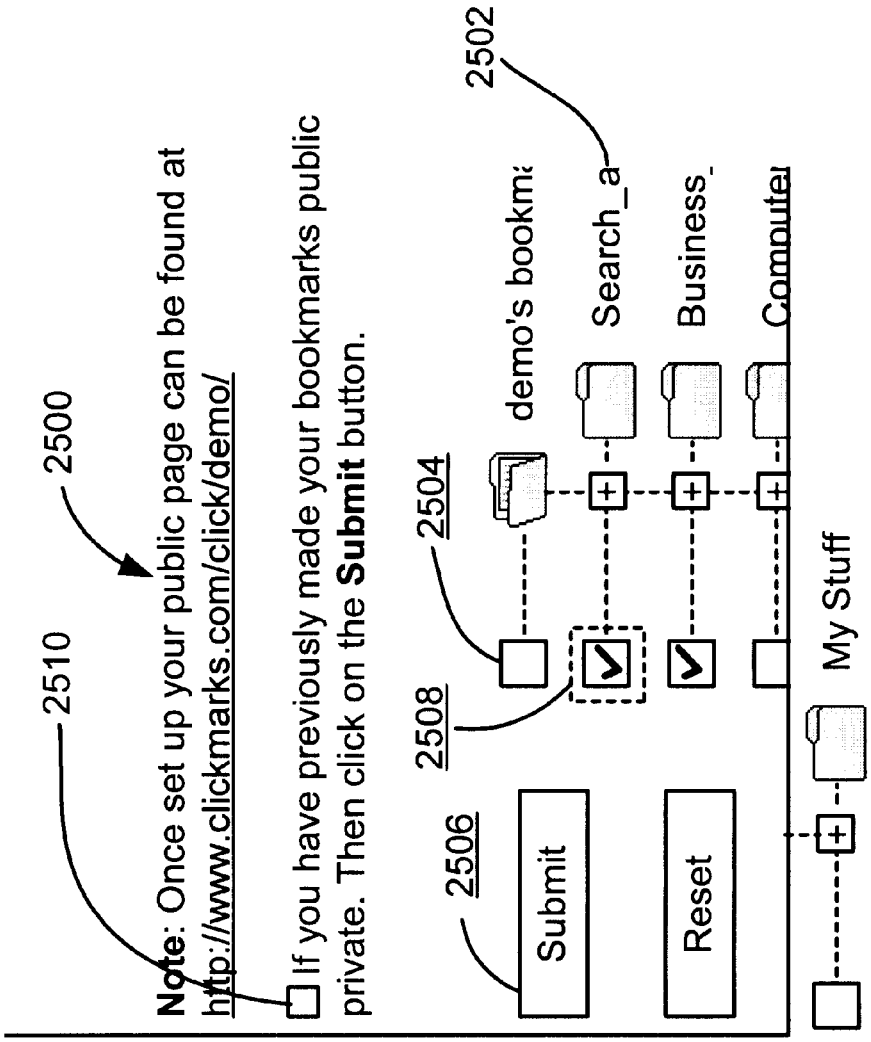
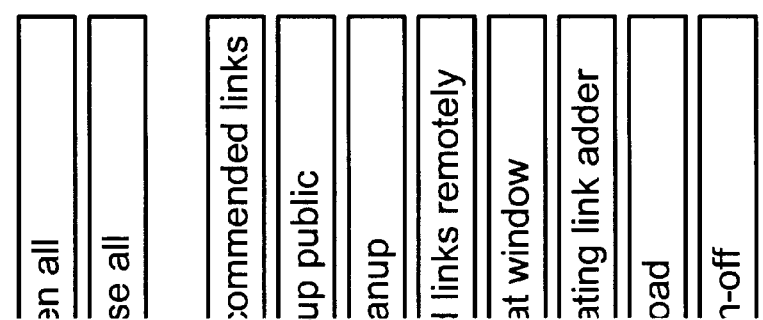
Figure 25

Hot List

2900

Hot Search Sites
Looksmart
Yahoo!
Excite
Jayde.com
Mamma.com - The Mother of All Search Engines
Ask Jeeves
Northern Light
Dogpile

Hot Directories Sites
Bigfoot
Four11
WhoWhere?
Switchboard
Infospace.com

Hot Business Sites
Business Week
CNNfn
Edgar Online
Monster Board Job Database
Headhunter.net
Fast Company

Hot Finance Sites
StockMaster
The Motley Fool: Finance and Folly
Yahoo! Finance
Bloomberg Online
Quote.com
Quicken Financial Network
OANDA Currency Converters
The Street
E*TRADE
IRS Homepage

Hot Computers_and_Technology Sites
W3C - The World Wide Web Consortium
Developer.com - Resources for programmers and developers
CMP TechWeb
Internet Sourcebook

Figure 29

3000 Users with Public Bookmarks a b c d e f g h i j k l m n o p q r s t u v w x y z 0 1 2 3 4 5 6 7 8 9 a
asic_design (user from clickmarks)
atv (user from clickmarks)
aeonflux (user from clickmarks)
andre (user from clickmarks)
austinpow (user from clickmarks)
anupun (user from thaiicq)
3002  alanm (user from clickmarks)
andros1 (user from delphi)
akibe (user from urduweb)
Andy (user from clickmarks)
ACSO (user from clickmarks)
Asim (user from pakistane)
AmberJade (user from clickmarks)

return to top

Figure 30

SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

FIELD OF THE INVENTION

The present invention relates to internet website directories and more particularly to dynamically user generated internet search directories based on prioritized server-sided user bookmarks.

BACKGROUND OF THE INVENTION

The World Wide Web was initially developed at CERN, which is a particle physics laboratory based in Geneva in Switzerland. The initial work began in 1989 and centered on the development of the HyperText Transmission Protocol (HTTP), which is a network protocol for requesting and transmitting web files and documents which both web servers and browsers can understand. By December 1990, CERN had developed a web server, a text-based browser and a browser for NExTStep computers. In March 1991, the software for the text based browser was made available to a limited audience. In January 1992, an updated version of the browser (version 1.1) was made freely available on the Internet. By January 1993, there were 50 web servers in existence and freely available graphical browser software had been made available for the Apple Macintosh. By February 1993, the World Wide Web was accounting for 0.1 percent of all Internet traffic.

One factor in the rapid acceptance and growth of the World Wide Web was the work done at the National Center for Supercomputer Applications (NCSA) at the University of Illinois in Urbana-Champaign in the USA. Their Software Development Group created a graphical web browser called Mosaic. In September 1993, they released versions of this software for Microsoft Windows running on PCs, Apple Macintoshes and Unix computers running X Windows. Each of the versions looked at and handled files in a very similar manner with images and text interspaced in the same document, allowing organizations to create visually exciting documents that could be viewed in very similar formats on the three main types of computer in use at that time.

Many members of the team who developed the original versions of Mosaic now work for Netscape Communications Corporation, a company which has developed the Netscape Web browser, which was estimated to account for around 70 percent of all the Web browsers in use in May 1995. Following Netscape, Microsoft launched a range of Internet browsers and servers.

A directory is, in general, an approach to organizing information, the most familiar example being a telephone directory. On the World Wide Web, a Internet search directory (also known as a web directory) is a subject guide, typically organized by major topics and subtopics. There are many Internet search directories, from the mega search directories such as Yahoo (www.yahoo.com) and Lycos (www.lycos.com) with millions of links to small niche directories such as South Asia Milan (www.samilan.com). These directories are structured as a multilevel tree of categories and subcategories, with website links, titles and possibly descriptions within subcategories, usually at the "leaf nodes" (final level subcategories).

There are several shortcomings with the implementations of such types of search directories. A web directory is typically compiled by listing any and all sites submitted for inclusion under a category by their webmaster. Quality assurance relating to the usefulness of a site to a visitor is usually either largely skipped or handled cursorily by the web directory administrator. Also, users of such directories are restricted to the categorization set once and for all by the webmaster. Because of this, users wishing to add sites to such directories are unable create their own custom category under which to put a new site.

SUMMARY OF THE INVENTION

A system, method and article of manufacture are provided for generating a prioritized network site directory. A link to a site on a network is generated. The site is then added to a site directory that includes a set of categories. The site is categorized into one of the categories of the site directory. The site is also ranked in the category.

In an embodiment of the present invention, the addition of the site to the site directory may also require the comparing of the site to pre-existing sites in the site directory and then generating a notification if the site matches one of the pre-existing sites of the site directory. In another embodiment of the present invention, categorizing of the site into one of the categories of the site directory may also include generating a table of sites where pre-existing site are ranked in the set of categories of the set directory and then determining whether the site exists in the table of sites. If the site already exists in the table of sites, the site may then be mapped to one of the categories of the set of categories. Further, if the site does not exist in the table of sites, the site may be searched for keywords relating to the categories of the set of categories.

In a further embodiment of the present invention, categorization of the site into one of the categories of the site directory may also include the selecting one of the categories into which the site is to be categorized and then comparing the selected category to the category to which the site is mapped. If the selected category does not match the category to which the site is mapped, then a notification may be generated.

In an aspect of the present invention, the site may be ranked in the category according to: the number of generated links to the site, the frequency that the site is accessed by selection of the generated links, and/or polling. In another aspect of the present invention, a mode of communication may be associated with one or more of the categories of the site directory.

In a further embodiment of the present invention, a sub-category may be created into which the site is categorized under one of the categories of the site directory. An added option to this embodiment, a creator identity may be assigned to the sub-category that includes information about a creator of the sub-category. In such an option, the creator of the sub-category may further be granted privileges such as recommending to accept or reject additional sites into and additional sub-categories under the sub-category, receiving information transmittals from users of site in the sub-category, and transmitting information to users of sites in the sub-category.

BRIEF DESCRIPTION OF THE DRAWINGS

The invention will be better understood when consideration is give to the following detailed description thereof Such description makes reference to the annexed drawings wherein:

FIG. 29 illustrates a page displaying a list of popular sites displayed subsequent the selection of the recommended links feature in accordance with an embodiment of the present invention;

FIG. 30 illustrates a page displaying a list of users with public bookmarks in accordance with an embodiment of the present invention;

DETAILED DESCRIPTION OF THE INVENTION

Figure 1:
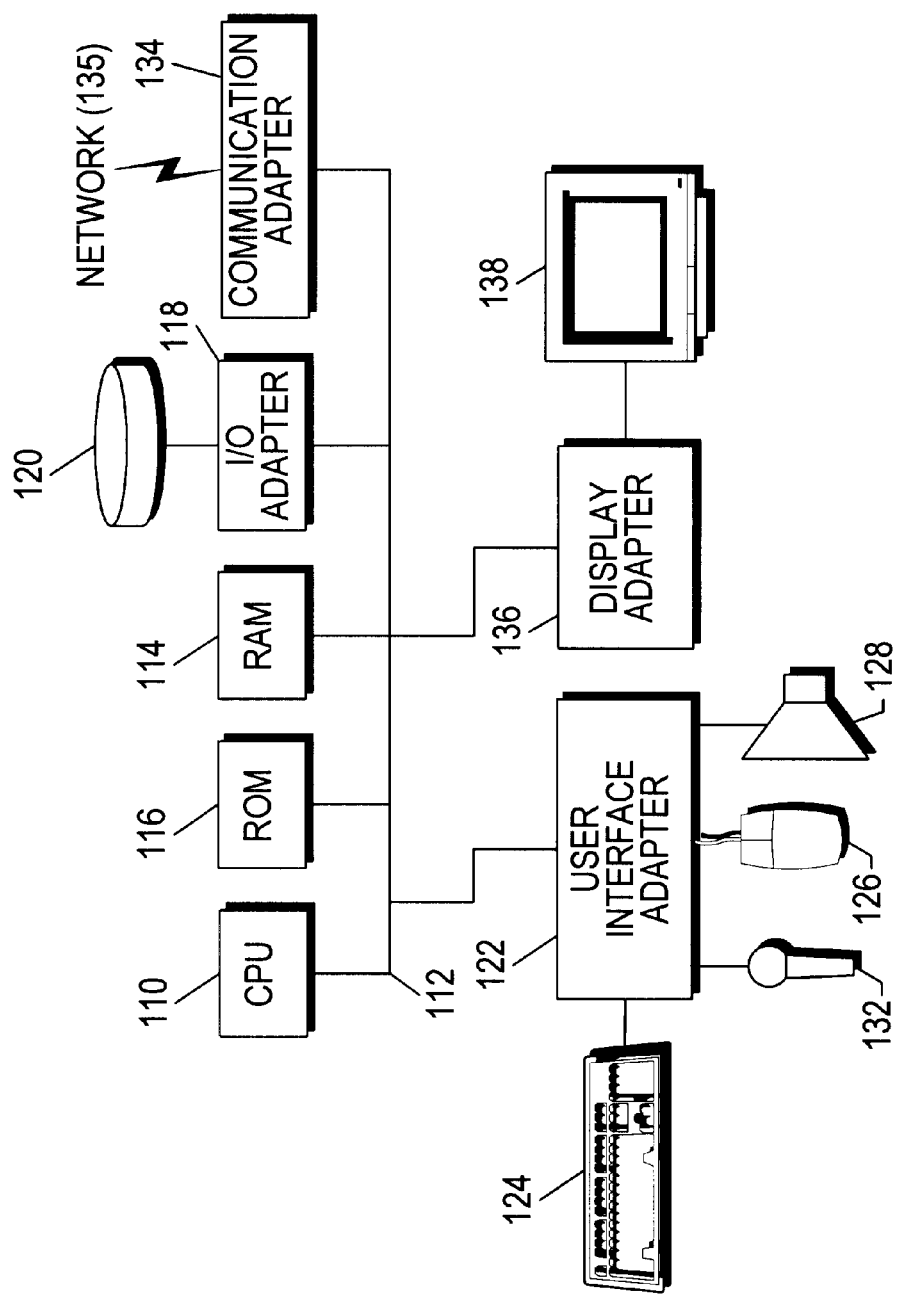
FIG. 1 is a schematic diagram of a hardware implementation of an embodiment of the present invention.

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

- Objects and their corresponding classes break down complex programming problems into many smaller, simpler problems.
- Encapsulation enforces data abstraction through the organization of data into small, independent objects that can communicate with each other. Encapsulation protects the data in an object from accidental damage, but allows other objects to interact with that data by calling the object's member functions and structures.
- Subclassing and inheritance make it possible to extend and modify objects through deriving new kinds of objects from the standard classes available in the system. Thus, new capabilities are created without having to start from scratch.
- Polymorphism and multiple inheritance make it possible for different programmers to mix and match characteristics of many different classes and create specialized objects that can still work with related objects in predictable ways.
- Class hierarchies and containment hierarchies provide a flexible mechanism for modeling real-world objects and the relationships among them.

Libraries of reusable classes are useful in many situations, but they also have some limitations. For example:

- Complexity. In a complex system, the class hierarchies for related classes can become extremely confusing, with many dozens or even hundreds of classes.
- Flow of control. A program written with the aid of class libraries is still responsible for the flow of control (i.e., it must control the interactions among all the objects created from a particular library). The programmer has to decide which functions to call at what times for which kinds of objects.
- Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

User-Generated Internet Search Directory Based on User Online Bookmarks

Users surf the Internet at an ever increasing rate and webpages get added to the World Wide Web at an exorbitant rate. The ability to bookmark a webpage or website that a user found particularly useful is an invaluable aid to surfing the web efficiently. The value of a bookmark to the user who owns it is clear. But there is an additional value attached to the bookmarking of a site. A bookmark is the result of an analysis of and positive judgment on a website by a visitor interested in a particular interest topic. However, the knowledge that a site is good enough to be bookmarked is locked away in a user's private bookmark set. Creating a web directory where each category contains not just sites recommended for listing by webmasters, but sites taken from within Internet user's bookmarks sets, unlocks the knowledge hidden away in private bookmarks sets distributed across standalone computers worldwide. Users are be able to search via keyword or traverse the category hierarchy to get to bookmarks pertaining to their area of interest.

The present invention includes the following concepts for implementing a searchable web directories:

Search Domain: The domain of links/websites categorized in the directory comprising of users' bookmarks Dynamic restructuring: The user has the ability to create their own categories to best identify the location of their bookmark(s) within the web directory.

Site Ranking: Each bookmark may be ranked by: (a) the number of people who have bookmarked the site, and (b) the frequency of access to this site by the bookmarkers.

Figure 2:
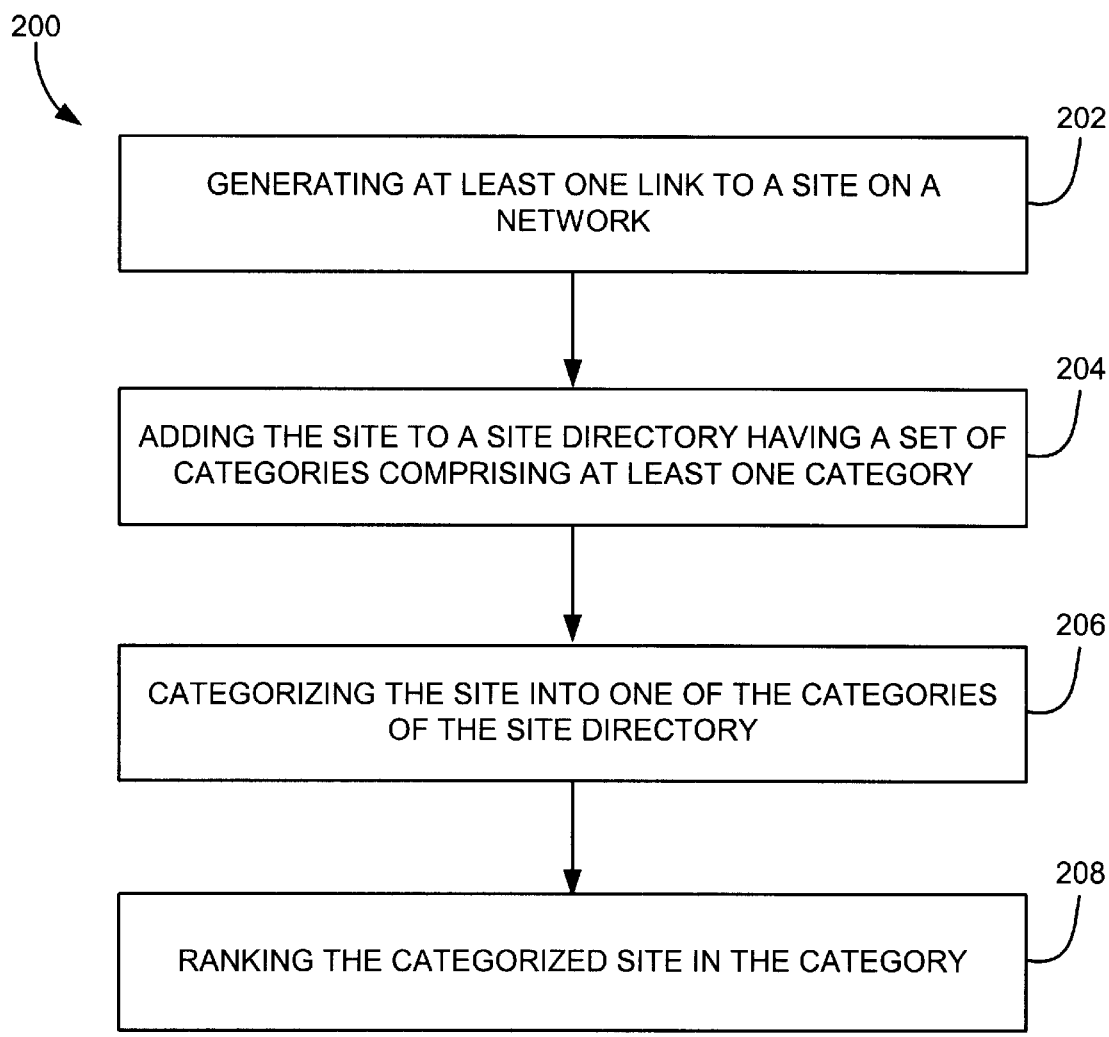
FIG. 2 illustrates a flowchart for a method for generating a prioritized network site directory from user generated links to sites on a network in accordance with an embodiment of the present invention.

Category guides and owners: Each category created by the user as well as each link added by users from their bookmark set may be associated with the user's name, allowing users to find not only relevant sites but people with similar interests FIG. 2 illustrates a flowchart for a method 200 for generating a prioritized network site directory from user generated links to sites on a network (see operation 202). The site related to the link is added to a site directory that includes a set of categories in operation 204. The site is categorized into one of the categories of the site directory in operation 206 and also ranked in the particular category that it is placed under in operation 208.

Search Domain

Figure 3:
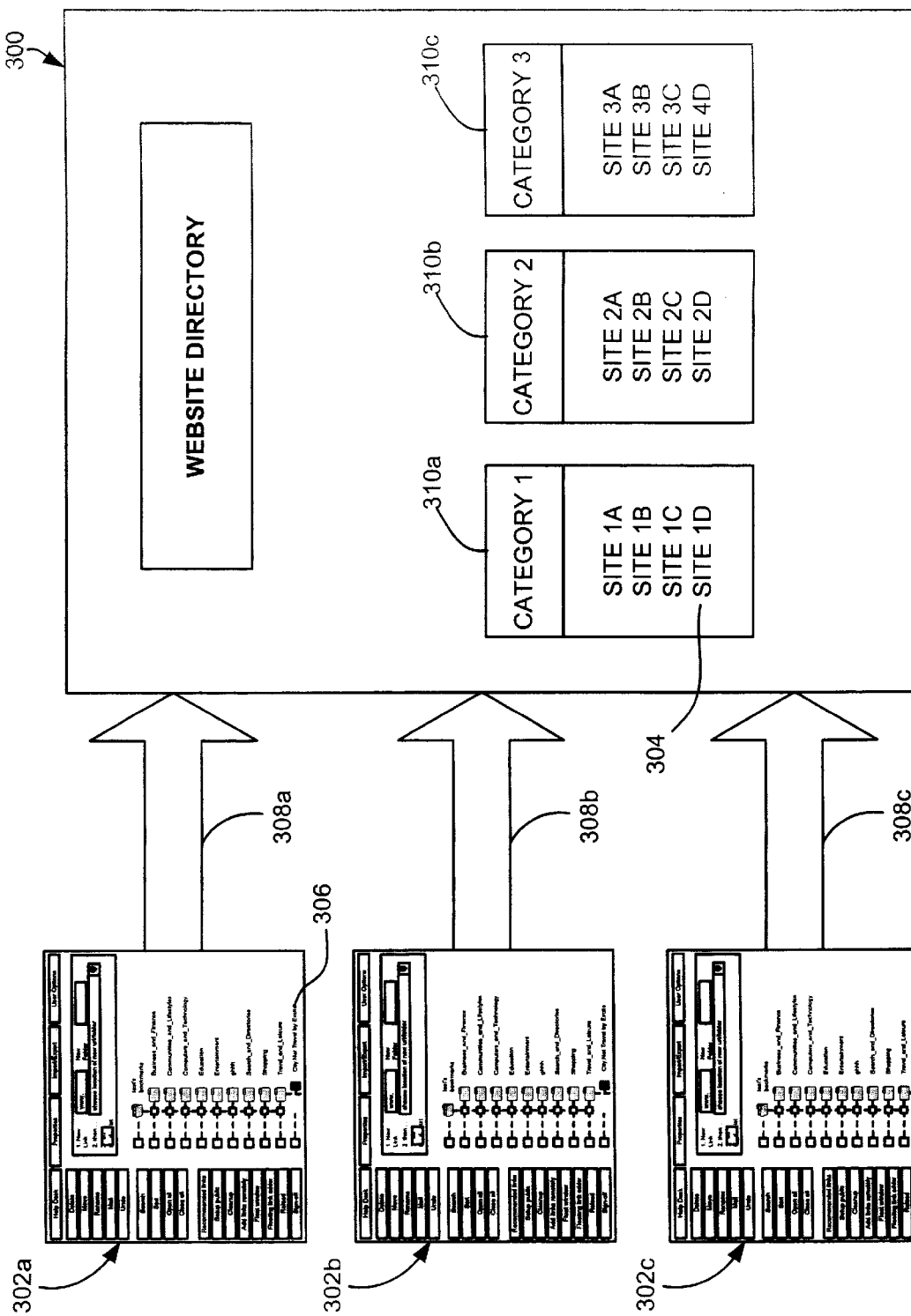
FIG. 3 is a schematic illustration illustrating the creation of an exemplary website directory derived from bookmarks submitted from users' online bookmark accounts in accordance with an embodiment of the present invention.

FIG. 3 is a schematic illustration illustrating the creation of an exemplary website directory 300 of the present invention derived from bookmarks submitted from users' online bookmark accounts 302a, 302b, 302c. In the present invention, sites 304 added to the web directory 300 exist as bookmarks 306 in a user's bookmark set of the user's online bookmark account. Thus, the only people allowed to add links to the web directory are users who host their bookmarks or favorite sites in online bookmark accounts 302a, 302b, 302c on an online bookmark management server. This also helps to eliminate the "spamming" of the web directory by overzealous webmasters. A user first registers with the online bookmark management service and import their browser bookmarks, or favorite links off an existing webpage. Optionally, a user may create a fresh set of bookmarks in their server based bookmarks account. Once the user has a server side bookmark account set up and populated, the user may add part or all of the user's bookmarks to the web directory as represented in FIG. 3 by arrows 308a, 308b, and 308c. The user may choose manual or automatic categorization while adding part or all of their bookmark.

Manual Categorization

Under manual categorization, the user determines the category 310a, 310b, 310c under which to file a bookmark or a set of bookmarks. These bookmarks as well as the suggested categorization are reviewed by the directory's editorial staff for correctness of categorization. After this screening, the sites are made part of the directory under the user recommended category or a editor selected classification, and the user is notified.

Automatic Categorization

In automatic categorization, the user may specify which part of the user's bookmark set is to be included in the directory. All unique links in this set that do not already exist in the directory are then considered for addition under categories determined by the staff. With automatic categorization, the user does not have to determine and submit the appropriate categorization of the submitted bookmarks.

Website Addition

The website addition process may automated with at least two manners. First, an automatic filtering step may be executed to determine whether the submitted link already exists in the search directory. In this step, the submitted site is compared to pre-existing sites in the site directory to see if it matches one of the pre-existing sites of the site directory. As an option, if the user attempts to add a link manually under a category, the user may be alerted (by for example the generation of a notification to the user) when the link already exists in that category or even elsewhere in the directory. After such an alter, the user may be allowed a choice to proceed and submit the link. A final determination on whether to replicate links across categories may subsequently then be made by the editorial staff.

NEED MORE INFORMATION ON THIS ASPECT

Second, in the determination of the right categorization, the editorial staff may be aided by a website profiling procedure. The website profiling algorithm will be similar to the interest clustering techniques detailed in the patent "Method and Apparatus User Preference Profiling and Transient Detection on Content and User Access of Web Bookmarks", filed separately.

Each bookmarked website submitted to the directory (manual or automatic submission) is looked up in a generated table of sites that have been ranked in a set of categories. This ranking is done using the interest clustering algorithm mentioned above. If the site exists in the table, its ranking is then mapped to the best category for it to be listed under. On the other hand, if the site does not exist in the table, the interest clustering engine is used to search the site on a variety of keyword baskets. Each keyword basket represents a particular interest category. The results from this search are then entered into the table of ranked sites and used to determine the final categorization of the site in the web directory. As an option, if the selected category does not match the category to which the site is mapped, then a notification may be generated. As a further option, manual inspection by the editorial staff may also be conducted as a double check of the categorization procedure.

Dynamic Restructuring

Figure 4:
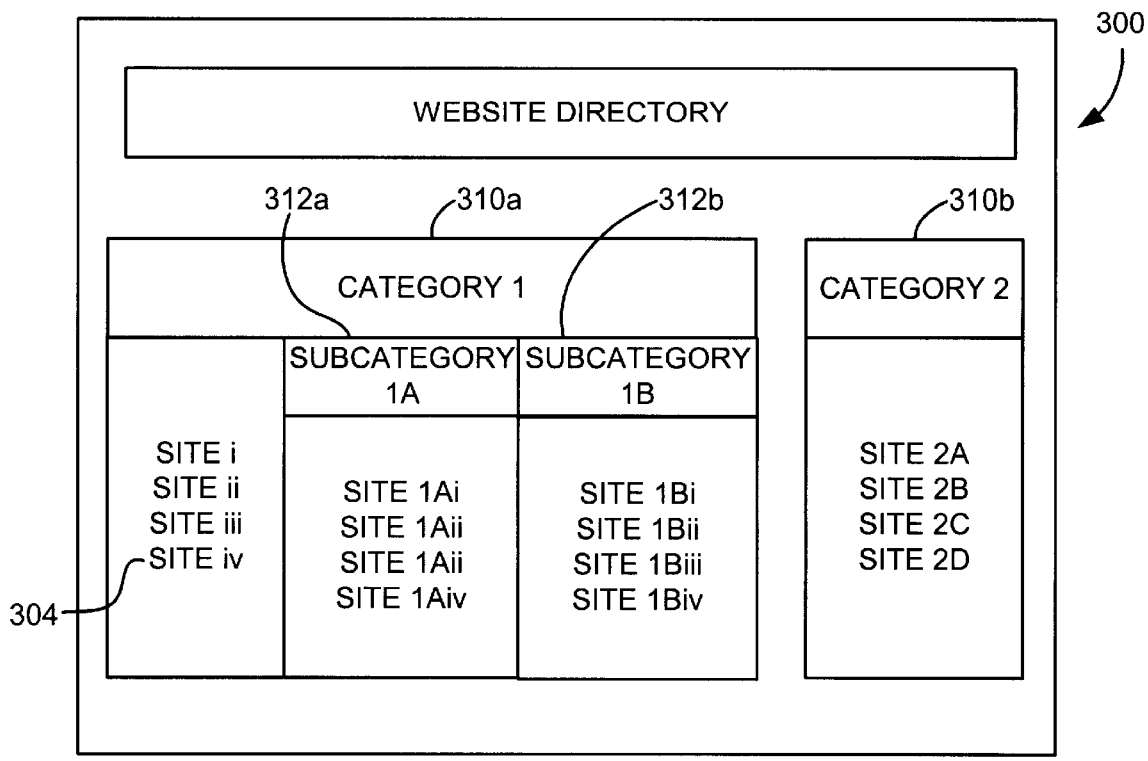
FIG. 4 is a schematic illustration of an exemplary embodiment of a website directory with sites categorized in user created and defined categories and subcategories in accordance with an embodiment of the present invention.

FIG. 4 is a schematic illustration of an exemplary embodiment of a website directory 300 of the present invention with sites 304 categorized in user created and defined categories 310a, 310b and subcategories 312a, 312b. In such an embodiment of the present invention, a sub-category may be created into which the site is categorized under one of the categories of the site directory. In adding niche and focused sites to a web directory, a major stumbling block has been the lack of flexibility for permitting users to make their own custom categories under which to add a favorite site. The present invention gives a user the ability to dynamically grow the hierarchical categorization tree. In the case of a bookmark based website directory, one of the underlying assumptions of such a search metaphor is that the user adding the bookmark has a keen interest in and some knowledge of the theme and/or subject of the bookmarked site.

In order to exploit this user knowledge properly, the user is allowed the option to grow the categorization tree by adding "nodes" or "subcategories" that best capture the category for the bookmarks they wish to add. Each added node may have the creator's ID (i.e., the user's online bookmarks account's username) and contain at least one site under it (i.e., users may not be able create an empty node). These features also create a dynamic interactive web directory. "Dynamic" here does not simply imply frequent addition of links, but frequent additions to the basic categorization structure.

These features may also be conducted under the manual inspection of the editorial staff. In such an embodiment, requests from a user to create a new node in the category tree may be queued for approval by an editor of the site directory. If the new sub-category is found to add value to the web directory, its addition is then finalized and included in the site directory.

Site Ranking

Figure 5:
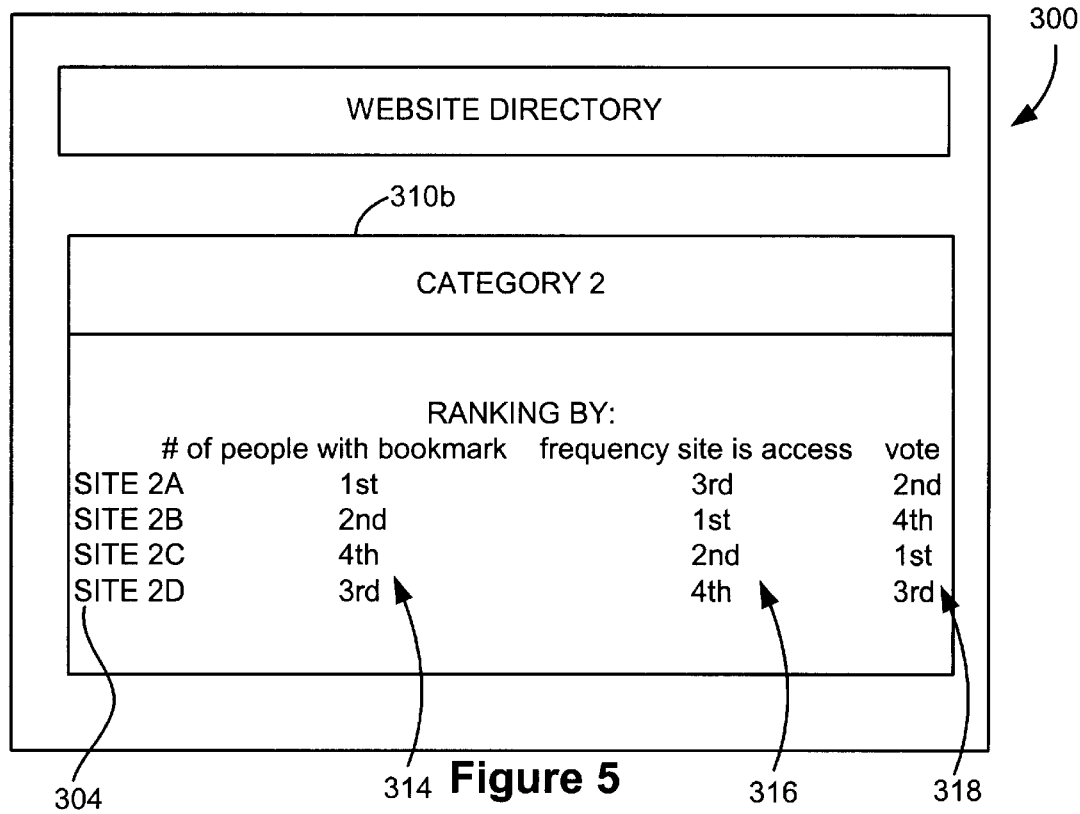
FIG. 5 is a schematic illustration of an exemplary website directory where the sites of a category are displayed with their rankings according to number of users who have the site bookmarked, frequency that the site is visited by users, and popularity determined by user voting in accordance with an embodiment of the present invention.

FIG. 5 is a schematic illustration of an exemplary website directory 300 of the present invention where the sites 304 of a category 310b of the website directory are displayed with their rankings according to number of users who have the site bookmarked 314, frequency that the site is visited by users 316 and popularity determined by user voting 318. A benefit of using bookmarked sites as a basis or domain for a web directory is that it creates two natural ranking metrics. As bookmarks are displayed in a category or as the result of a keyword search, they may be prioritized or ranked according the following metrics:

1. How often does a bookmark appear in online bookmark accounts 314 (i.e., how many users in the server side bookmarks community have bookmarked this site); and
2. How often do people who have bookmarked this site access the site from their account 316.

The more the bookmarks accounts in which a particular site appears, the higher it may be ranked in its interest category. Likewise if the traffic to one bookmarked site is much higher than others that belong in the same interest category, the high traffic site may be ranked above (and possibly placed above in a search result or category listing page) the other sites. This may greatly increases the utility of the web directory. It may also be an important way to exploit the knowledge that is locked up in user bookmarks. Not only are the sites that are interesting enough to have been bookmarked by users simply displayed, but the sites are displayed in a manner for users of the site directory to differentiate which may be more relevant and content/ information rich from among a pool of sites displayed in a particular category.

As an option, an additional ranking mechanism may also be built into the site directory by allowing users to vote on the usefulness of any site 318. In such an embodiment, all three ranks may be displayed alongside the particular link to allow users to have the option to prioritize their selection of a link on the search page by: (a) number of people who have it bookmarked, (b) traffic frequency or (c) voting results.

Category Guides and Owners

When a user adds a site 304 or creates a new subcategory 312a, 312b, they may be given the option to assign their identity (i.e., their username to their online bookmarks account) to the added category or site. As a further option, the user may also be granted additional privileges as creators of a new category, such as the right to recommend to accept or reject new sites/subcategories under the new category (with or without a further safeguard option of leaving the final determination with the directory editors). This option adds a dimension of interactivity and expertise to the web directory. With such an option, users of the site direction are able to find not only relevant websites but also users with similar or identical interests.

The site directory's users may also be allowed to send information transmittals such as an instant message or e-mail to these "experts" or guides whose username is associated with the particular category or link they entered into the directory. With such a feature, the online bookmarks accounts of these guides may also include features that give them the capacity to receive these communiques and transmit replies back to sender. As a further option, associated with each category may be a forum or chat room where users with like interests are allowed to communicate with each other.

Online Bookmarks Managing System

The following portion of the present specification is included to provide further clarification to various aspects and portions of the present invention through discussion of exemplary embodiments of the present invention. In particular, the following portion of the present specification includes further information regarding the user and maintenance an online bookmarks managing system and user online bookmark accounts of the system.

In an embodiment of the present invention, as soon as a user signs up, the user may be set up with a personal, password-protected, web-based online bookmark account.

Every time the user accesses the Internet, wherever the user is, the user is able to sign in and see the user's complete bookmarks selection. No matter what browser, no matter which operating system, the user's favorite links are there via the user's online bookmark account for the user to use.

Figure 6:
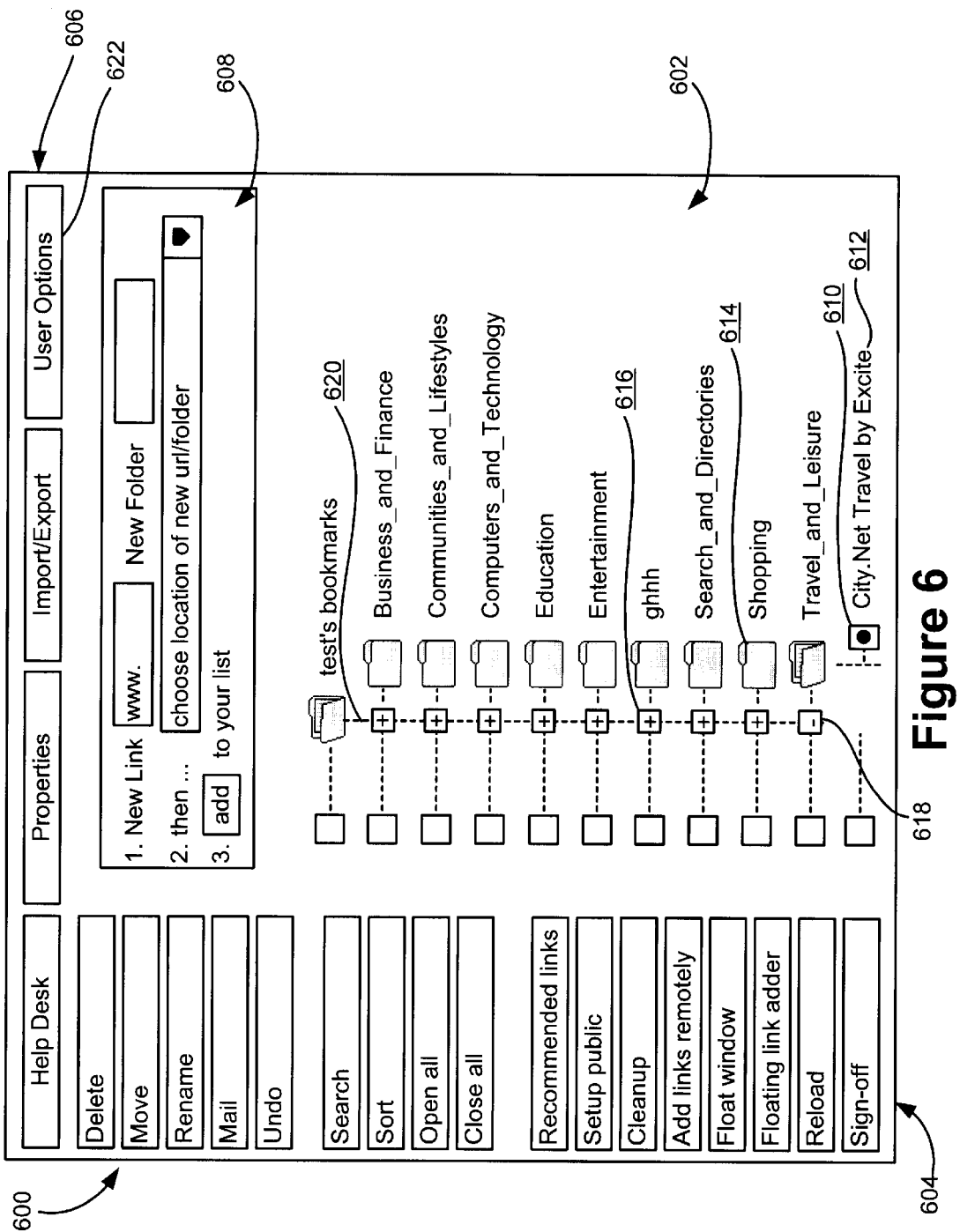
FIG. 6 illustrates an exemplary display of a online bookmark account page of a user in accordance with an embodiment of the present invention.

FIG. 6 illustrates an exemplary display of a online bookmark account page 600 of a user. This exemplary page 600 has a central area 602, a left menu bar 604 and a top menu bar 606. Also displayed may be a bookmark adding area 608.

With continuing reference to FIG. 6, in this exemplary embodiment of the present invention, the icon 610 with the circle in the middle located in the central area 602 is used to represent a bookmark (also known as a favorite, a link, or a shortcut) of the user. A bookmark is a saved link to a web site that, when selected, accesses the linked website. Next to this icon 610 may be a text 612 providing further indication of the site to which the particular bookmark provides a link to.

In this exemplary embodiment, the icon 614 similar to a folder is the icon for a folder in which a user may organize their bookmarks. A folder's usage is similar to the use of directories in a computer's desktop: namely, to allow a user to group similar items together. These icons are similar to a closed folder when the contents of the folder are not being displayed. A user may view the contents of the folder by clicking on the "+" sign 616 to the left of the closed folder icon. This changes the icon to an "open folder" icon, the "+" sign to "−" sign 618, and displays the contents of the folder. A user may then close the folder by clicking on the "−" sign to the left of the open folder. This will close the folder once again.

When folder icons 614 are present, bookmark icons 610 may appear under the folder in which it is stored. Note that the display uses various levels of indentation and connecting lines 620 to indicate the specific folder under which the bookmark is filed.

Accessing Links/Bookmarks

How to Use/access Bookmarks

To visit the bookmarked site, a user clicks on a bookmark icon 610. Clicking on the bookmark icon will open up a new window and take the user to the bookmarked site. To return to the bookmark list, a user may either close the new window that had opened up or the user may switch back to the browser window with the a session of the present invention active.

Displaying Bookmarks

To allow users unlimited bookmarks and to present them more efficiently, bookmarks may be broken up and displayed in separate pages. In an illustrative embodiment, a default of approximately 250 bookmarks may be displayed on each page. A user may change the number of bookmarks they want displayed on each page. To do so, the user clicks on the User Options button 622 displayed on the online bookmark account page 600 (see FIG. 6) and make changes in "View Size" form that is subsequently displayed.

Accessing Bookmarks of a User Account from Another Computer

As a web-based bookmarks service, the present invention may available from any computer connected to the Internet. This enables a user to access, and edit their bookmarks from anywhere in the world. A user does not need to login from the same computer every time the user wishes to use their bookmarks to browse the Internet. Nor does a user need to sign up again or transfer any files when they switch computers.

Managing Links

Figure 7:
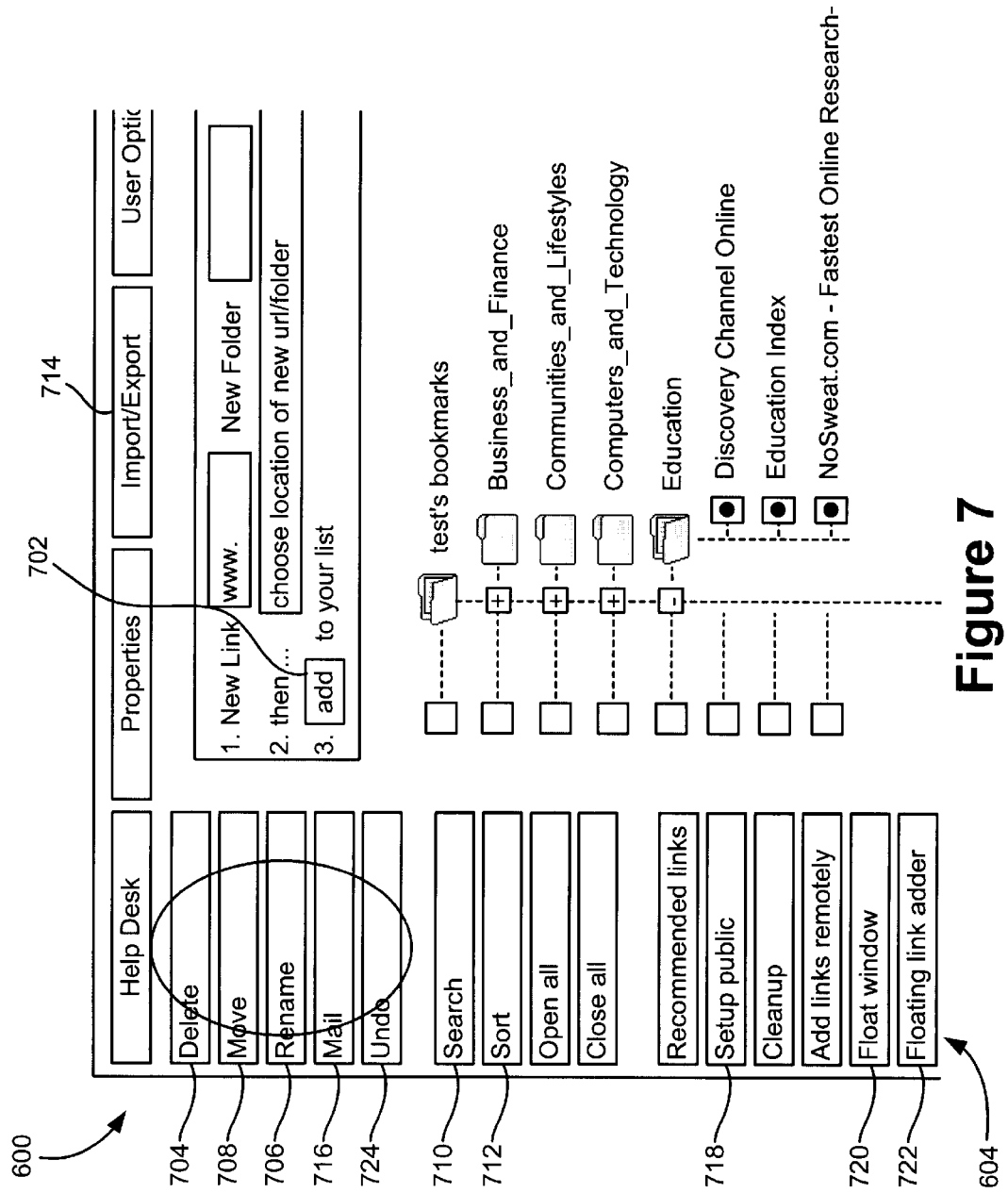
FIG. 7 illustrates tools displayed on a user's online bookmark account page in accordance with an embodiment of the present invention.

FIG. 7 illustrates tools displayed on a user's bookmark page 600 of the present invention that are included to help a user manage their bookmarks. Some examples include:

add, delete, or rename functions 702, 704, 706;

a move function 708 for organizing a user's links;

duplicate or stale (i.e. broken or inactive) bookmark detectors;

search and sorting functions 710, 712 to help a user find bookmarks that the user may be looking for; and an e-mailing function 716 for transmitting information utilizing a network.

Drag & Drop Functionality

Figure 8:
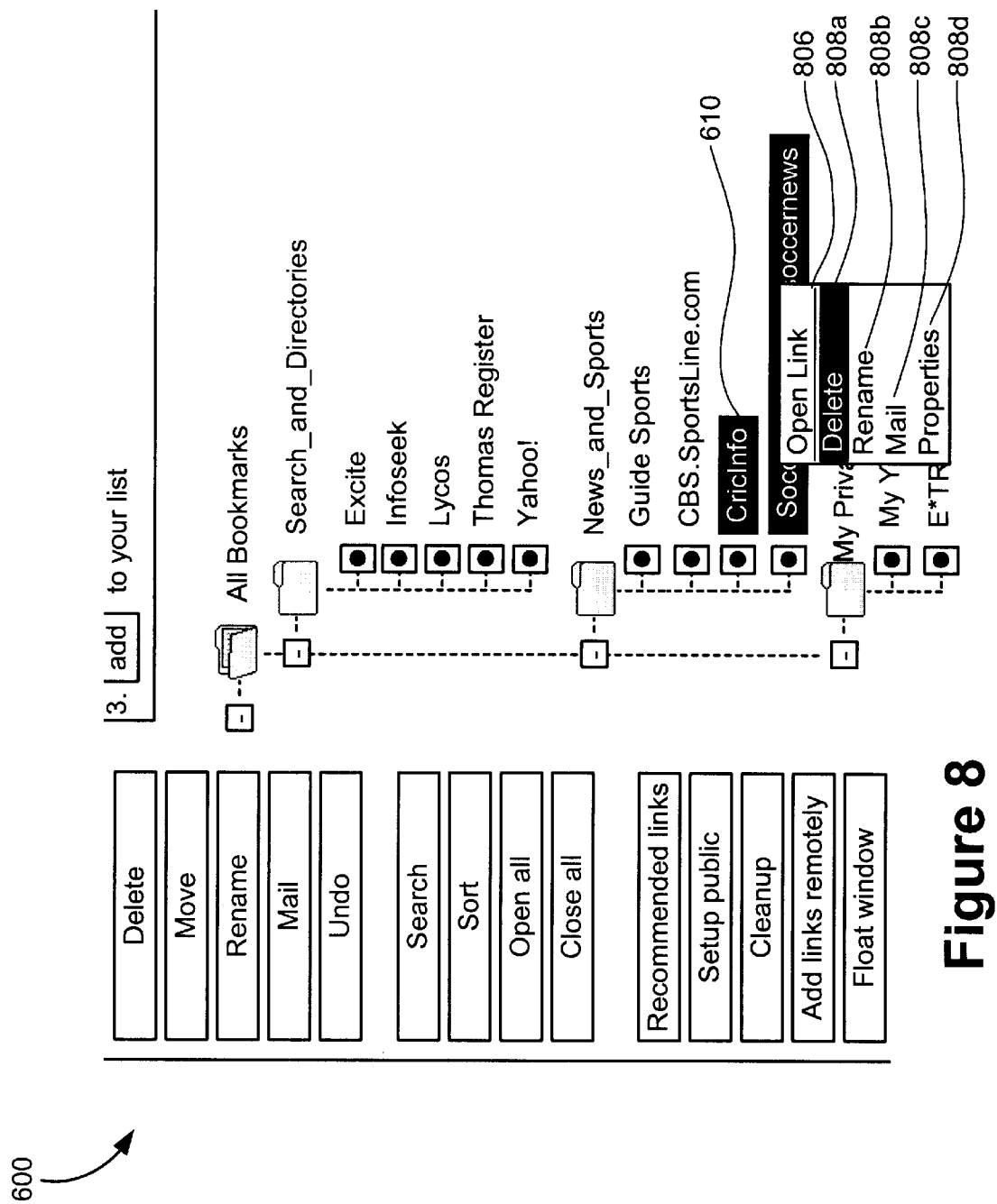
FIG. 8 illustrates an exemplary online bookmark account page with drop and drag capability in accordance with an embodiment of the present invention.

In embodiments of the present invention with such a this feature, the pains associated with managing information online may be reduced. With reference to FIG. 8, users may click, drag and drop their bookmarks 610 (and folders 614) to move them anywhere within their account. One-touch management of links, folders and link properties to make the user's life easier. Select one link 610 or more to display a box 806, choose the appropriate function 808a, 808b, 808c, 808d from the box and the function is then executed.

Remote Addition

Figure 9:
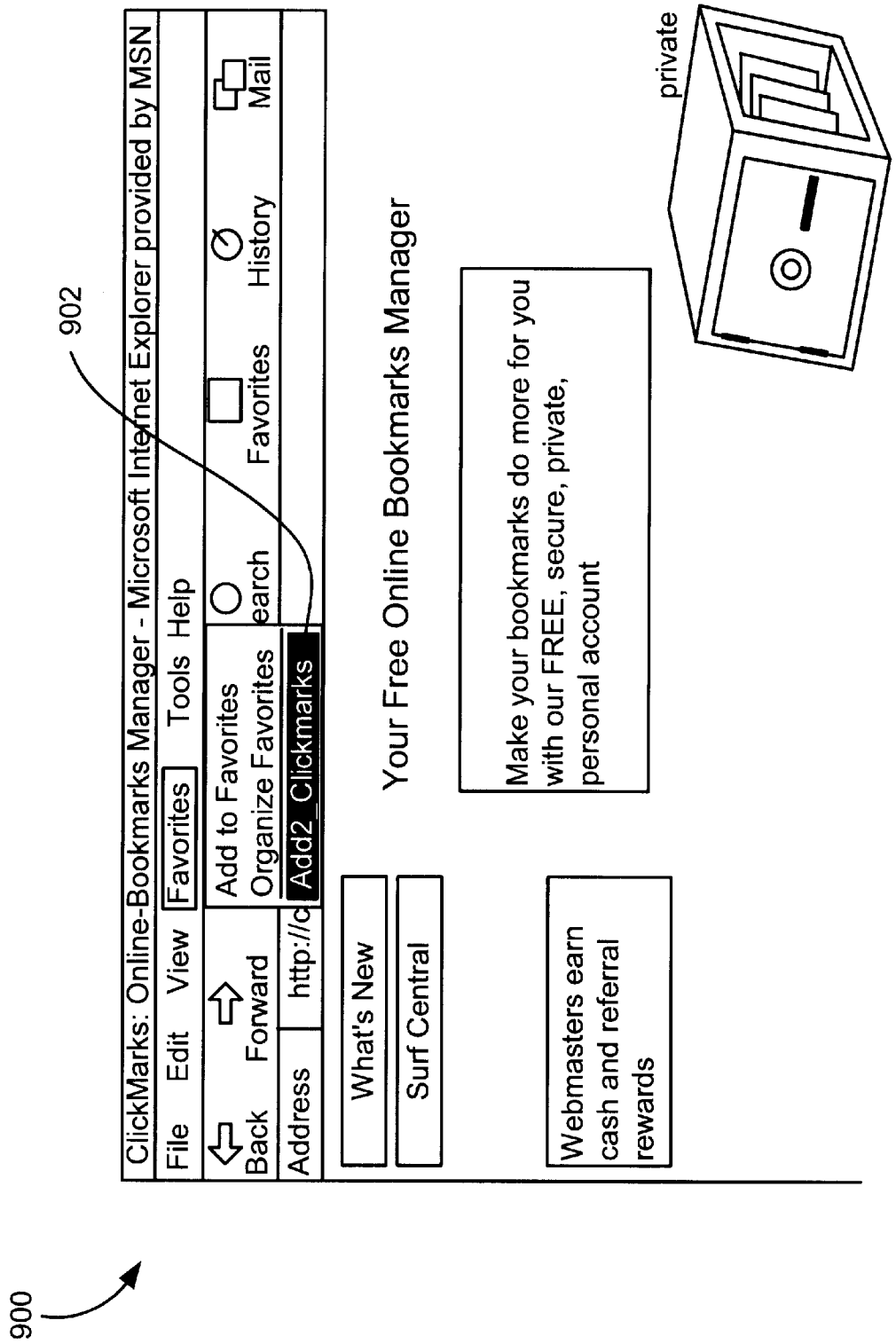
FIG. 9 illustrates a remote addition feature for adding bookmarks to a user's online bookmark account page in accordance with an embodiment of the present invention.

With particular reference to FIG. 9, a user may also add bookmarks to their online bookmark account without even being on the online bookmark provider's webpage by using an "Adding Bookmarks Remotely" feature 902 that may be included on a user's web browser 900. This feature lets a user add links while surfing on the internet by clicking on the function 902 as shown in FIG. 9.

Accessing Bookmarks Added through the "Adding Bookmarks Remotely" Feature

All the URLs that users add to their current online bookmark account through the "Adding Bookmarks Remotely" feature may be stored in their online bookmark account and are accessible from any computer on the Internet, just like all their other bookmarks in their online bookmark account. When a user wishes to bookmark a particular page using this function, the user first accesses the particular page through their browser. Once the user is thereat the particular page, the user may add a bookmark remotely by clicking on, for example, the ADD2My_Stuff favorite/bookmark in their current browser. The URL of the particular page is then stored in their My_Stuff folder.

Import/Export Bookmarks

Figure 10:
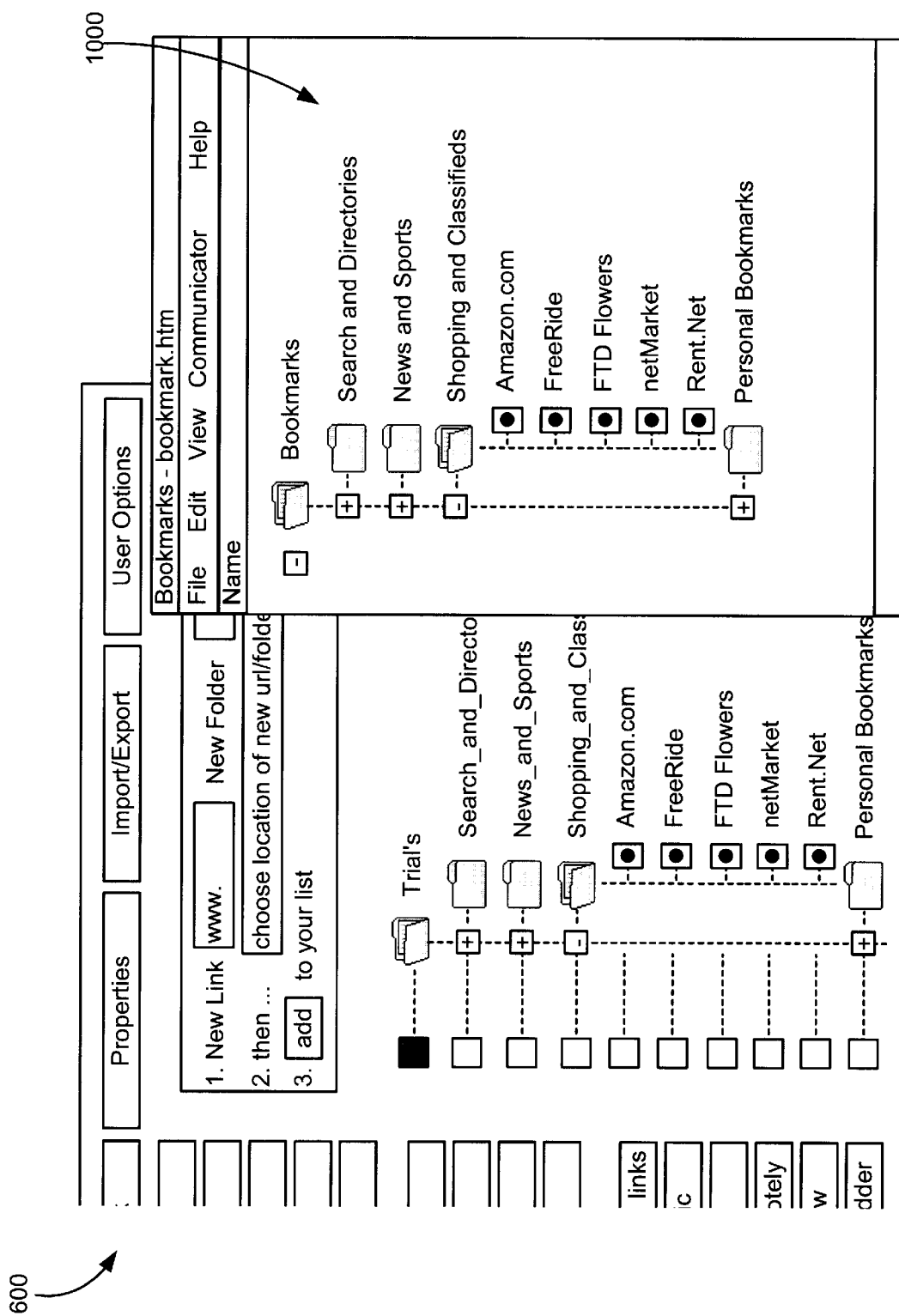
FIG. 10 illustrates an importation feature of an online bookmark account page for importing Internet browser bookmarks or favorites into the online bookmark account page in accordance with an embodiment of the present invention.

A user may import their current Netscape "Bookmarks" or Internet Explorer "Favorites" directly into their online bookmarks account 600. The user may either add them to the online bookmark provider's default list of bookmarks, or replace the links with the imported links 1000 as shown in FIG. 10. This way, the user may import from multiple sources, whenever they want, and even however many times they want.

Sharing Bookmarks

Figure 11:
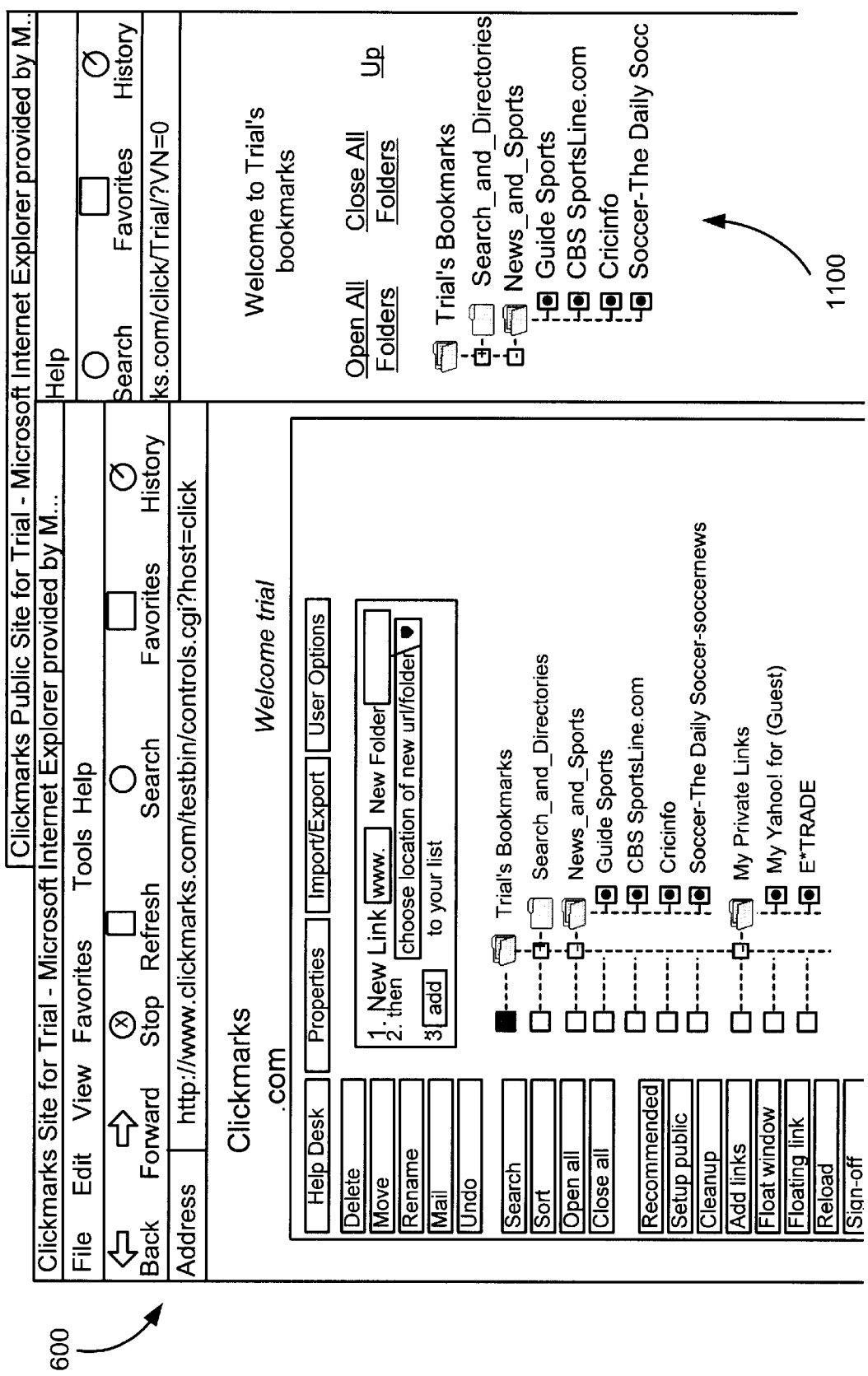
FIG. 11 illustrates a user's online bookmark account page and a public bookmark page derived from the online bookmark account page in accordance with an embodiment of the present invention.

A user may also be able to choose to share their bookmarks with friends—or any surfer by:

e-mailing links to others; and setting selected bookmarks as public. As best illustrated in FIG. 11, this feature lets users publish their own Internet directories at the touch of a button. Users may choose the links they wish to set as public from their bookmarks 600 and publish them on the Internet 1100.

Add Links/Folders

A user may add links to their account in three ways:

adding directly (from the account page);

adding links remotely; and adding links through a pop-up window.

Adding Directly

Figure 12:
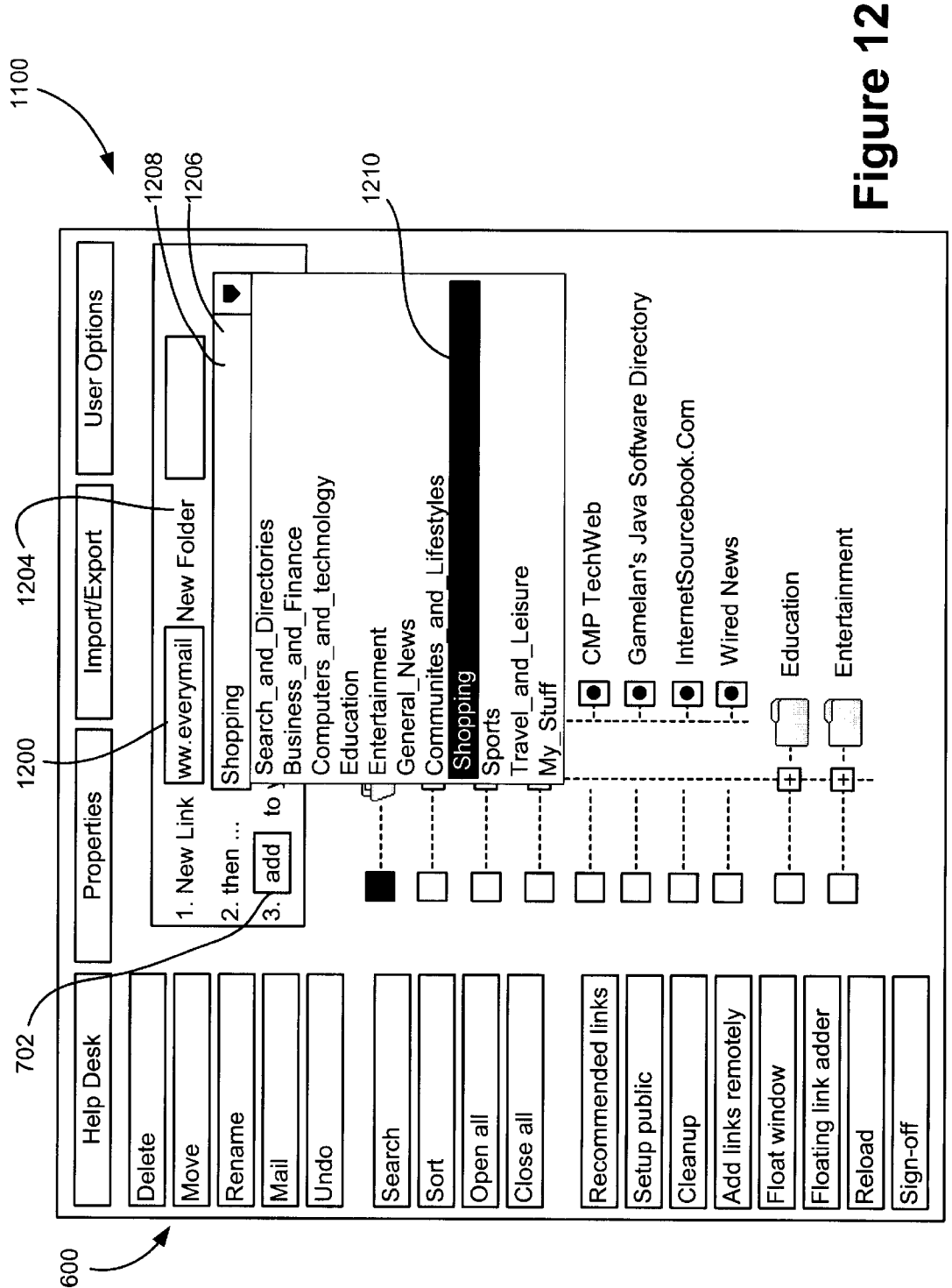
FIG. 12 illustrates a direct addition of a bookmark to an online bookmark account page in accordance with an embodiment of the present invention.

With reference to FIG. 12, a user may add bookmarks by typing the URL (web site address) into the box 1200 next to "New Link" and then clicking on "Add" 702. A user may add folders in the same way, by typing the new folder's name into the box 1204 next to "New Folder" and then clicking on "Add" 702. Both new bookmarks and new folders may be placed inside other folders. A user may do this by clicking on the down arrow 1206 on the "choose location of new url/folder" box 1208 and selecting the folder 1210 users want to move the new item into.

Adding Links Remotely

Figure 13:
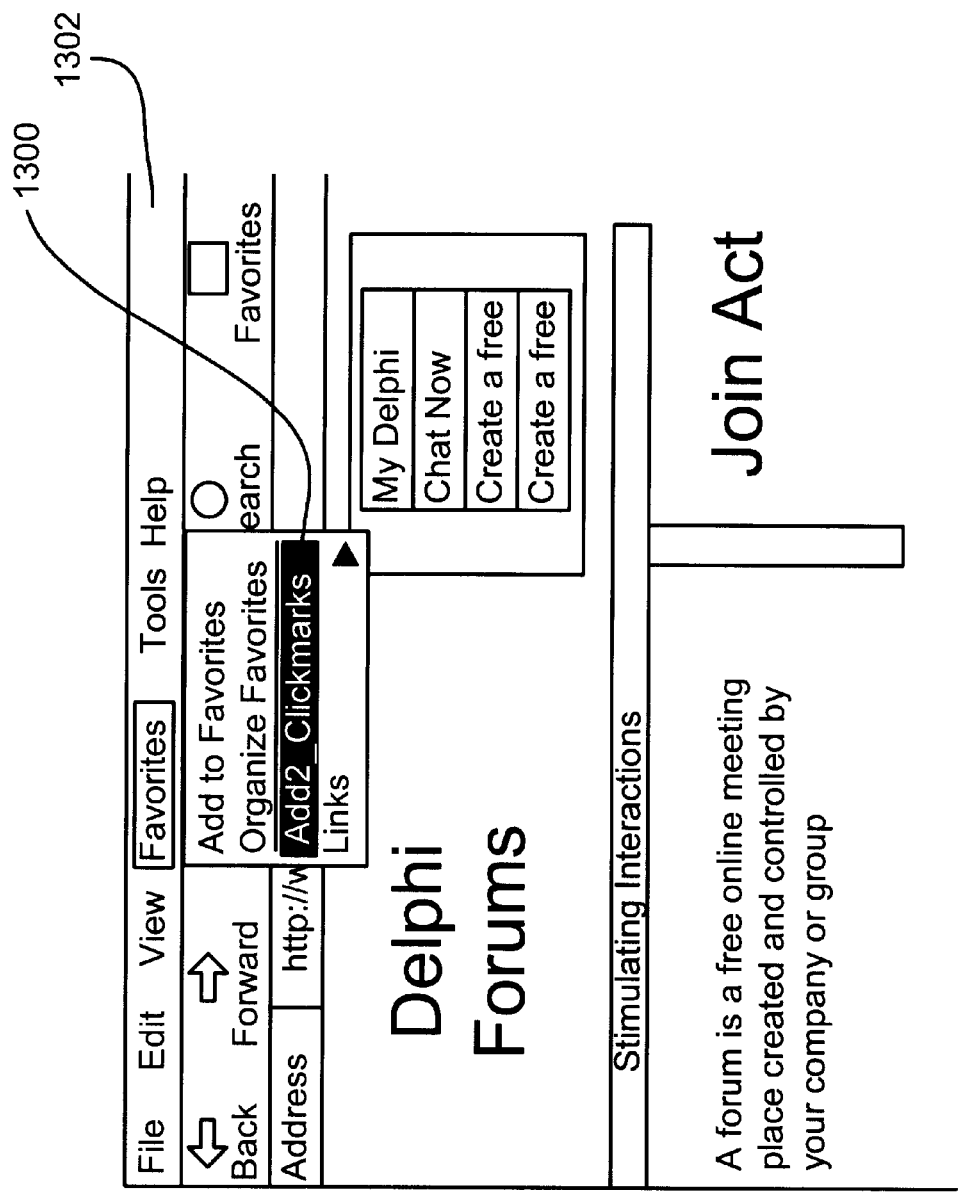
FIG. 13 illustrates a remote addition of a bookmark to an online bookmark account page in accordance with an embodiment of the present invention.

A user does not have to be in their account to add bookmarks. Users may actually add them while they surf the Internet. First, the user needs to set up the Adding Links Remotely function. With reference to FIG. 13, once the Adding Bookmarks Remotely function is set up, the user may see a new bookmark called "Add2Clickmarks" 1300 on their browser 1302. This means that the Netscape Bookmarks list or their Internet Explorer Favorites list will have this new "Add2Clickmarks" bookmark. While a user surfs the Internet, if the user finds a web site he or she wants to add to their account, the user just clicks on the browser bookmark called "Add2Clickmarks" and the site will be automatically added to their online bookmark account.

Adding Links through a Pop-Up Window

Figure 14:
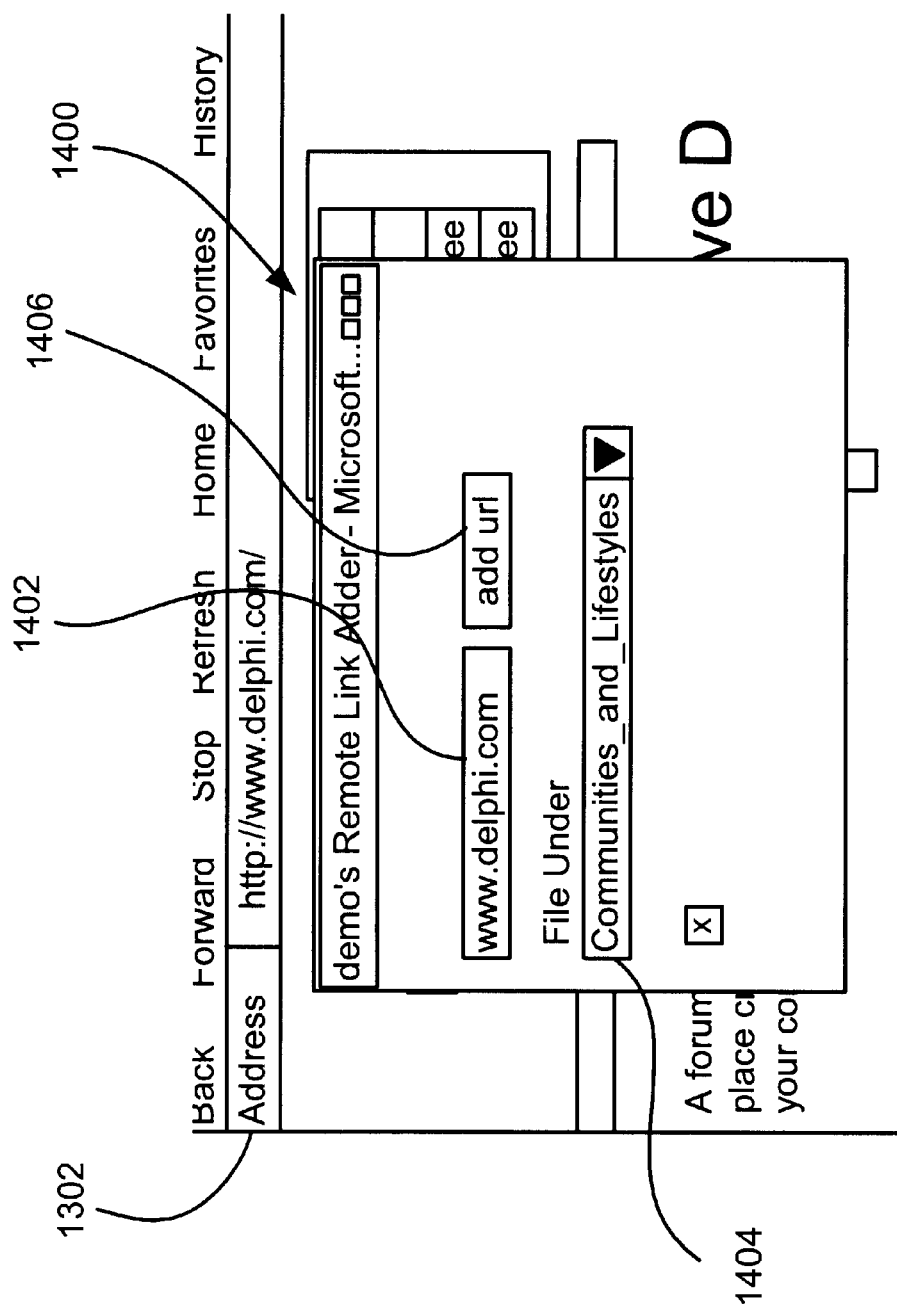
FIG. 14 illustrates a Floating Link Adder pop-up window for adding bookmarks to an online bookmark account in accordance with an embodiment of the present invention.

To add links to a user account without coming back to the user account page, a user may use the Floating Link Adder pop-up window 1400 which is illustrated in FIG. 14. This feature is useful when using the present invention from a computer that is not the user's regular workstation.

With reference to FIG. 7, a Floating Link Adder button 722 may be clicked on from a user account page for displaying of the Floating Link Adder pop-up window 1400 illustrated in FIG. 14. In the pop-up window 1400, the user may then input in box 1402 the URL that they want to add. By default, the new link will be added to the top level folder in the user's account. The user may also choose the specific folder that users want the new link to be added to by selection of a folder displayed in box 1404. Clicking on the Add URL button 1406 adds the link to the user's account.

Add & Manage Folders

Creating a Folder

Figure 15:
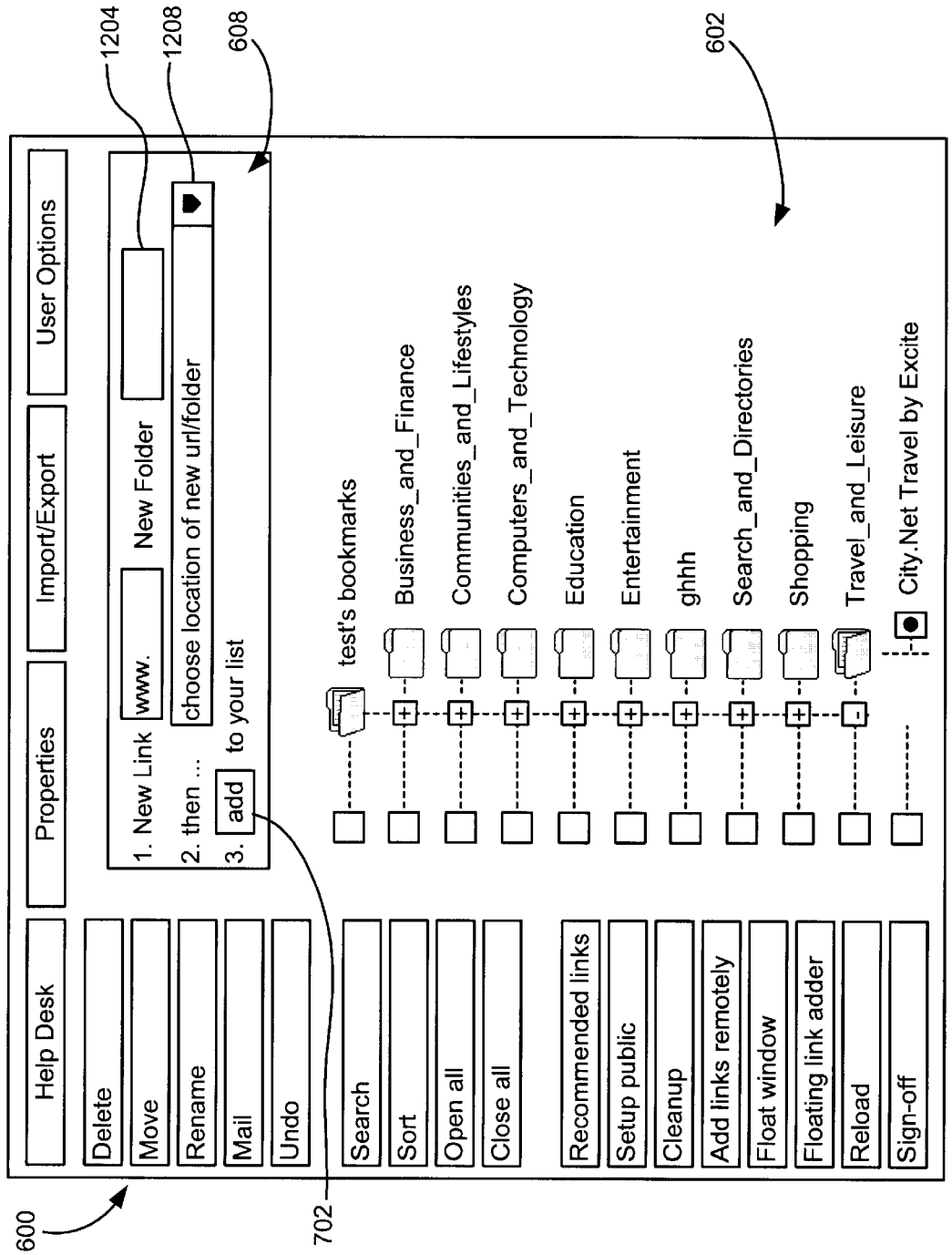
FIG. 15 illustrates an online bookmark account and, in particular, features for creating a folder in accordance with an embodiment of the present invention.

With reference to FIG. 15, to create a folder, a user may first type the name of the folder the user wants to be created in "New Folder" space 1204 in the bookmark adding area 608. The user may then click on the "Add" 702 to created the new folder. When their folder is created, the new folder is displayed with the other folders of the user in the central area 602.

Creating Folders within Folders

Users may nest folders within folders if so required. To create a new folder within an existing folder, a user may first choose the destination folder from the drop-down menu labeled "File Under" located above their displayed bookmarks of the page. This will ensure that the new folder the user creates will be placed in the folder that the user has chosen. The user then types the name of the folder the user wants to be created in the space to the right of the button titled "New Folder" and then clicks on the "New Folder" link in the top navigation bar. When their folder is created, the user should see that it has been added to their list of current folders.

Undeleting Bookmarks/folders

A user may undo the effects of the last editing step that the user took off their page. To do so, the user clicks on the "undo" button 724 in the left menu bar 604 (see FIG. 7). This will undo the effect of the last step that the user had executed. Note that undo feature may be used only for the last edit step that the user took. Clicking on undo the second time may redo the step that users had undone.

Viewing the Contents of a Folder

If the contents of their folders are not already visible, click on the "+" sign 616 next to the left of the icon and name of the folder (see FIG. 6). Note that the icon should represent a closed folder, and the sign next to it should be a "−" sign 618 when the list of bookmarks and folders within this folder is not being displayed. Clicking on the "+" to the left of the closed folder icon should change that icon to an open folder icon, a "+" sign to a "−" sign , and should display the contents of that particular folder including all the bookmarks and folders. To view the contents of any one of the folders within the current folder, click on the "+" sign to the left of the folder icon and the folders contents will be displayed as well.

Hiding Contents of a Folder

If the contents of their folders are being shown, click on the "−" sign 618 next to the left of the icon and name of the folder. Note that the icon should represent an open folder, and the sign next to it should be a "+" sign when the list of bookmarks and folders within this folder is being displayed. Clicking on the − to the left of the open folder icon should change that icon to a closed folder icon, a "−" sign to a "+" sign, and should hide the contents of that particular folder. To hide the contents of any folder within an open folder, just click on the "−" sign to the left of the folder icon. Doing so will hide the contents of this folder from the current display.

Editing Links/Folders

Users may edit their bookmarks with a single click in their user accounts. This may be accomplished by choosing the links that the user wants to edit and then pressing the button corresponding to the desired function. In an embodiment of the present invention, the user may choose to:

delete links and folders;

move links and folders; and rename links and folders.

Deleting Links/Folders

Figure 16:
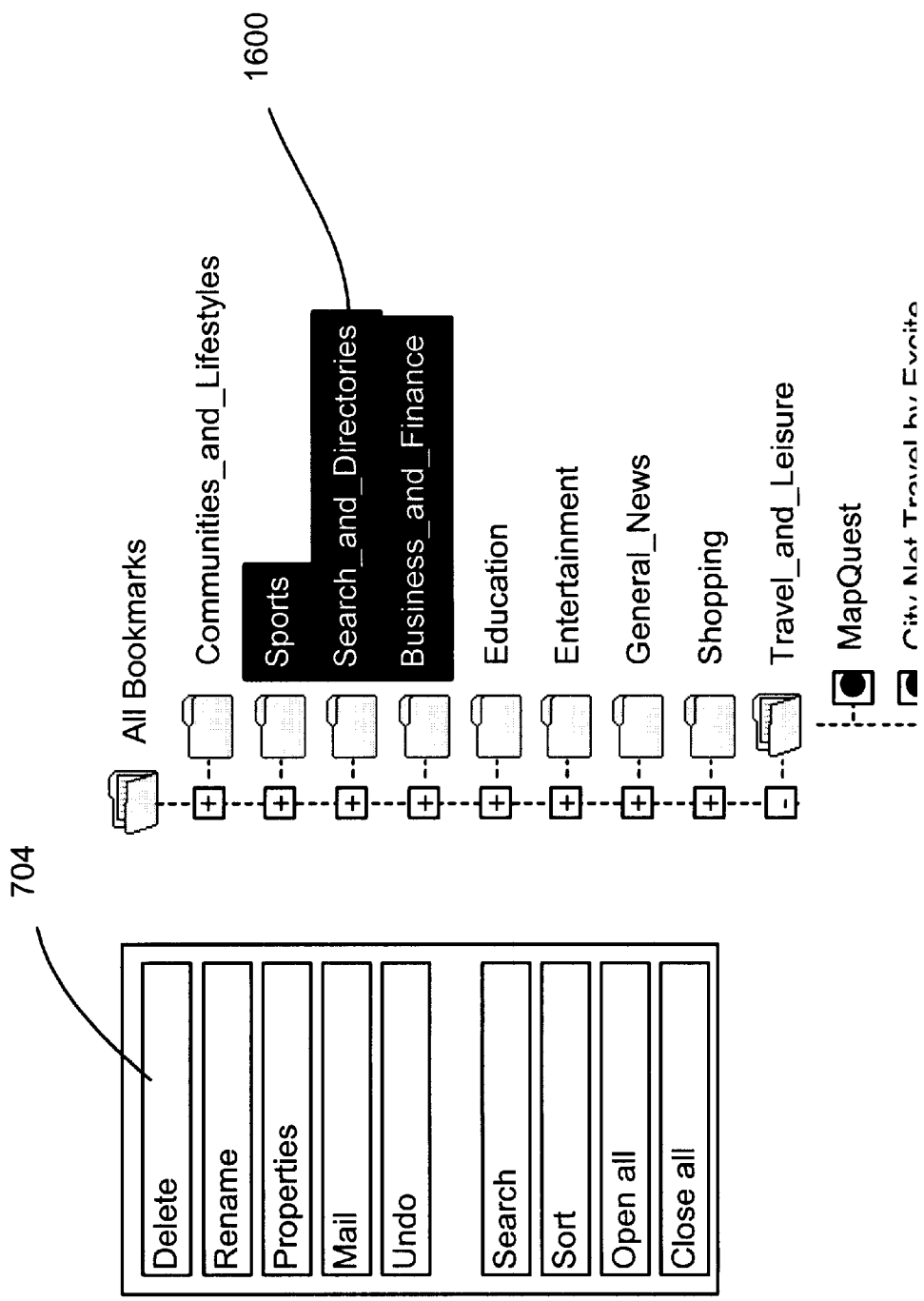
FIG. 16 illustrates portion for an online bookmark account while deleting a bookmark or folder from the online bookmark account in accordance with an embodiment of the present invention.

With reference to FIG. 16, there may be two ways to delete links or folders in the drag and drop embodiment of the present invention:

Selection of the link(s)/folder(s) by highlighting them 1600 and then using the "delete" button 704 on the left menu bar. The chosen bookmarks are then removed immediately; and/or Clicking on the link/folder so that it is highlighted and then right-clicking a mouse-type input device. From the drop-down menu that appears upon the right-click "delete" is then chosen. The links/folders are then removed from the account immediately.

Moving Links/Folders

Figure 17:
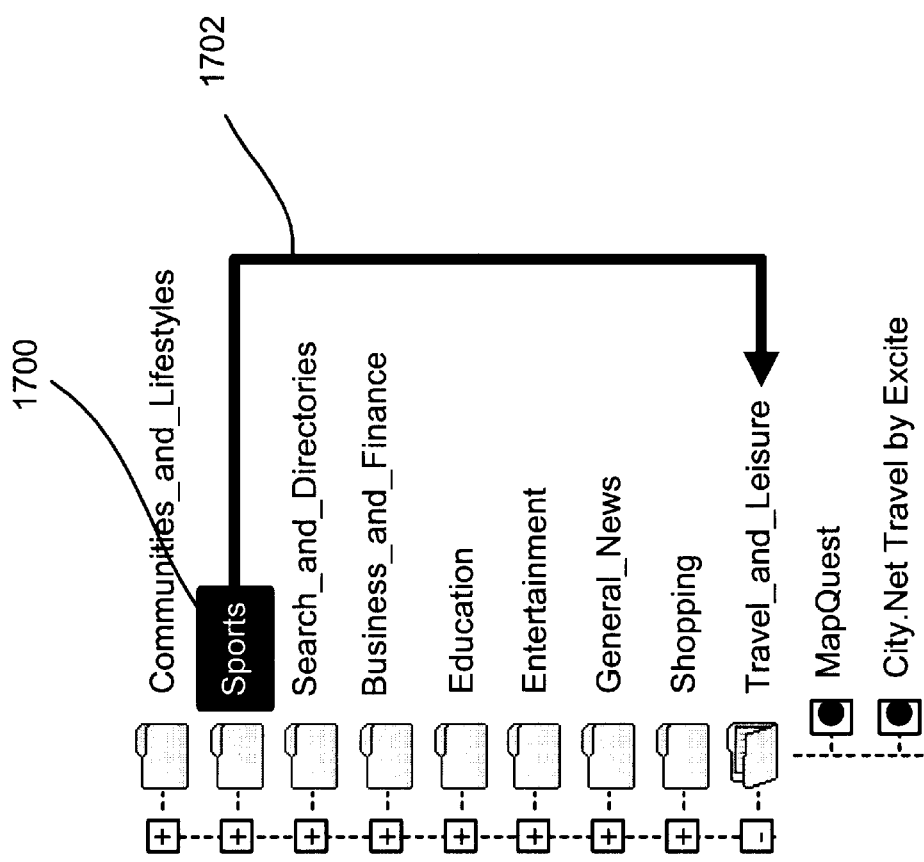
FIG. 17 illustrates portion for an online bookmark account while moving a folder in the online bookmark account in accordance with an embodiment of the present invention.

With reference to FIG. 17, to move links/folders within an account, a user first selects the link(s)/folder(s) by highlighting them 1700 with their mouse-type input device. As an option, the user may also use the Ctrl and Shift keys to make multiple selections as in the windows desktop environment. The selections may then be moved 1702 by holding down the left-click button on the mouse which may then be released wherever the user wishes the links to be placed. As an option, to move within a folder, release of the left-click button may be done when the destination folder is highlighted.

Renaming Links/Folders

There may be two ways a user may rename links or folders in a drag and drop embodiment of the present invention. To rename links/folders within a user account, the individual link/folder is selected by highlighting it with an input device such as a mouse-type input device. As an option, a user may not be able to rename multiple selections in one operation.

In one embodiment, upon right-clicking on the link with the user's mouse displays a drop down menu with a rename selection. The choosing of the rename selection from the drop down menu. The title will be replaced by a rename box into which a new title for the link may be entered. With reference FIG. 18, as another option, once the link/folder is highlighted, clicking on rename selection 706 from the left hand menu bar displays a drop down menu with a rename selection which, upon selection, replaces the title box with a rename box into which a new title for the link may be entered.

Importing Bookmarks

A user may import Netscape "Bookmarks" or Internet Explorer "Favorites" directly into their user account. A user may either add them ("append" them) to the user's current list of bookmarks, or the user may "overwrite" the user's current list with the ones that the user imports. In an exemplarily embodiment of the present invention importation may be accomplished with the following steps: (1) Go to the "Import/Export" box 714 on the top panel (see FIG. 7); and then (2) Select either "automatic" or "manual" to indicate how to import the bookmarks.

Automatic Importing Bookmarks

Figure 19:
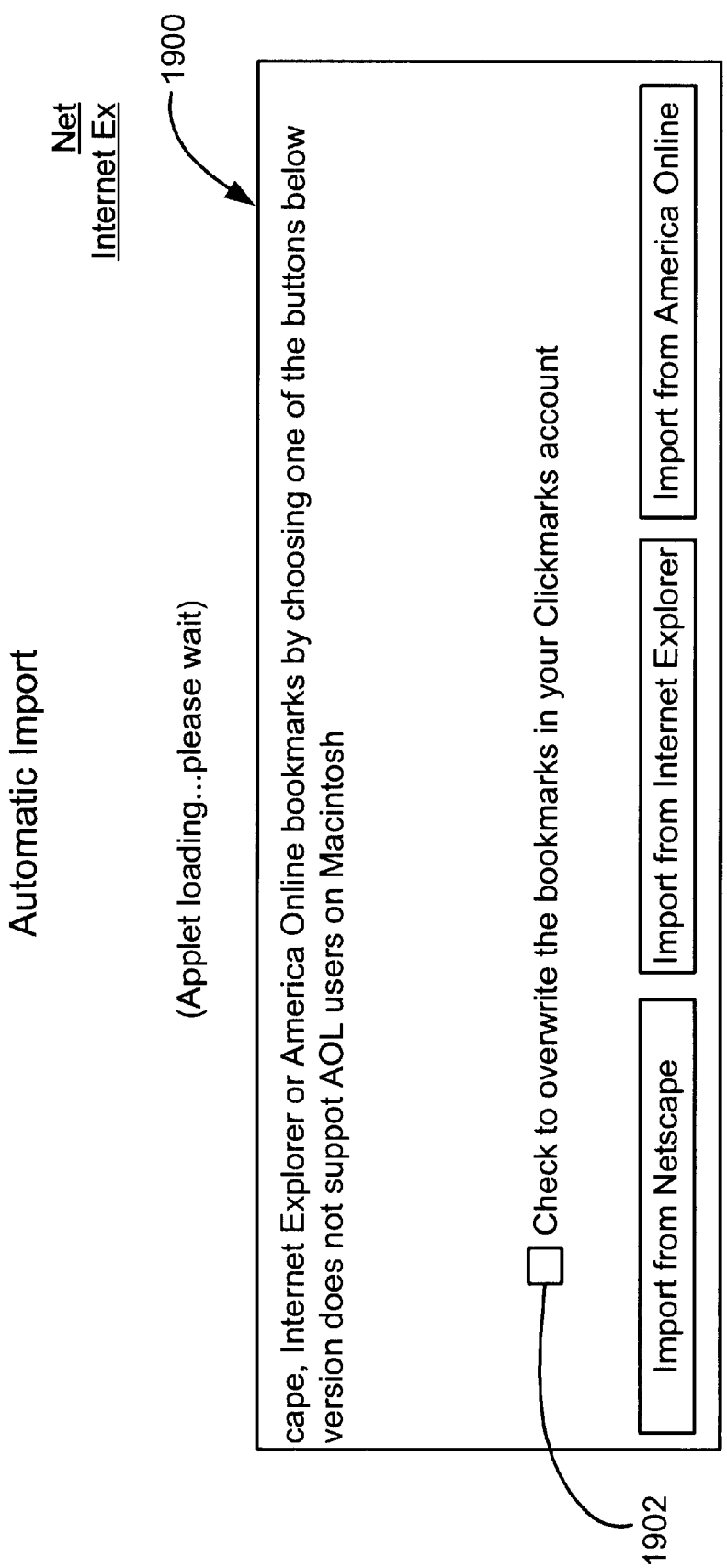
FIG. 19 illustrates a display for automatic importing of bookmarks into a user's online bookmark account in accordance with an embodiment of the present invention.

Automatic Import allows a user to import bookmarks automatically from their desktop browser. Once automatic import is selected, a Java Applet will load. Note that it may take a little time to do that. Once the applet is loaded, the user may be asked via a dialog box 1900 to select the browser as illustrated in FIG. 19. The user then may choose whether they want to overwrite or append to the existing bookmarks with the selection 1902. The bookmarks may then be imported immediately.

Manually Importing Bookmarks

In an exemplary embodiment of the present invention, to manually import bookmarks, a user first selects the Import/Export button 714 displayed on the top control menu bar on the user account page. The user then follows the following instructions corresponding to the particular browser the user is using:

Importing from the Netscape Browser

In the Netscape browser, select Bookmarks from the top menu.

Click on Edit Bookmarks.

A new window will open up with all of the user's bookmarks visible therein.

From the bookmarks editing window select Save As from the File menu.

This will save the user's bookmarks file in the directory users specify.

Enter the desired file name.

Note the path to the file by clicking on the select arrow next to the Save in: field.

Also note the bookmark file name.

Now return to the Bookmarks Import page in their online bookmark account.

Use the Browse button given on the page to locate the bookmarks file that the user created and saved in the previous steps, outlined above.

Select the bookmarks file.

Press Submit.

The bookmark file will be imported into their online bookmark account.

Importing from the Internet Explorer IE.5

A user first converts their Microsoft favorites to an HTML file.

On the user's browser, go to the File menu and select Import and Export.

Choose Export Favorites when it gives the Import/Export Selection window.

Click Next until users get to the Export Favorites Destination.

Select Export to a File or Address and enter:

C:\My Documents\clickmarks.html

Click Next and then click on Finish.

In the text field of the Browse button on the Import page, type C:\My Documents\clickmarks.html If the user has saved it on some other place and named it something else, then type that in.

Click on Submit Options.

Return to the Bookmarks Import page in their online bookmark account.

Use the Browse button given on the page to locate the bookmarks file that users created and saved in the previous steps, outlined above.

Select the bookmarks file.

Press Submit.

The user's bookmark file is then be imported into their online bookmark account.

Exporting Bookmarks/Favorites

Figure 20:
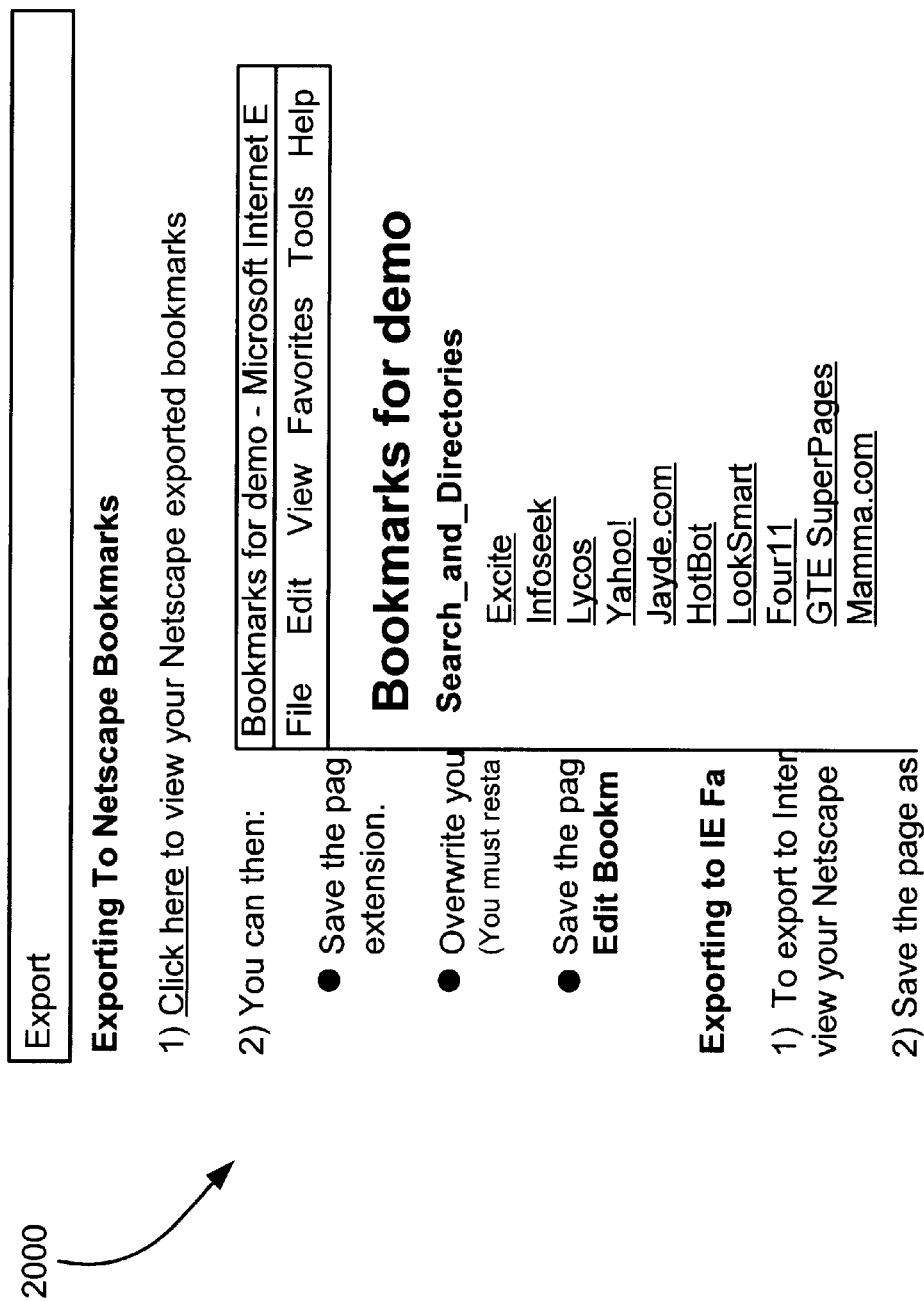
FIG. 20 illustrates a display displayed upon a selection for exporting bookmarks from a user's online bookmark account in accordance with an embodiment of the present invention.

The present invention also enables users to export their bookmarks/favorites back to the desktop browser. A method that a user may use to export the bookmarks from their user account back to their Netscape or Internet Explorer browser is described as follows: (1) Choose "Import/Export" 714 from the top menu bar (see FIG. 7) to display a page with a "Export Your Bookmark" selection. Upon selection of this selection, a set of instructions 2000 are displayed as illustrated in FIG. 20 which a user may then follow to export their bookmarks.

Export Bookmarks into to Netscape

To export to Netscape, click on the Import image. From the import page click on the "export their bookmarks" link. Follow the Exporting To Netscape Bookmarks steps. In the two step process users first view the Netscape style bookmarks as an HTML file, then save the file on their local drive.

Export Bookmarks to Internet Explorer

To export to Internet Explorer, click on the Import image. From the import page click on the "export their bookmarks" link. Follow the Exporting To IE Favorites steps. In the three step process users first view and save their online bookmark account as Netscape style bookmarks. The final step requires users to convert the saved Netscape bookmarks file to Internet Explorer favorites using a freely downloadable Microsoft utility.

Managing Bookmarks

The present invention may also provide a user with functions to help the user manage their account. A user may "Sort" their links, "Search" their bookmarks for keywords, and/or "Clean Up" their user account by removing stale and duplicate links.

Search

Figure 21:
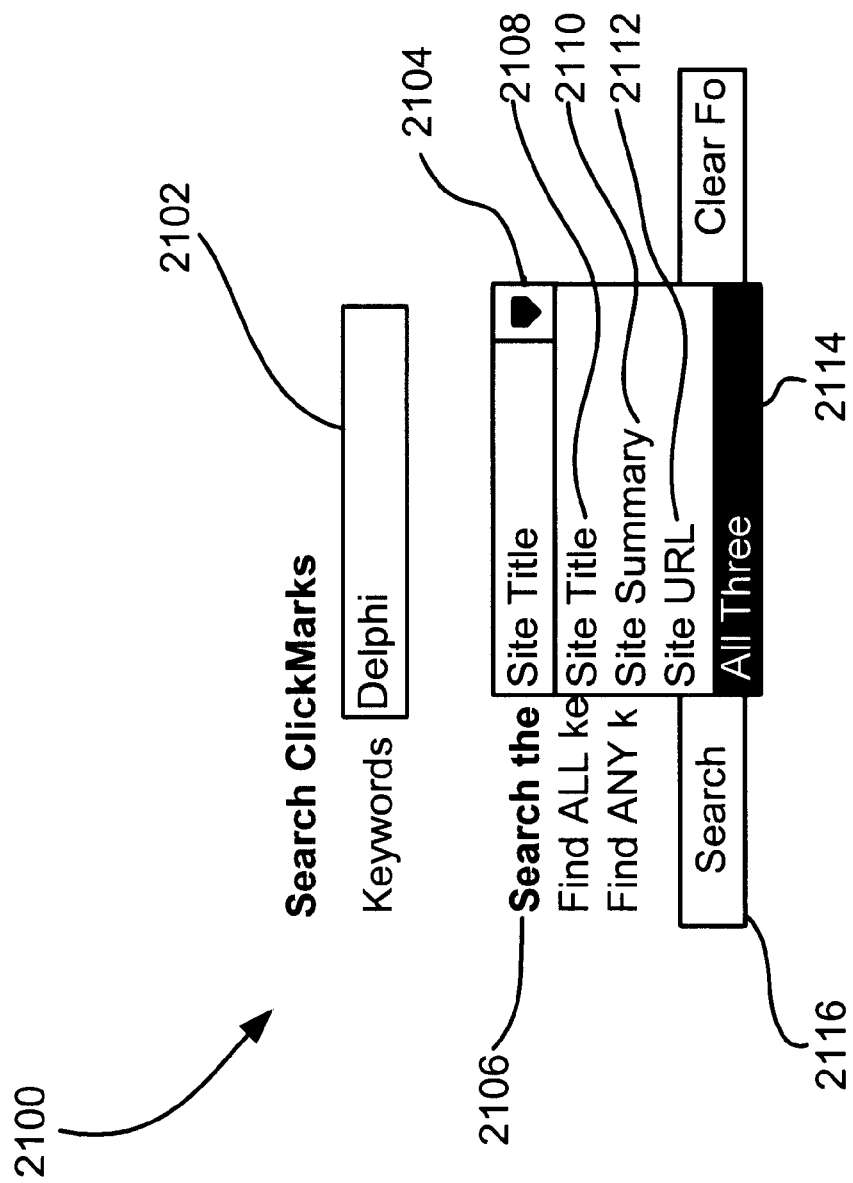
FIG. 21 illustrates a dialog box for a search feature for keyword searching of bookmarks in a user's online bookmark account in accordance with an embodiment of the present invention.

A user may search through their bookmarks for keywords. In an embodiment of the present invention, this may be accomplished by first clicking on the "Search" button 710 on the left menu bar (see FIG. 7) so that a search dialog box 2100 is displayed as depicted in FIG. 21. A keyword(s) may then be entered in the keyword box 2102 and then search area may be chosen for those words by clicking on the down arrow 2104 next to "Search the" 2106 and selecting either Site Title 2108, Site Summary 2110, Site URL 2112, or All Three 2114. A user may also select whether they want to search for links that contain ALL of the keywords or for links that contain ANY of the keywords. To execute the search, the Search Bookmarks button 2116 is then selected.

In an embodiment of the present invention, the search process may display all of the bookmarks in their current bookmark files corresponding to the search keywords that users have entered. In such an embodiment, there may be no limit to the number of bookmarks that will be displayed as a result of their search.

Sorting

Figure 22:
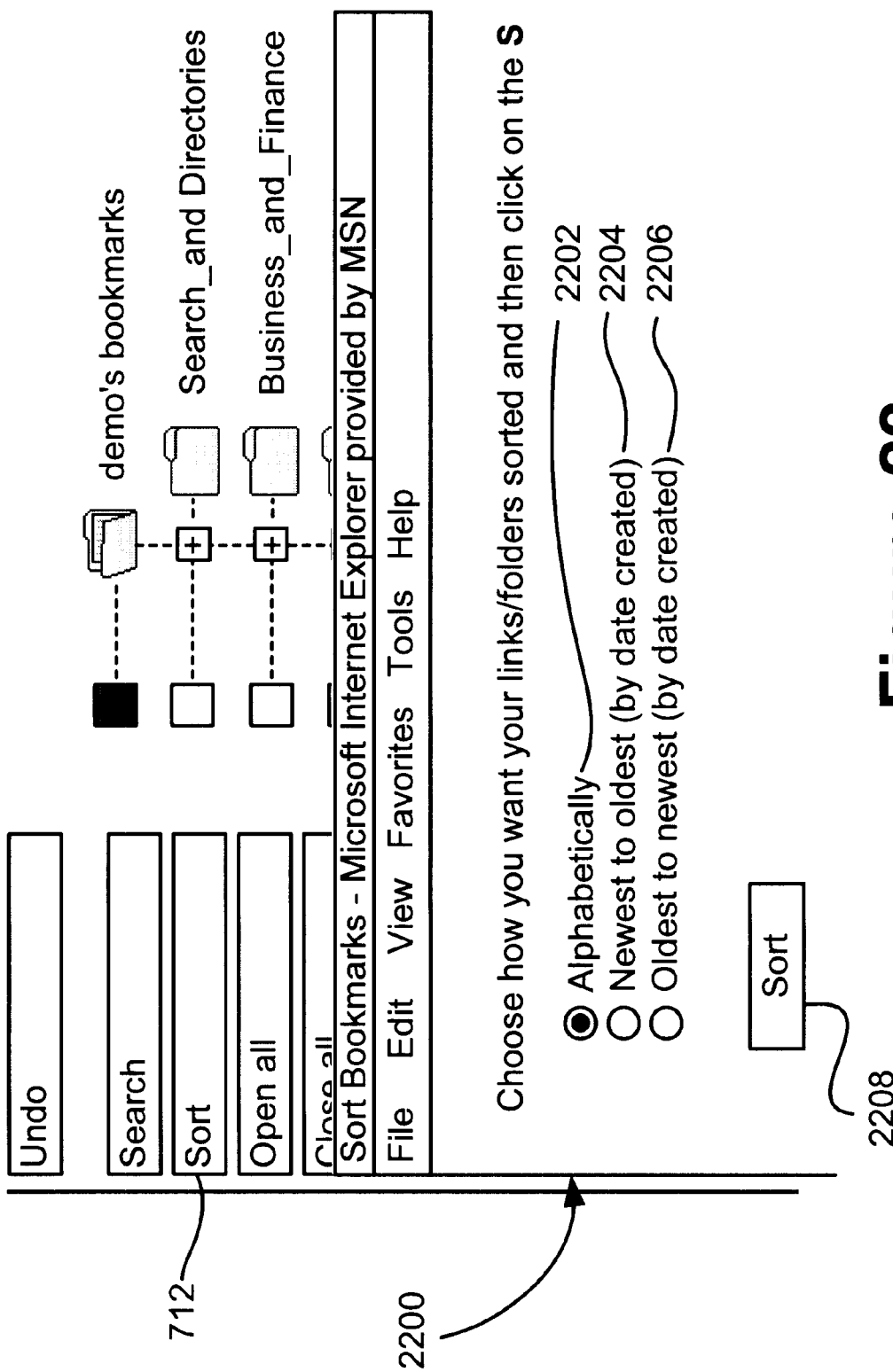
FIG. 22 illustrates a dialog box for a sort feature for sorting bookmarks in a user's online bookmark account in accordance with an embodiment of the present invention.

A user may sort their bookmarks in several orders. In an embodiment of the present invention, this may be accomplished by first clicking on the Sort button 712 on the left menu bar 604 (see FIG. 7) to display a Sort screen 2200 as illustrated in FIG. 22. The Sort screen 2200 may display a plurality of sort order choices 2202, 2204, 2206 that a user may select to choose the sort order they users want. Once a sort order is select, the user may then click on Sort button 2208 to execute the sort function.

In one embodiment, when the alphabetical sort is selected, the bookmarks may be sorted by the first word in the description that appears to the right of the icon for the bookmark. When a sorting by date of creation (newest to oldest) is selected, the bookmarks may be sorted such that the bookmarks most recently created appear first. When a sorting by date of creation (oldest to newest) is selected, the user's bookmarks may be sorted so that the bookmarks most recently created appear last.

Checking for Duplicates or Stale Links

Figure 23:
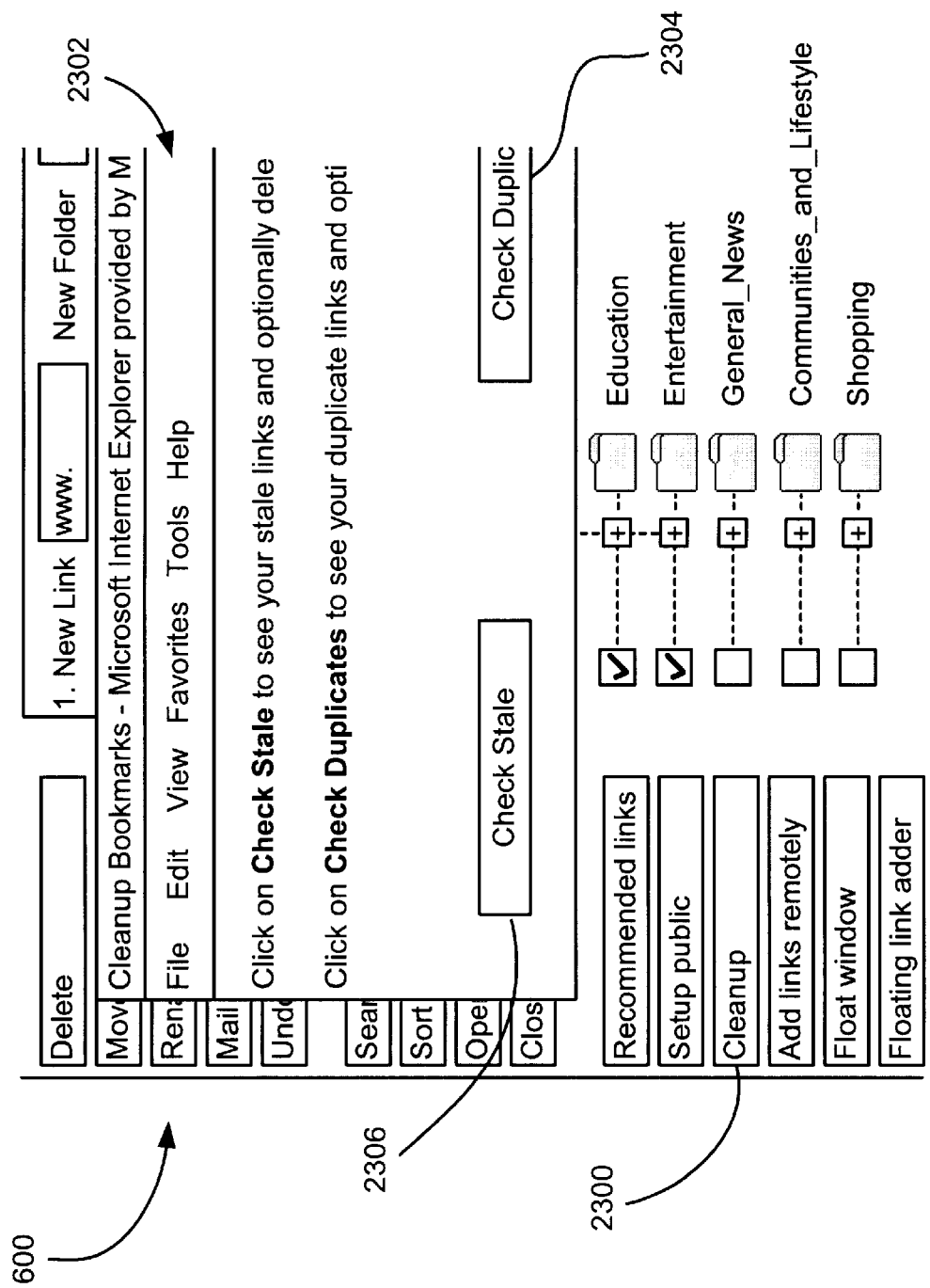
FIG. 23 illustrates a dialog box for a cleanup feature for checking for stale and duplicate bookmarks in a user's online bookmark account in accordance with an embodiment of the present invention.

In one embodiment of the present invention, a cleanup feature 2300 may be included in the left menu bar of the user's online bookmark account 600 to check for duplicate or stale links. Upon selection of the cleanup feature, a cleanup bookmarks screen 2302 may be displayed as illustrated in FIG. 23. This screen 2302, may display two buttons: a "Check Duplicates" button 2304 and "Check Stale" button 2306.

Selection of the "Check Duplicates" button 2304 executes the duplicate bookmark checking function which checks the user's bookmark collection for duplicate bookmarks and then displays a list of any duplicated bookmarks. The user may then be given an option to delete the duplicate bookmarks from their bookmark collection. The duplicate bookmark checking function helps users remove duplicate links from their accounts. Organizing bookmarks into different folders and sub-folders increases the difficulty of keeping track of duplicate bookmarks within their bookmark files. By comparing all the bookmarks and their titles/summaries stored, the bookmark management system identifies duplicate bookmarks stored in an user's online bookmark account, regardless of the folders that they may be stored in and the different titles that they may exist with. A user may therefore remove all the duplicate links that might lead to the same URL. This may be also useful in removing bookmarks that point to old locations of sites, although users may already have the correct updated URL in their files.

Selection of the "Check Stale" button 2306 executes the stale bookmark checking function which checks the user's bookmark collection for old or stale bookmarks (i.e., bookmarks that are broken or have moved) and then displays a list of any stale bookmarks in the user's bookmark collection. The user may then be provided the options of Renaming, Deleting, or Doing Nothing with the listed stale bookmarks. The stale bookmark checking function helps a user remove bookmarks that have expired since the user last used them.

E-mailing Bookmarks

Figure 24:
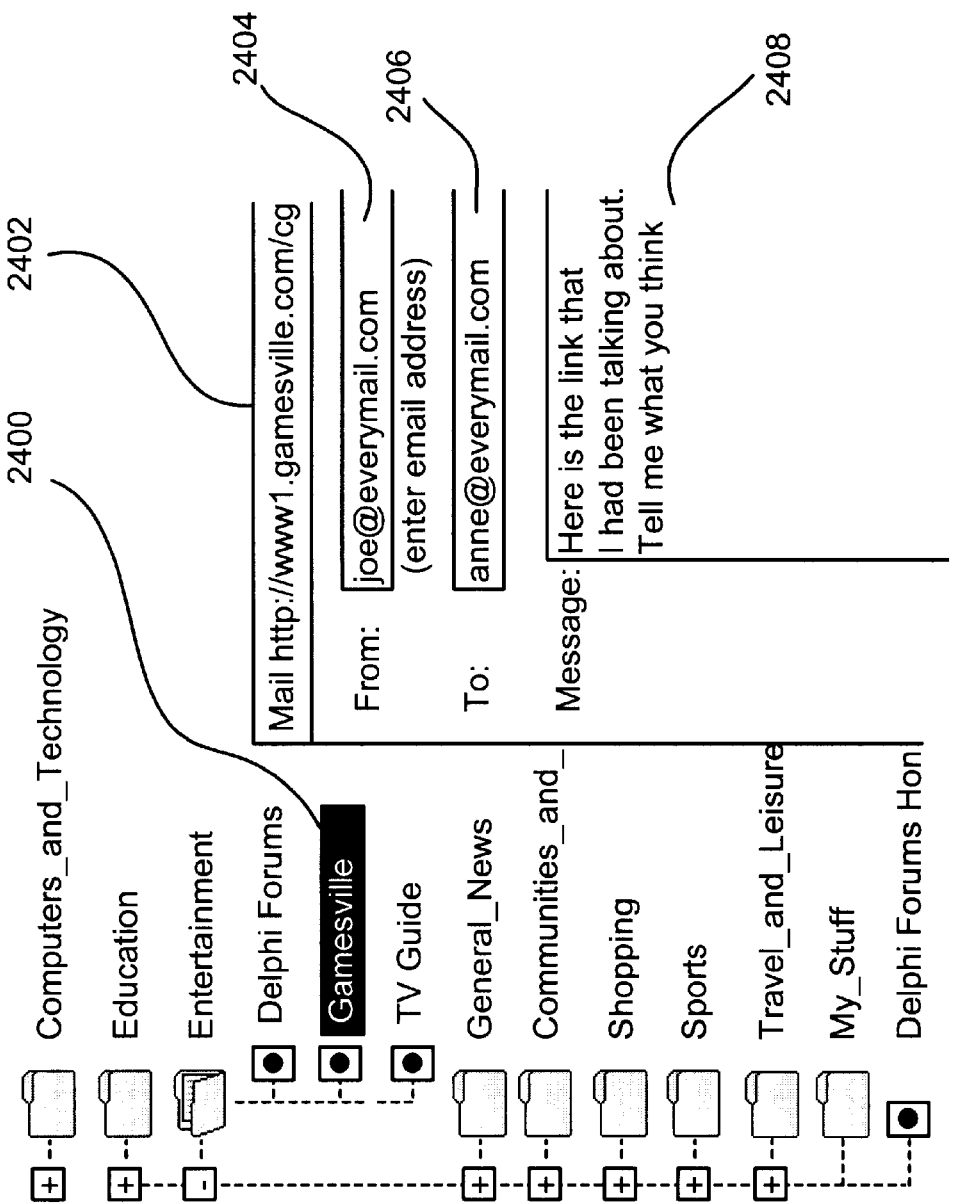
FIG. 24 illustrates a portion of a frame of an e-mail feature of a user's online bookmark account in accordance with an embodiment of the present invention.

This feature provides a handy way for a user to e-mail a their bookmarks to friends without having to cut and paste the URLs into e-mail messages. As best illustrated in FIG. 24, this function may be accomplished by first selecting all the bookmarks and folders 2400 to be e-mailed (multiple selections may be made using the Ctrl and Shift keys as in a windows desktop environment) and then selecting the mail button 716 displayed on the user's bookmark account page (see FIG. 7). Upon selection of the mail button 716, an e-mail screen 2402 may then be displayed into which a sender's and receiver's e-mail addresses may be entered in the appropriate boxes 2404, 2406. As an option, a message box 2408 may also be included for permitting the adding of a note to accompany the links. A "send" button may also be included for executing the transmission of the e-mail.

Making Bookmarks Public

Figure 25:
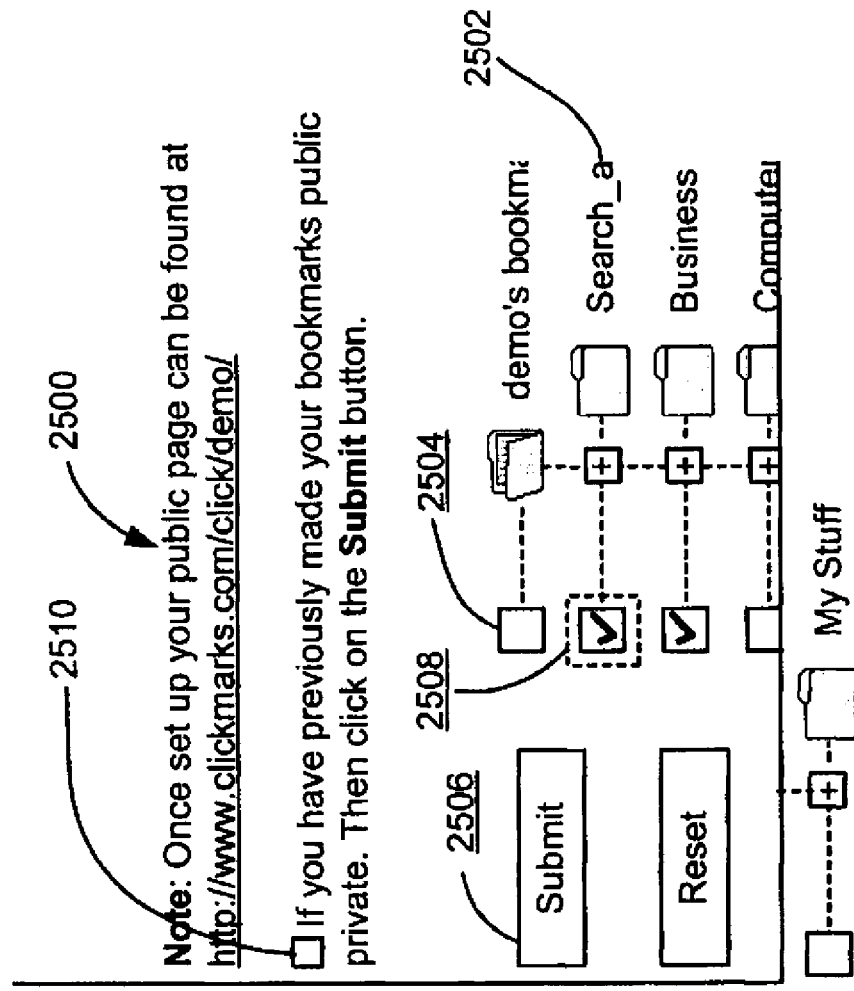
FIG. 25 illustrates a portion of a frame for making a user's private bookmarks public and a user's public bookmarks private in accordance with an embodiment of the present invention.
Figure 26:
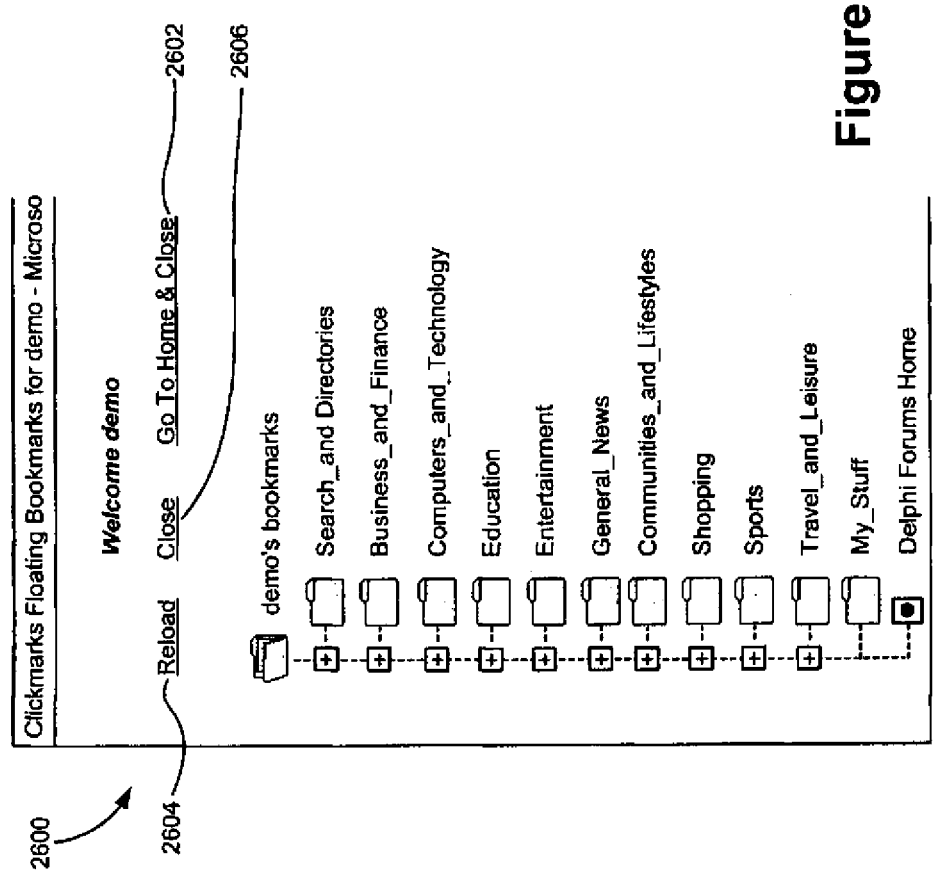
Figure 27:
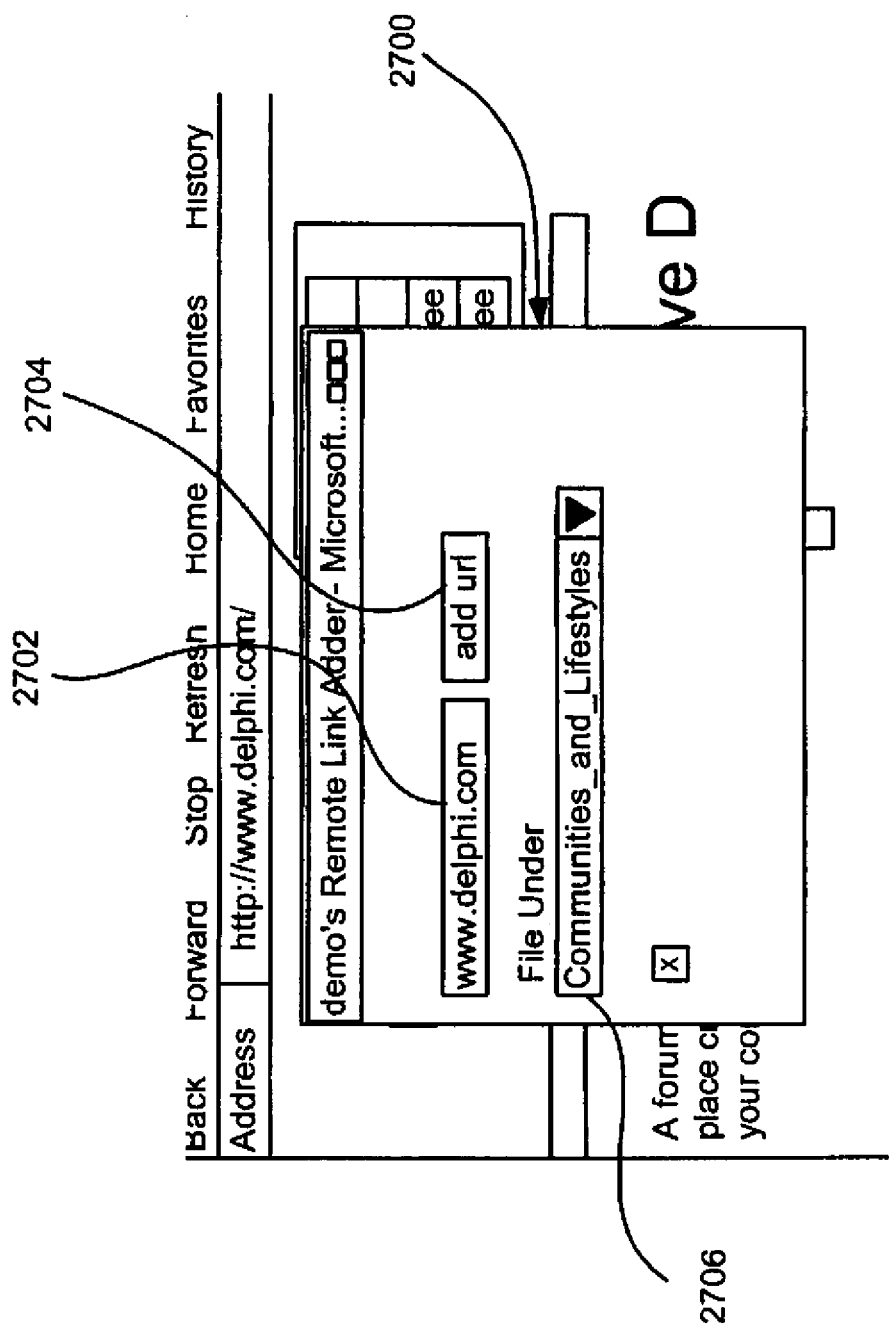
Figure 28:
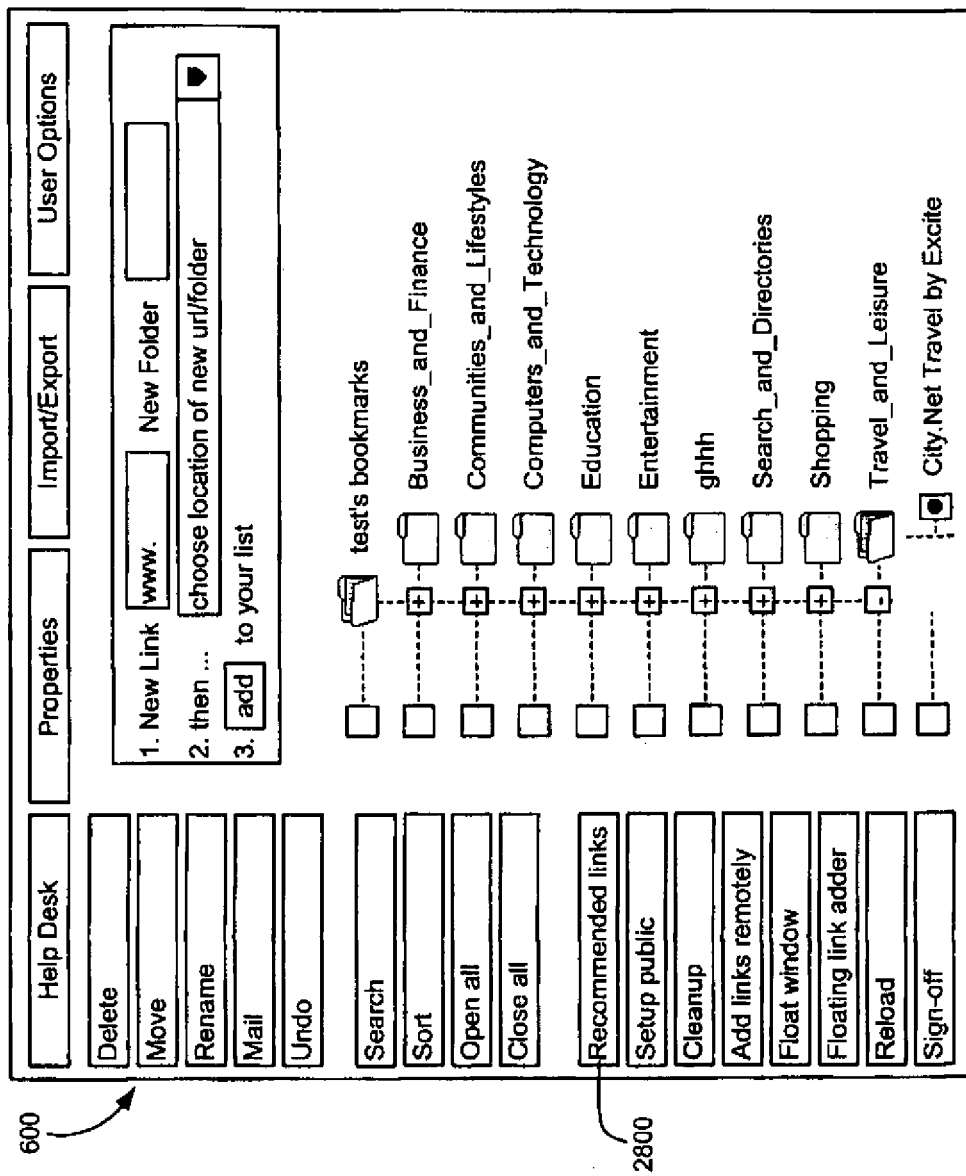
Figure 31:
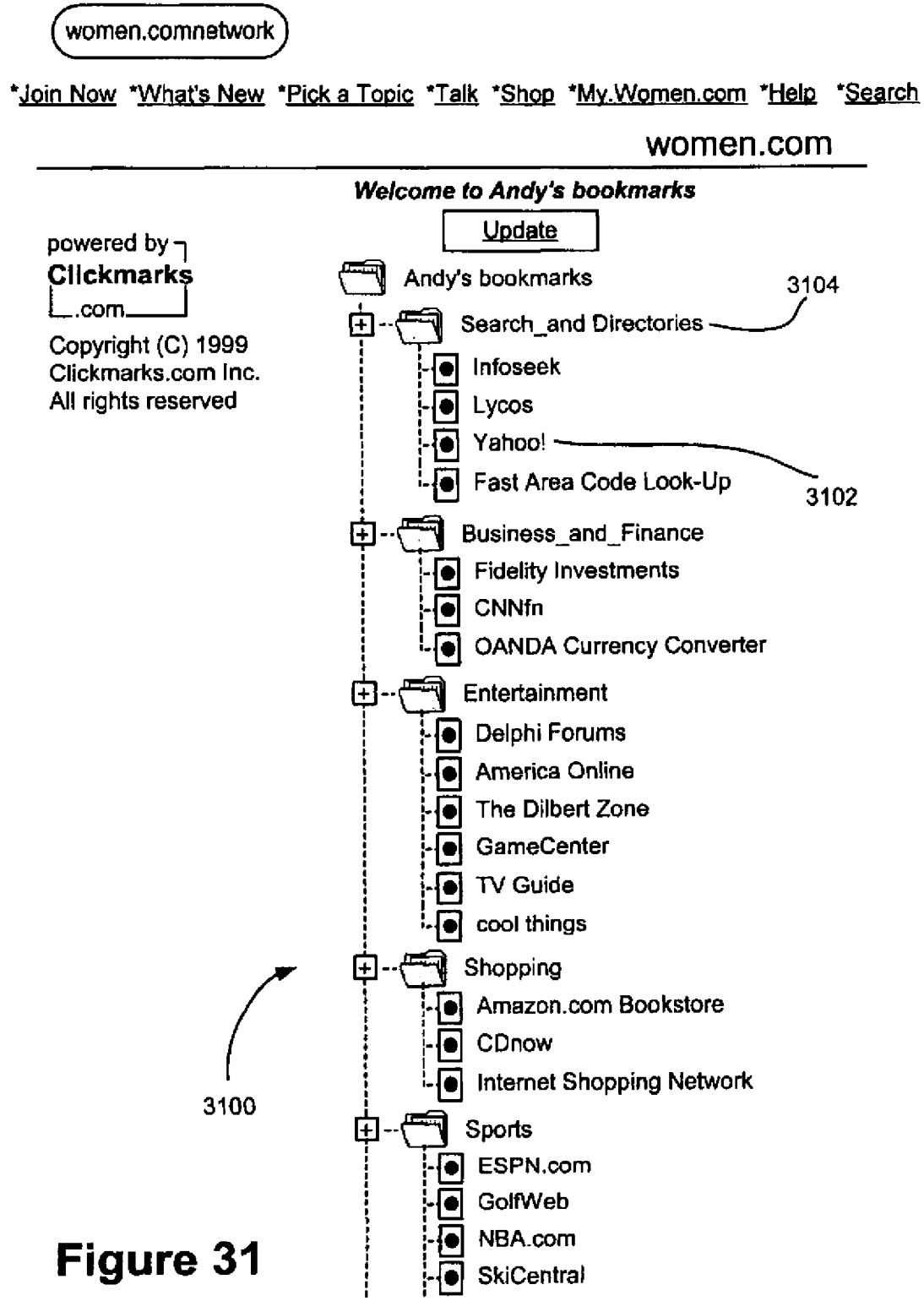
Figure 1:
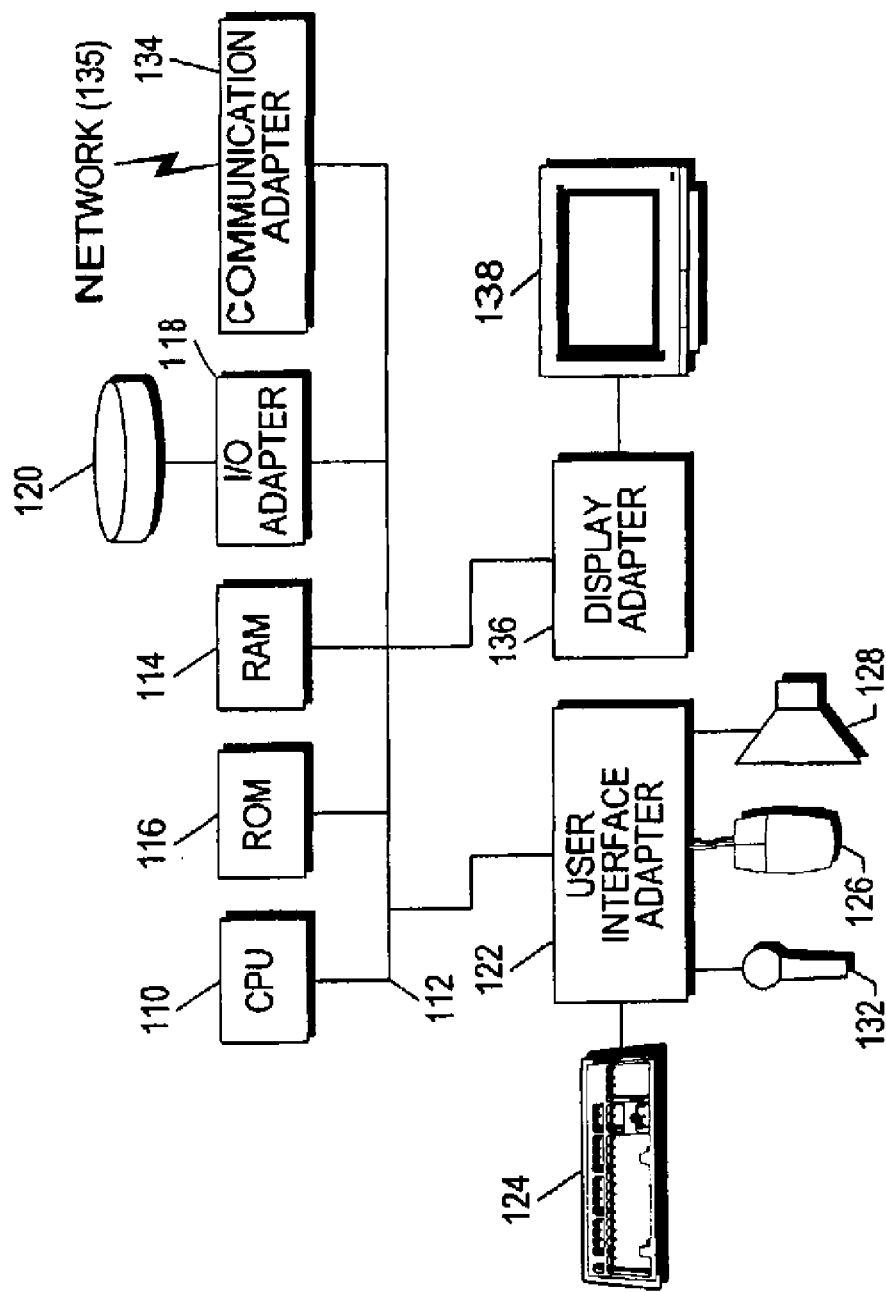
Figure 2:
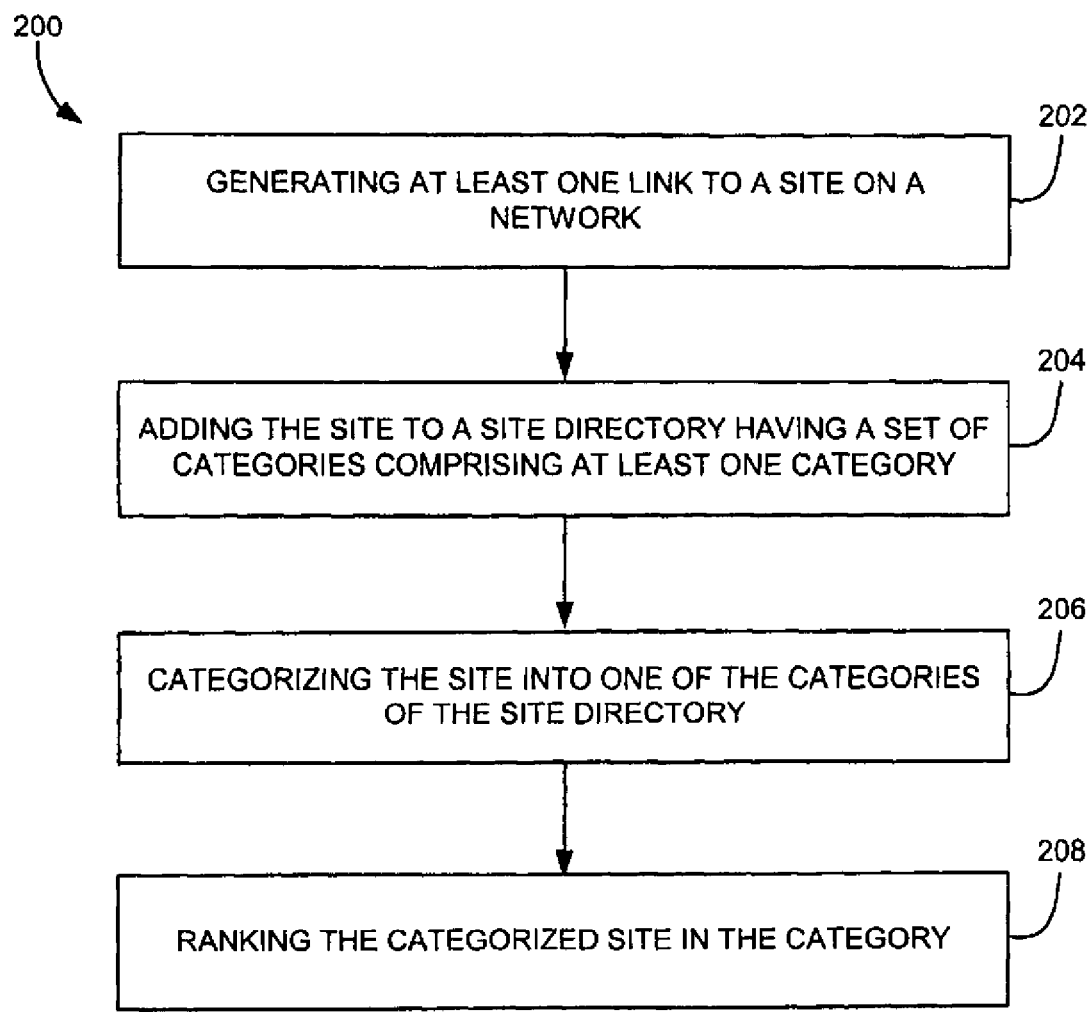
Figure 3:
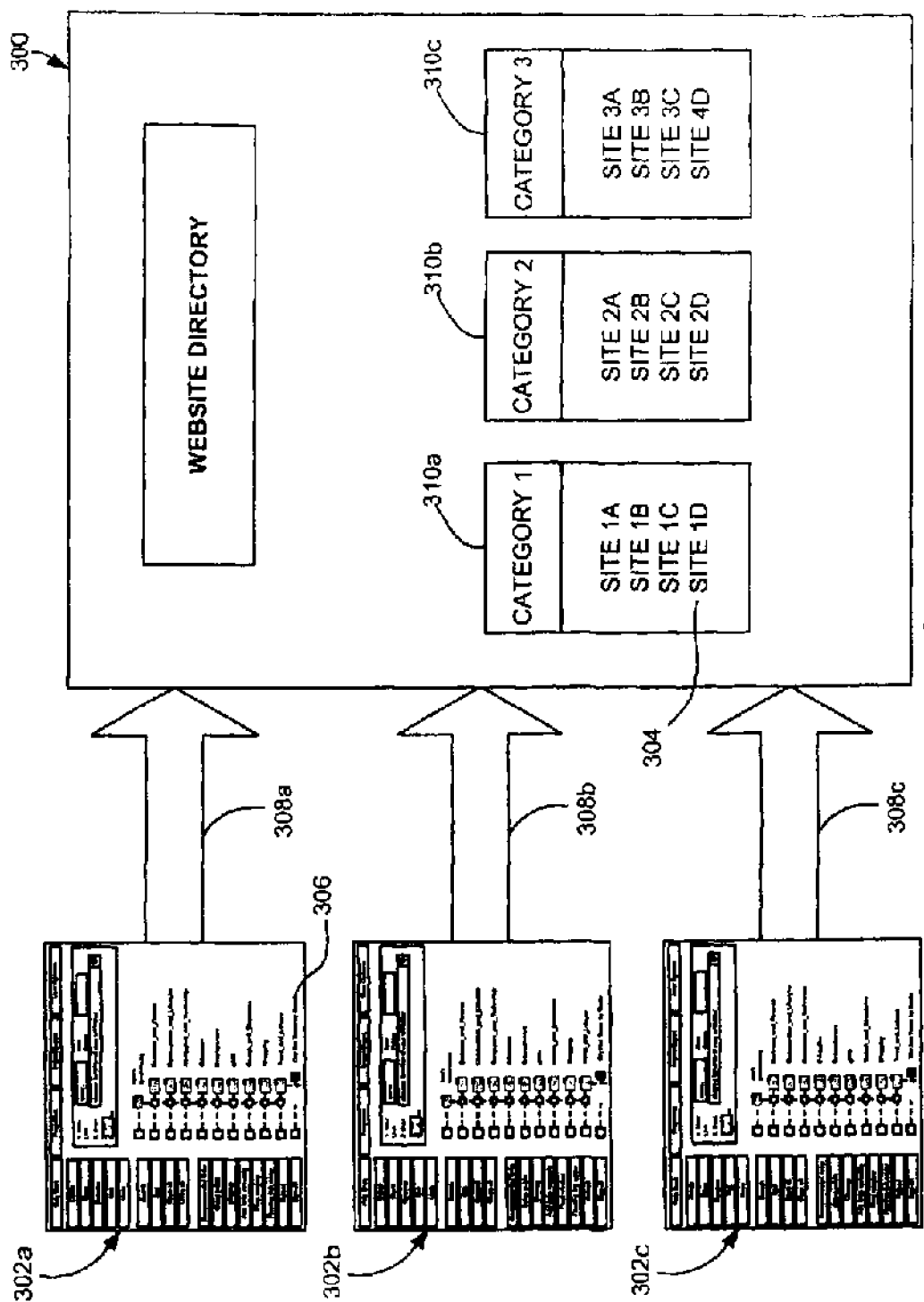
Figure 4:
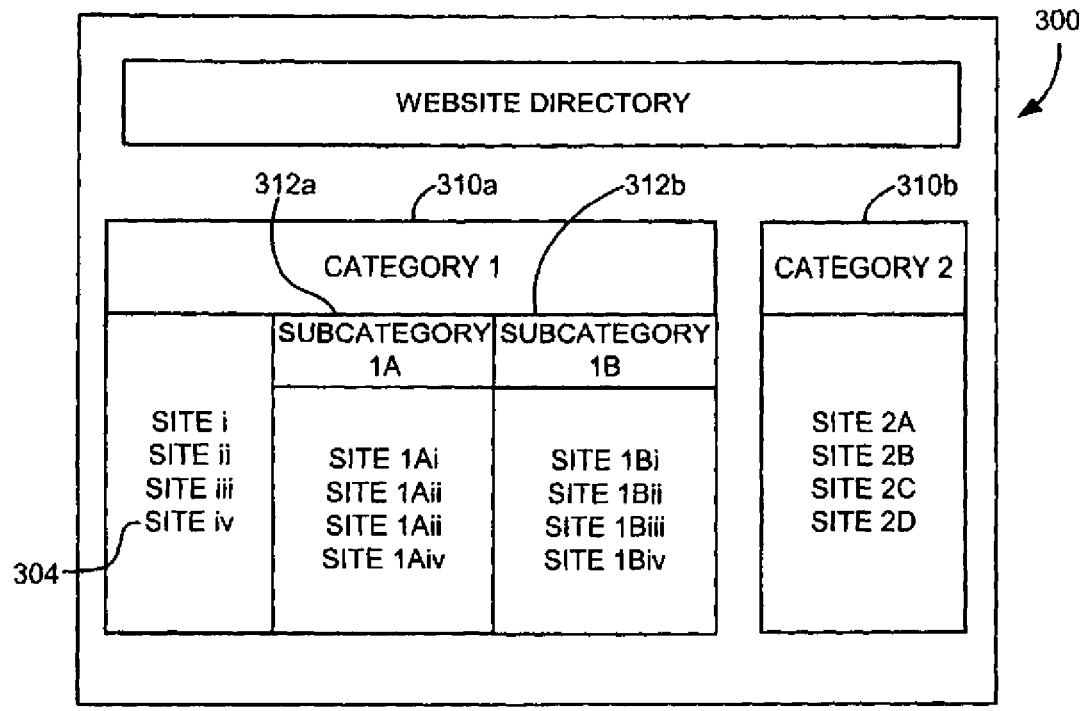
Figure 5:
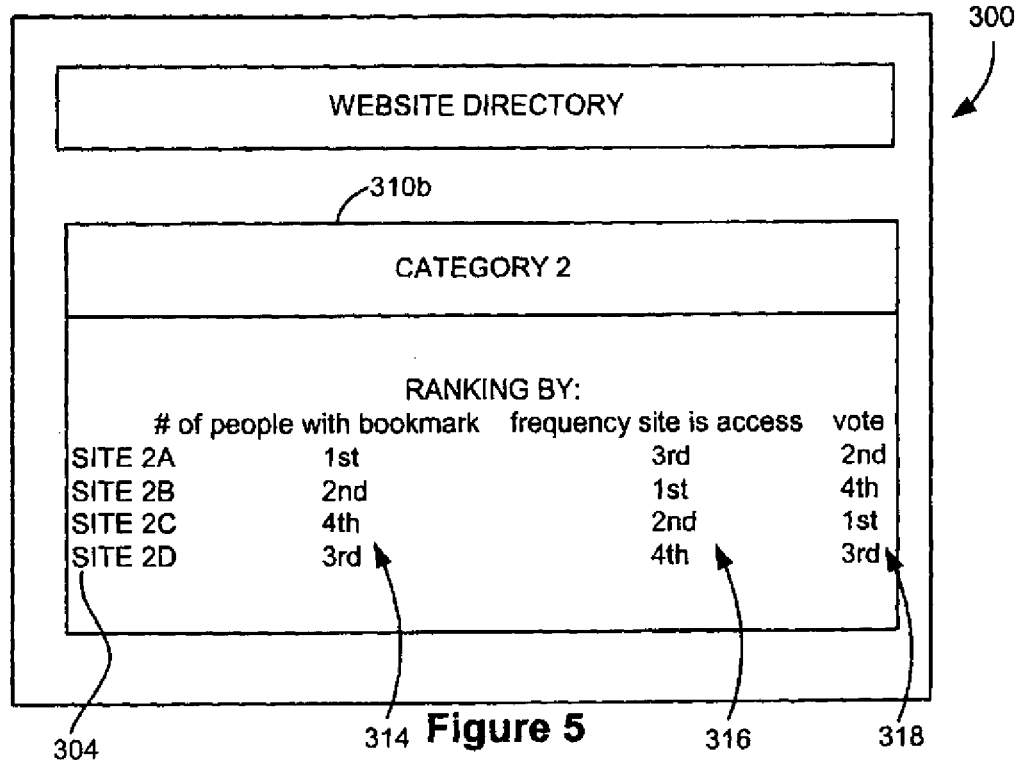
Figure 6:
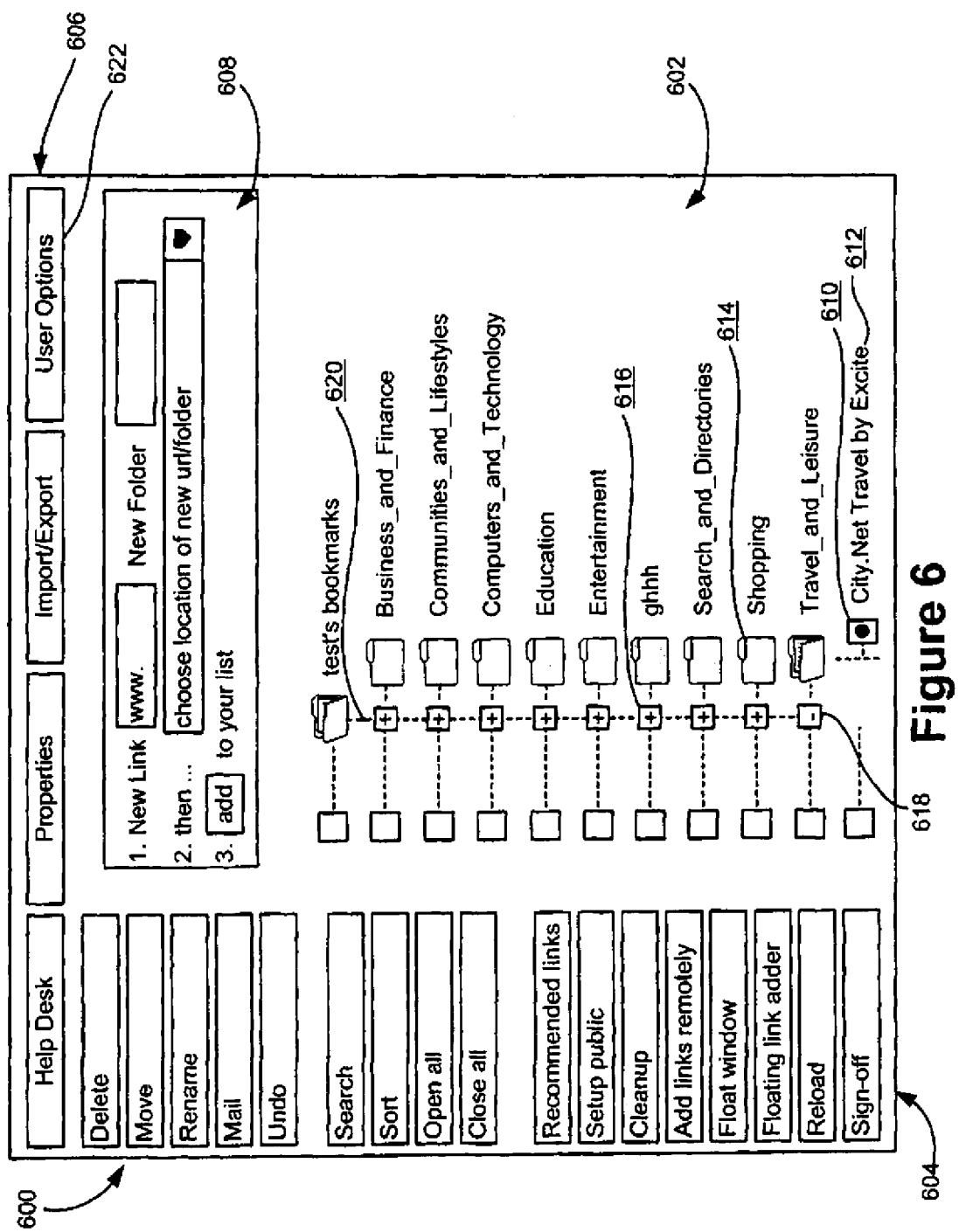
Figure 7:
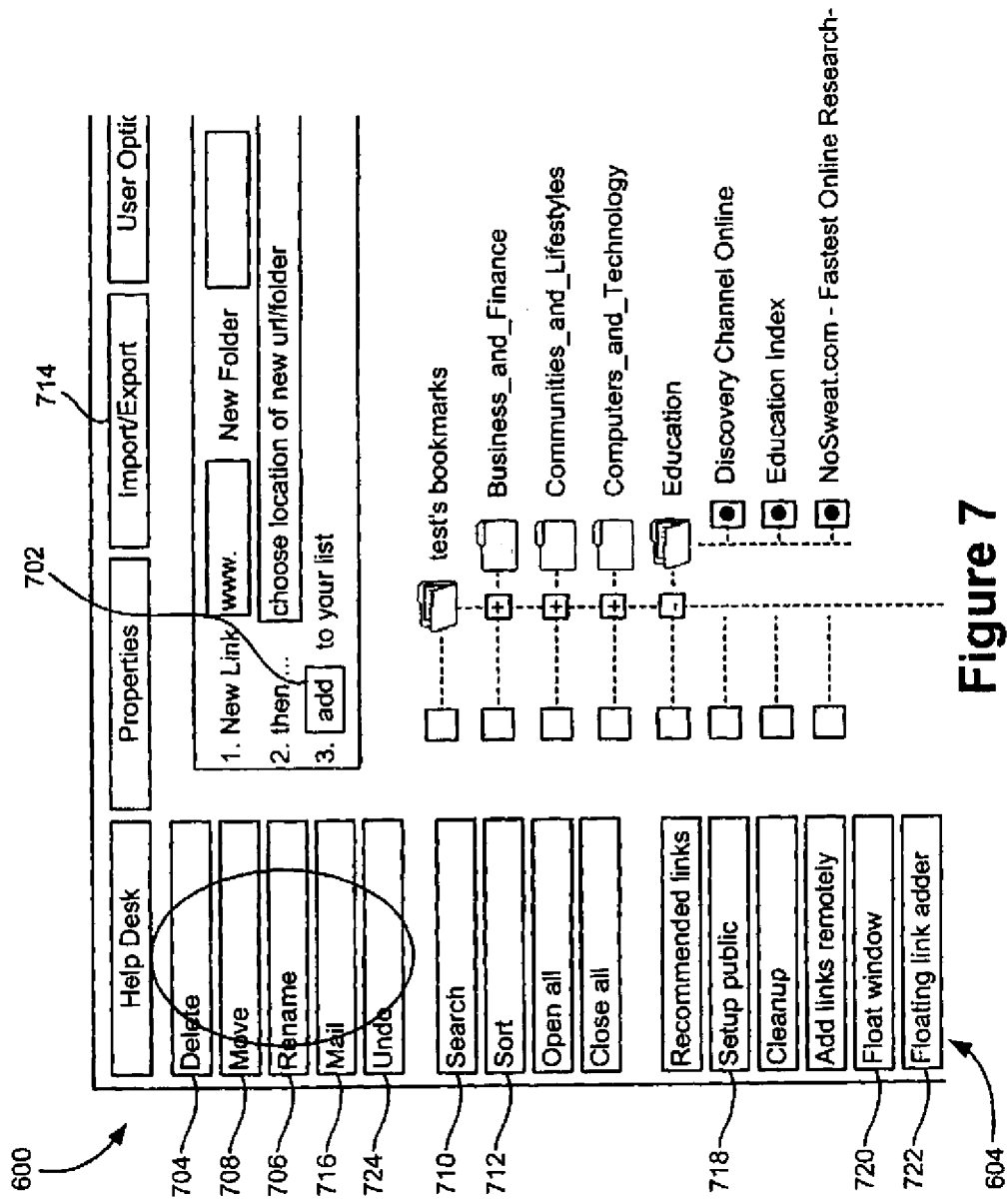
Figure 8:
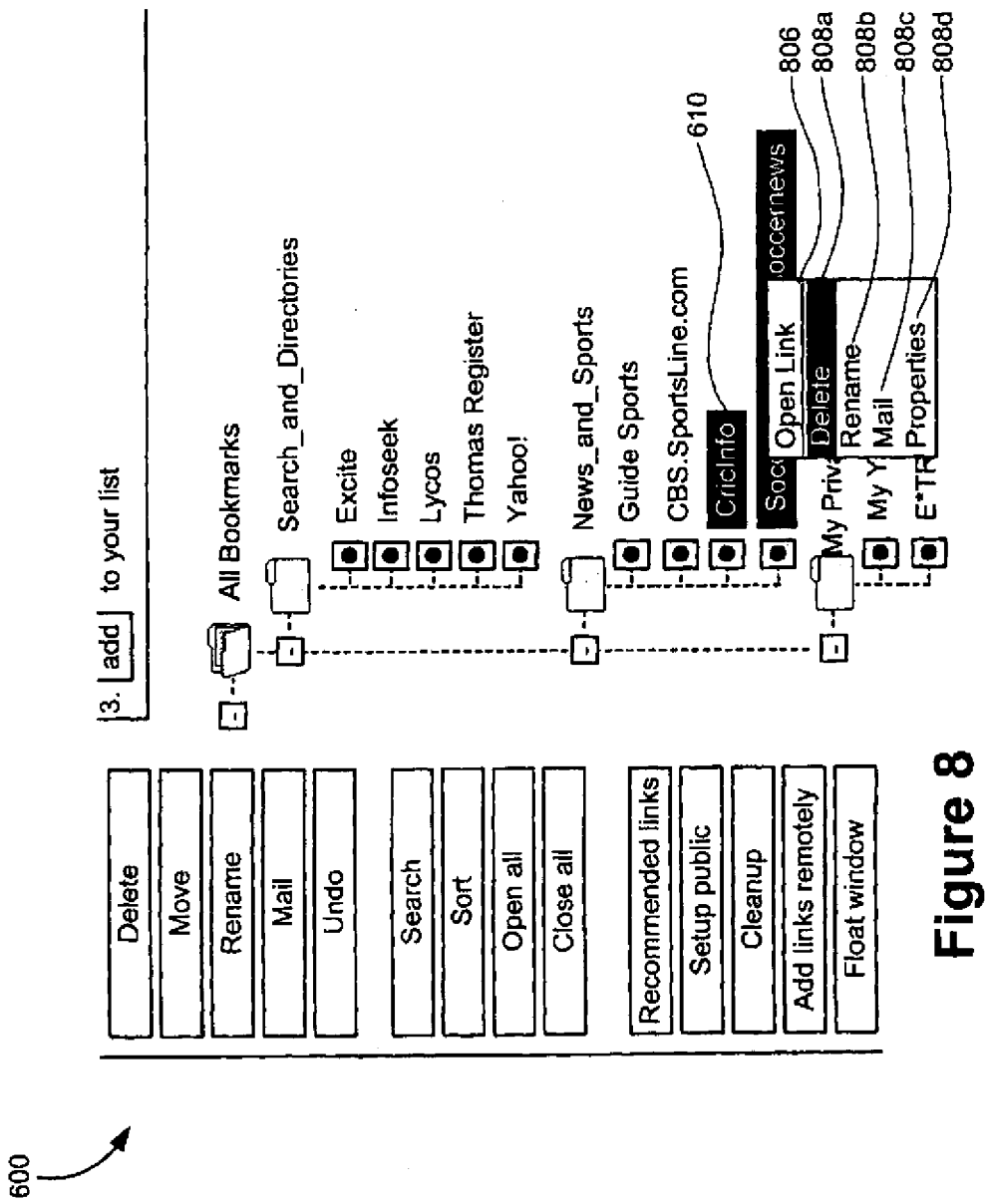
Figure 9:
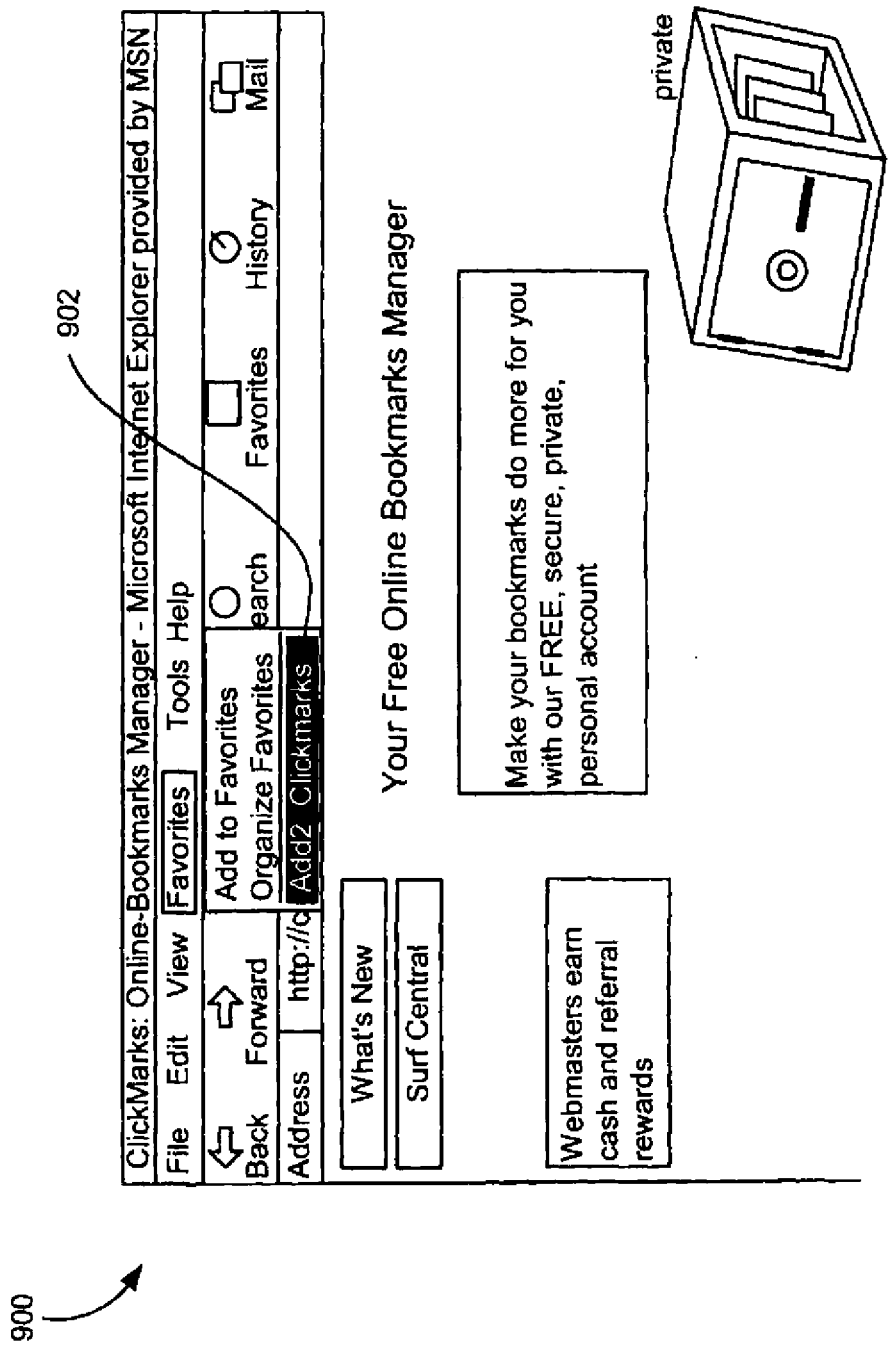
Figure 10:
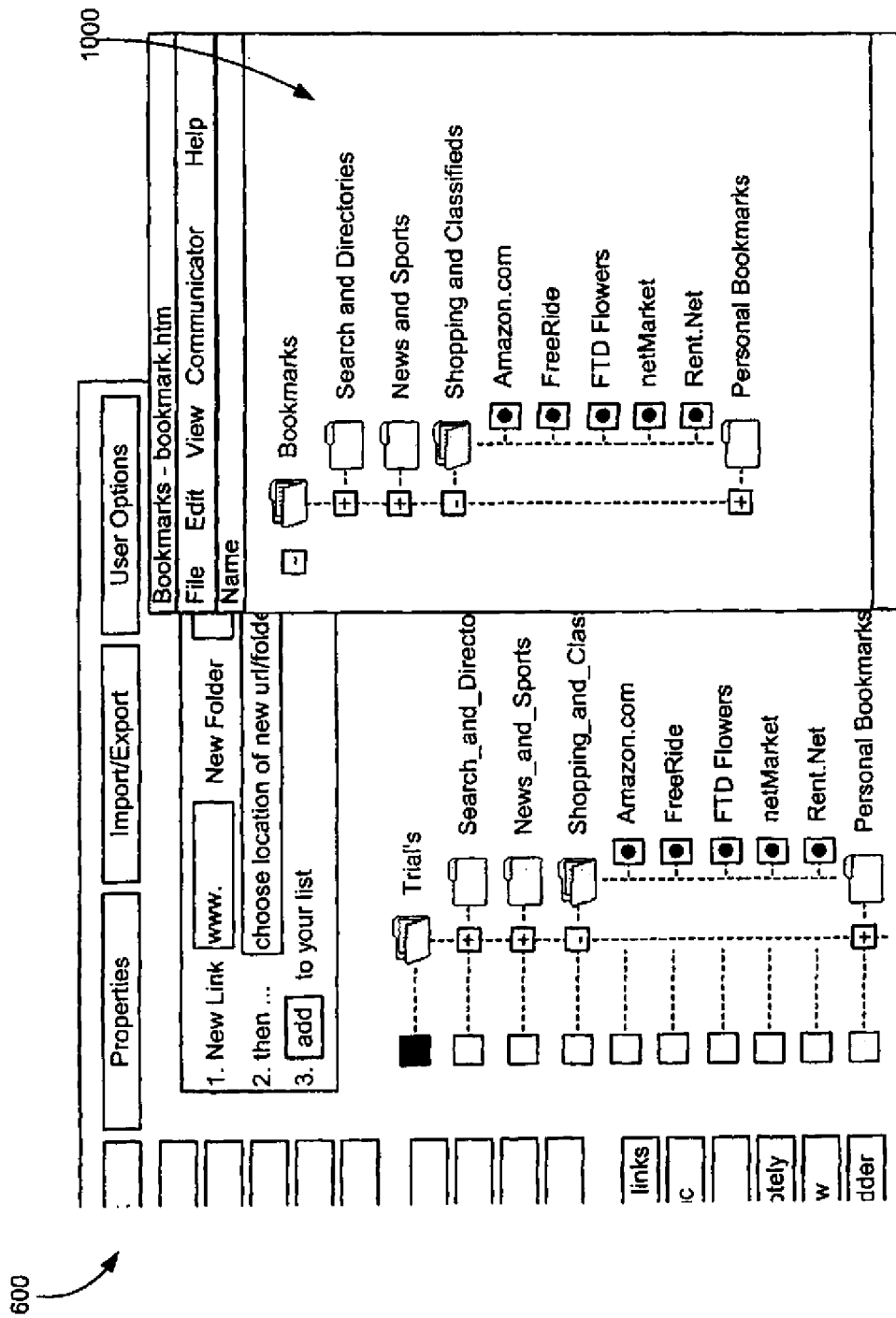
Figure 11:
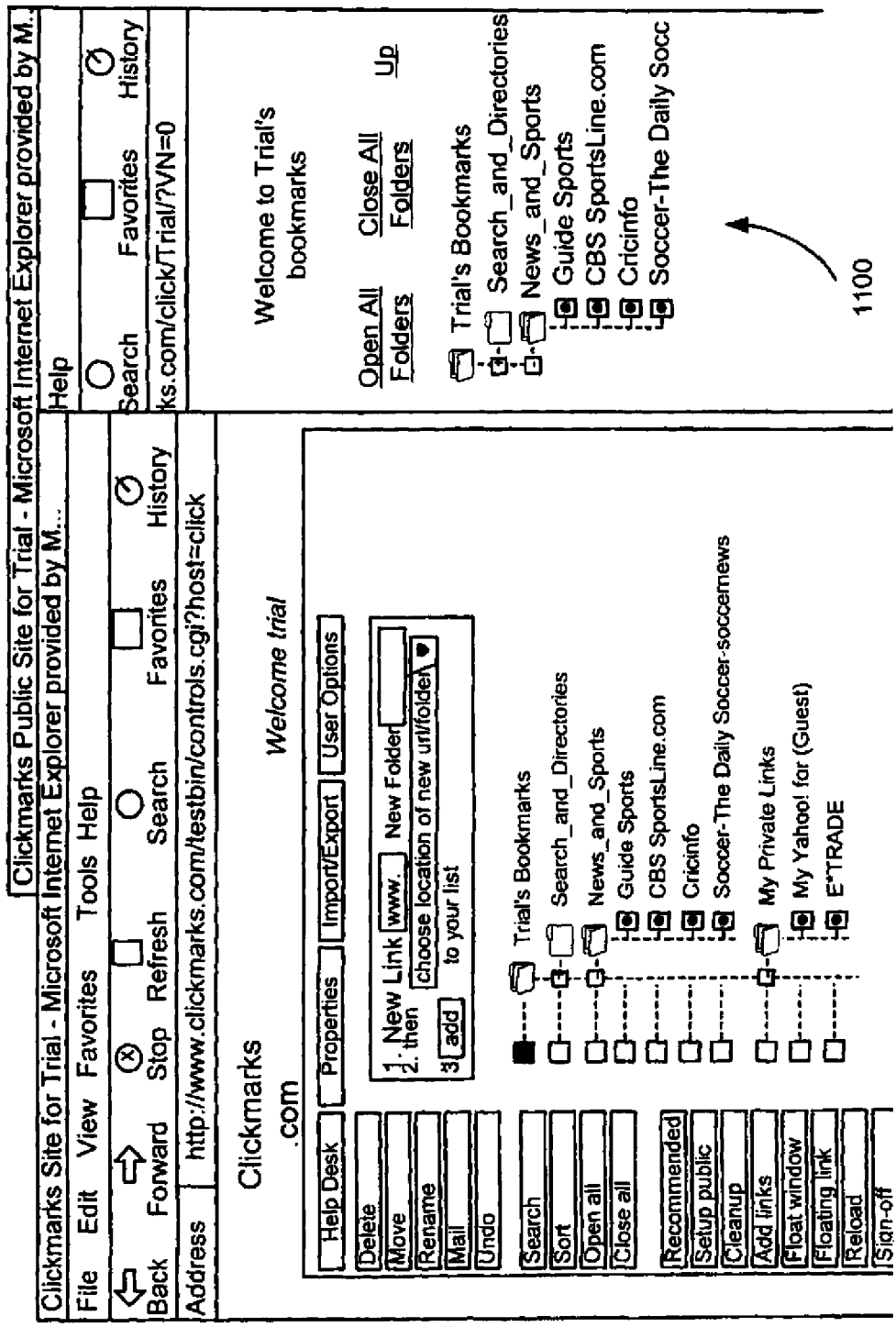
Figure 12:
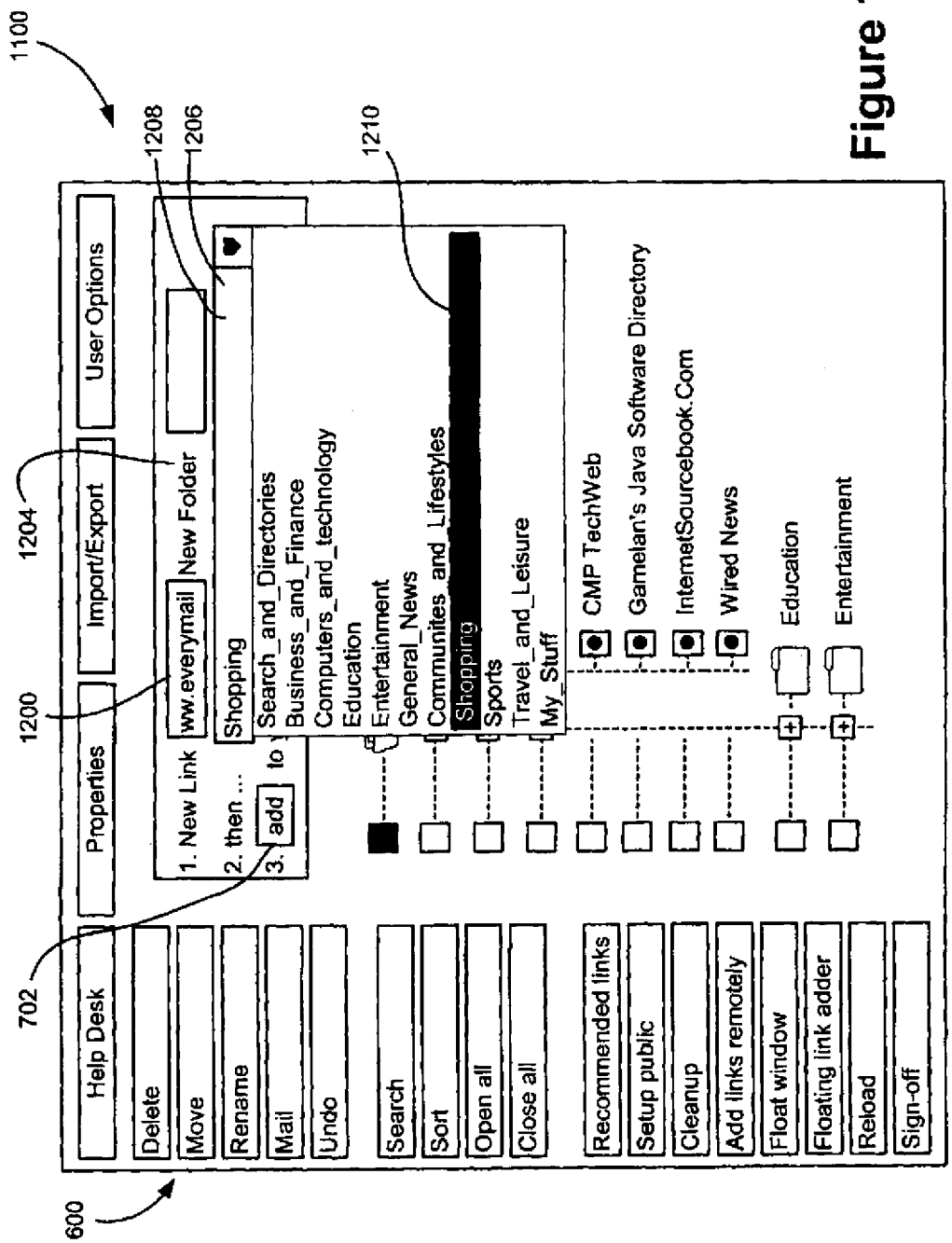
Figure 13:
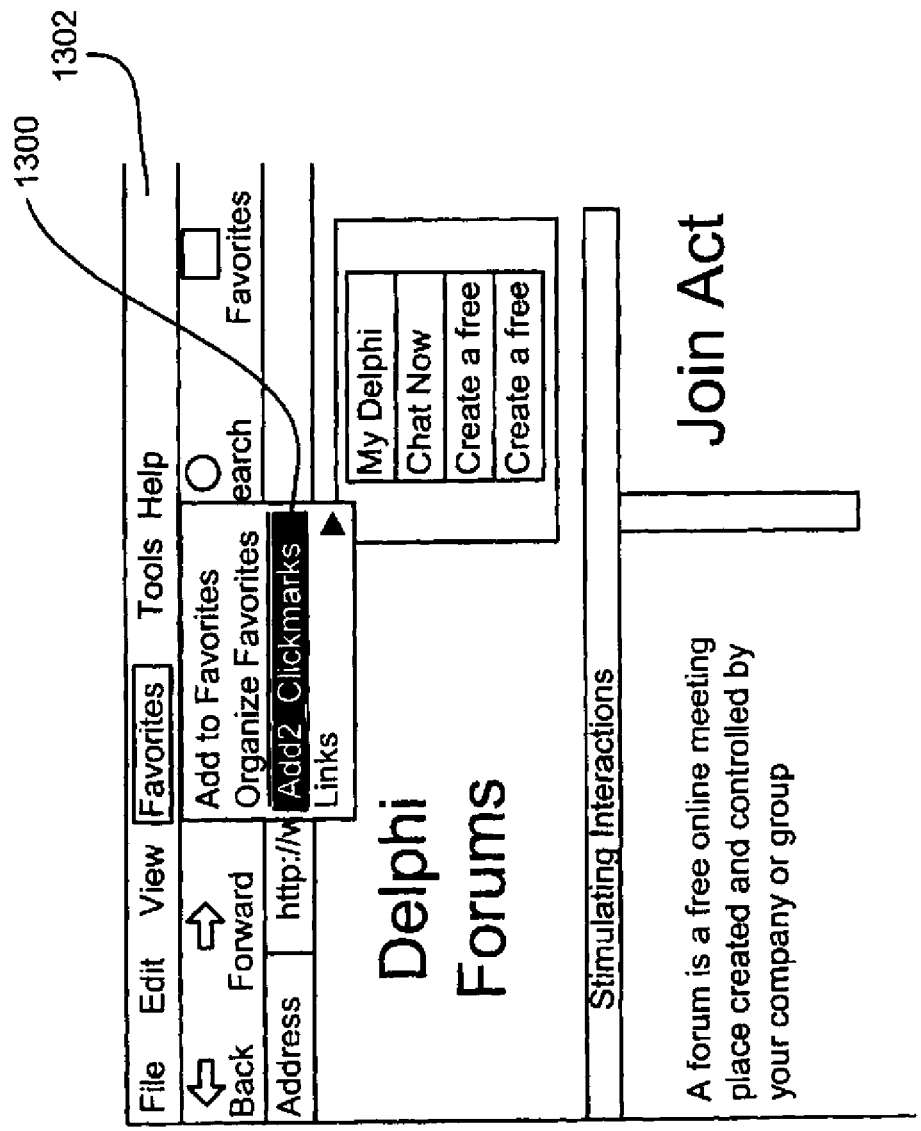
Figure 14:
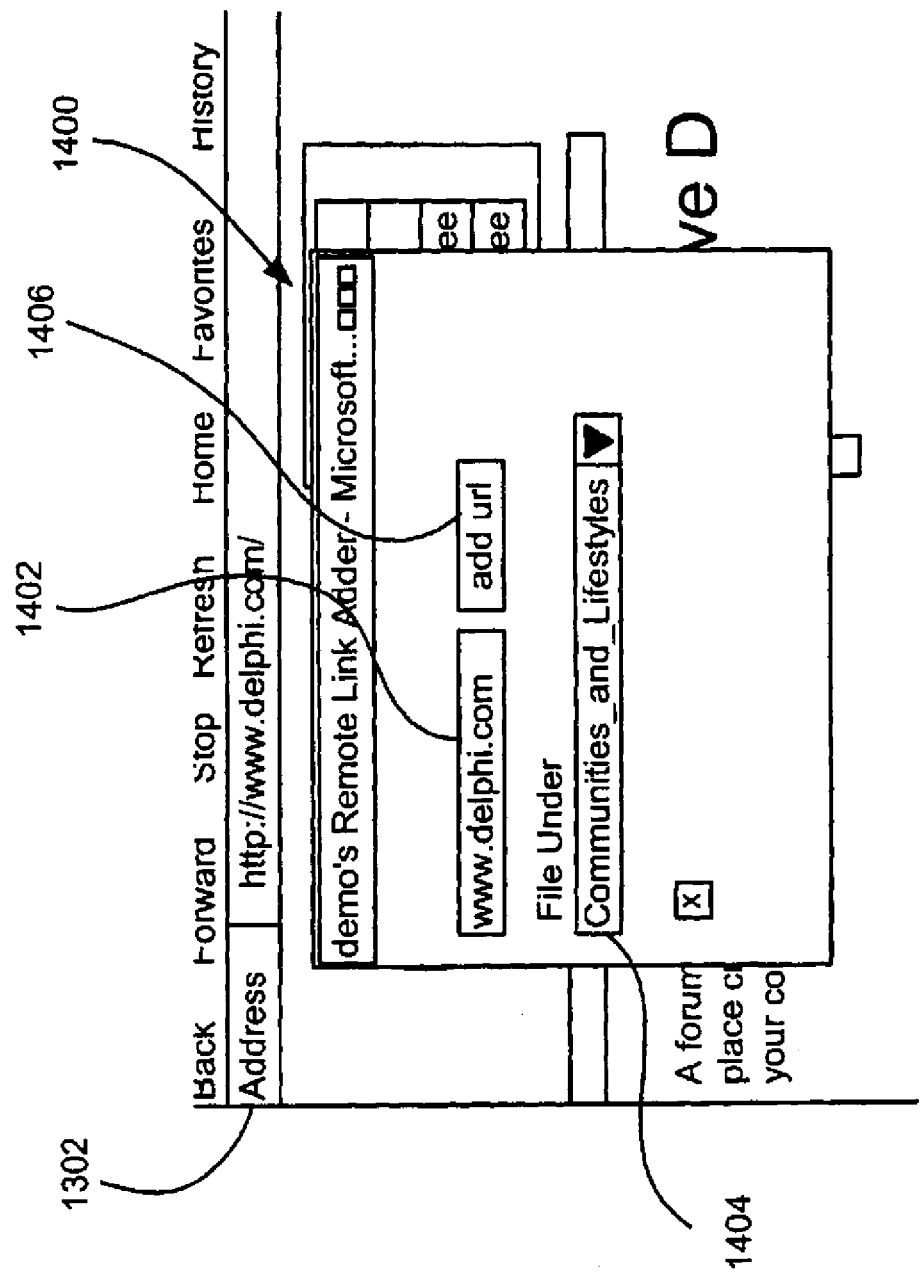
Figure 15:
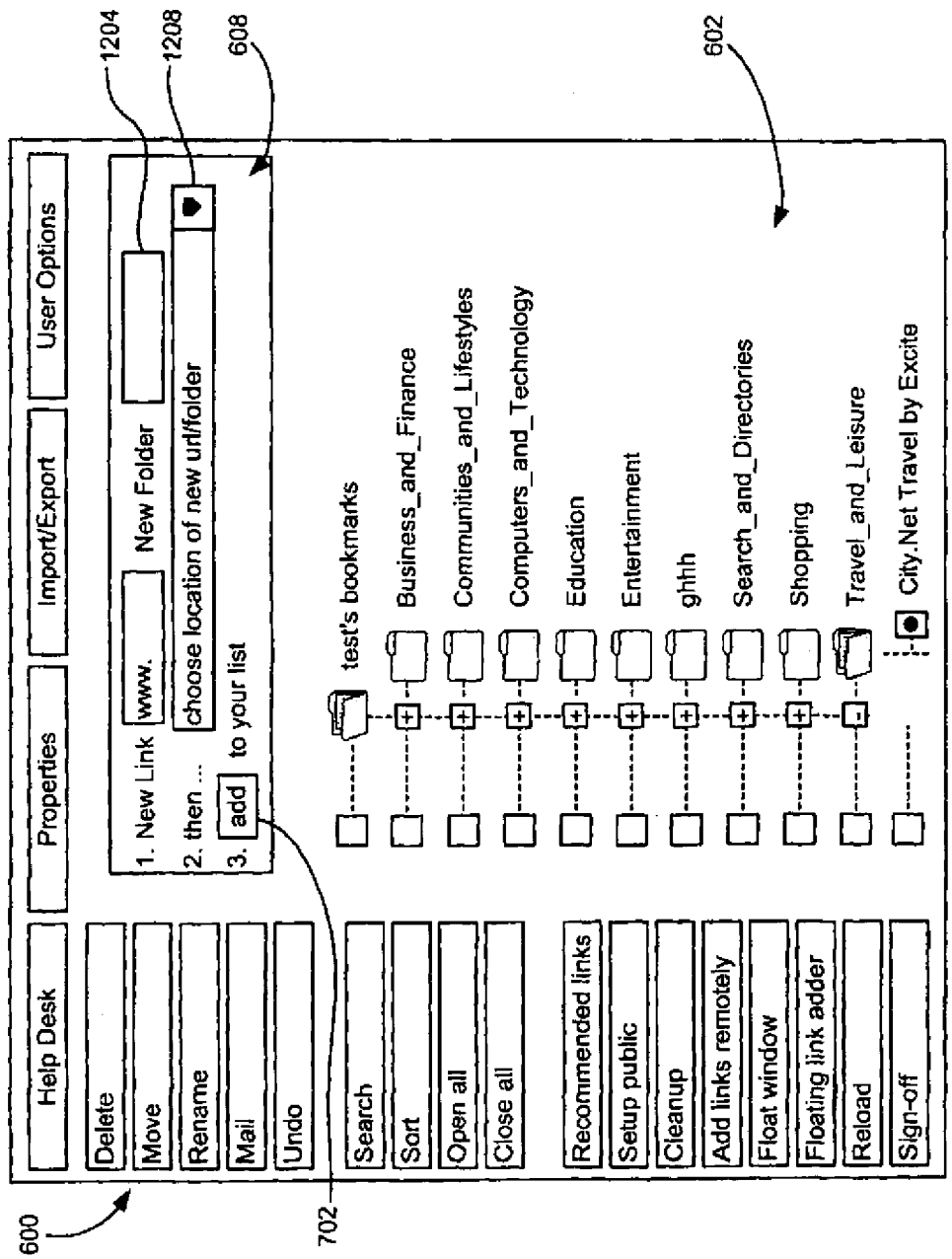
Figure 16:
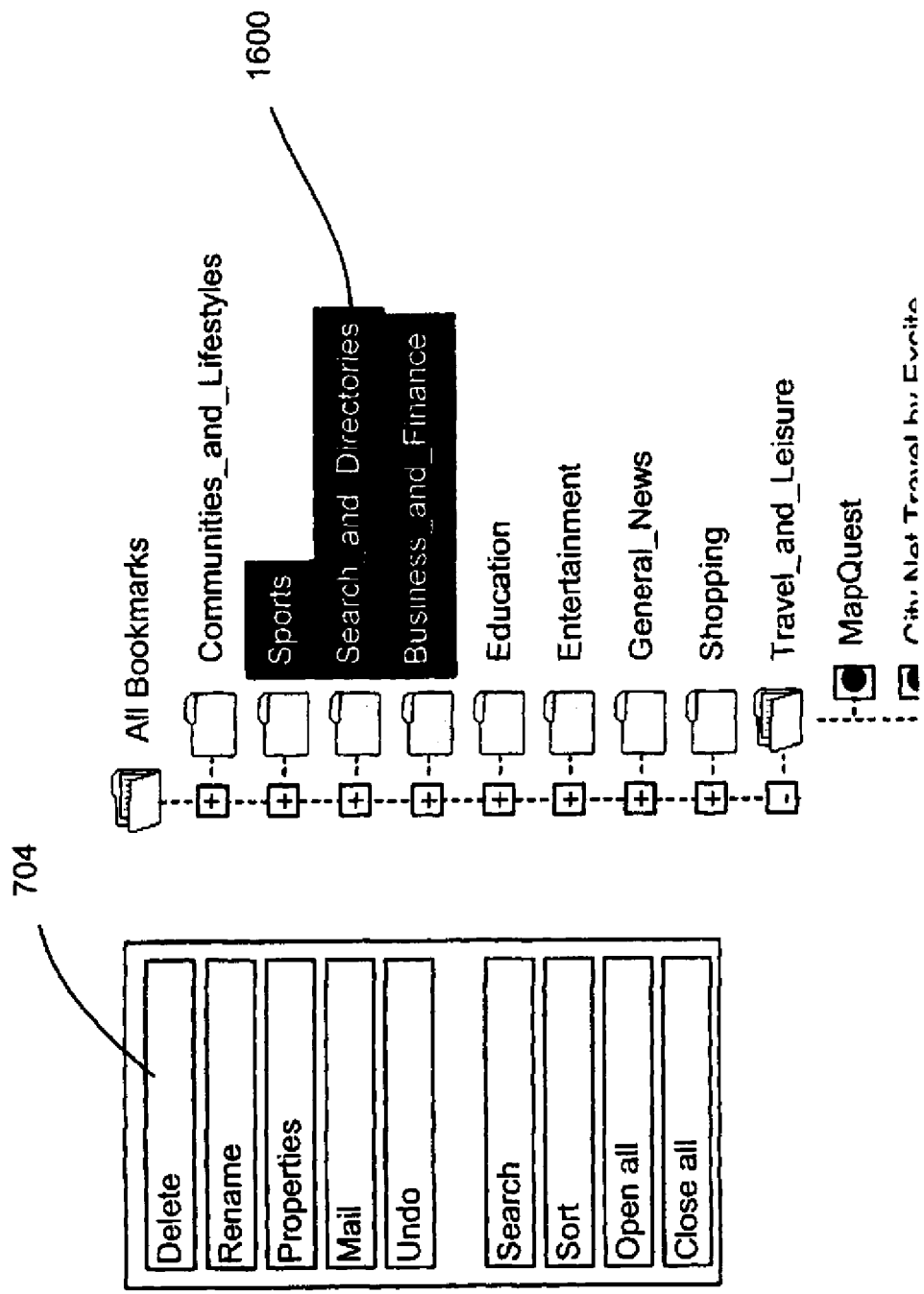
Figure 17:
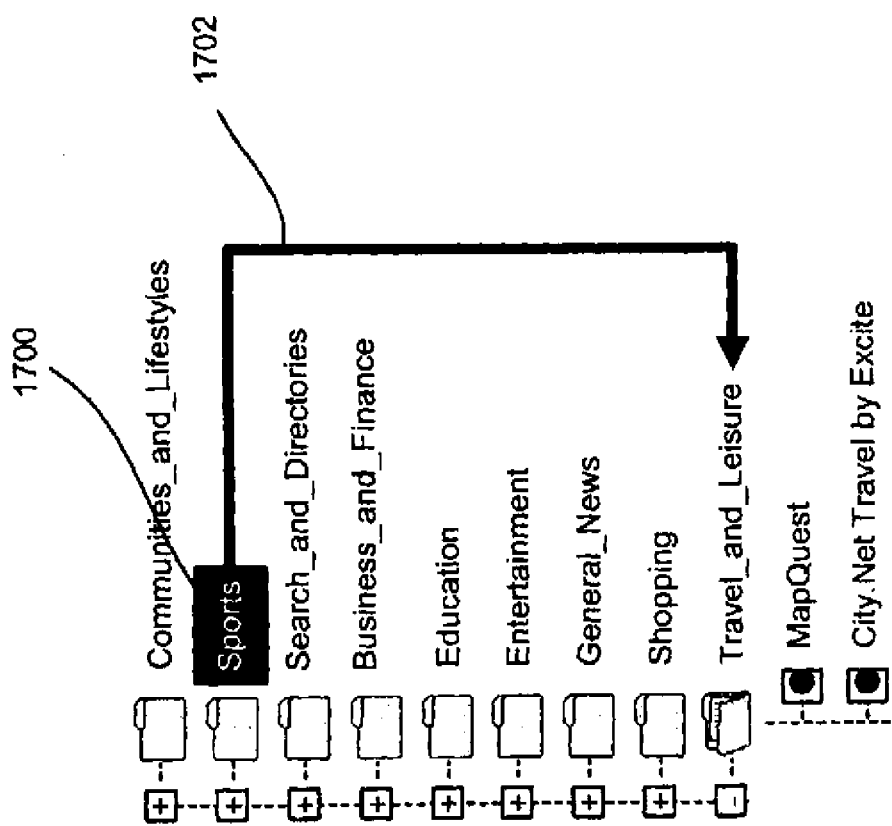
Figure 19:
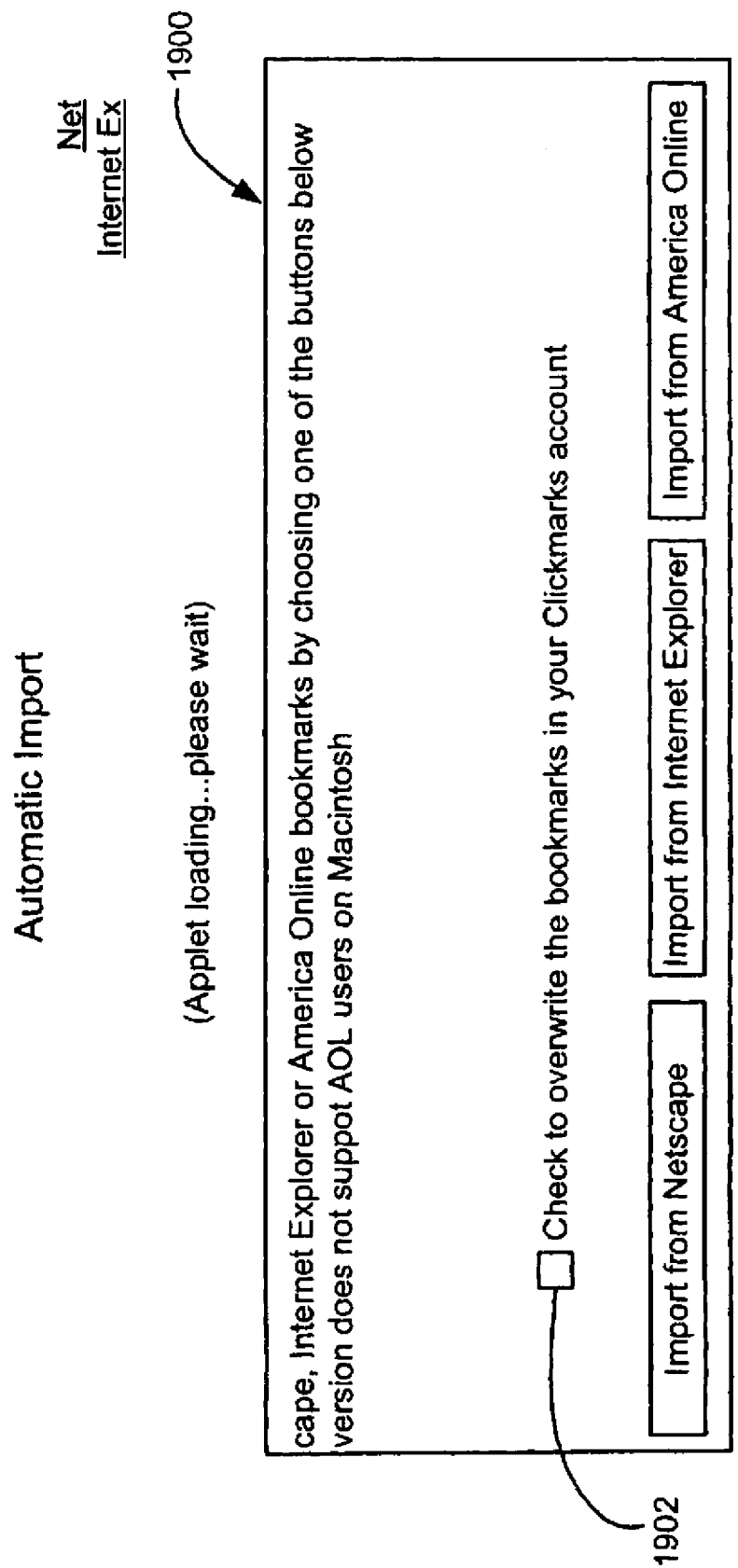
Figure 20:
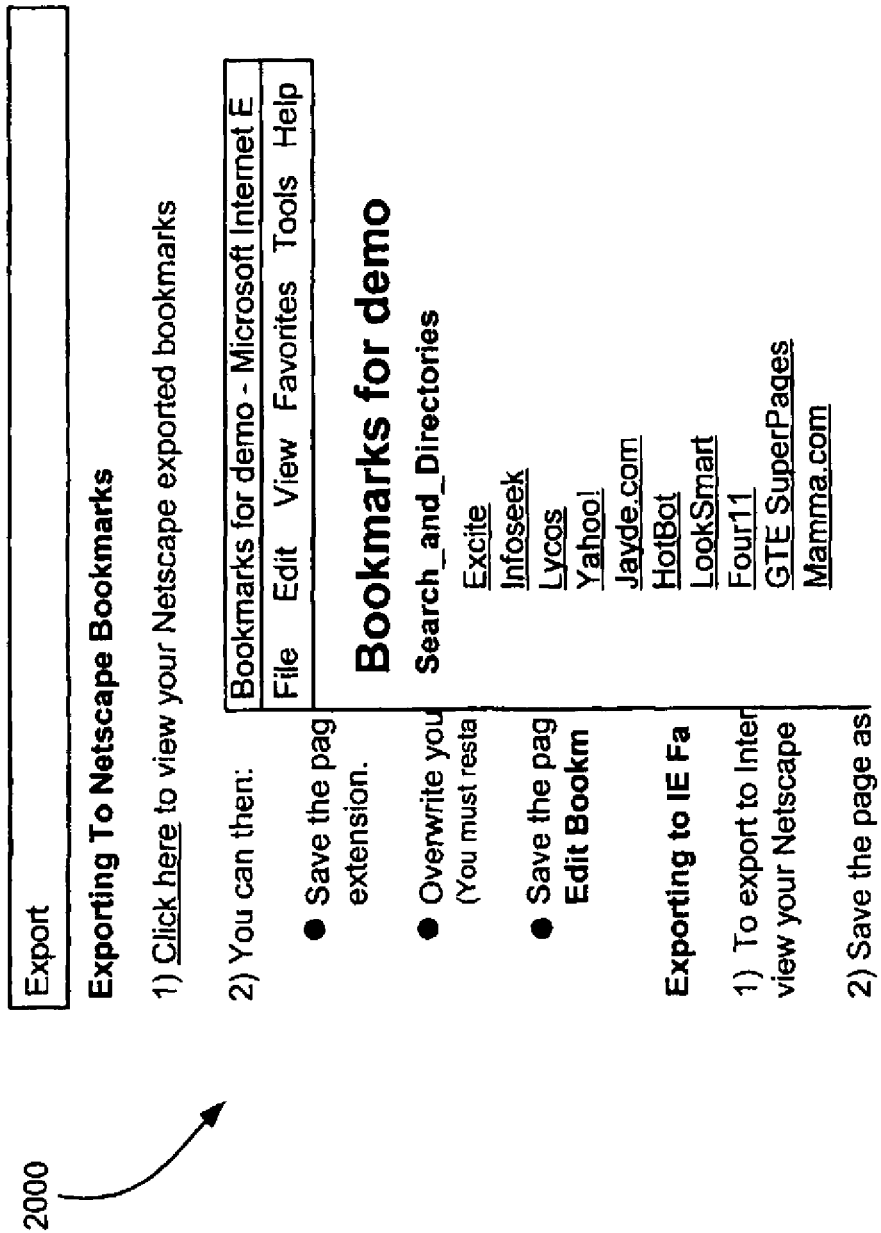
Figure 21:
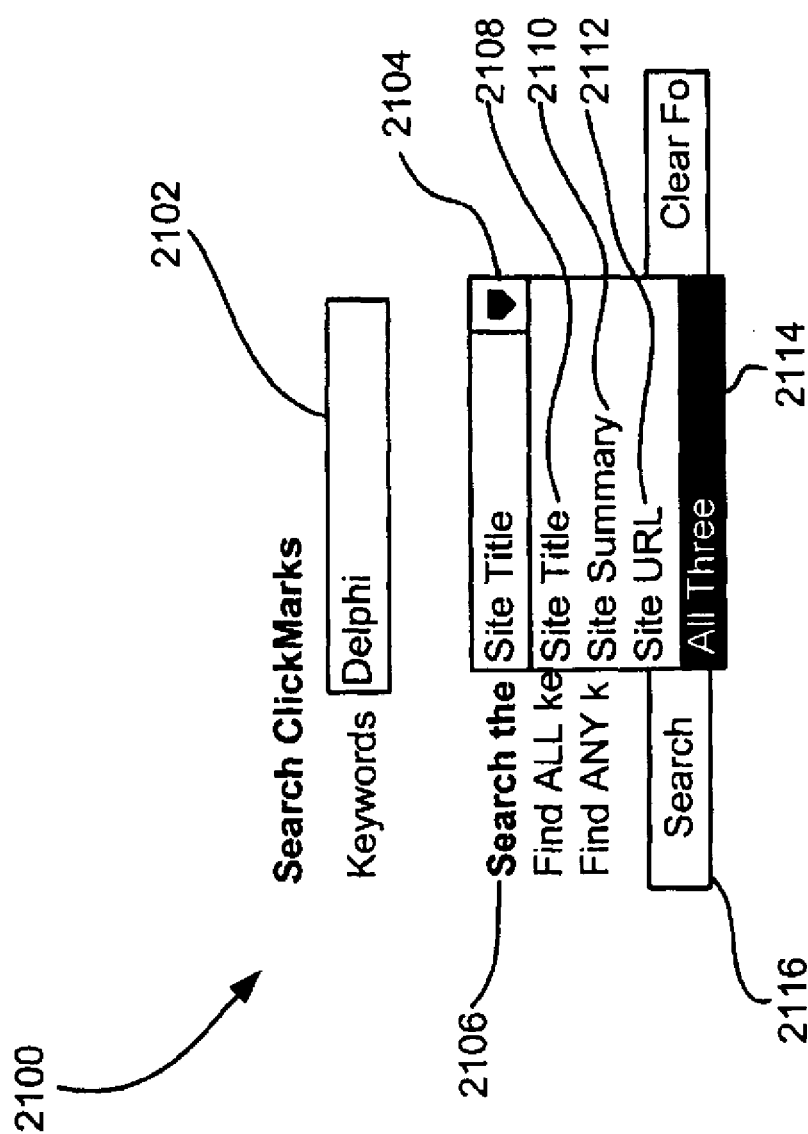
Figure 22:
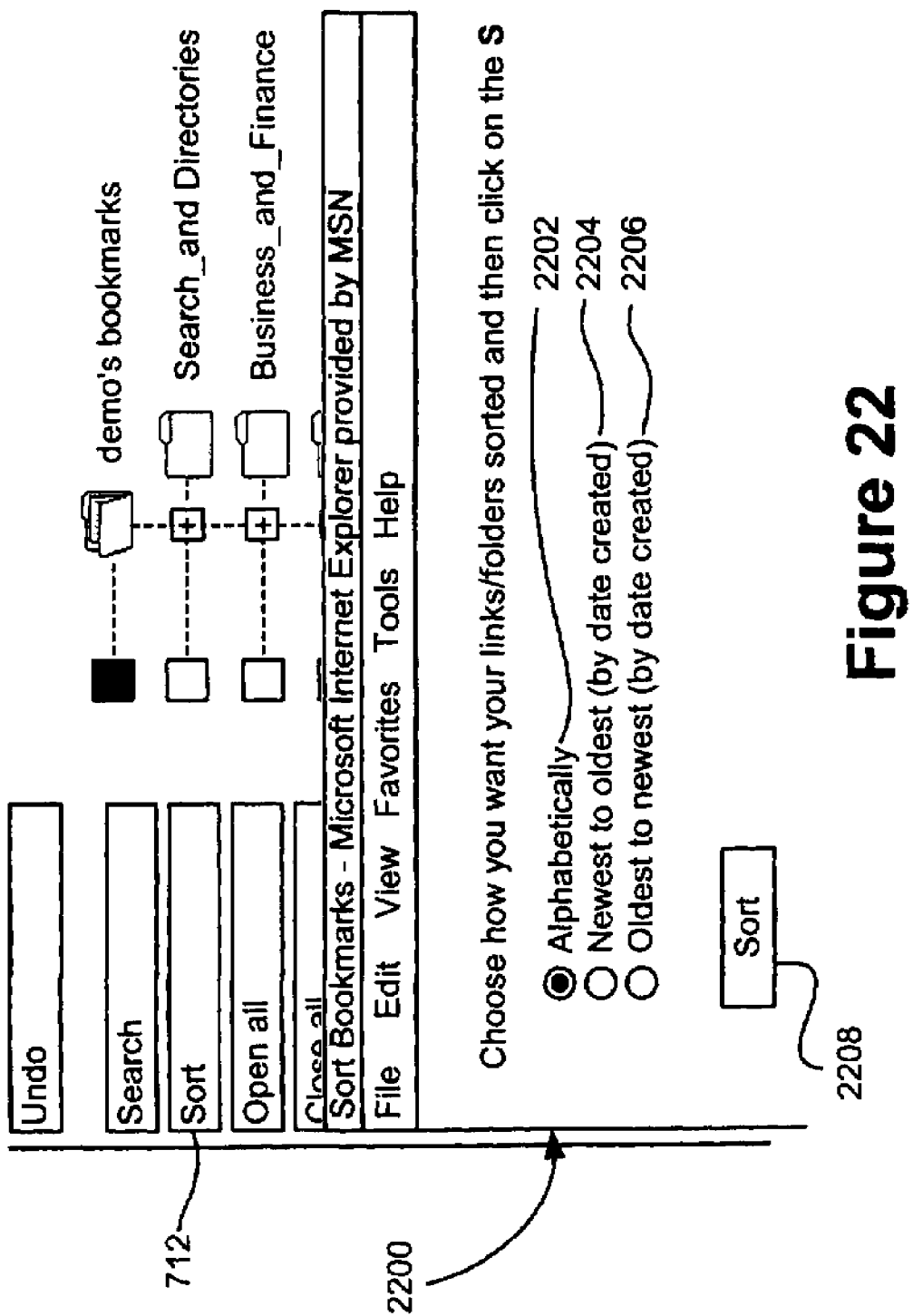
Figure 23:
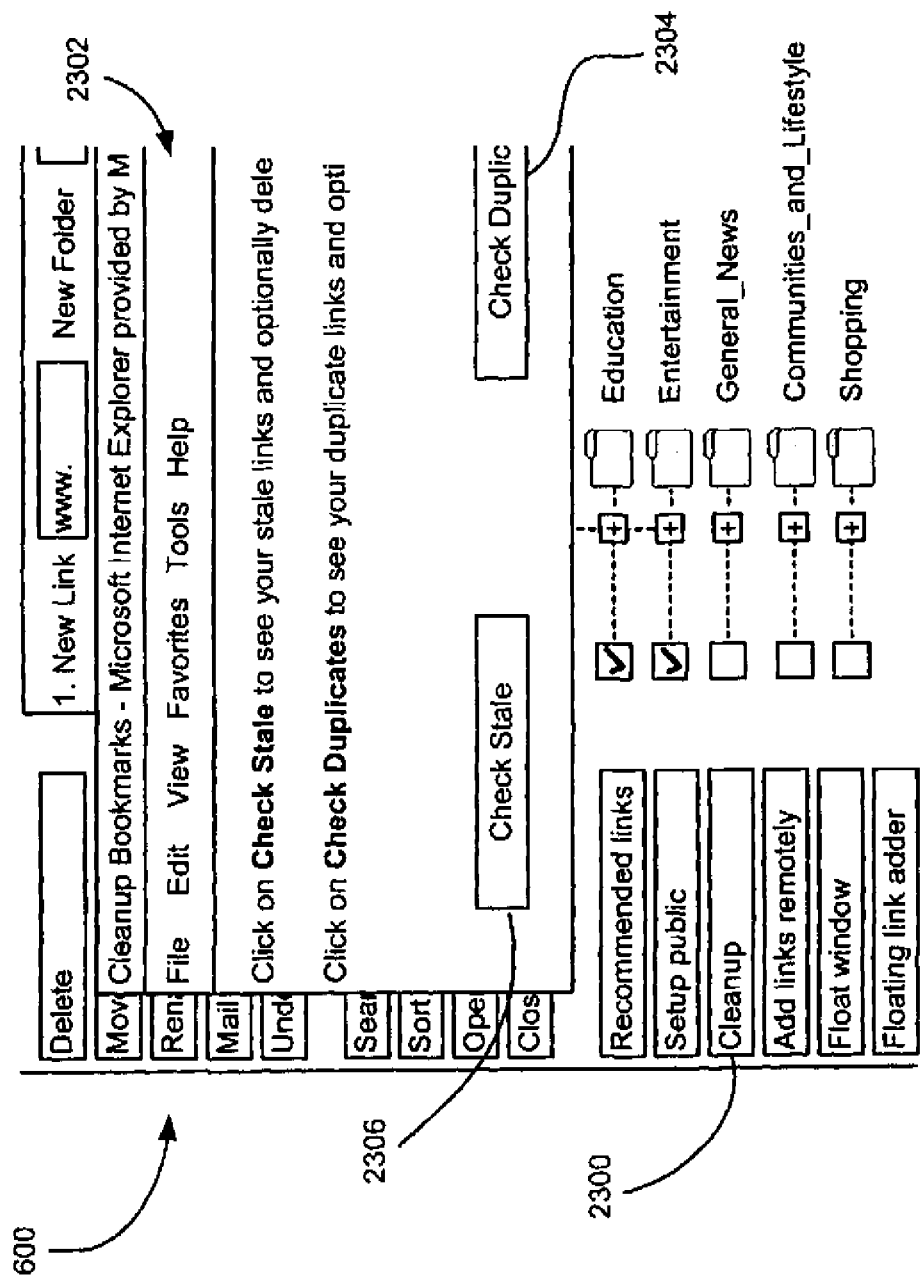
Figure 24:
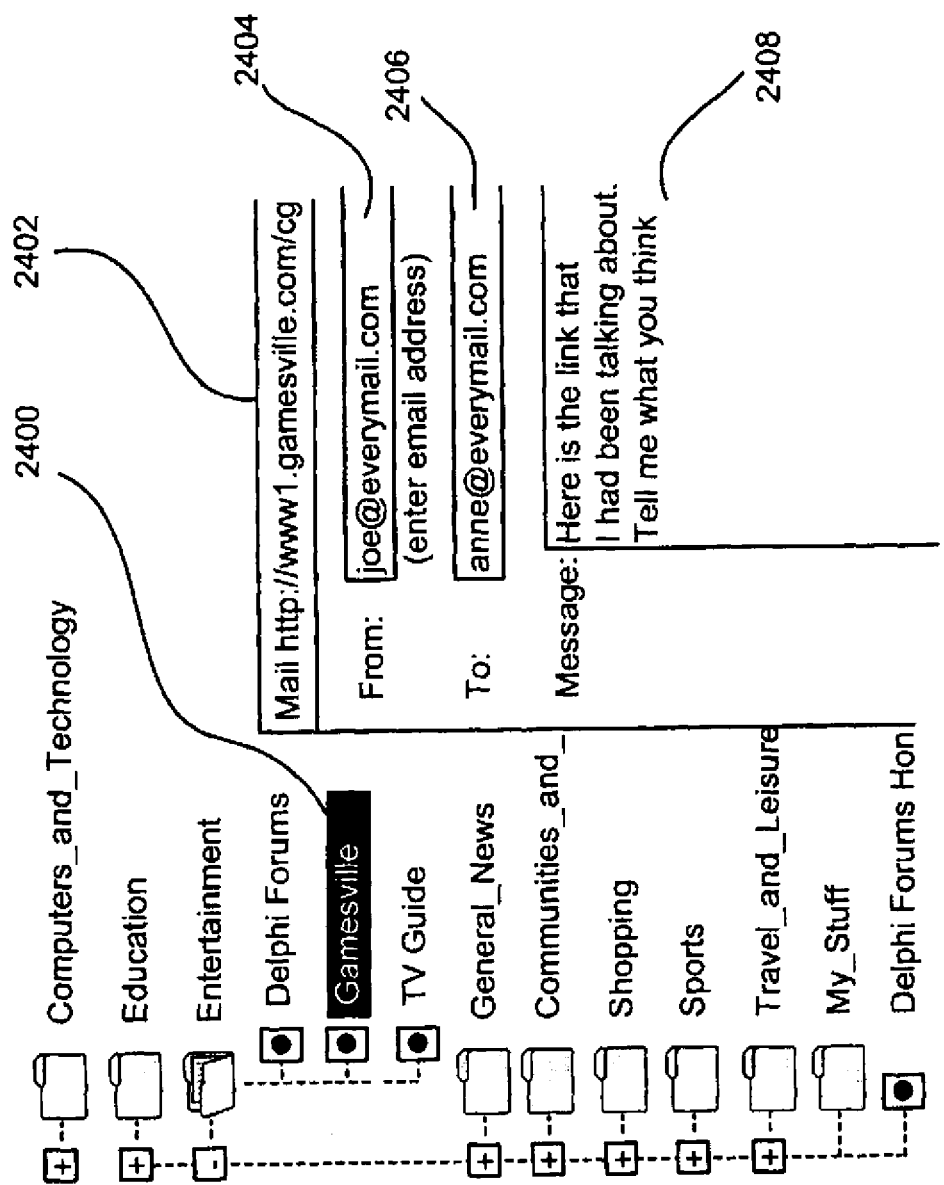
Figure 26:
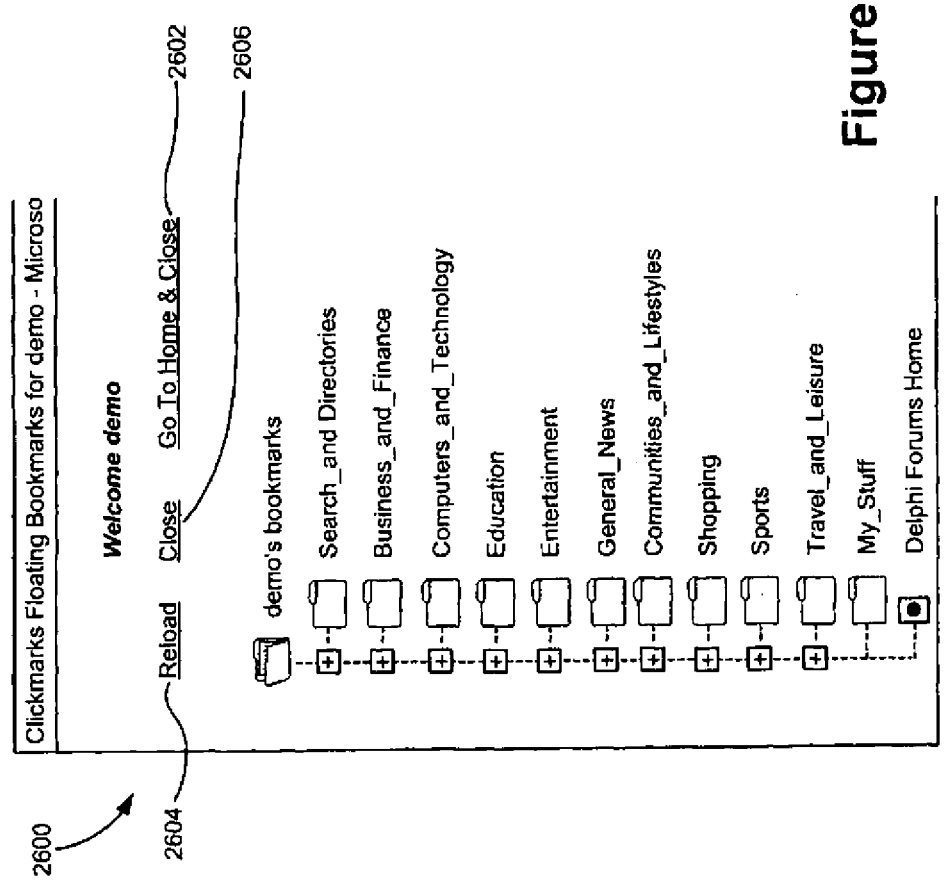
Figure 27:
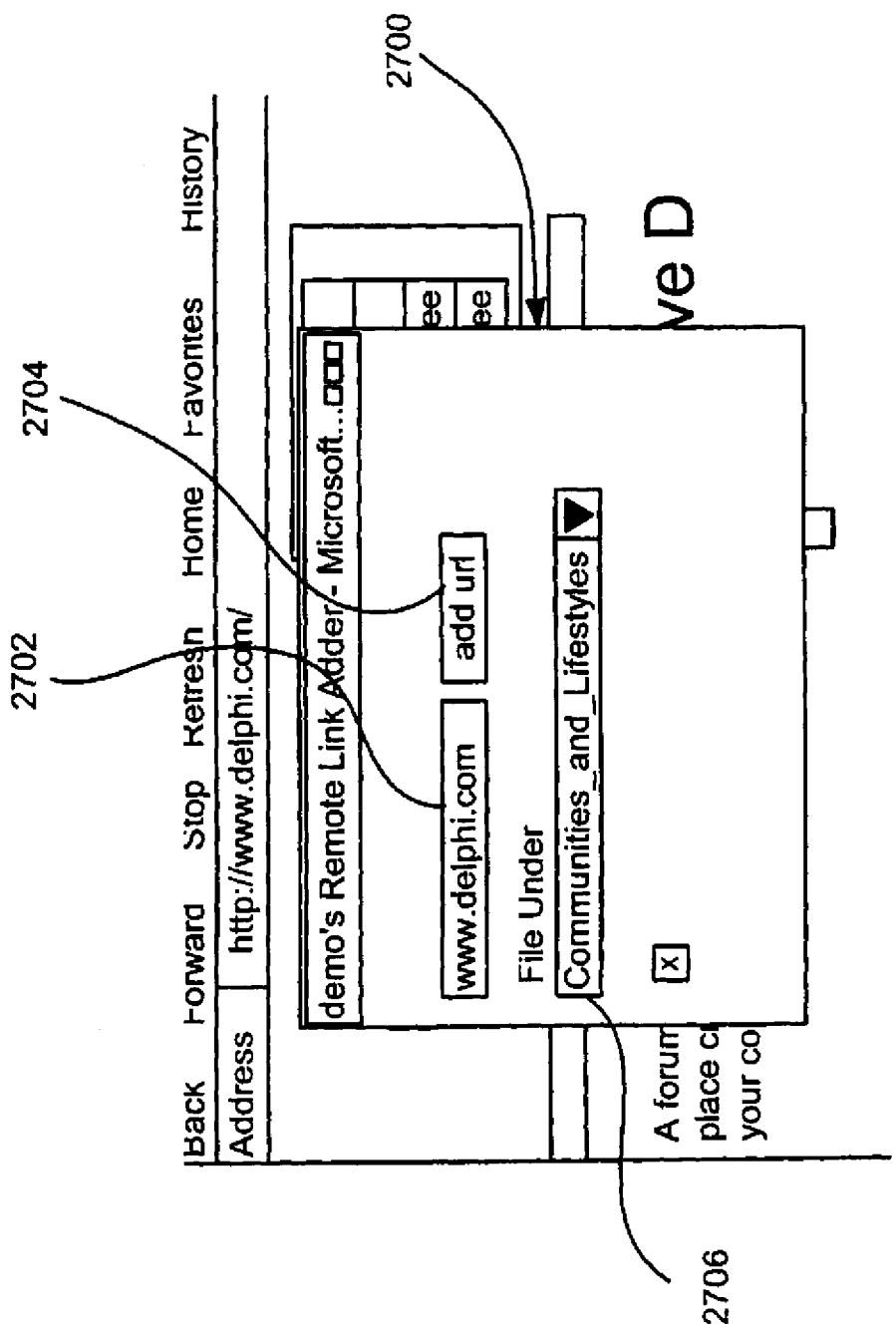
Figure 28:
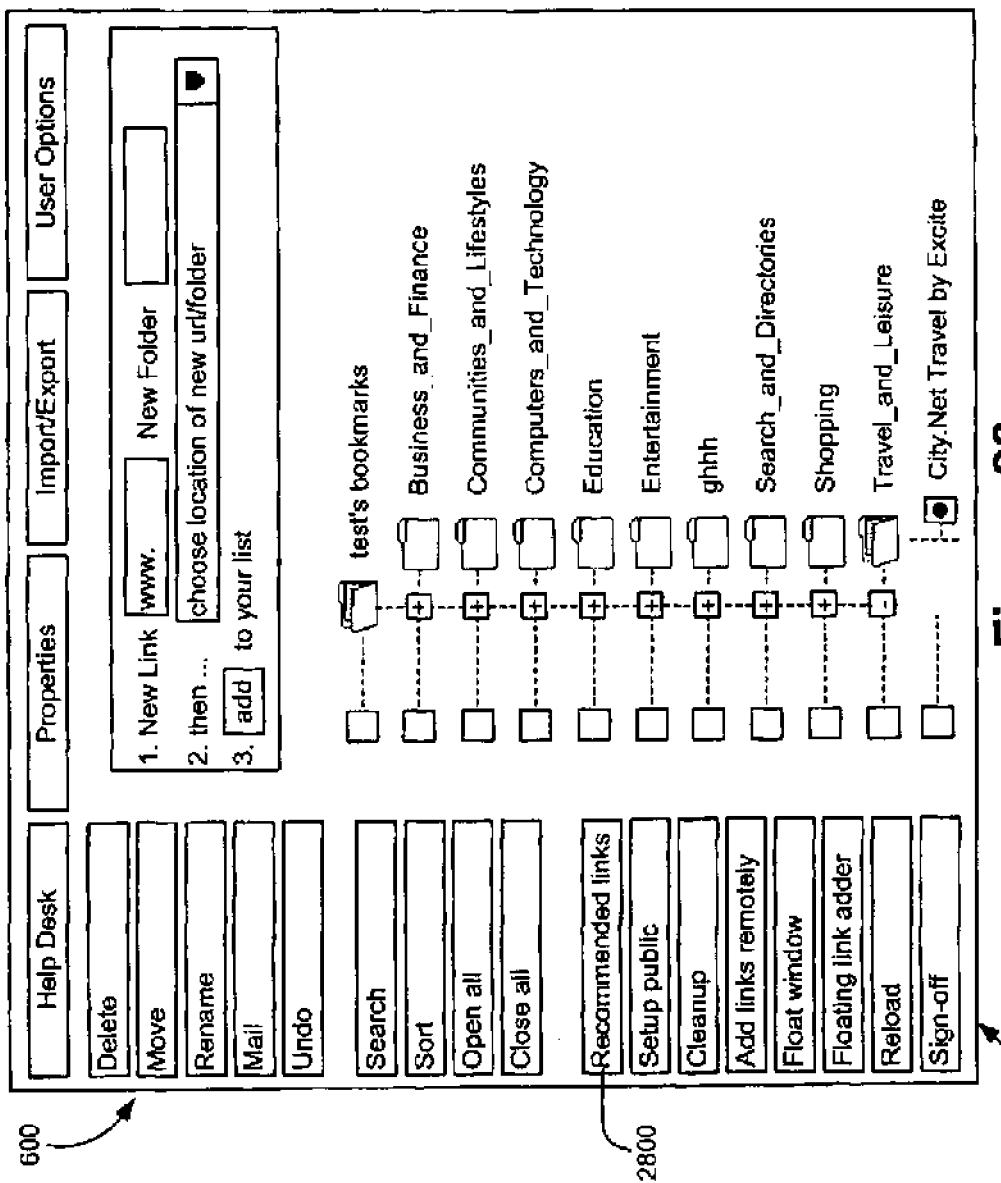
Figure 31:
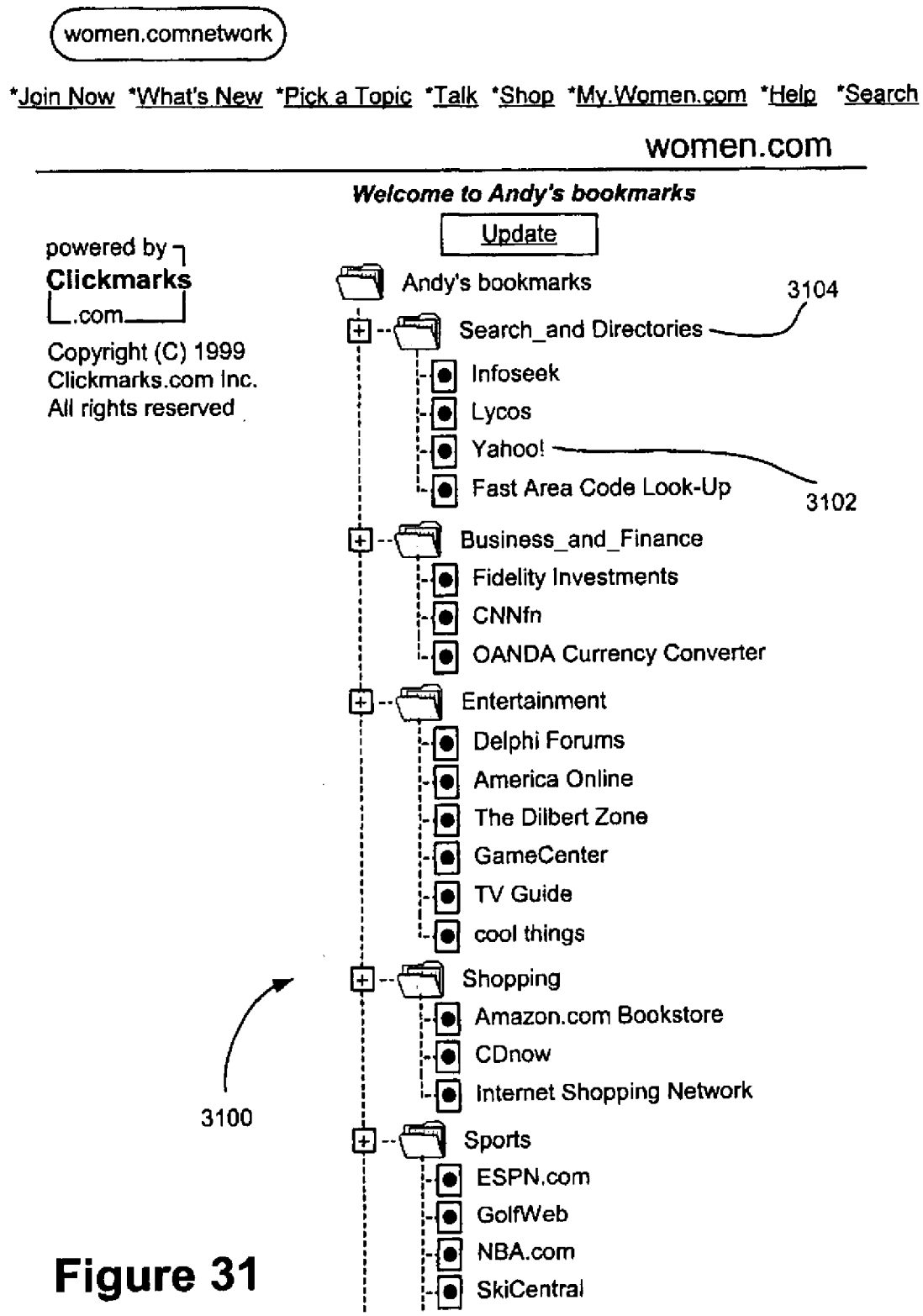

In one embodiment of the present invention a user's account and all the bookmarks in it may be private by default. However, if a user wants to share certain bookmarks or folders with other users, the user may opt to make their bookmarks public. Also, if the user has already made certain links public, the user may also use this function to make their public bookmarks private again. In one such embodiment of the present invention, this feature may be carried out by first selecting a "Setup Public" button 718 on the left menu bar (see FIG. 7) to display a list 2500 of the user's bookmarks and folders 2502 as illustrated in FIG. 25. Also displayed with the list adjacent each bookmark and folder is a checkmark box 2504. To select which bookmarks/folders are to be made public, the user clicks on the checkmark boxes next to the bookmarks or folders the user wants to make public so that a checkmark 2506 appears in the selected checkmark box. The user then clicks on a "Submit" button 2508 also displayed with the list to execute the public function which then displays the selected bookmarks is a public bookmark screen/page.

To make a public link private again, a user may click on the checkmark box next to the particular link and then select a box 2510 above the "Submit" button and then click on "Submit" to execute the public function to remove from display the selected bookmark(s) from the public bookmark screen/page.

Floating Windows

Figure 26:
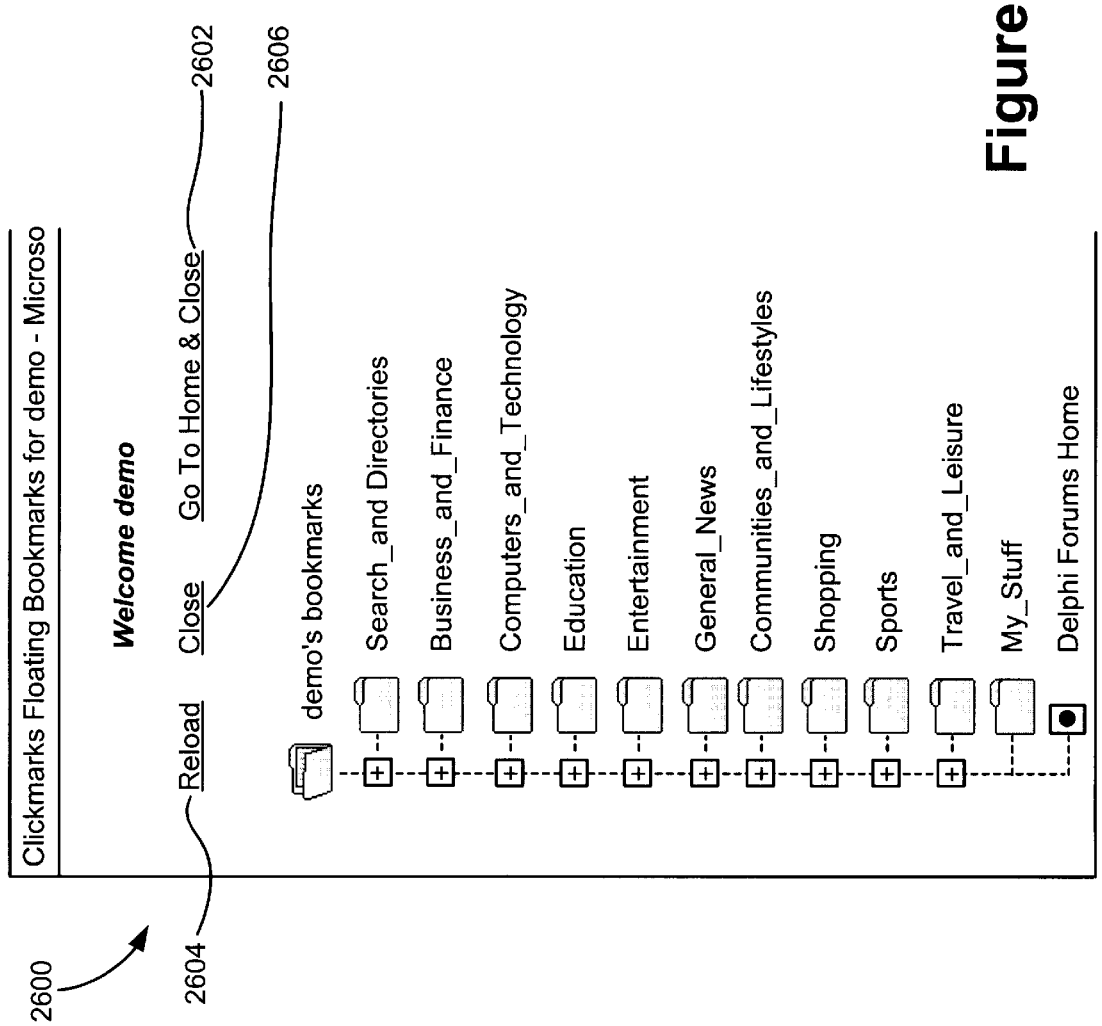
FIG. 26 illustrates a Float Window in accordance with an embodiment of the present invention.

The "Float Window" button 720 on the left menu bar (see FIG. 7) displays up a miniature version (i.e., "floating window") 2600 of the user's online bookmark account page as illustrated in FIG. 26. This floating window 2600 gives the user a view of the user's account while surfing on the Internet and permits the user to add new bookmarks to their account. This window displays a user's links without most of the other controls found on their full size account page Having a smaller window open frees up monitor space and may be optimal for a user if the user is not actively managing their bookmarks. A user may return to their main user page by clicking on the "Go To Home & Close" link 2602. Two other controls may also be included to allow a user to refresh the page ("Reload" 2604), and to simply close the window "Close" 2606).

Floating Link Adder

Figure 27:
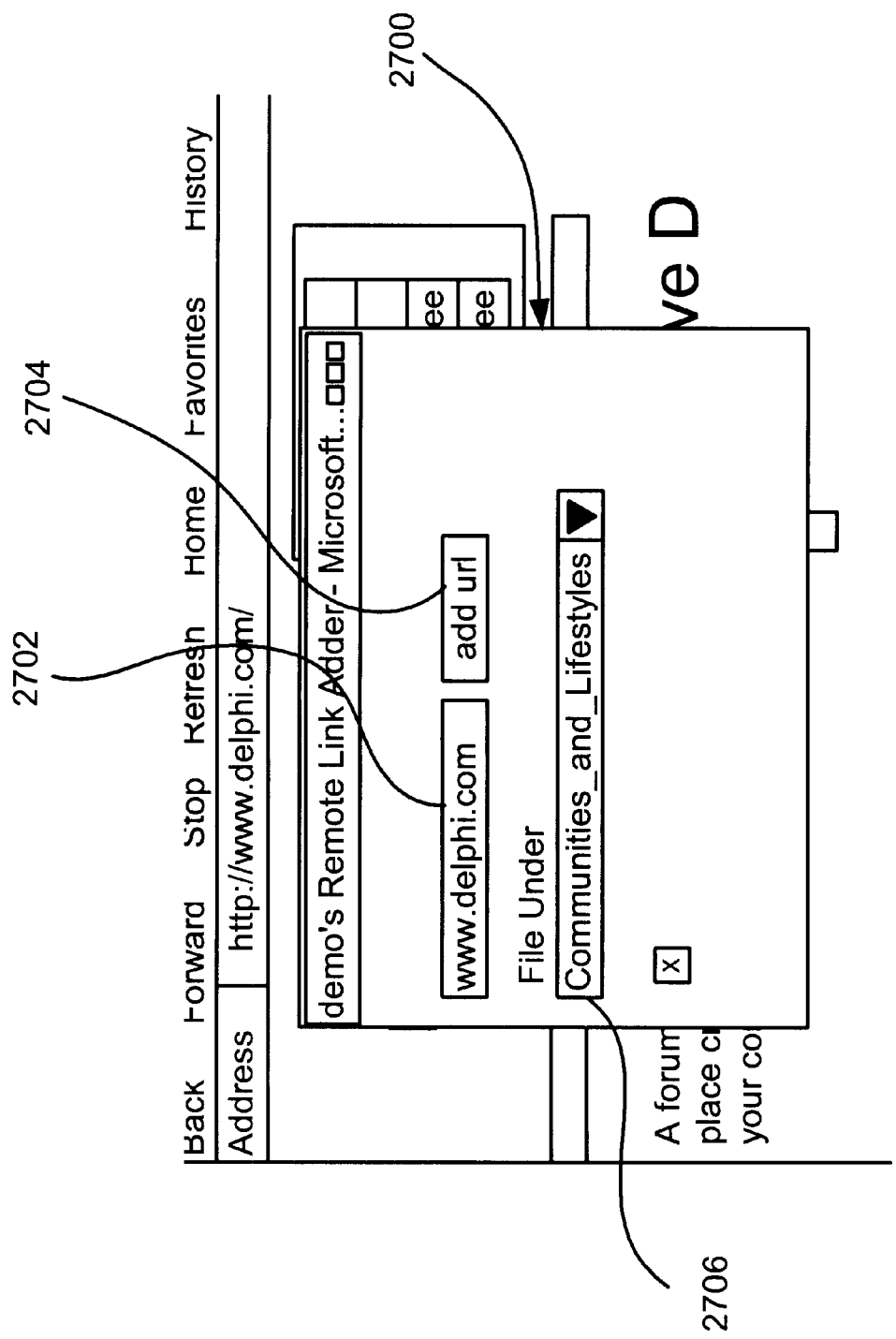
FIG. 27 illustrates a Floating Link Adder Pop-up Window in accordance with an embodiment of the present invention.

The "Floating Link Adder" button 722 on the left menu bar (see FIG. 7) pops up a window 2700 as illustrated in FIG. 27 that lets a user add and file bookmarks to their user account while they are surfing the Internet without having to return to their online bookmarks account page. To add a bookmark with this window, a user simply types the web site address in box 2702 and clicks on "Add URL" 2704 to execute this function and add a bookmark for this site to the user's account. A user may also choose which folder the user wants the bookmark to go into by using the "File Under" pull-down menu 2706.

Recommended Links

Figure 28:
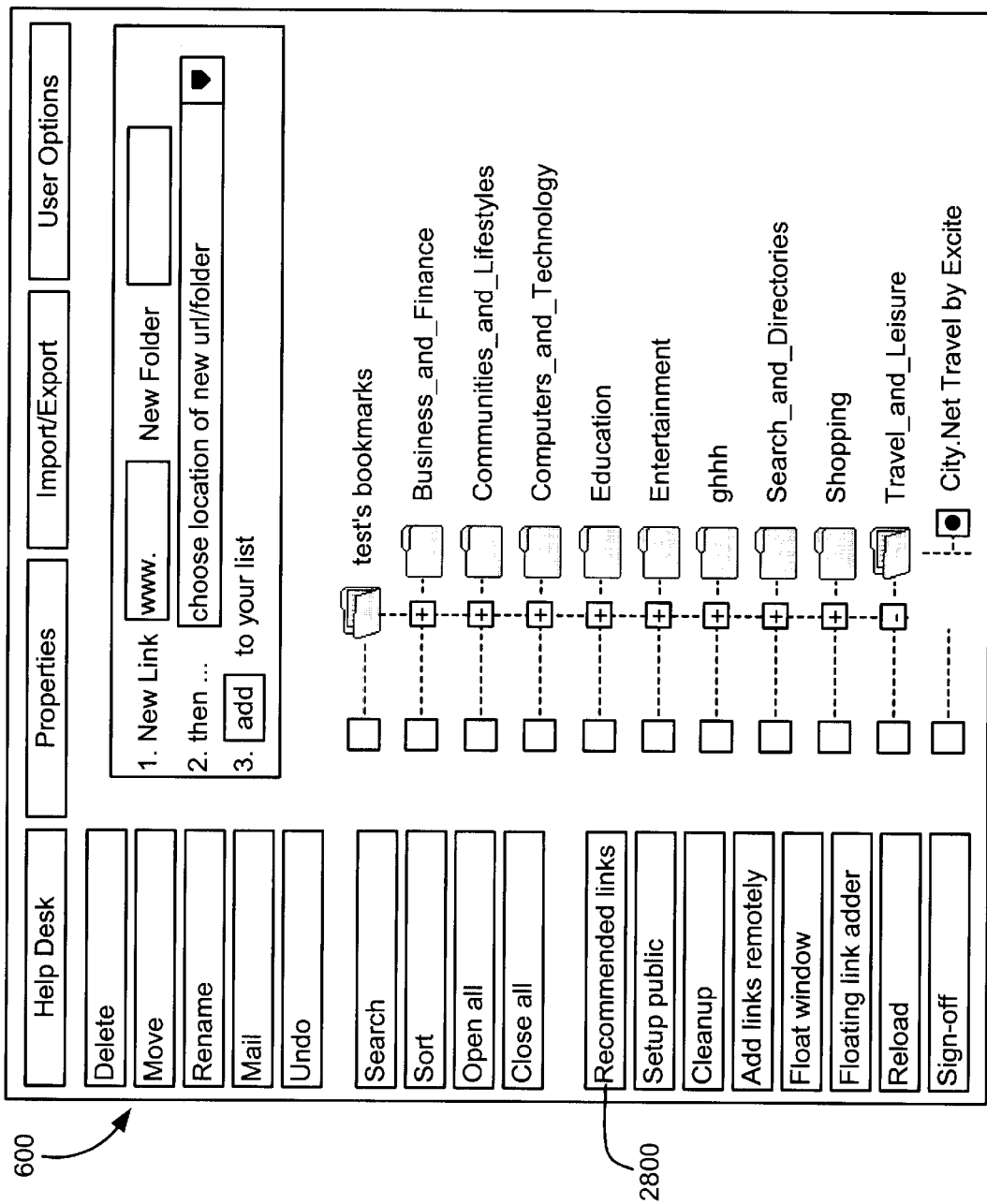
FIG. 28 illustrates an exemplary display of a online bookmark account page of a user with a button for a recommended links feature in accordance with an embodiment of the present invention.

As illustrated in FIG. 28, an embodiment of the present invention may include a "Recommended Links" feature

2800 in the left menu bar 604 of a user's online bookmark account page 600. Upon selection of the Recommended Links feature, a page may be displayed as illustrated in FIG. 29 that displays a list of popular sites 2900 which other users may have found useful. In such an embodiment, the bookmark management system may track popular links in many interest categories. These recommended links may be organized by various categories. A user may select any of these links to add to their account. A user may also choose which folder in their account page into which the recommended links are stored. As a further option, users may also be able choose to inform the bookmark management system that they do not wish to receive any future recommendations for a given interest category. In

Public Bookmarks Feature

Figure 31:
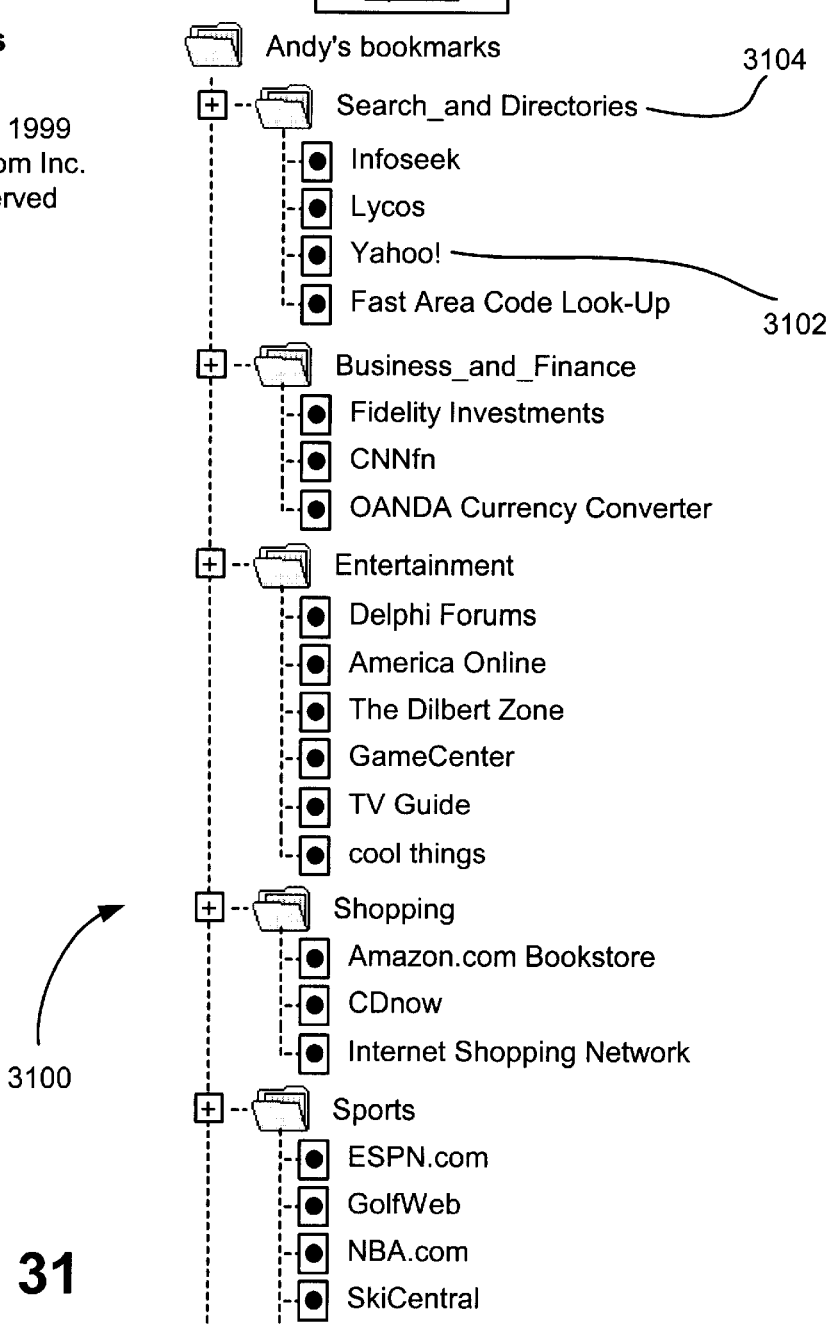
FIG. 31 illustrates an exemplary welcome page a particular user's public bookmarks in accordance with an embodiment of the present invention.
Figure 1:
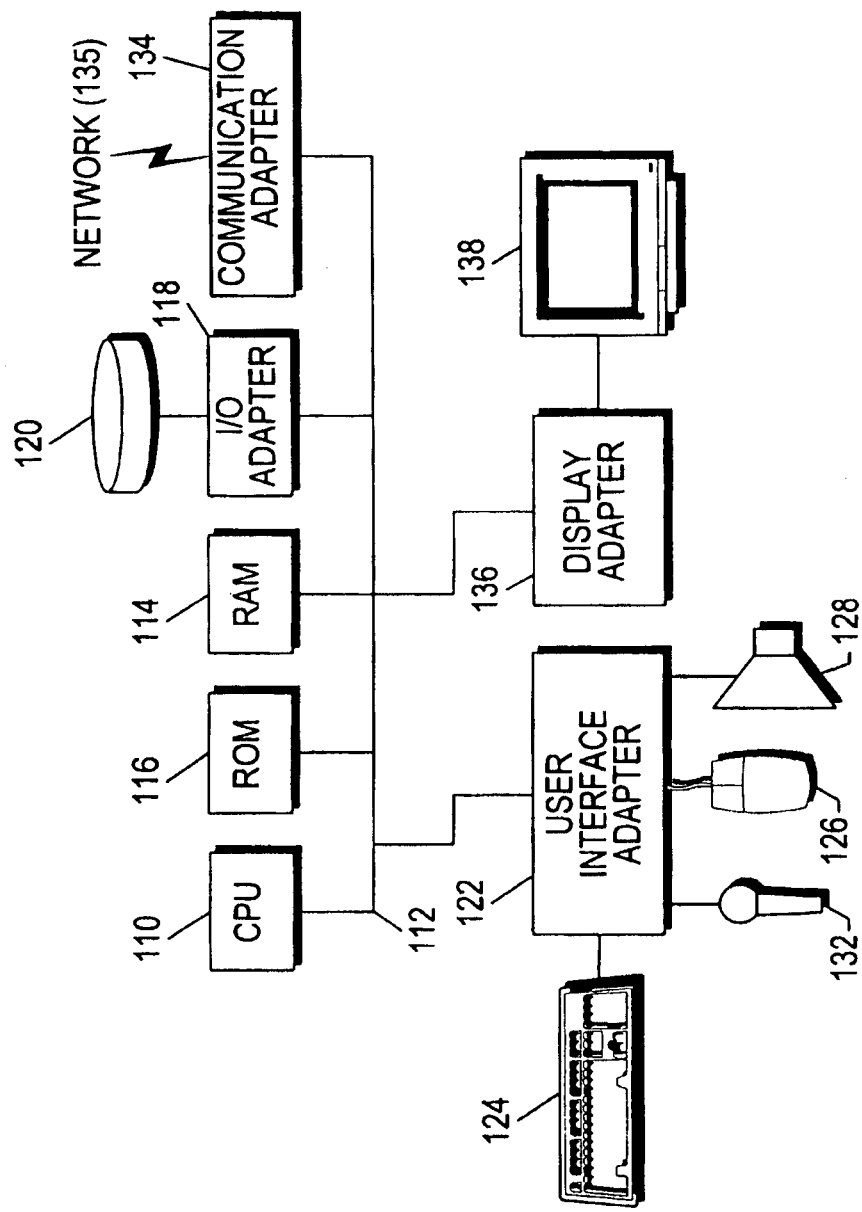
Figure 2:
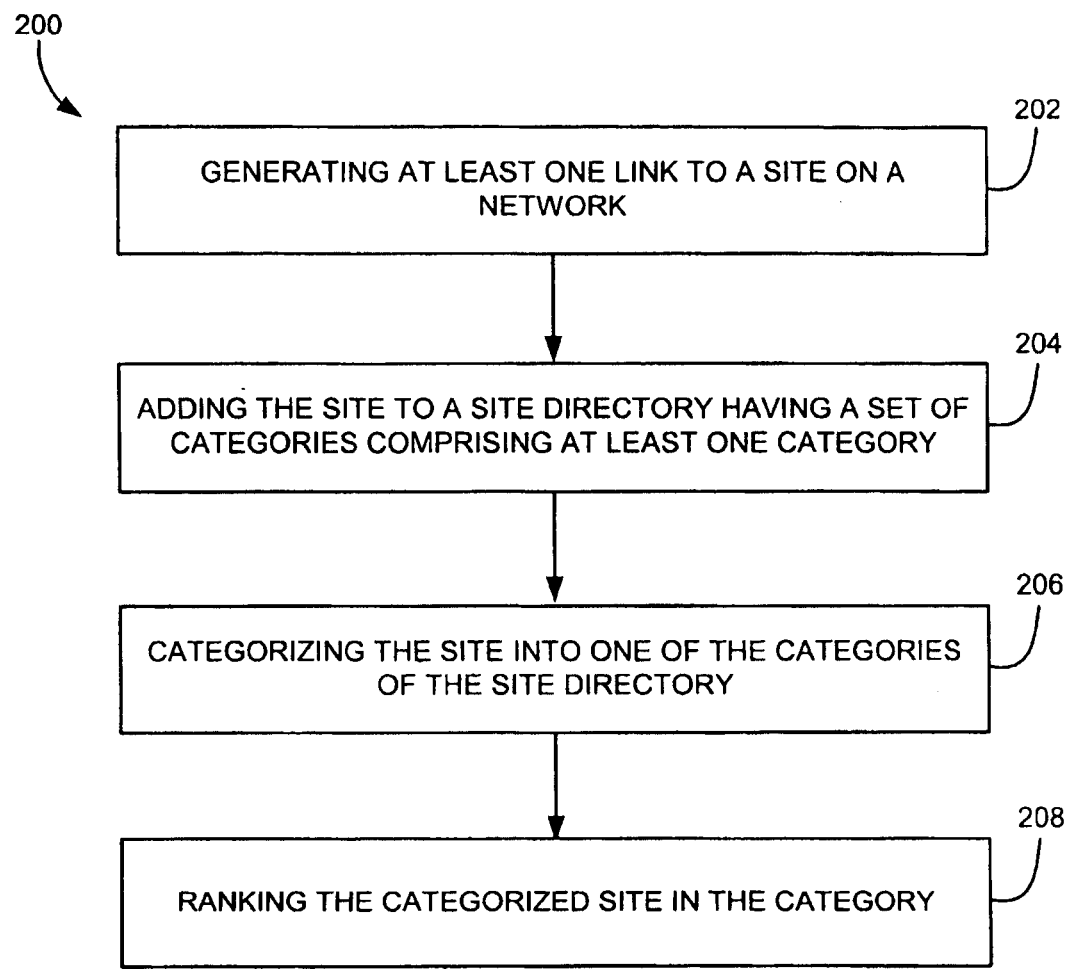
Figure 3:
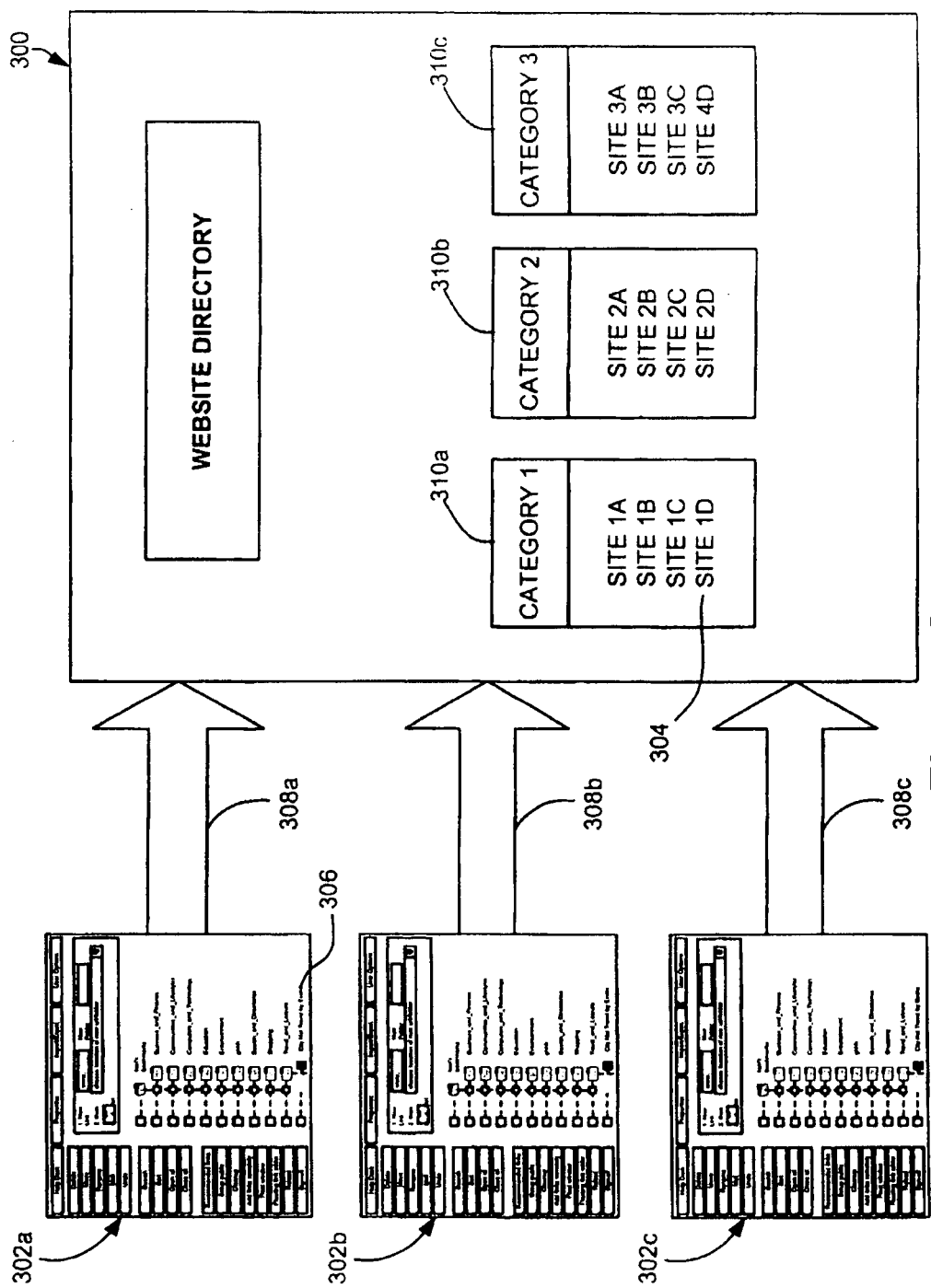
Figure 4:
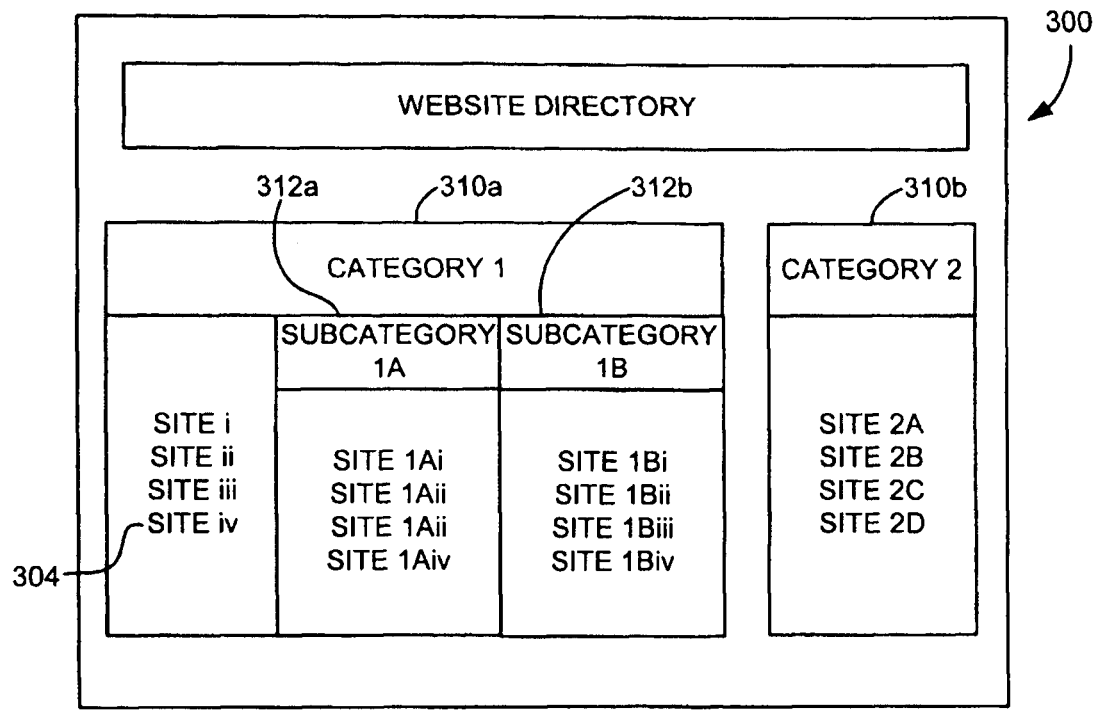
Figure 5:
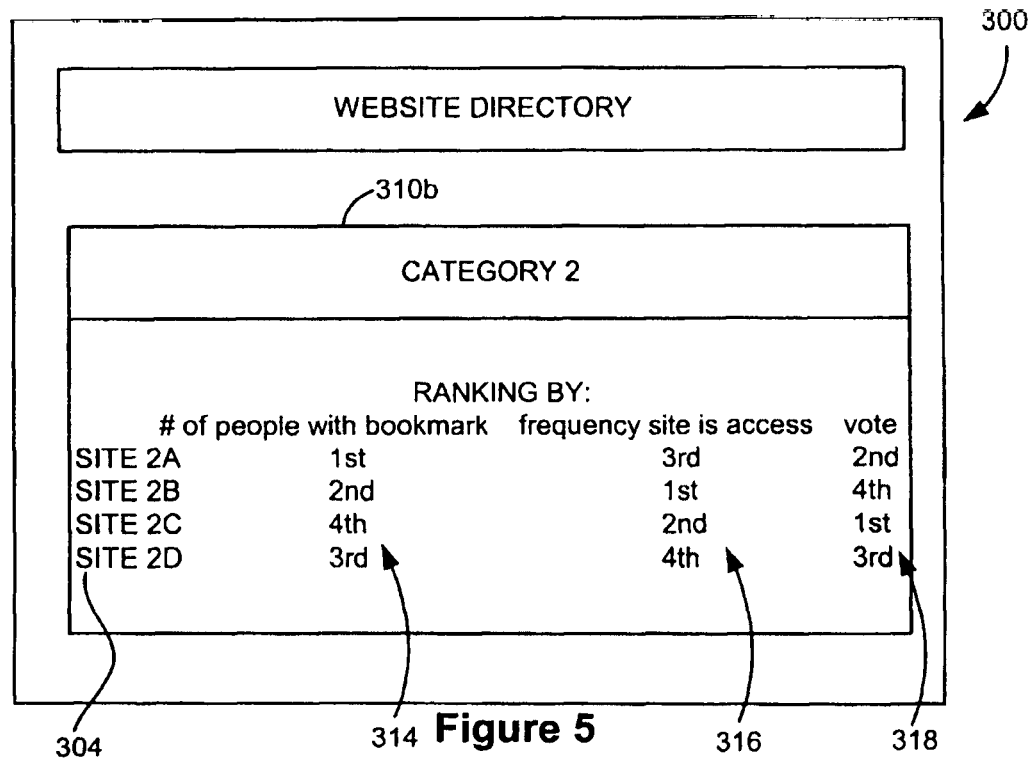
Figure 6:
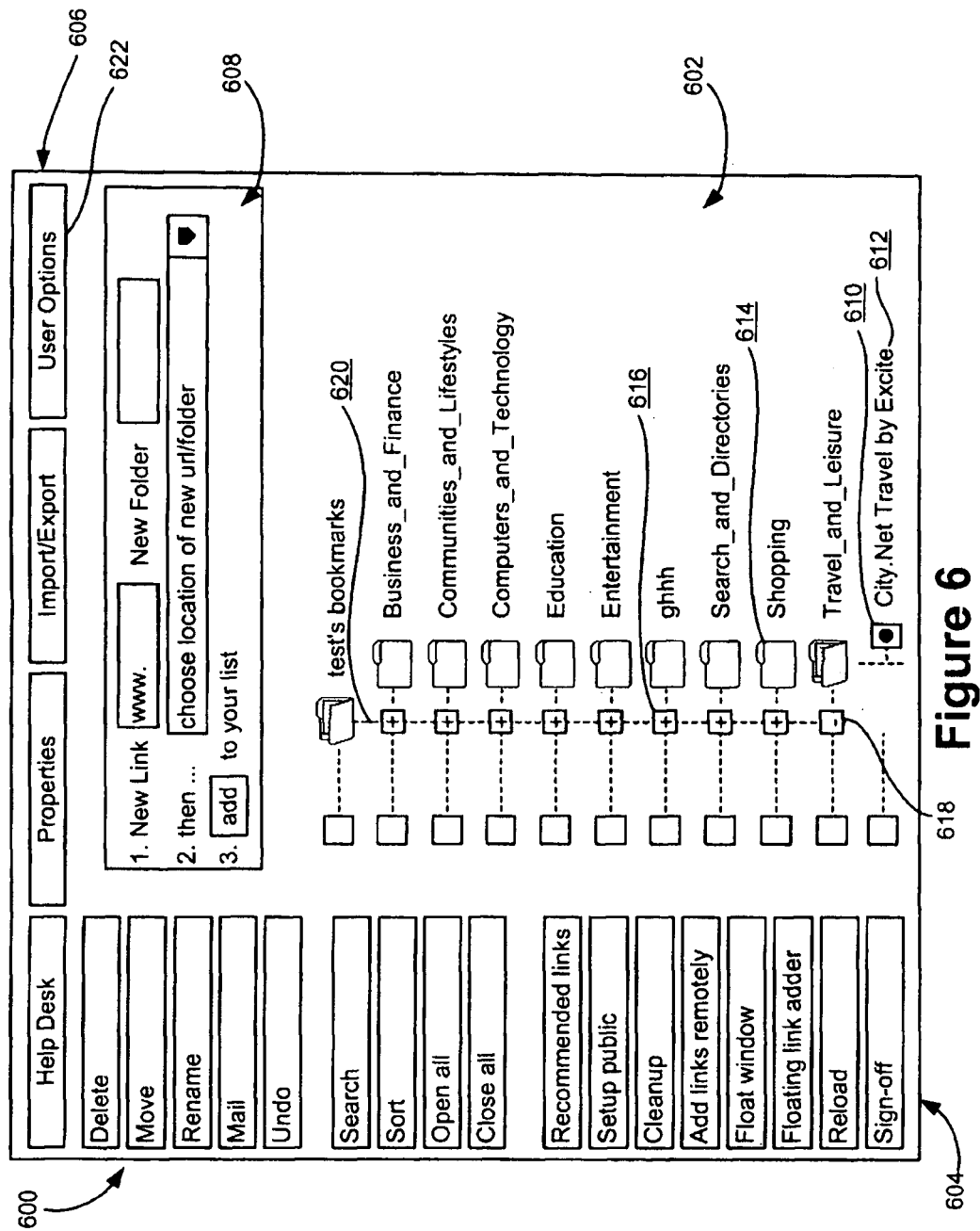
Figure 7:
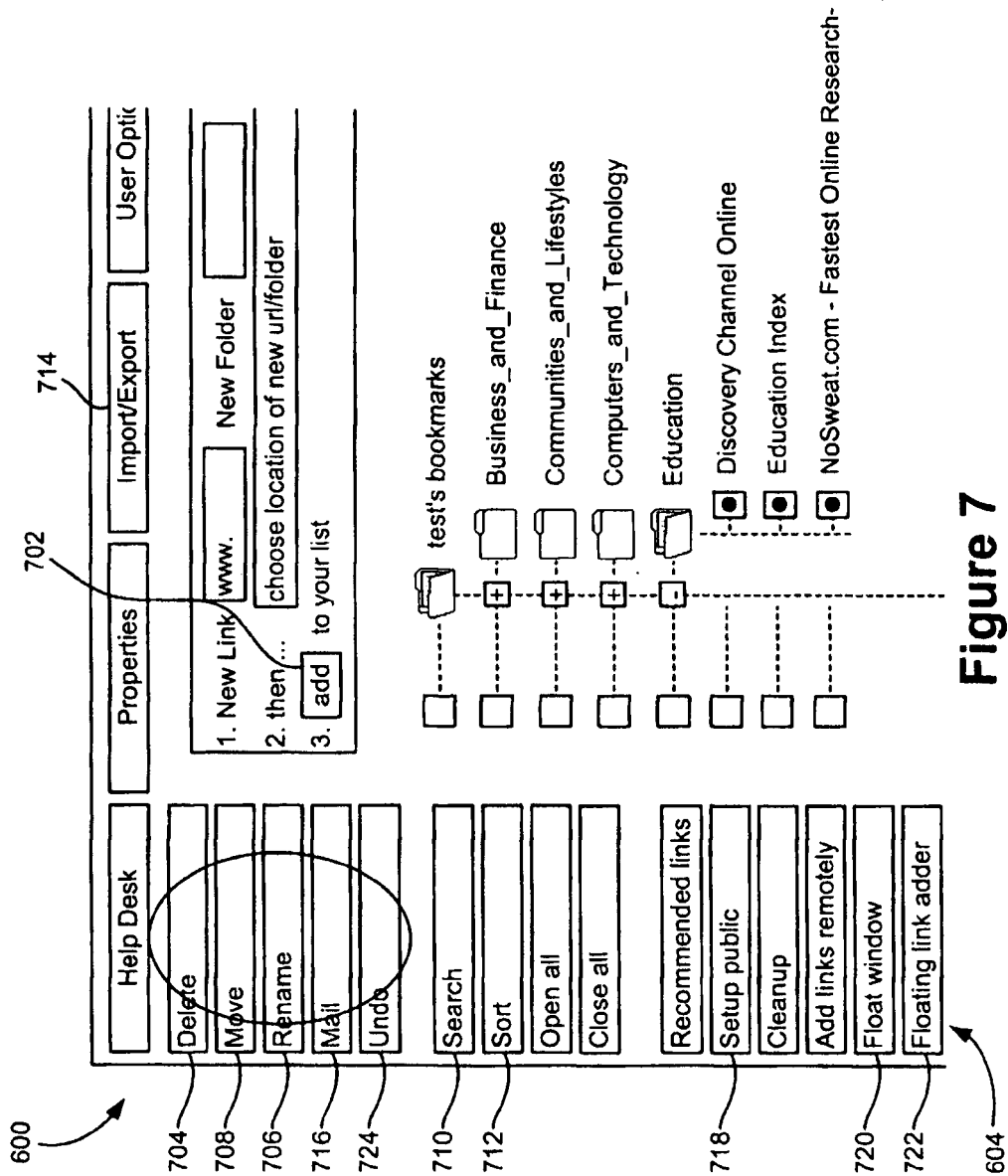
Figure 8:
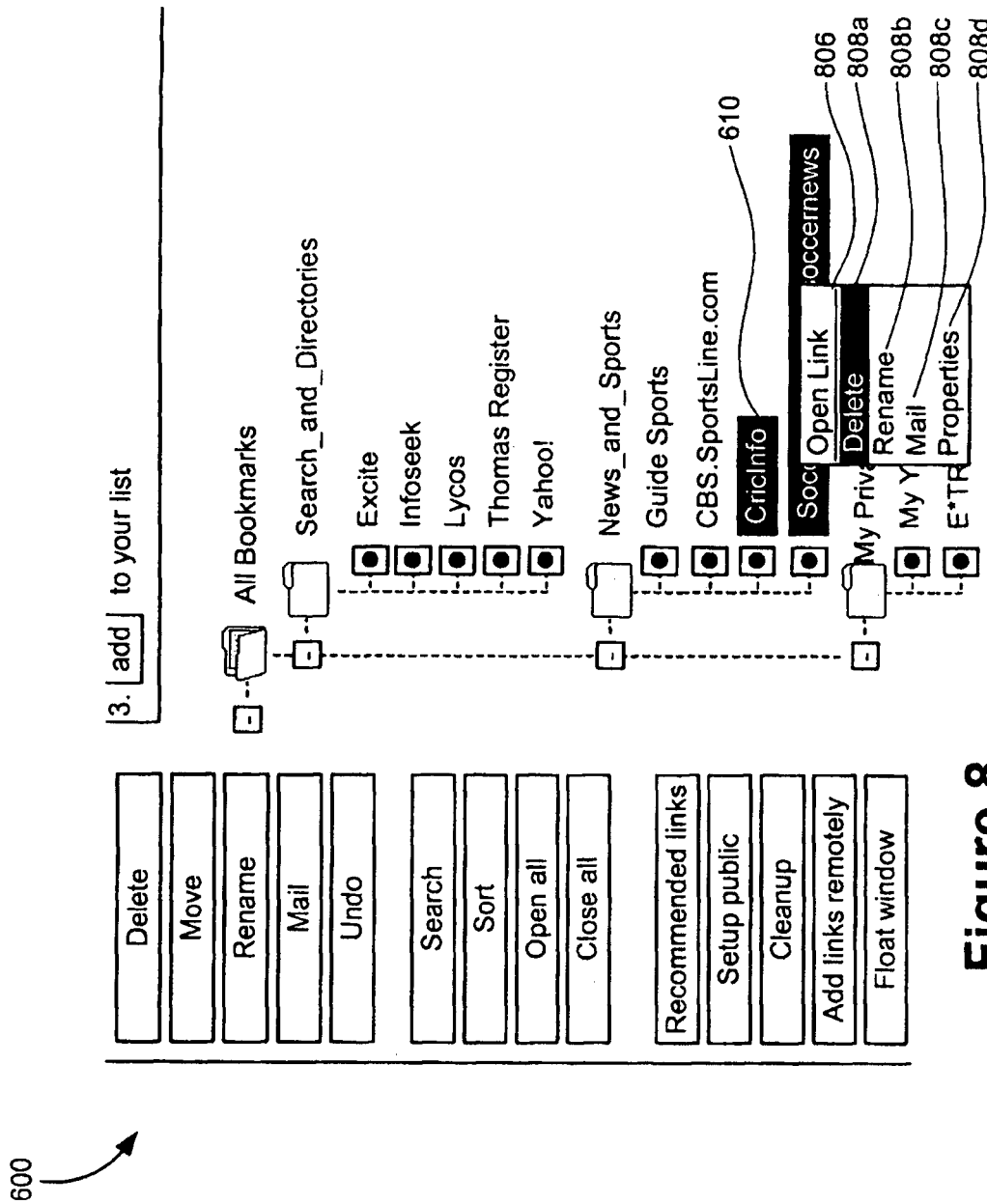
Figure 9:
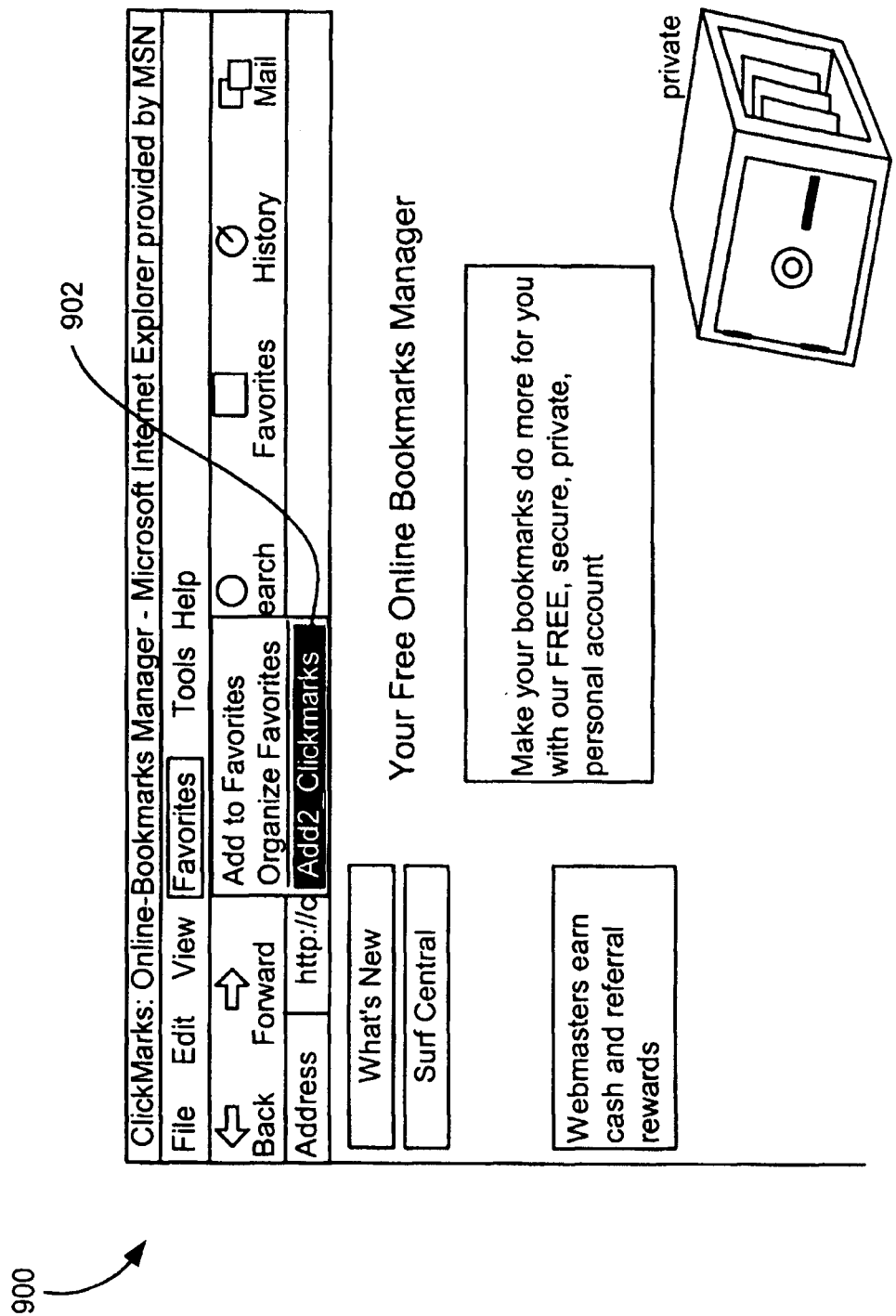
Figure 10:
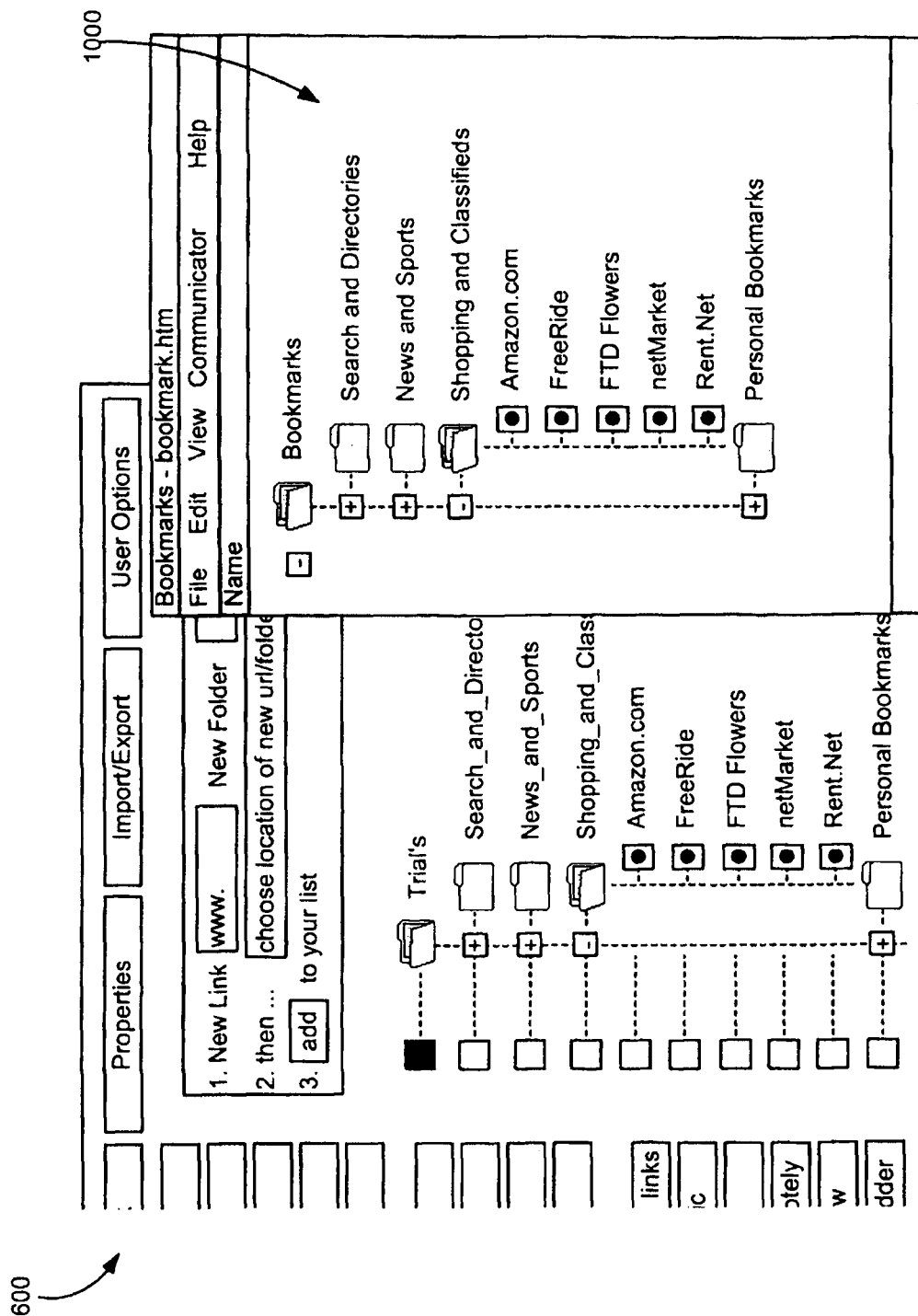
Figure 11:
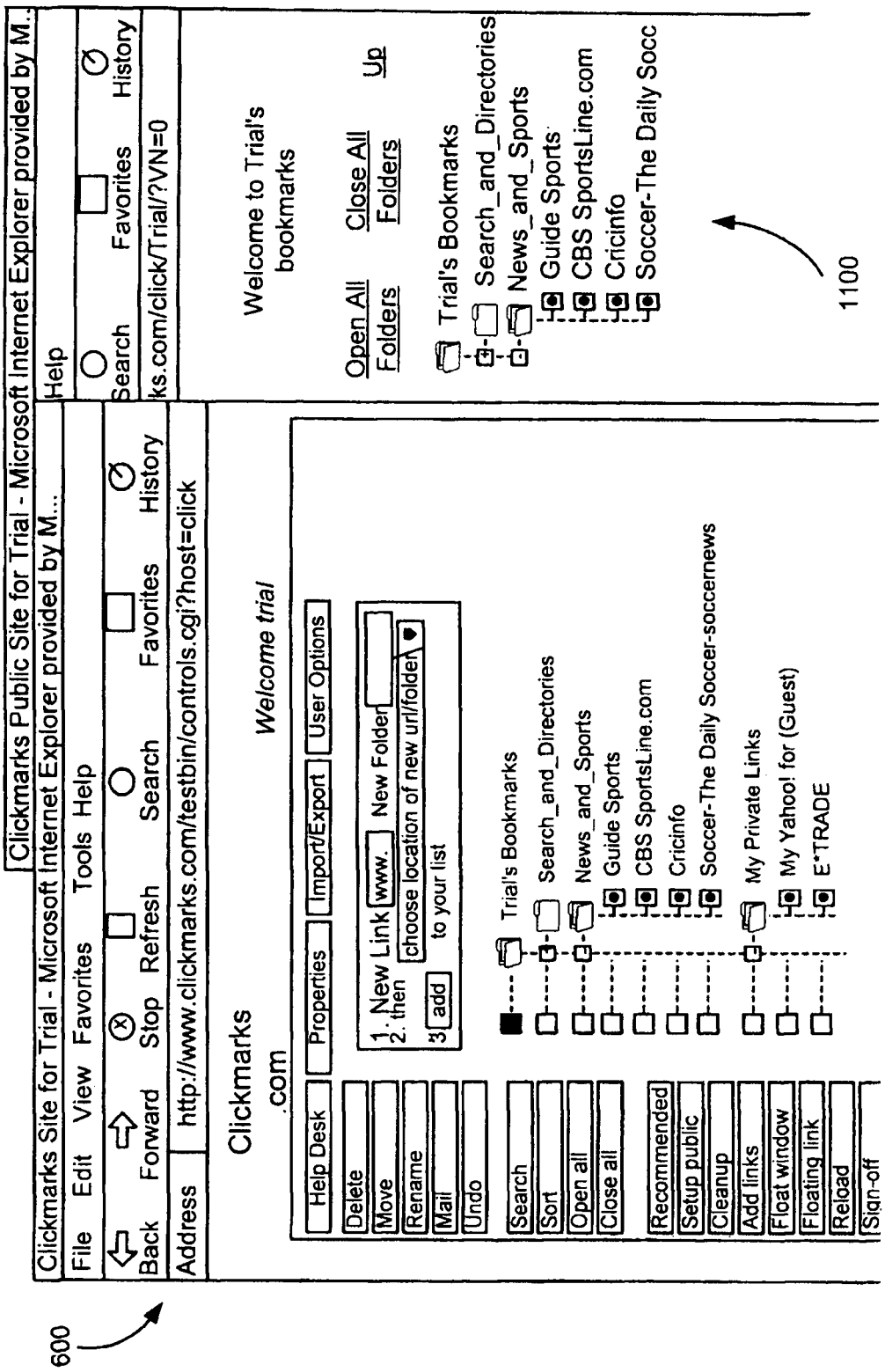
Figure 12:
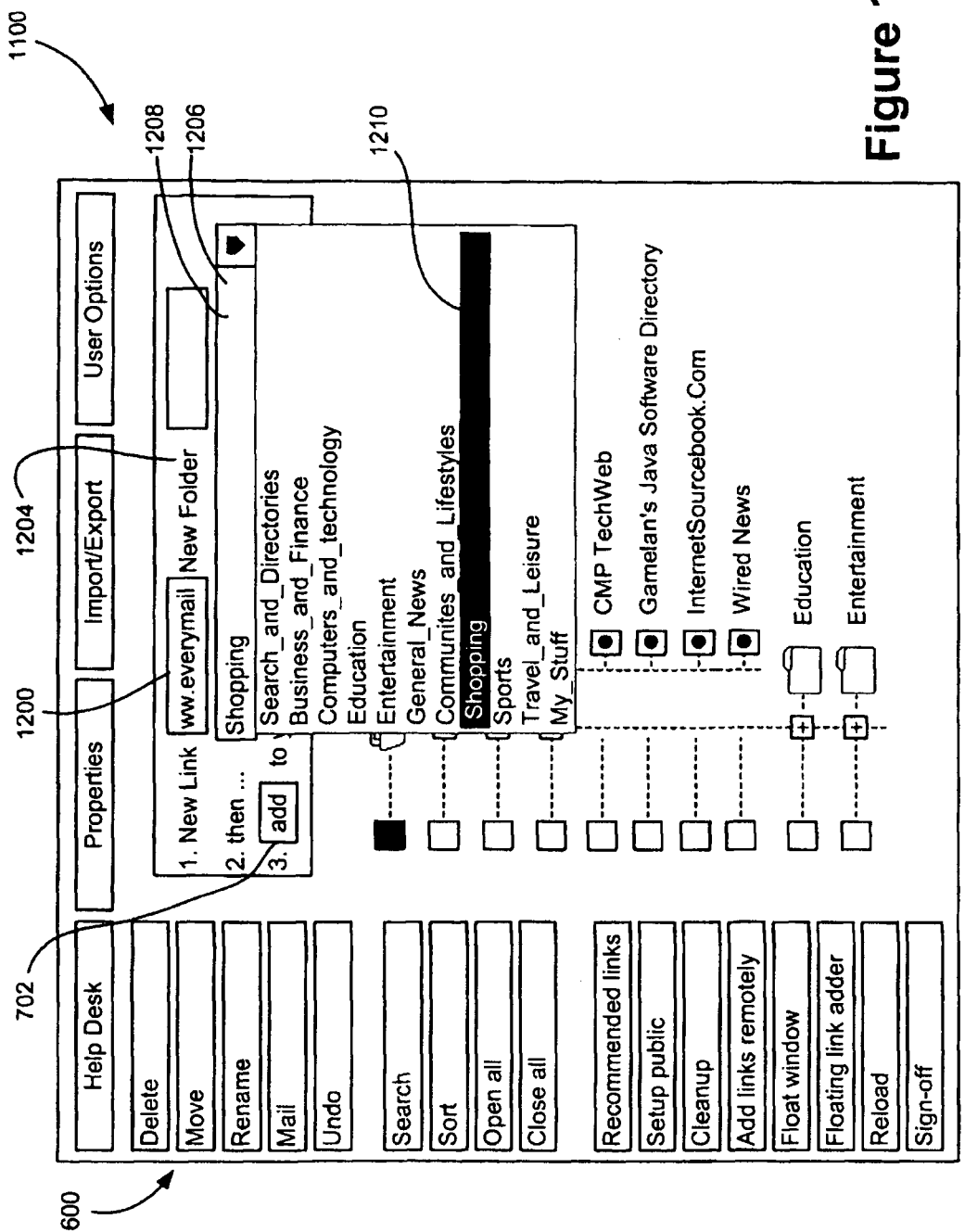
Figure 13:
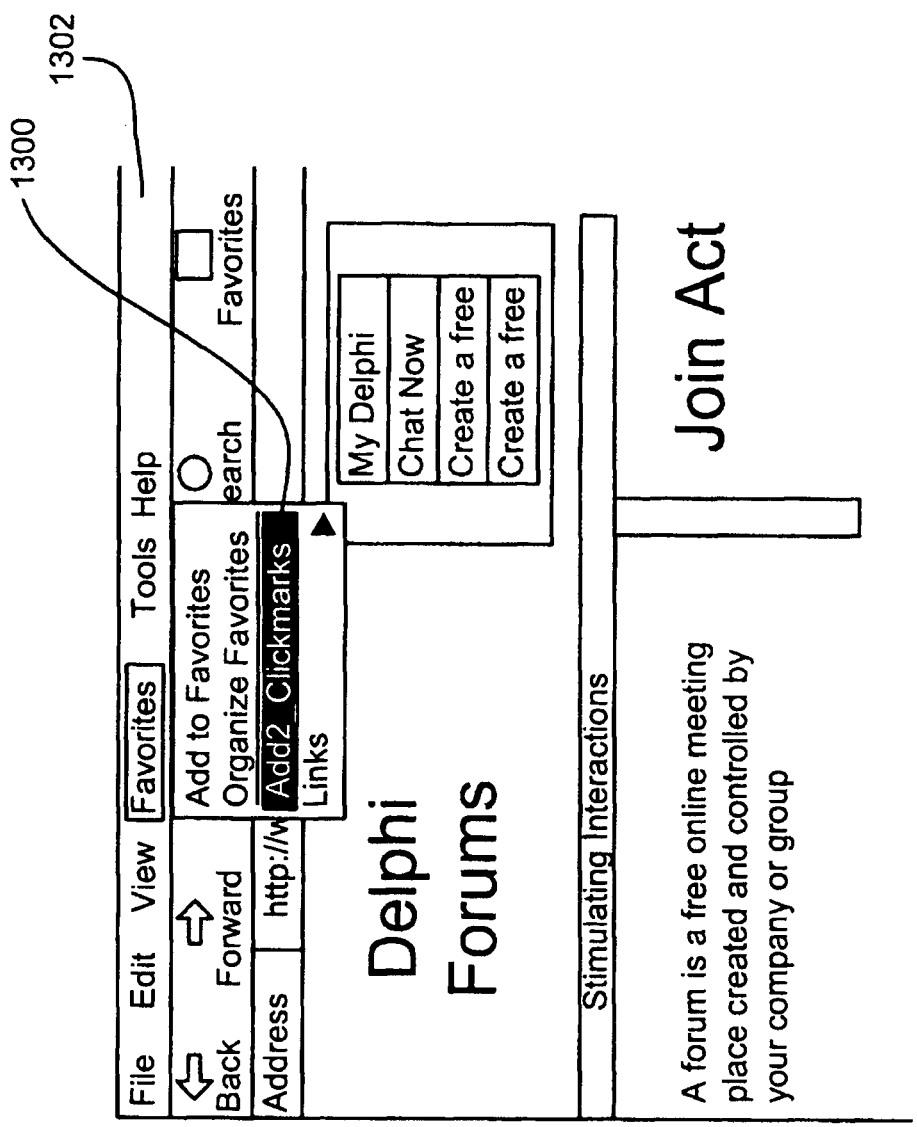
Figure 14:
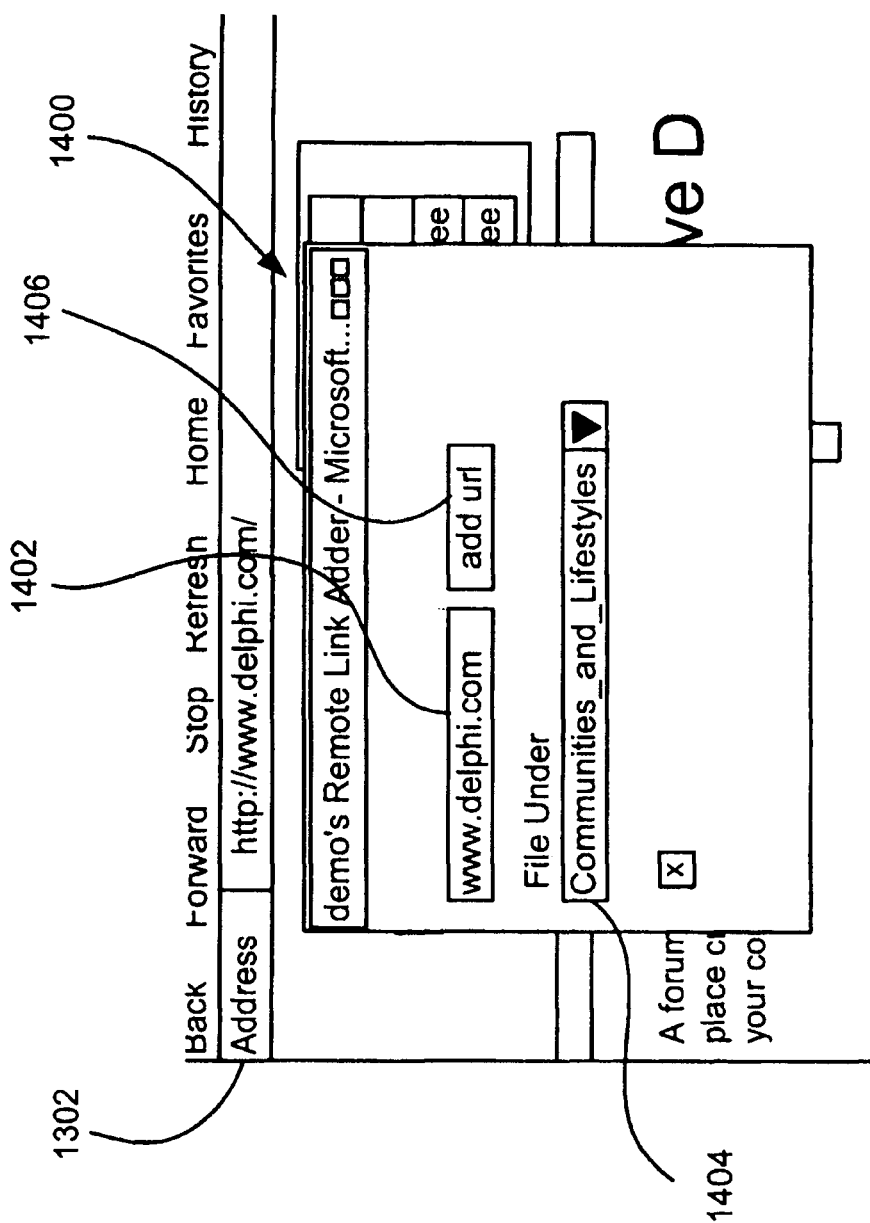
Figure 15:
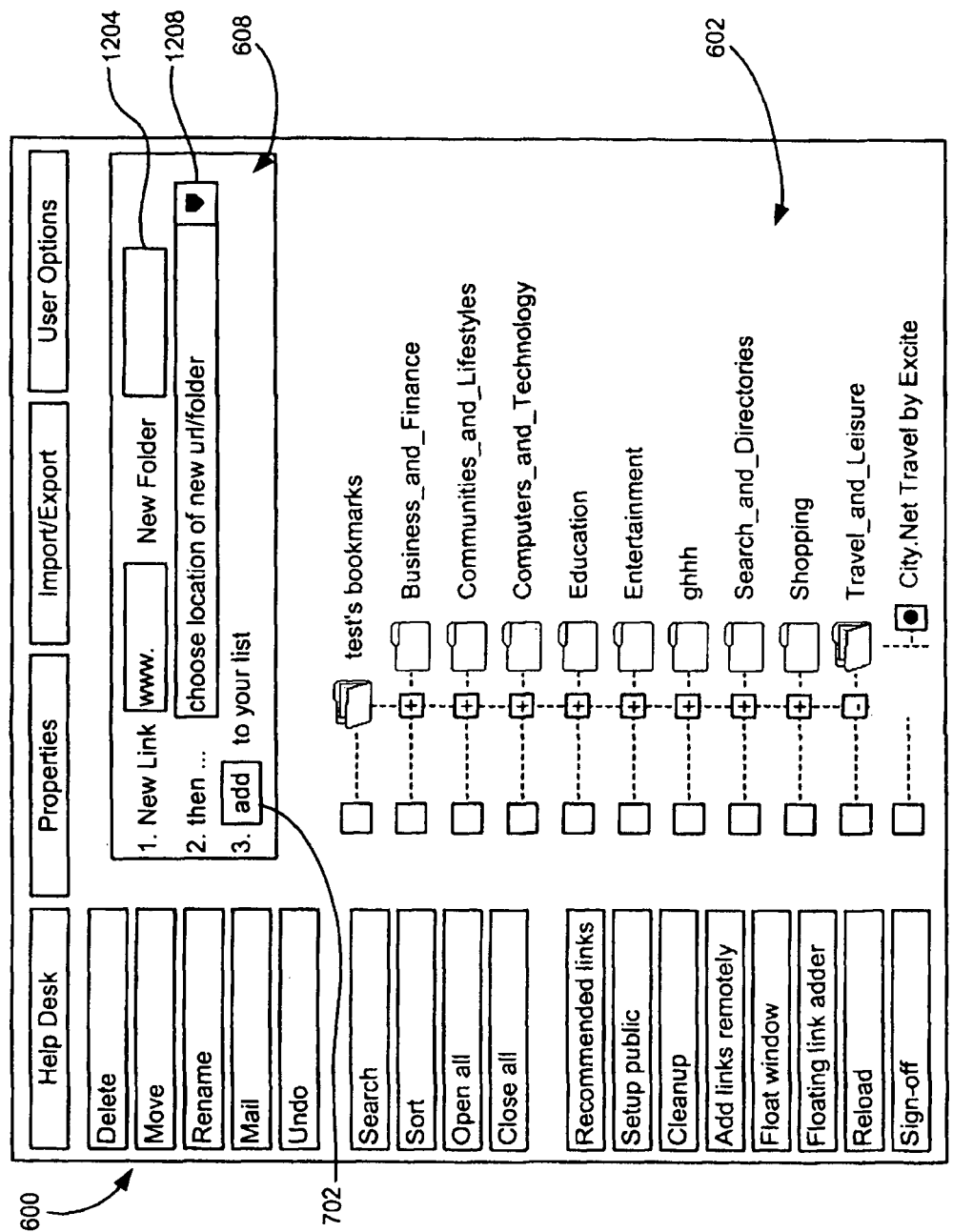
Figure 16:
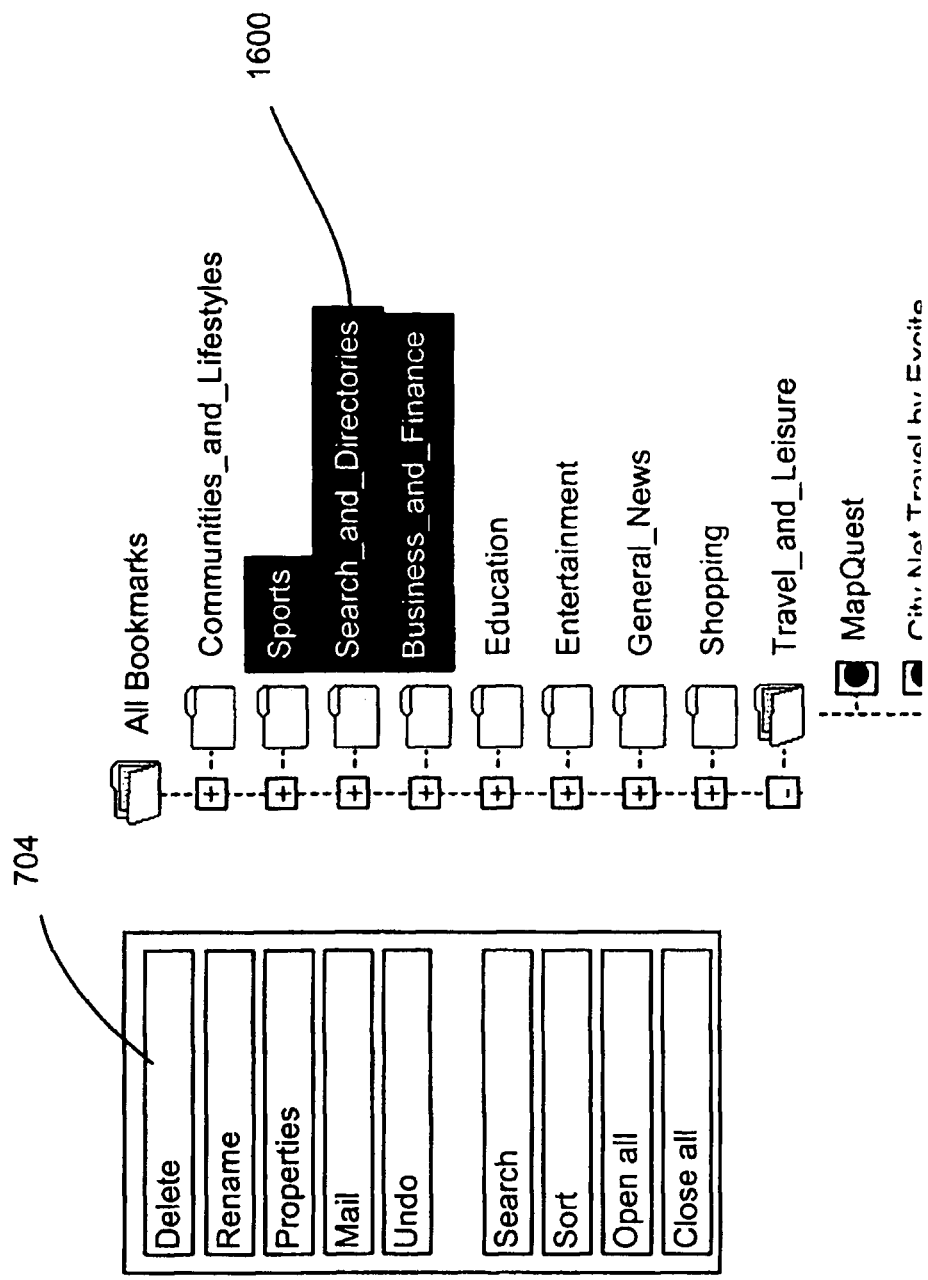
Figure 17:
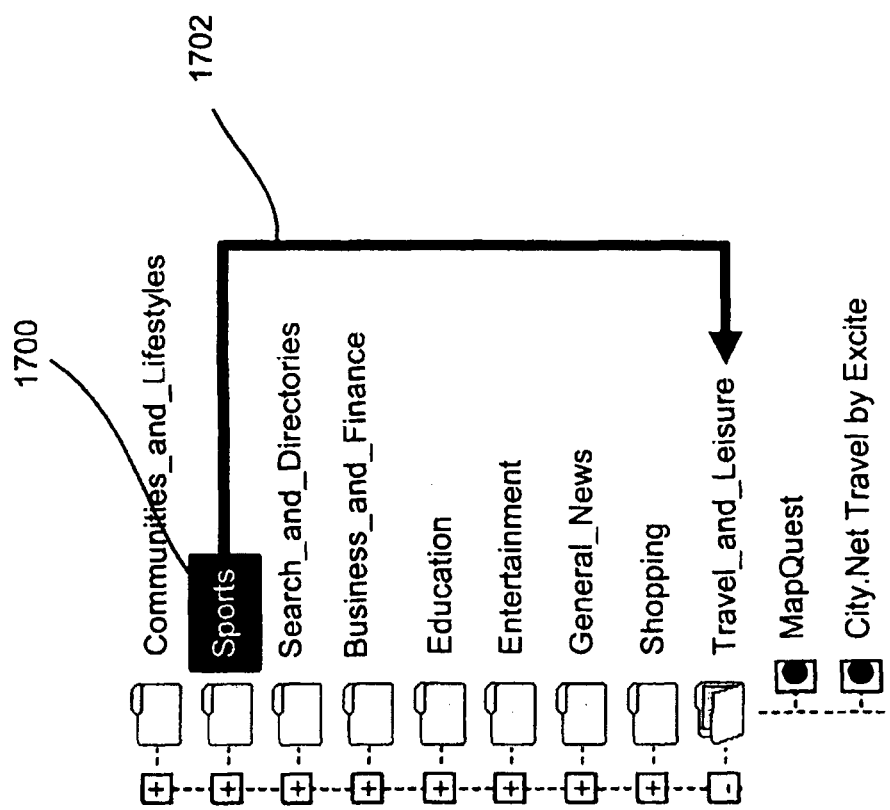
Figure 18:
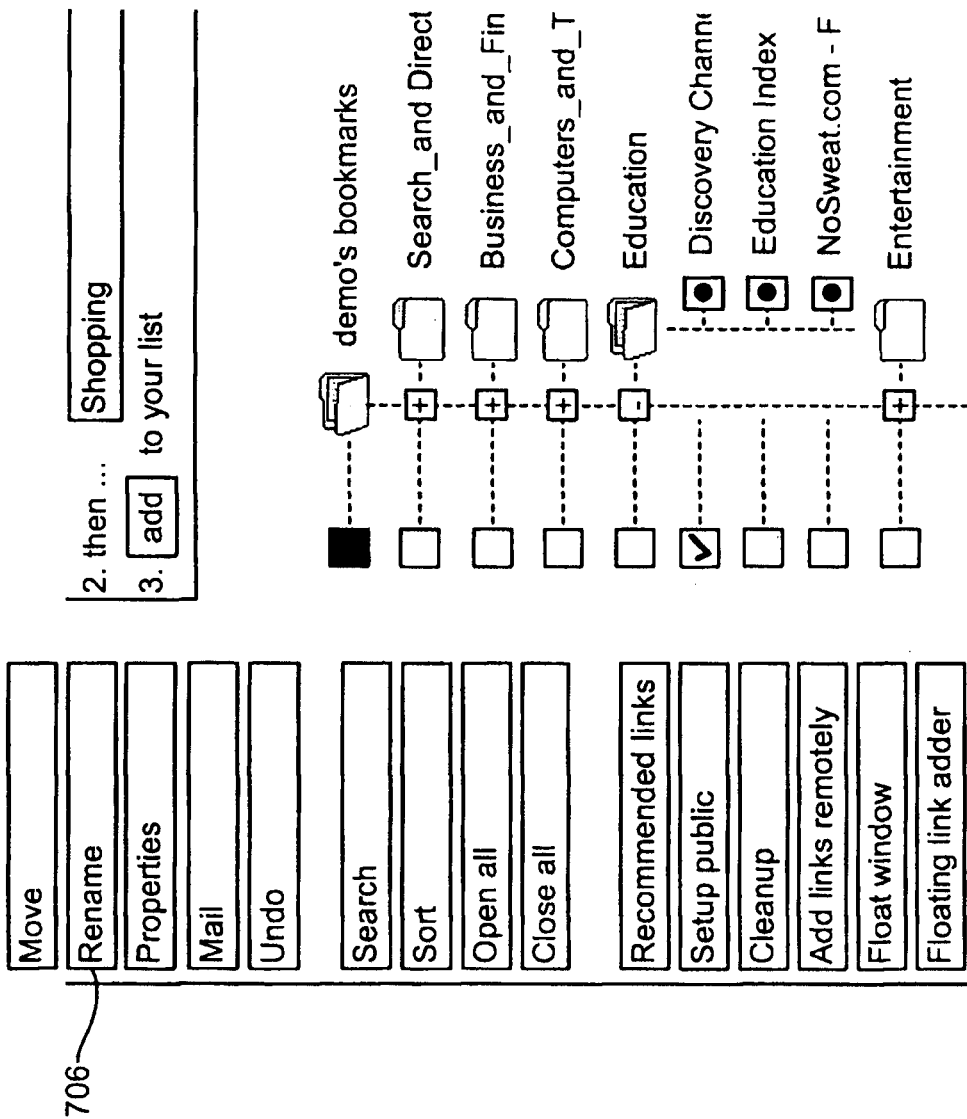
Figure 19:
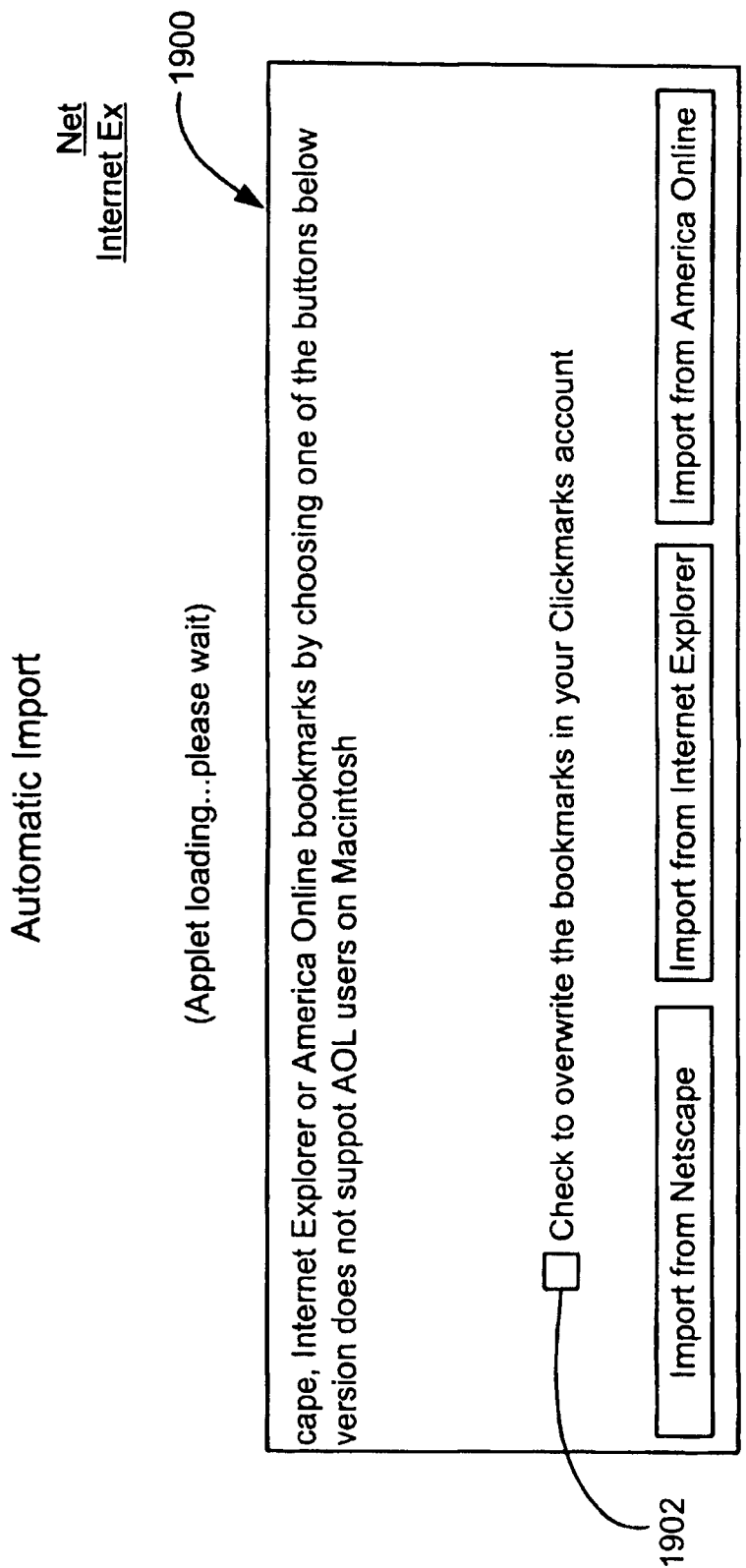
Figure 20:
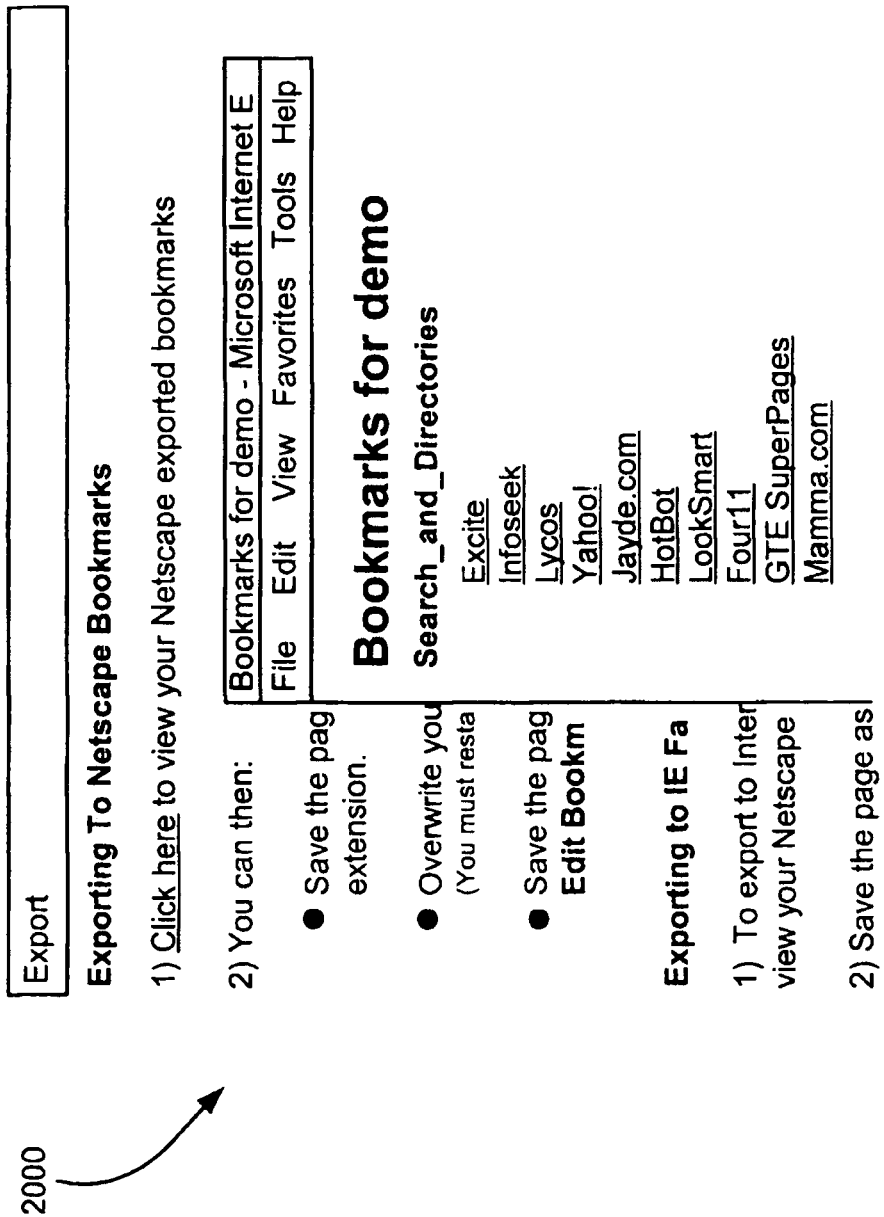
Figure 21:
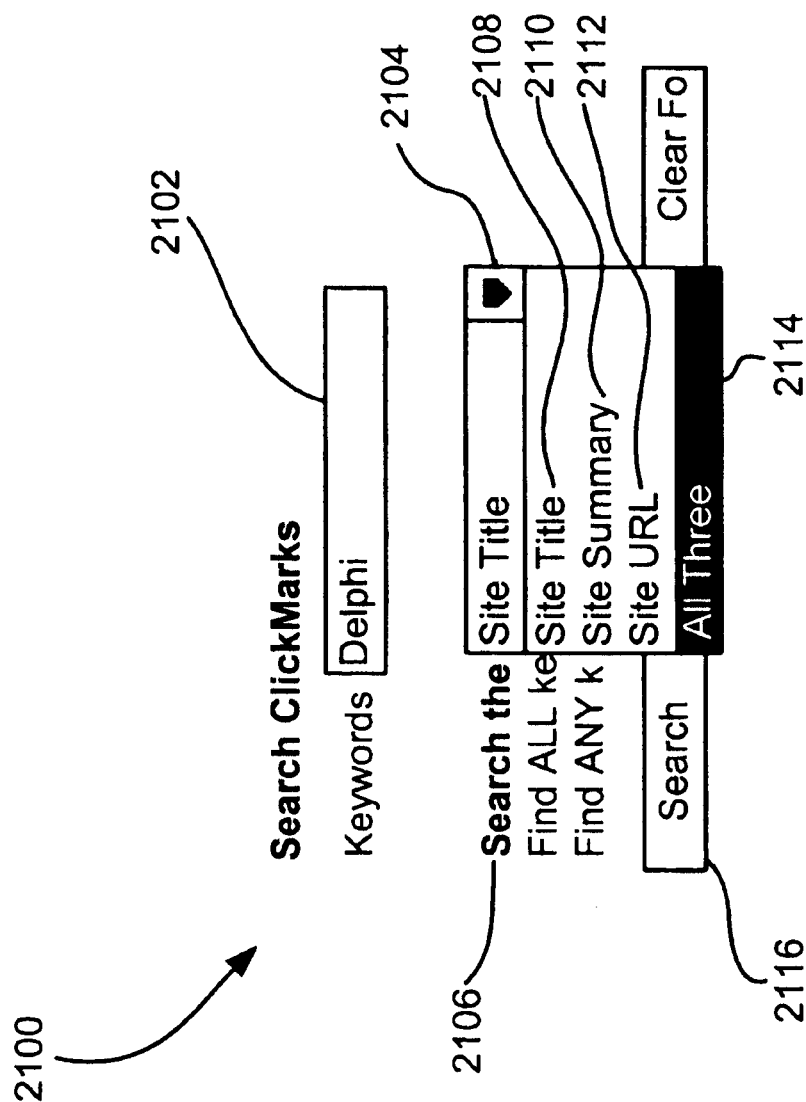
Figure 22:
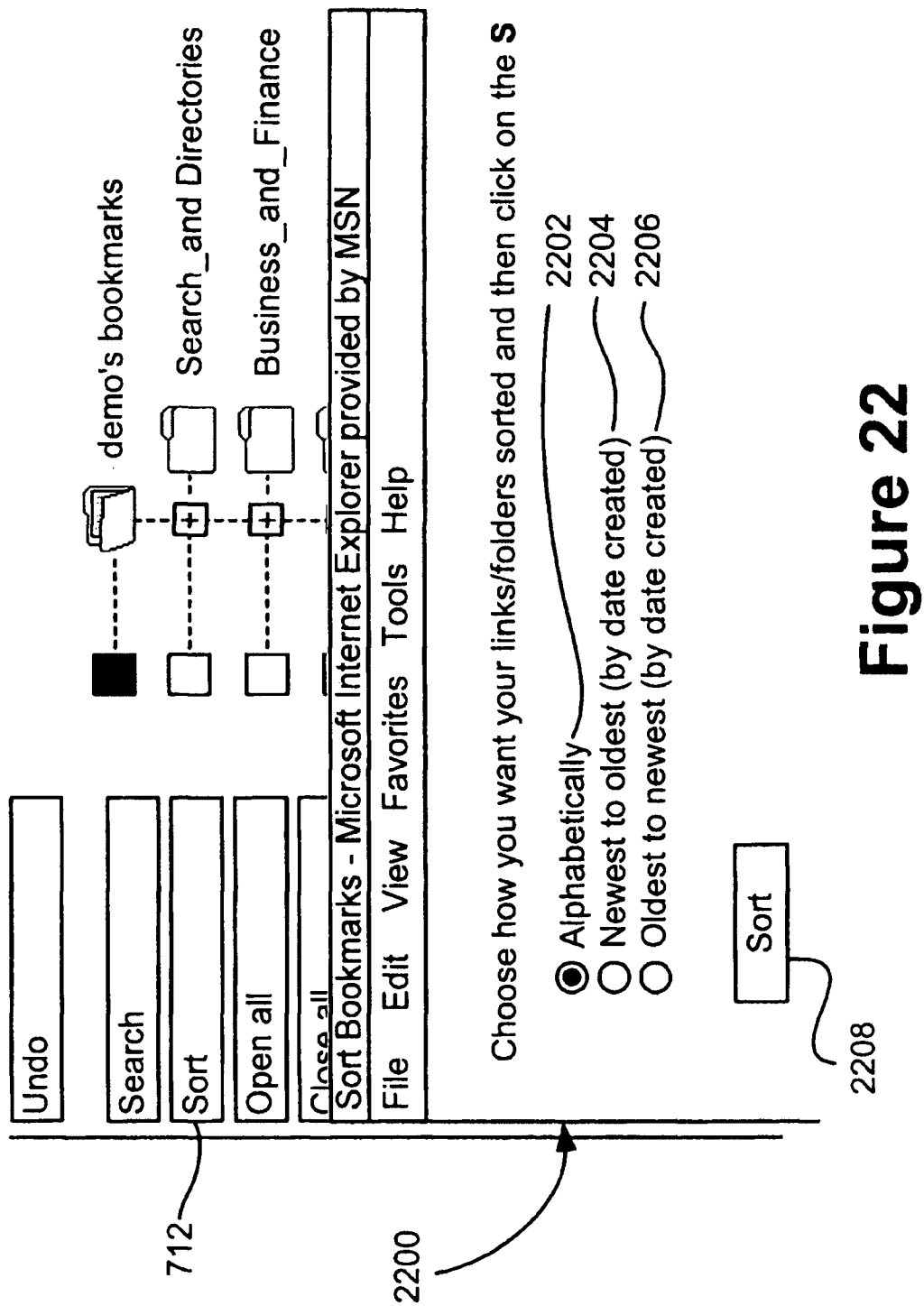
Figure 23:
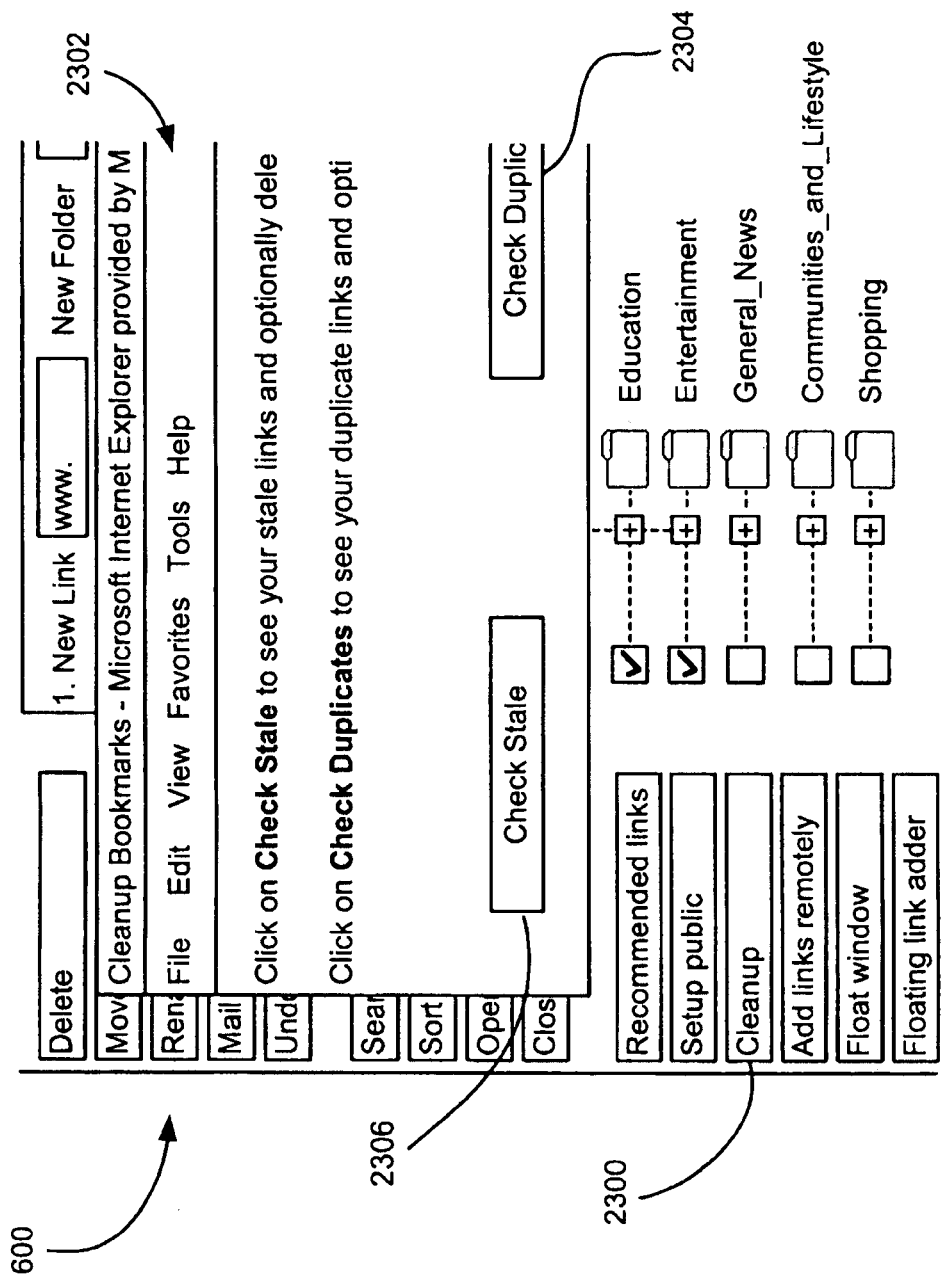
Figure 24:
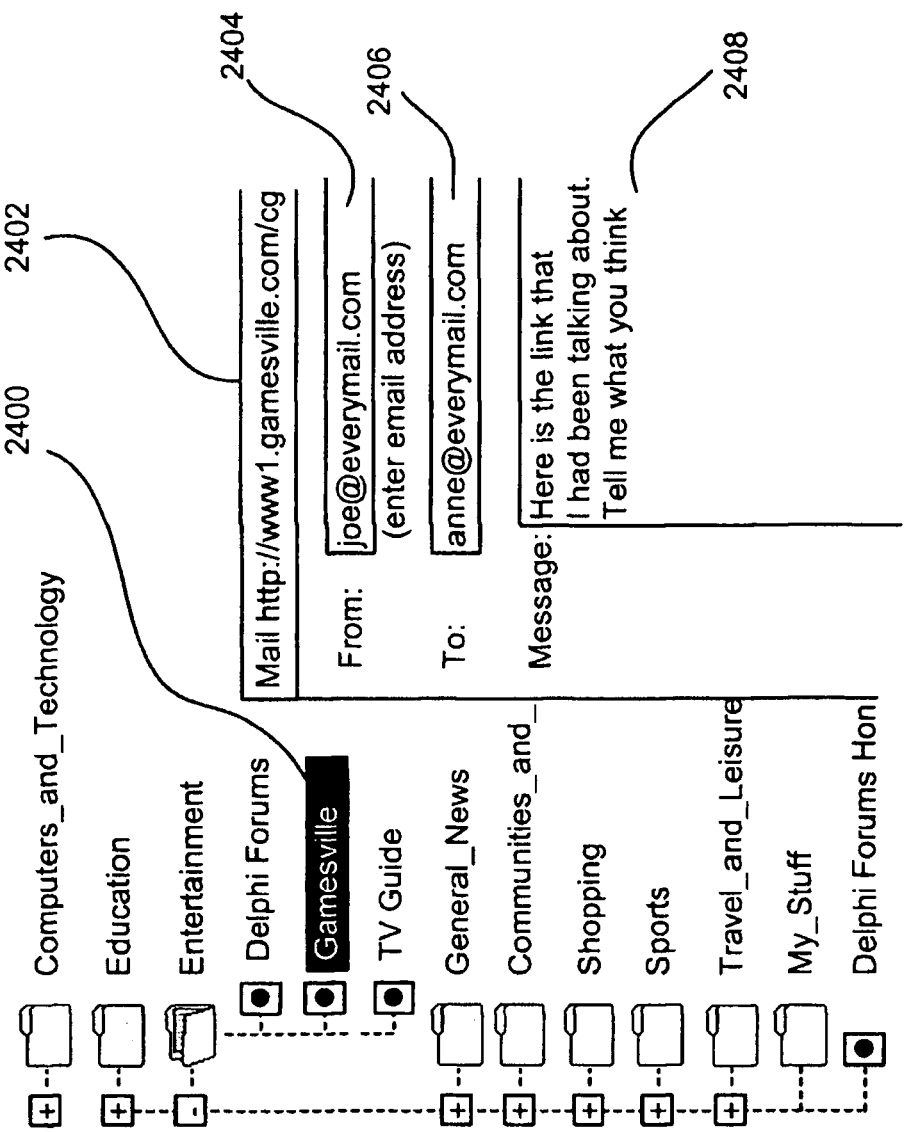
Figure 26:
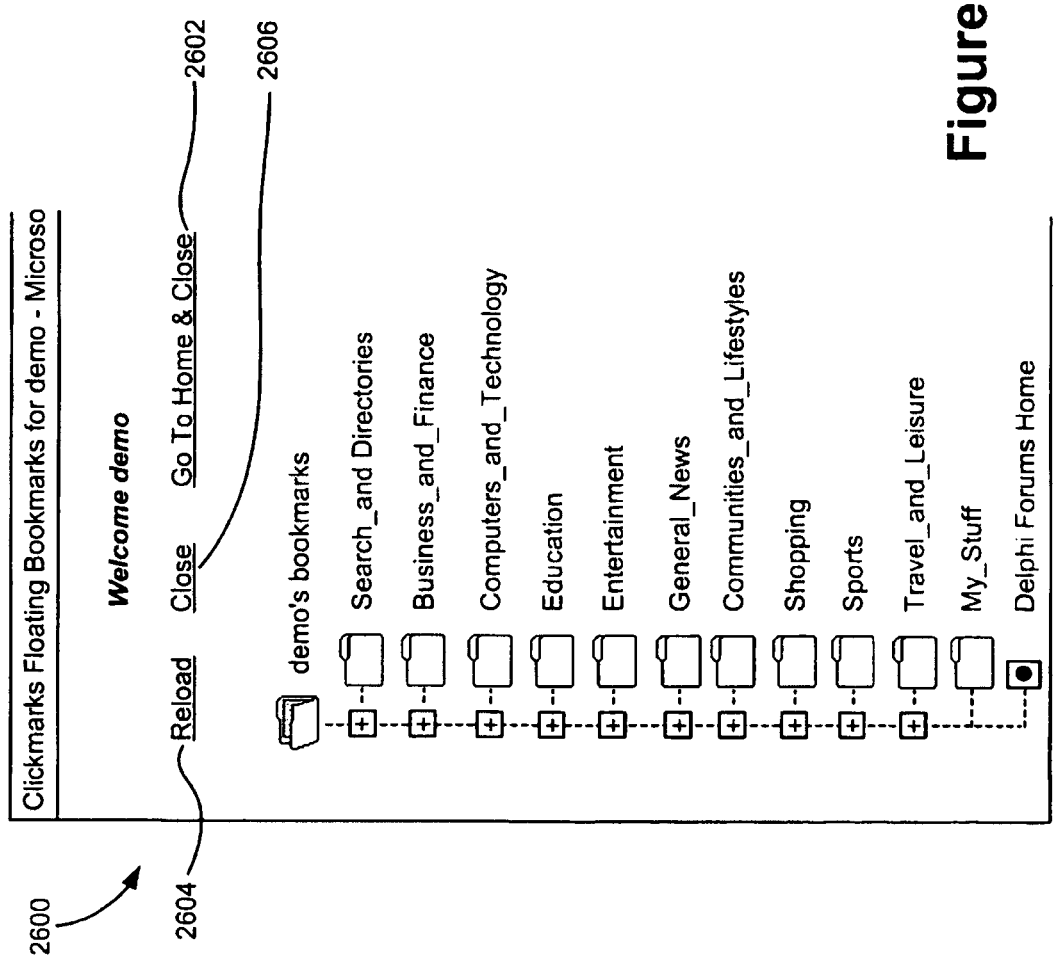
Figure 27:
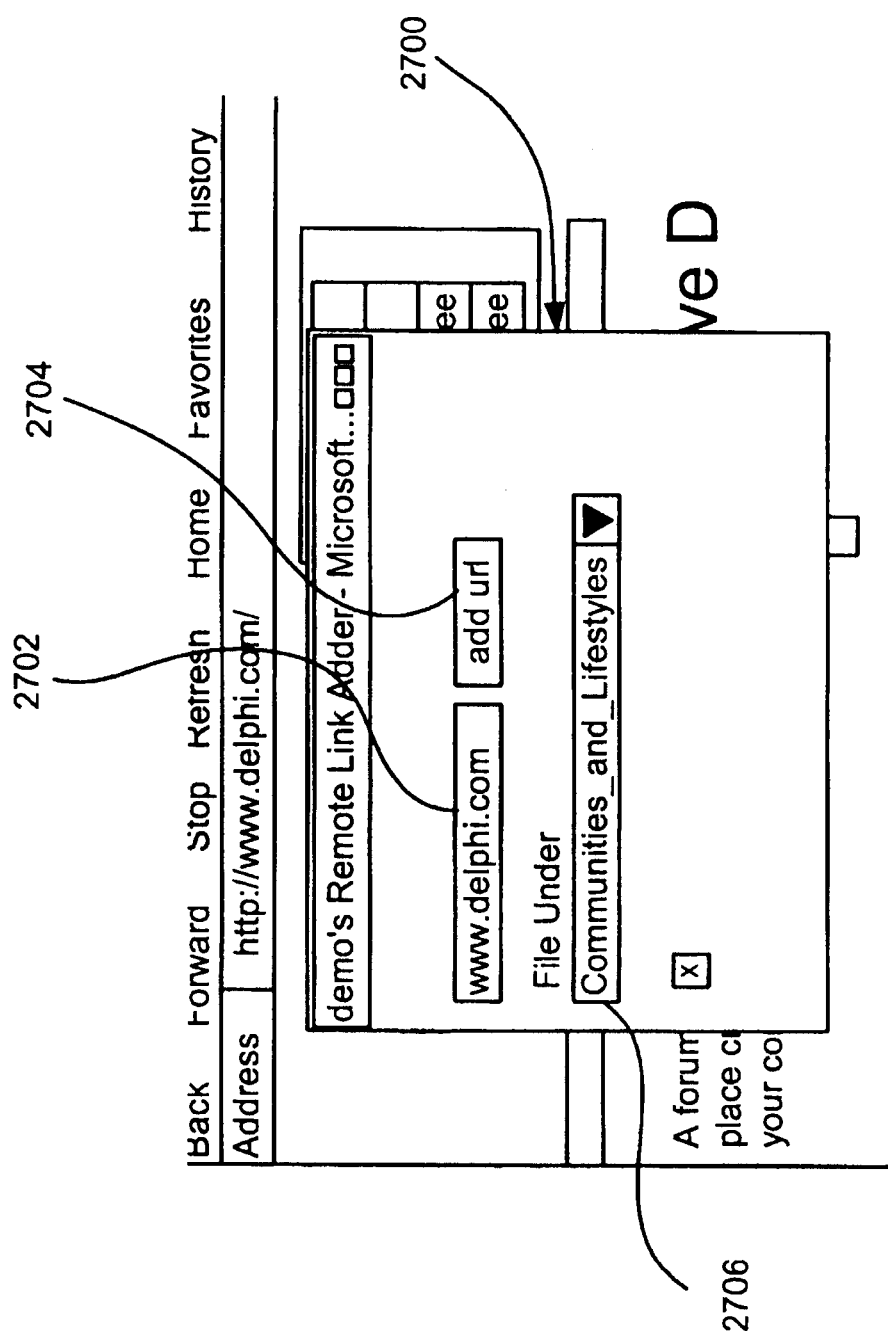
Figure 28:
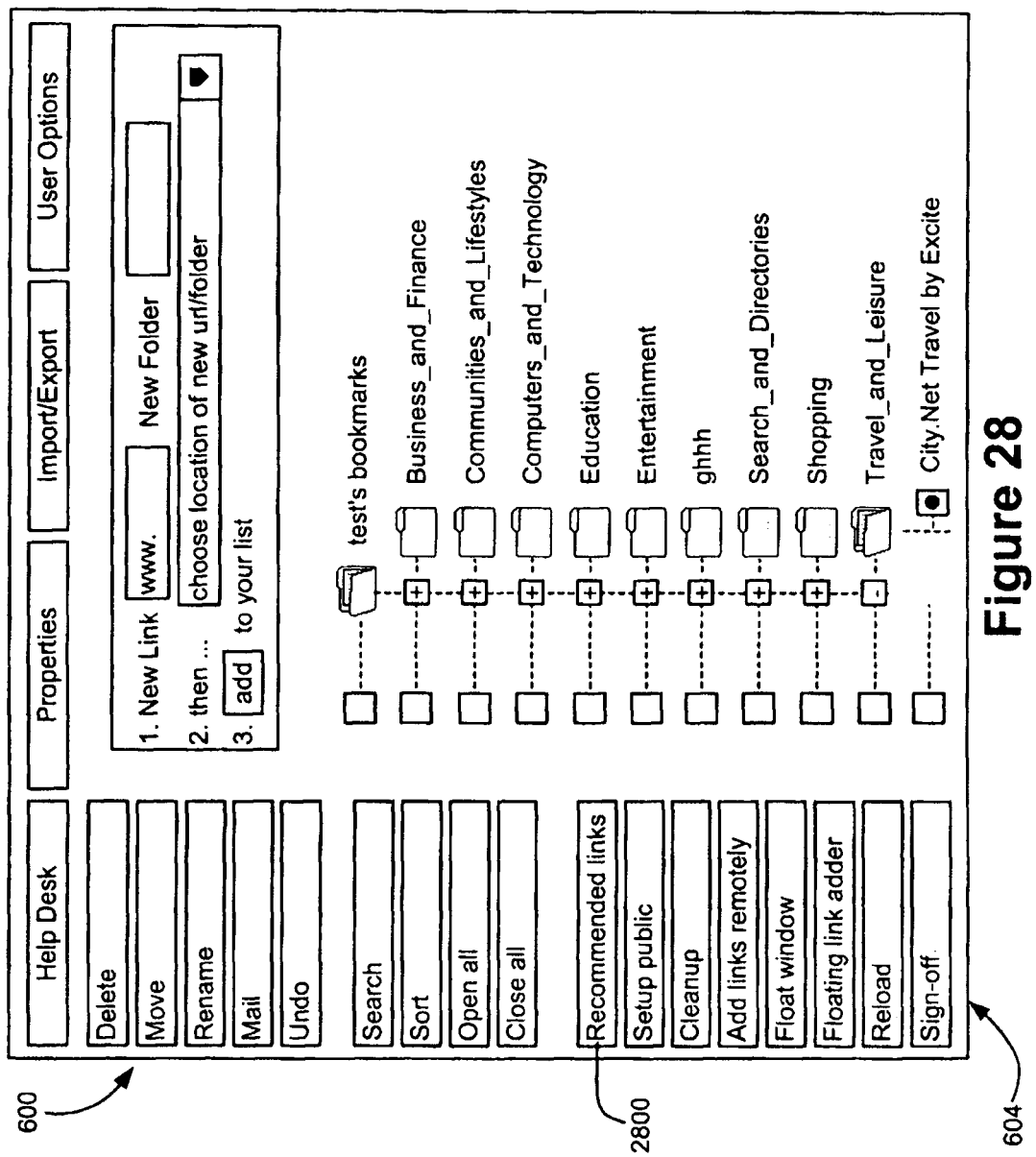
Figure 31:
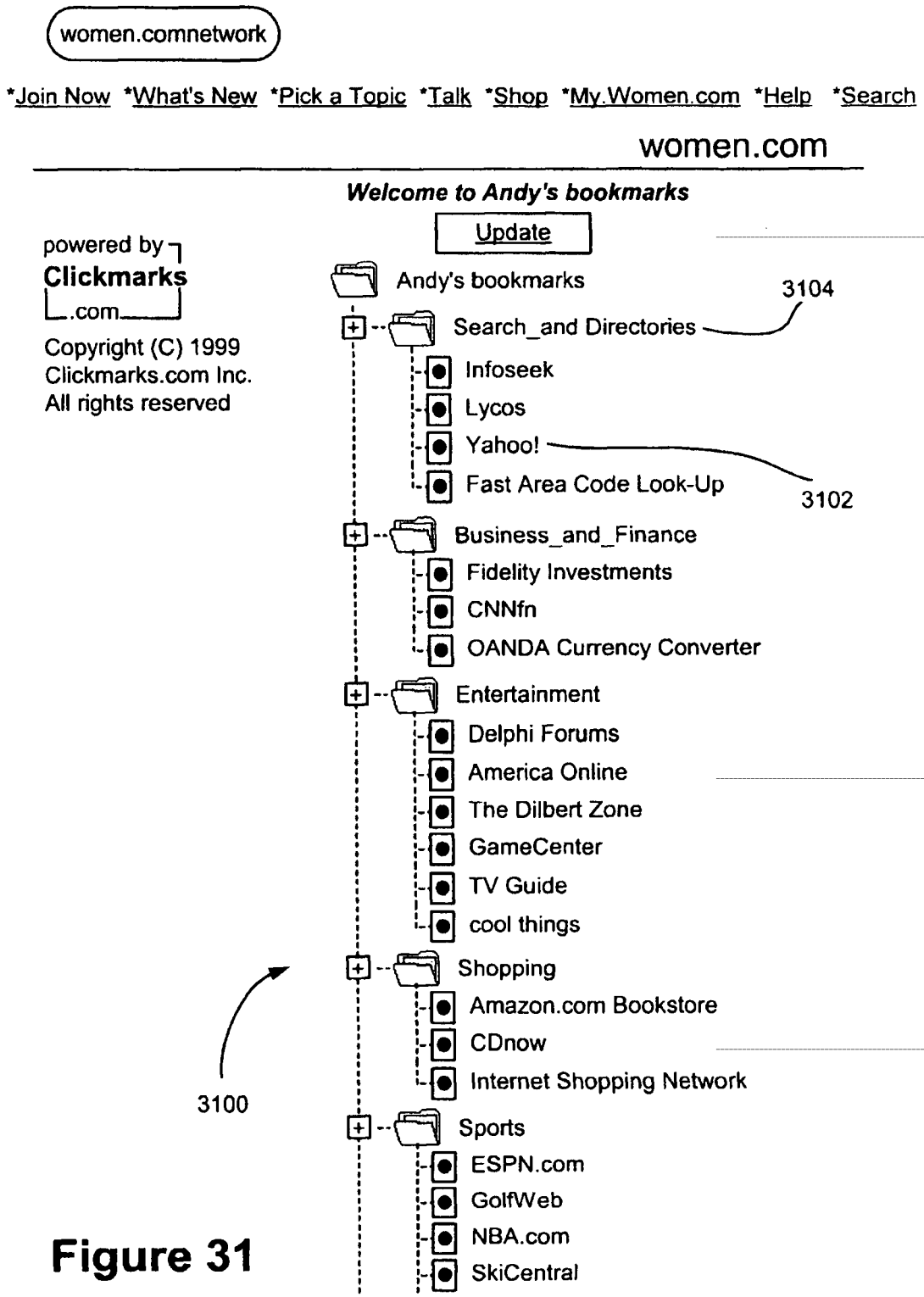
Figure 1:
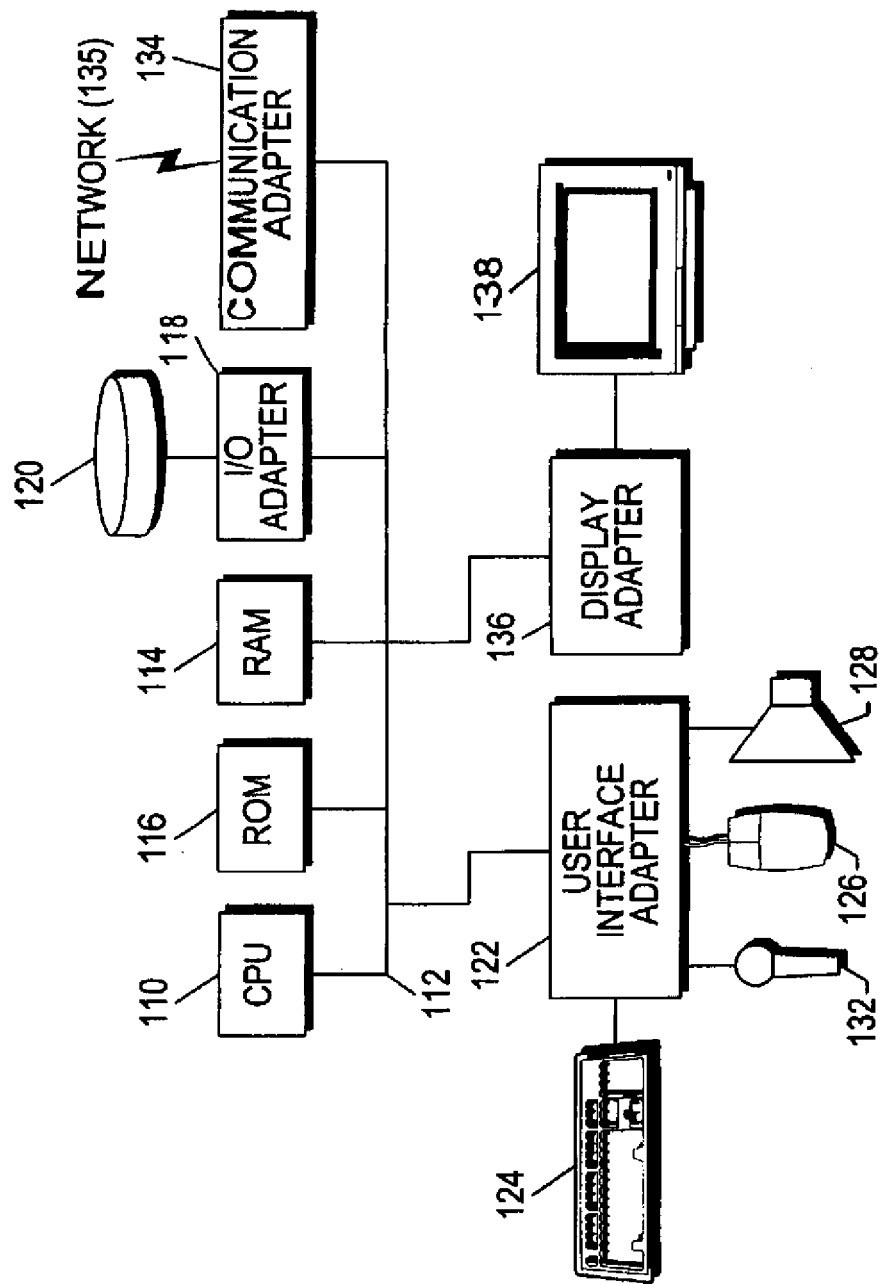
Figure 2:
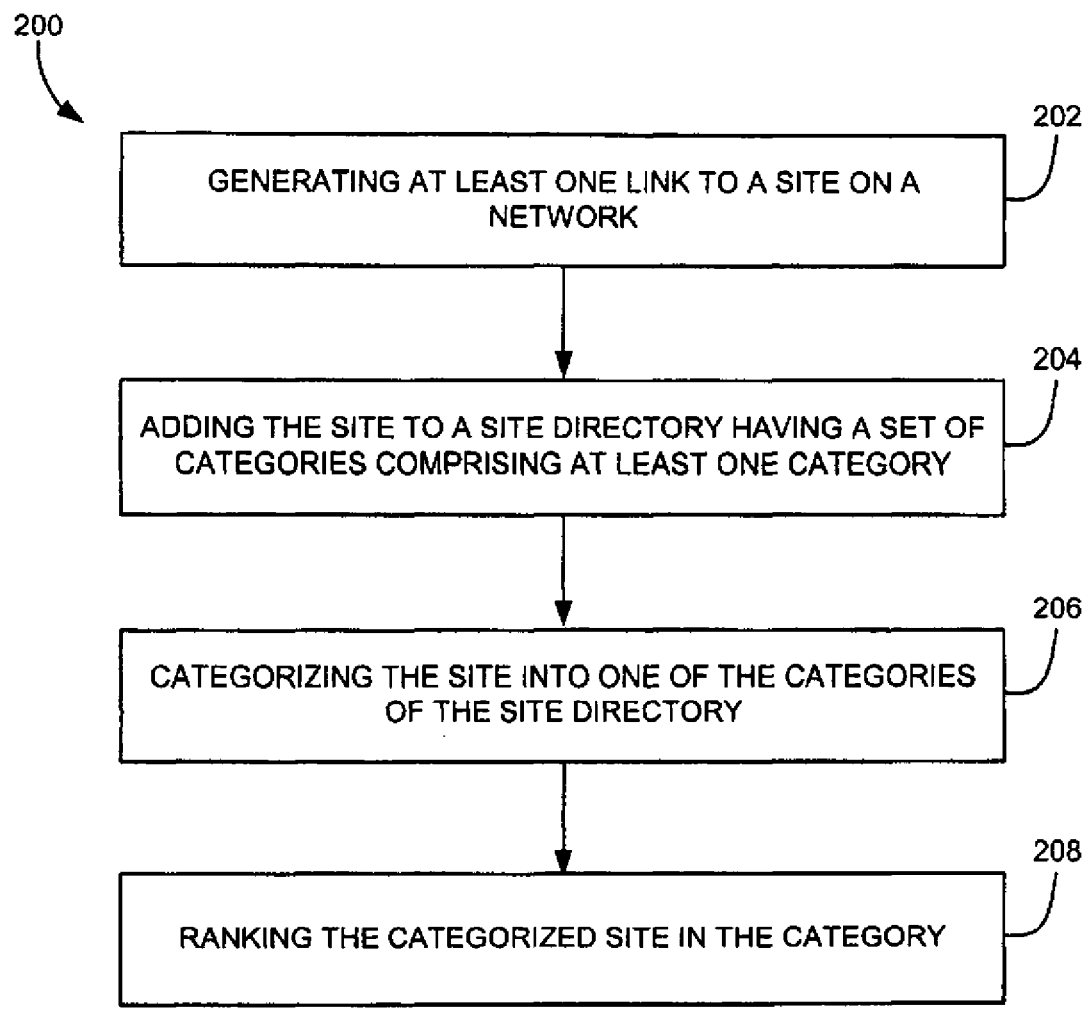
Figure 3:
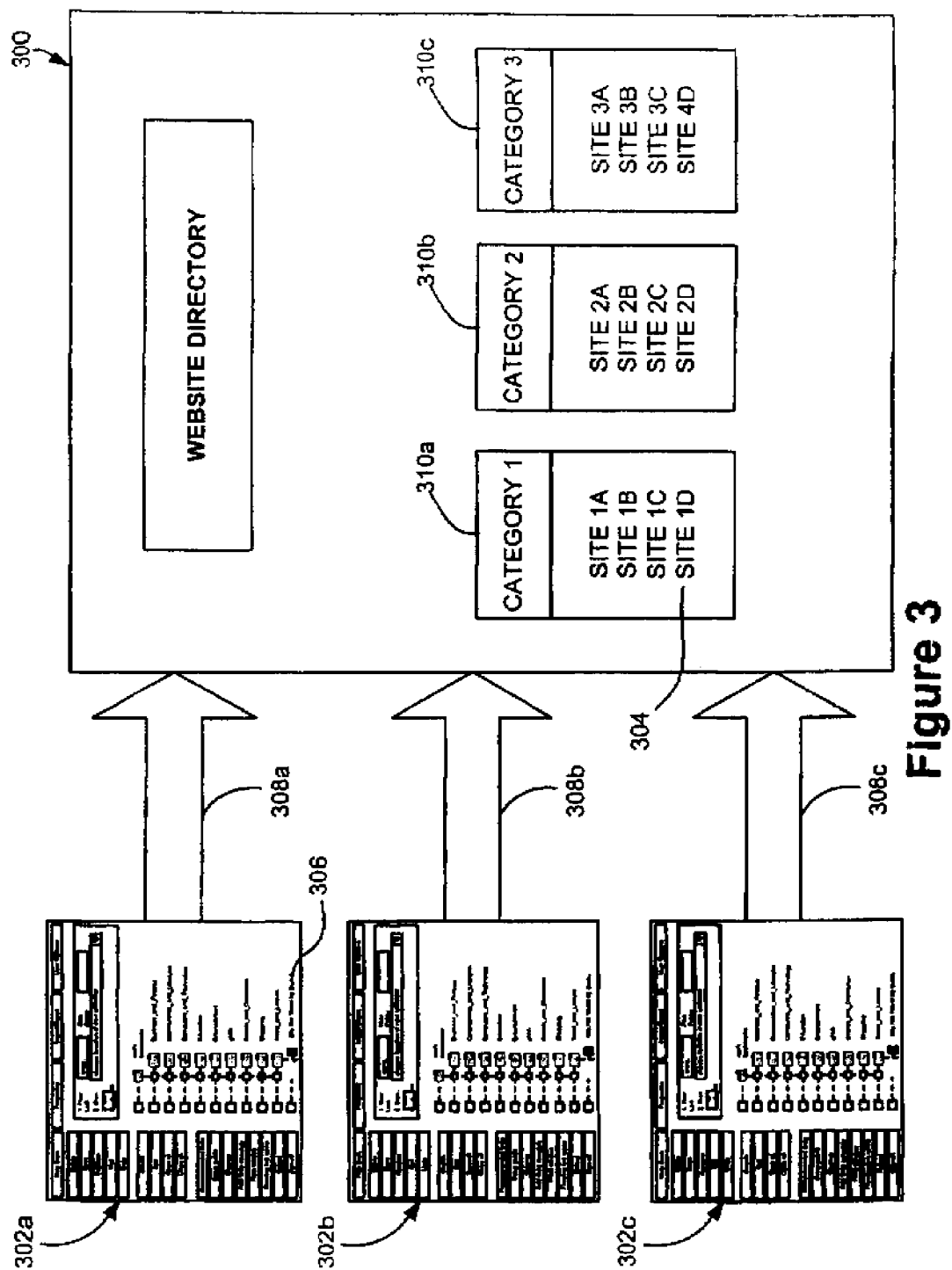
Figure 4:
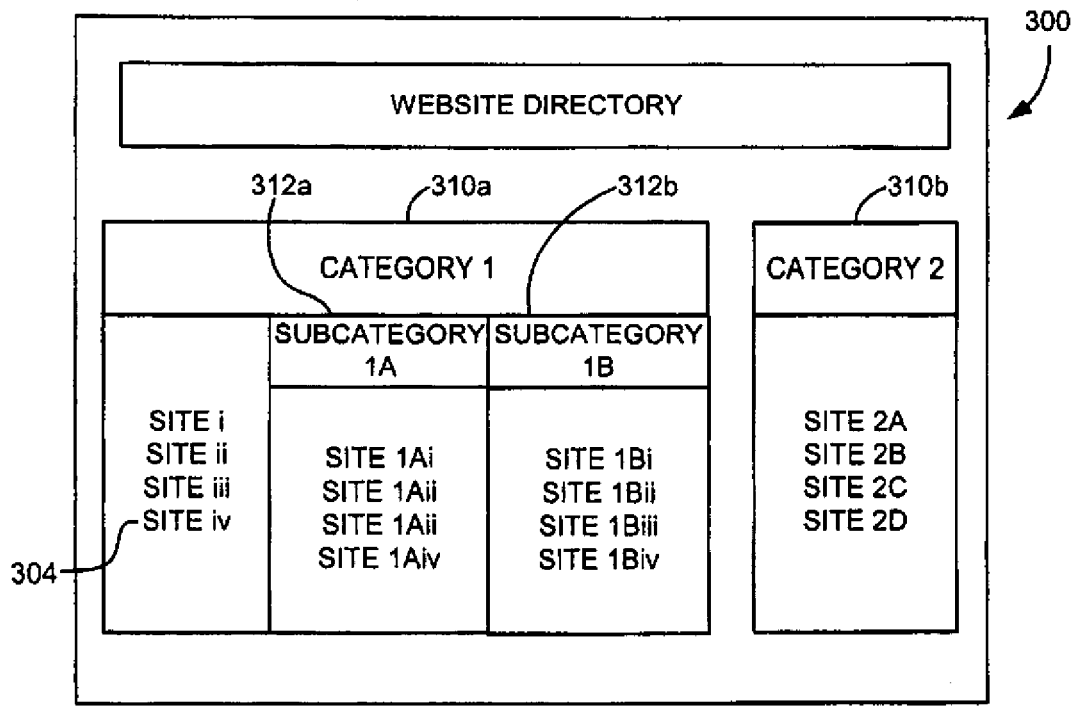
Figure 5:
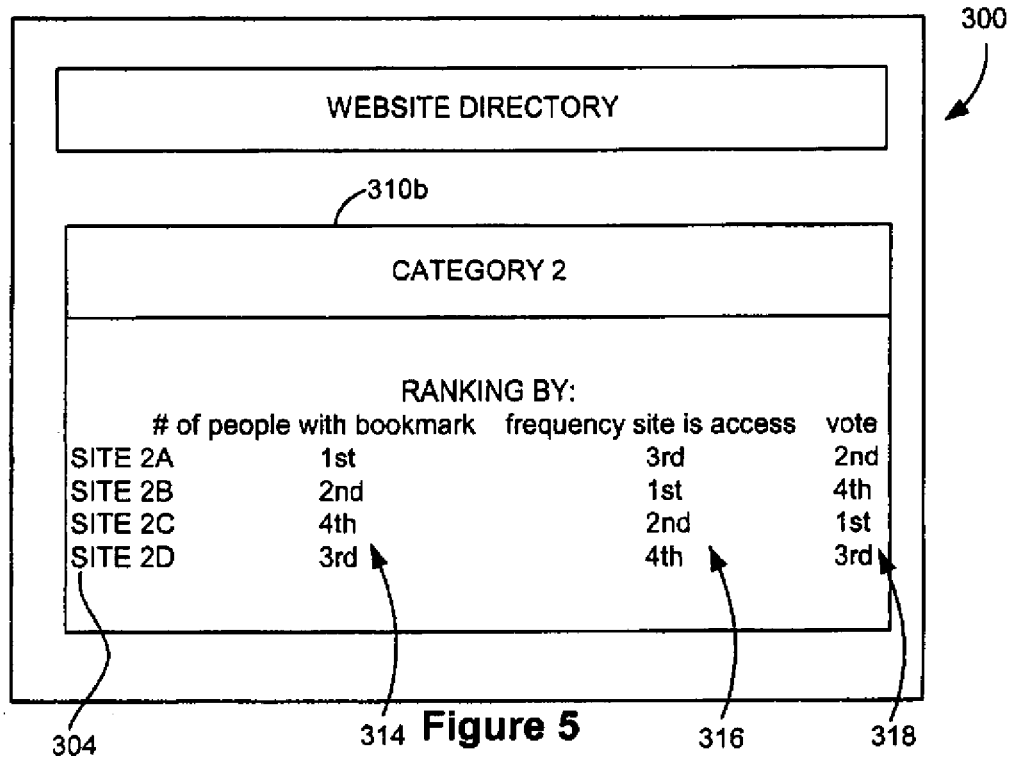
Figure 6:
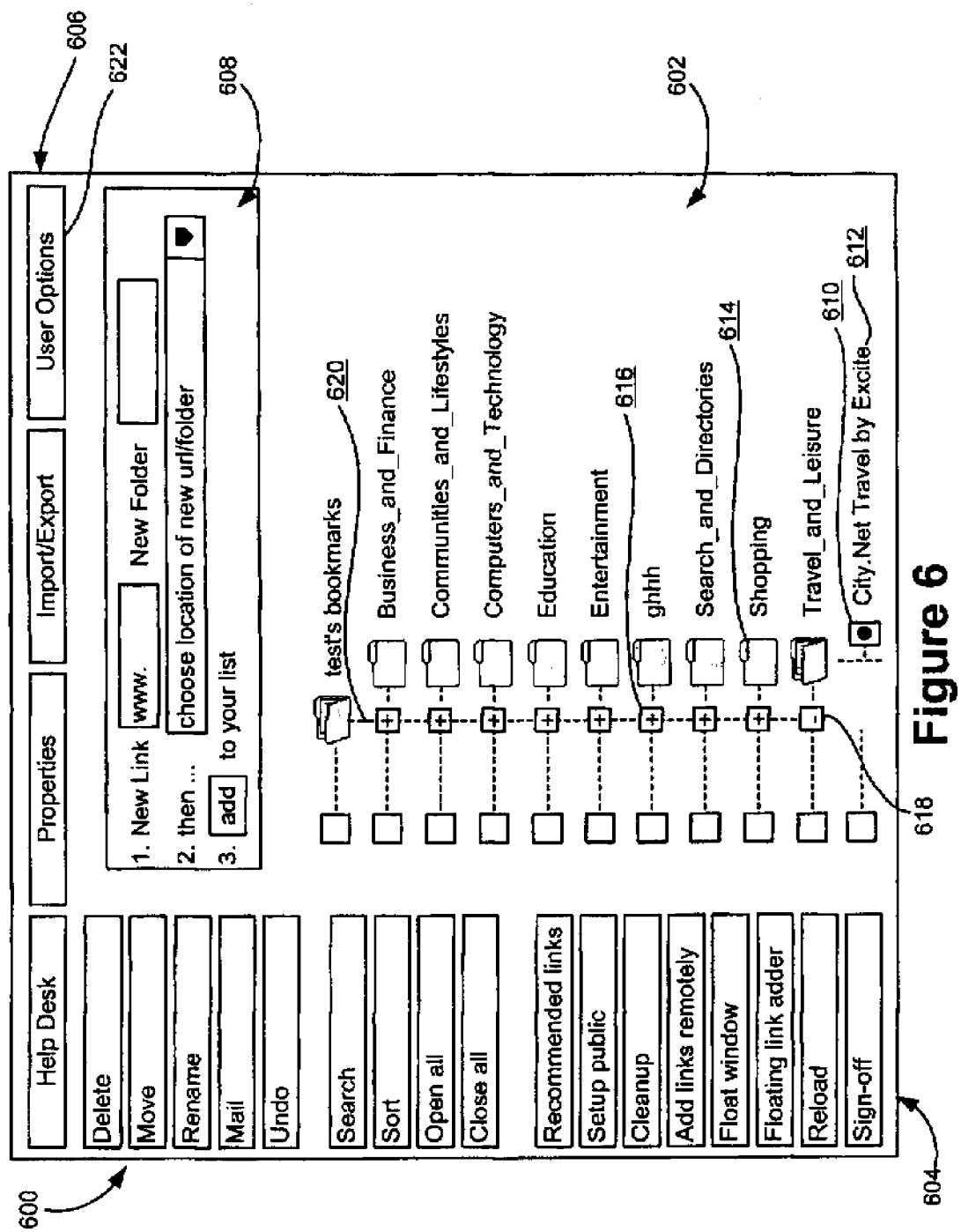
Figure 7:
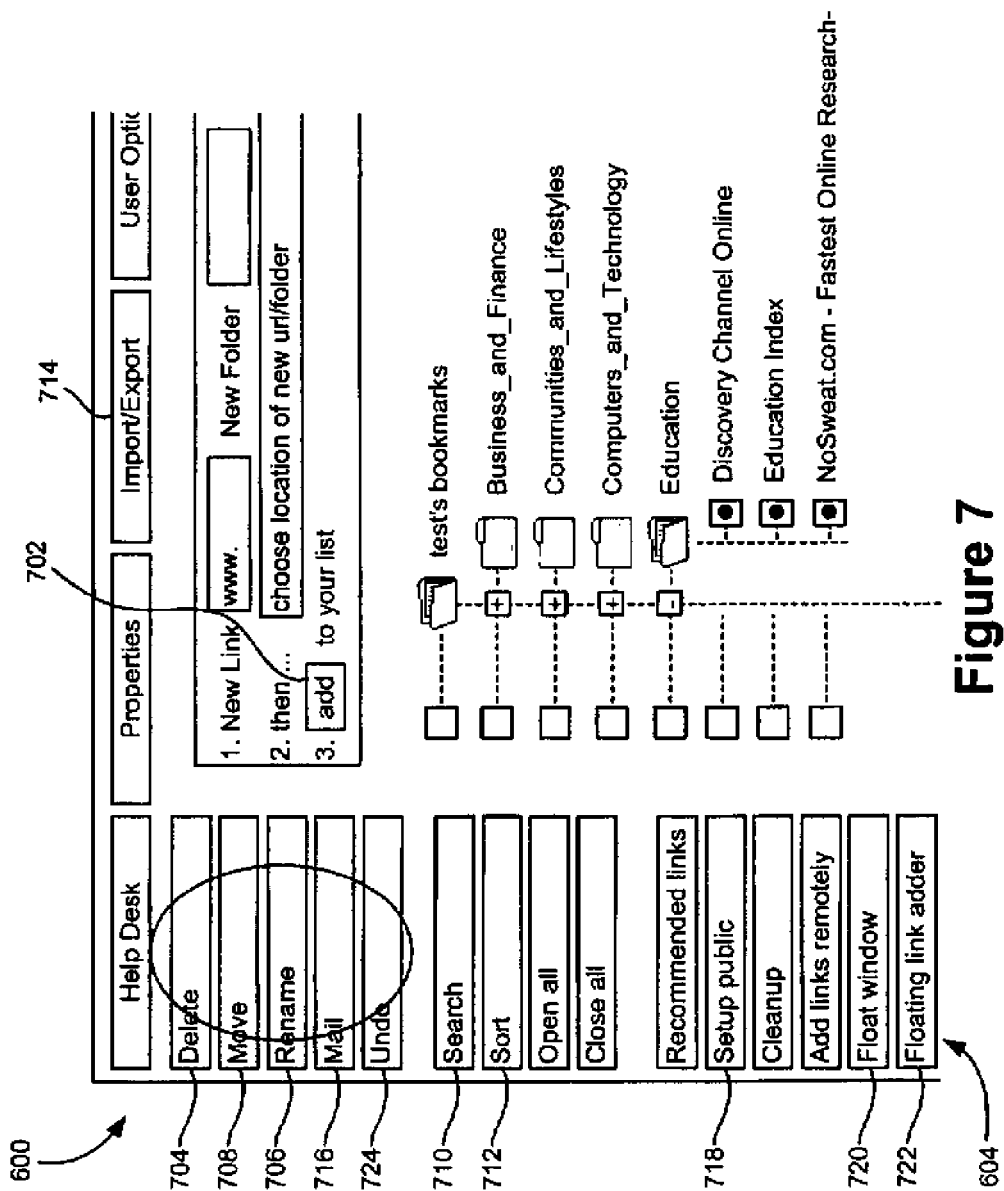
Figure 9:
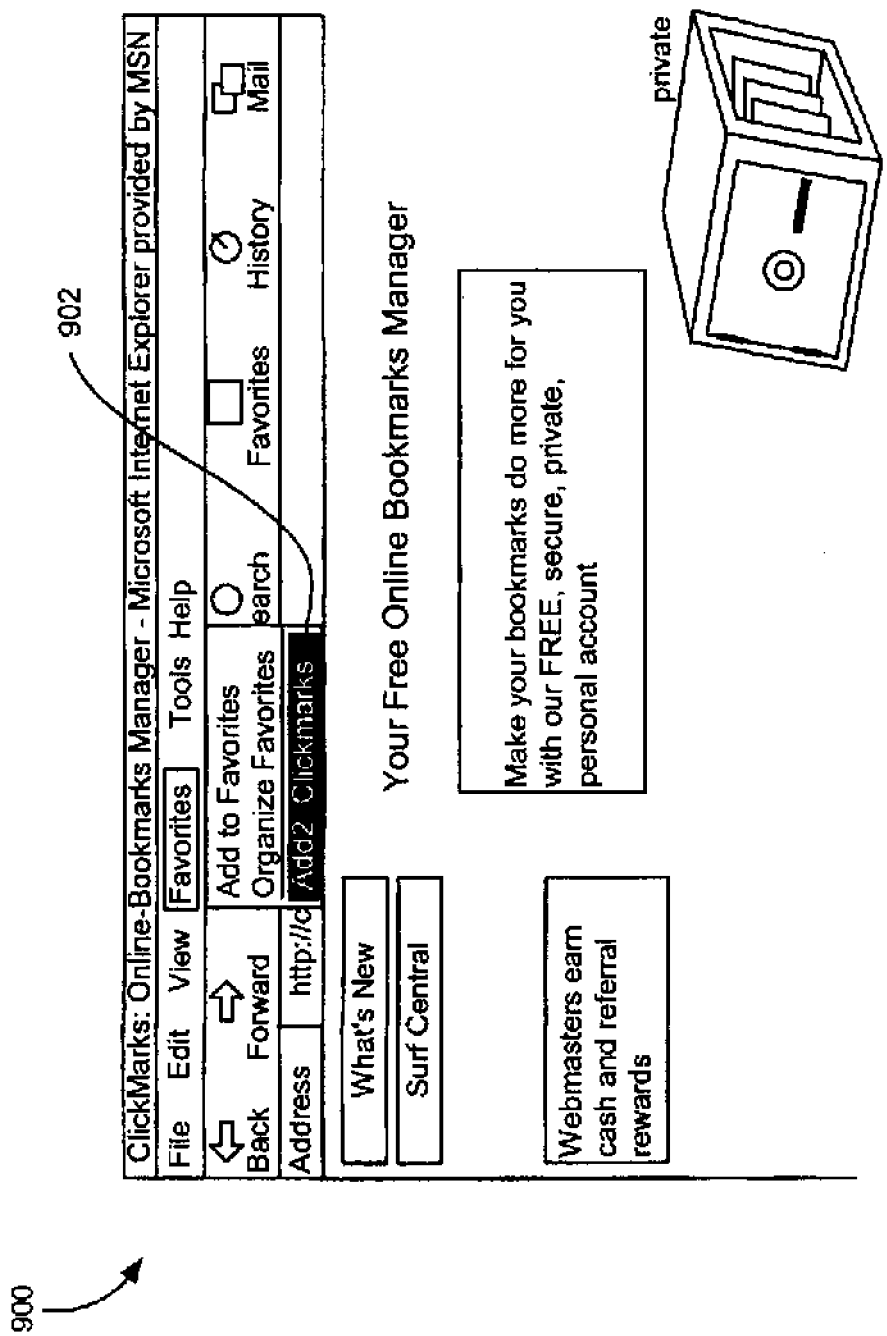
Figure 10:
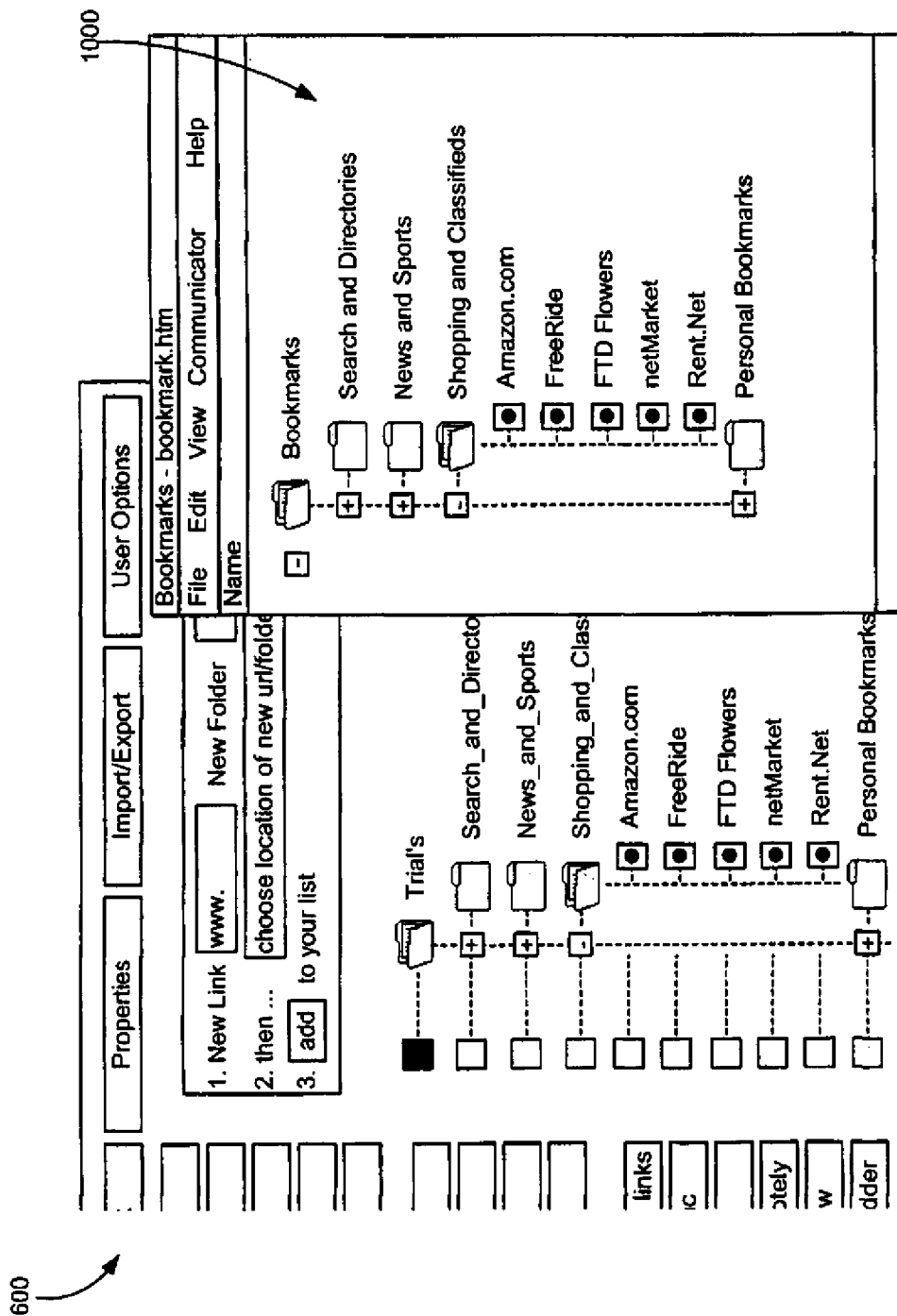
Figure 11:
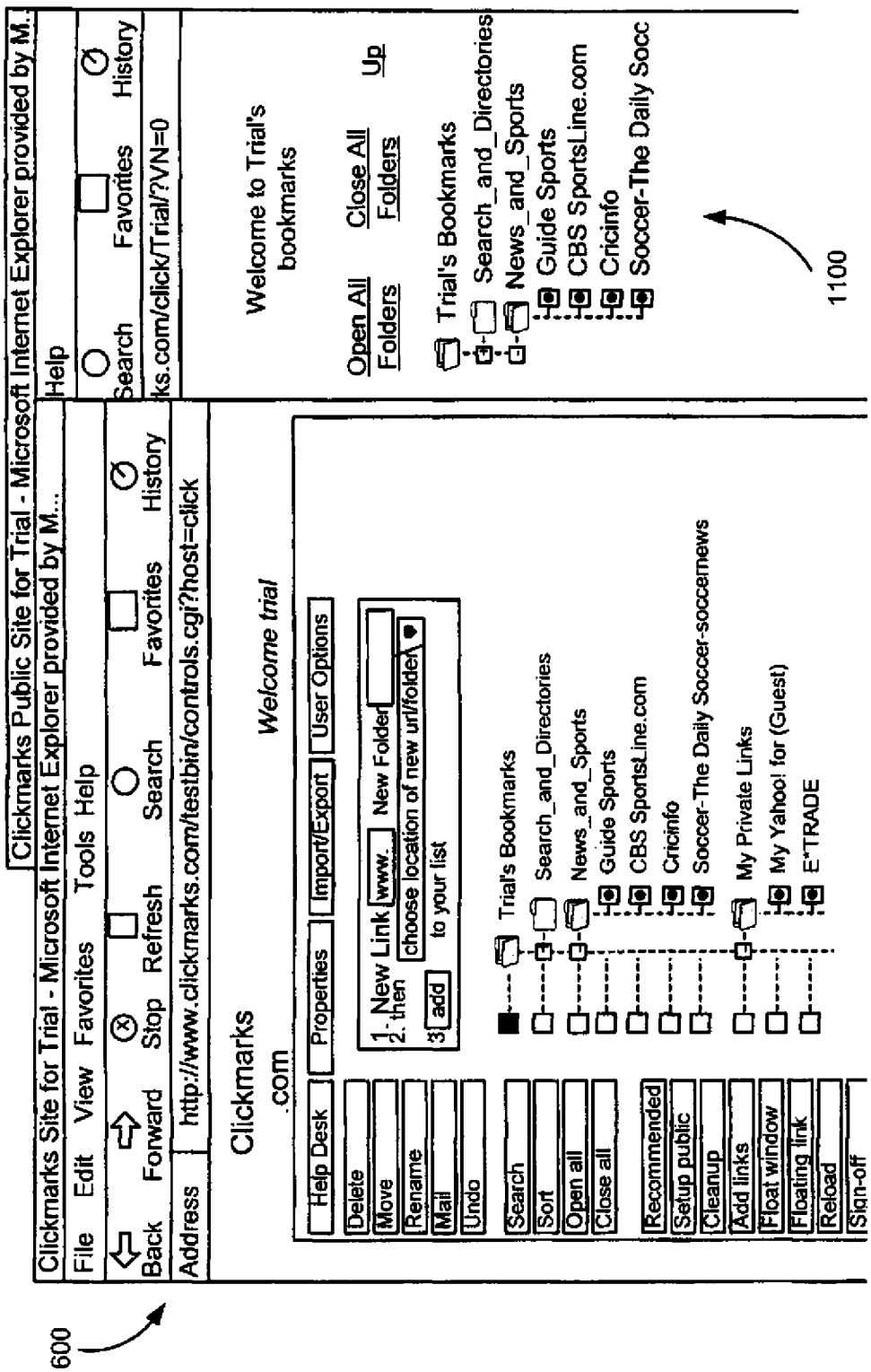
Figure 12:
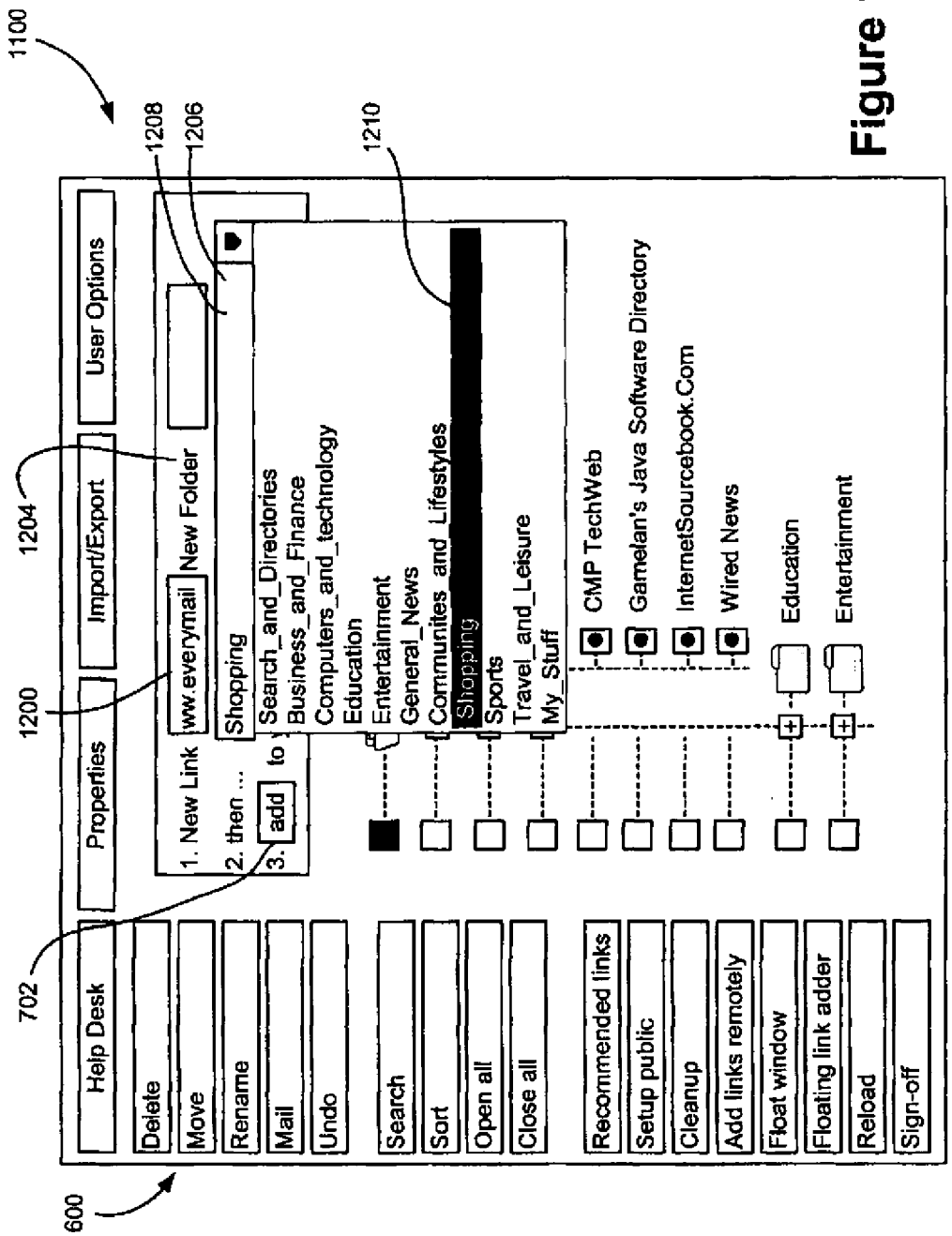
Figure 13:
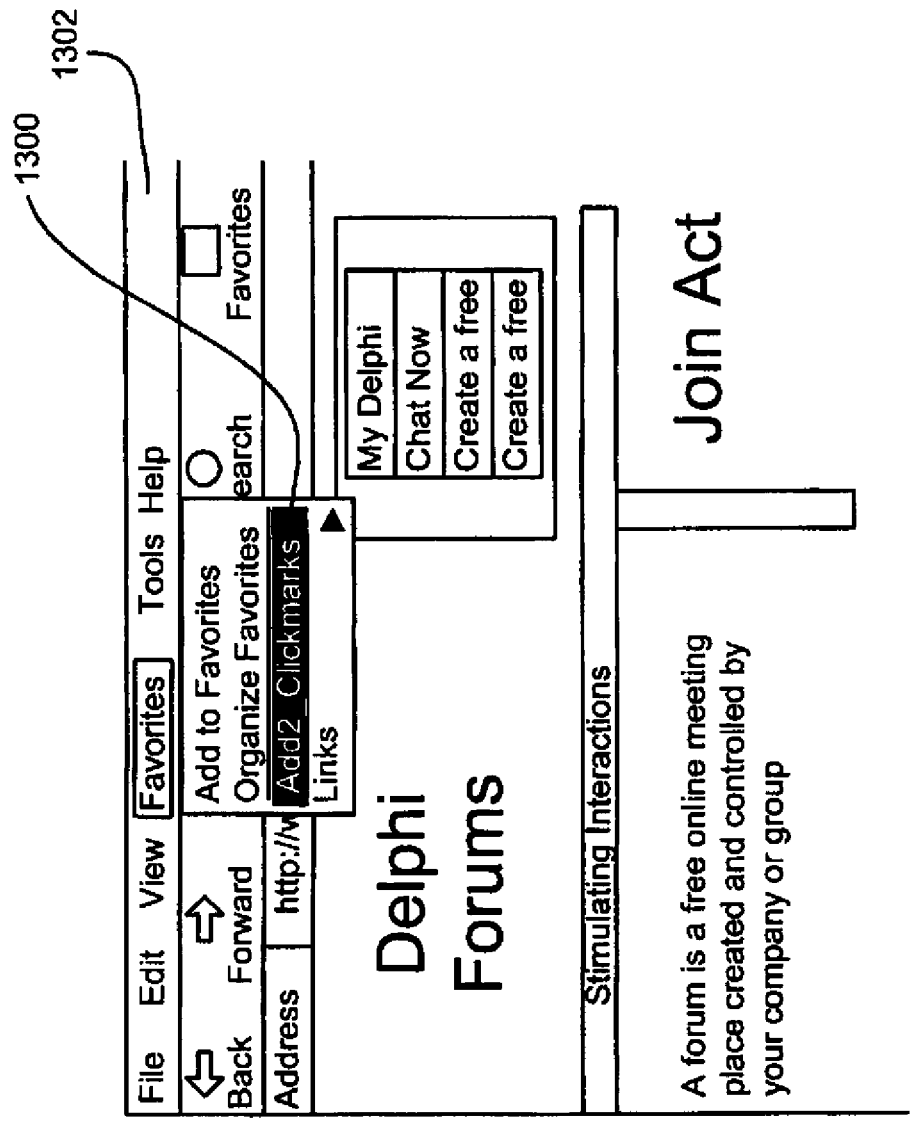
Figure 14:
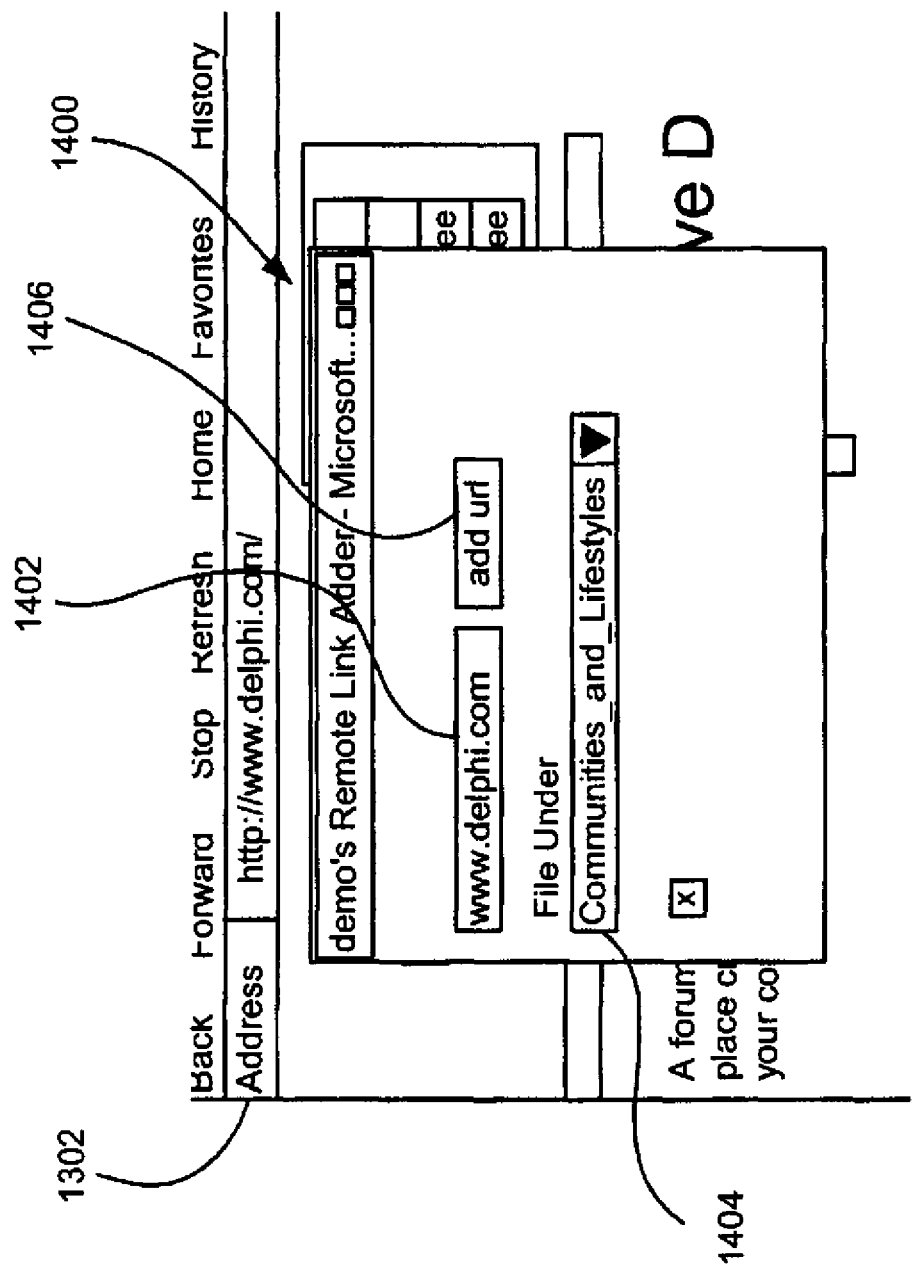
Figure 15:
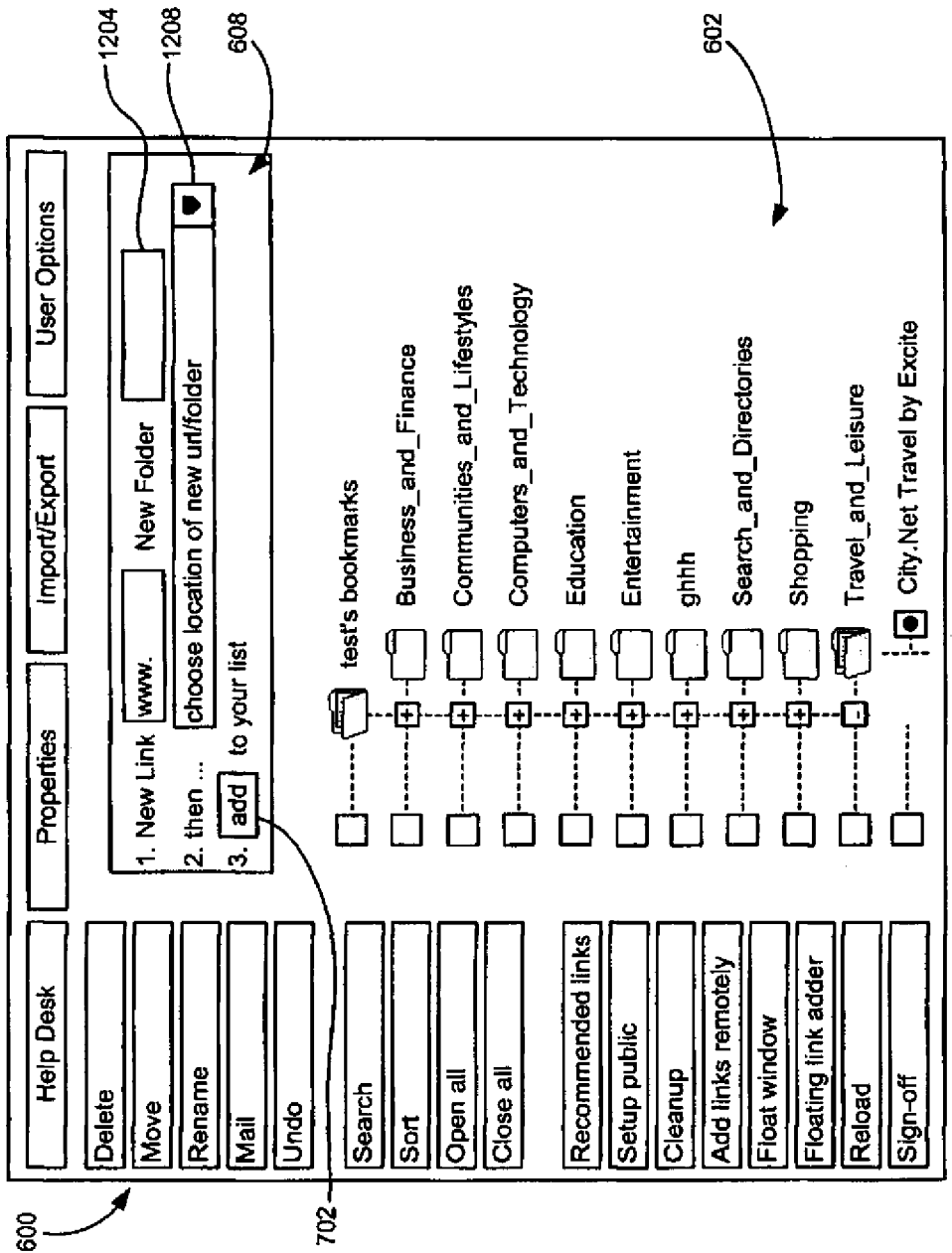
Figure 16:
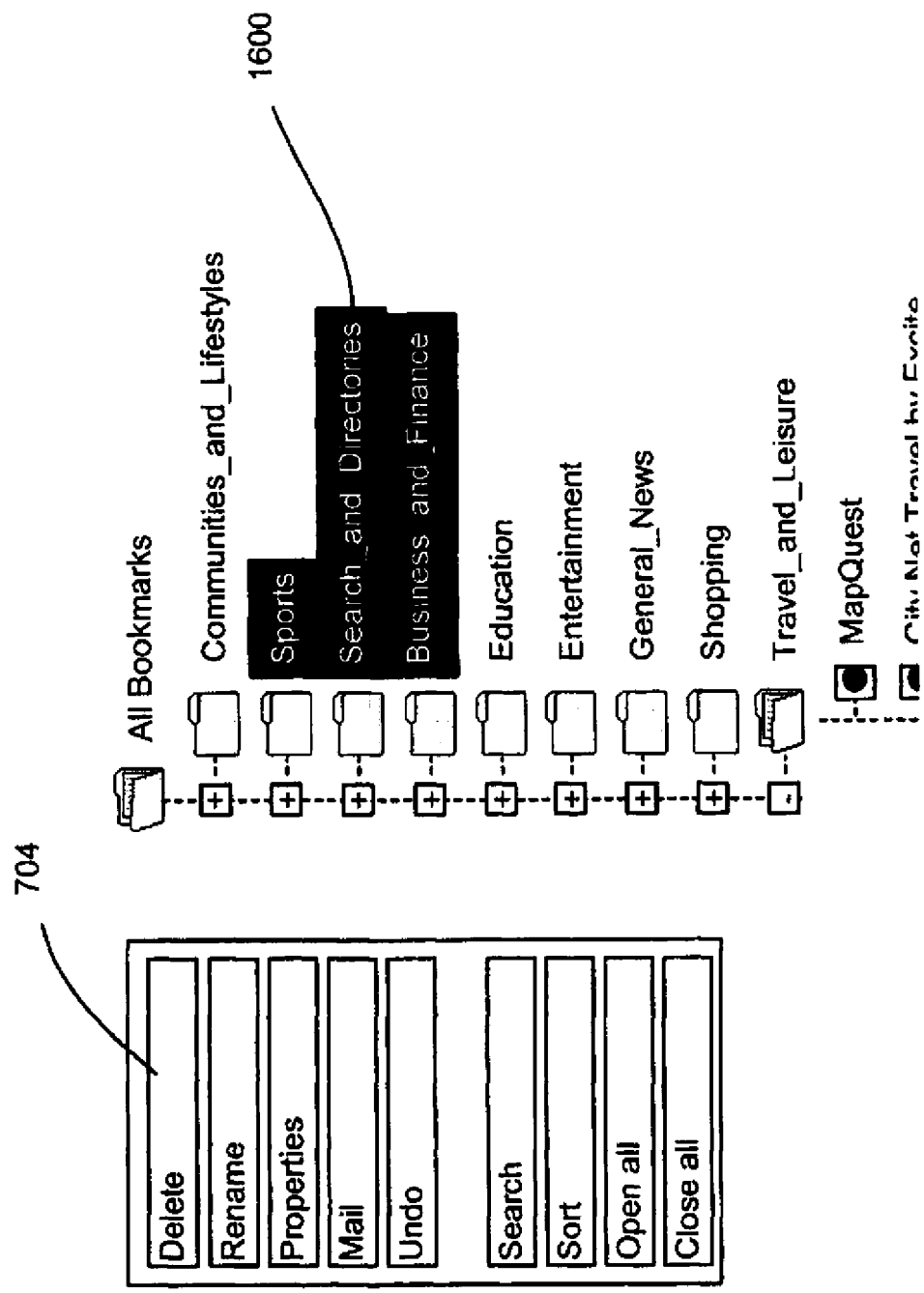
Figure 17:
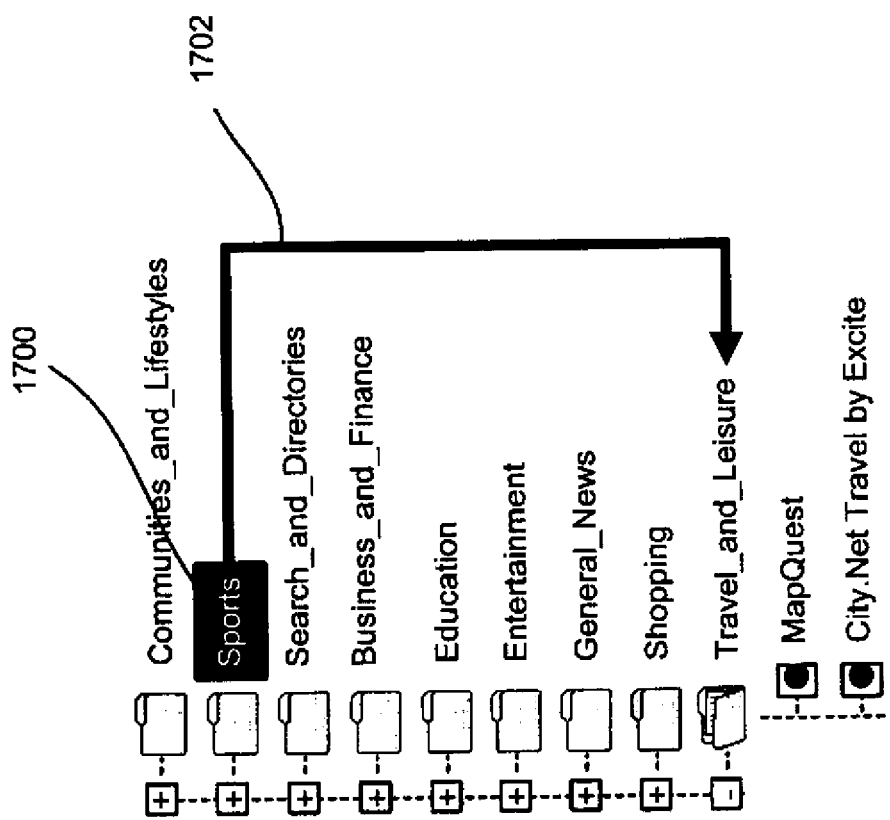
Figure 18:
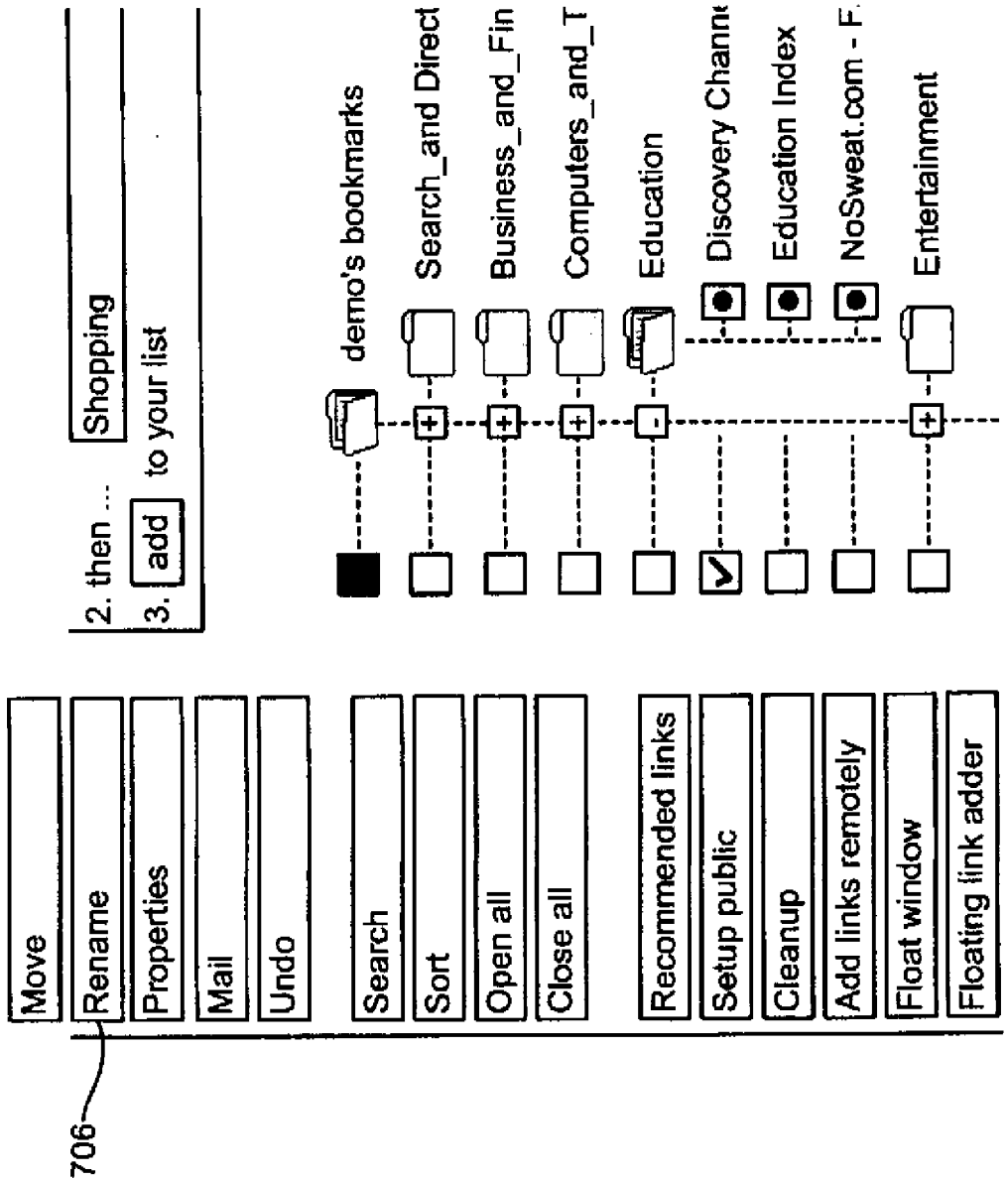
Figure 19:
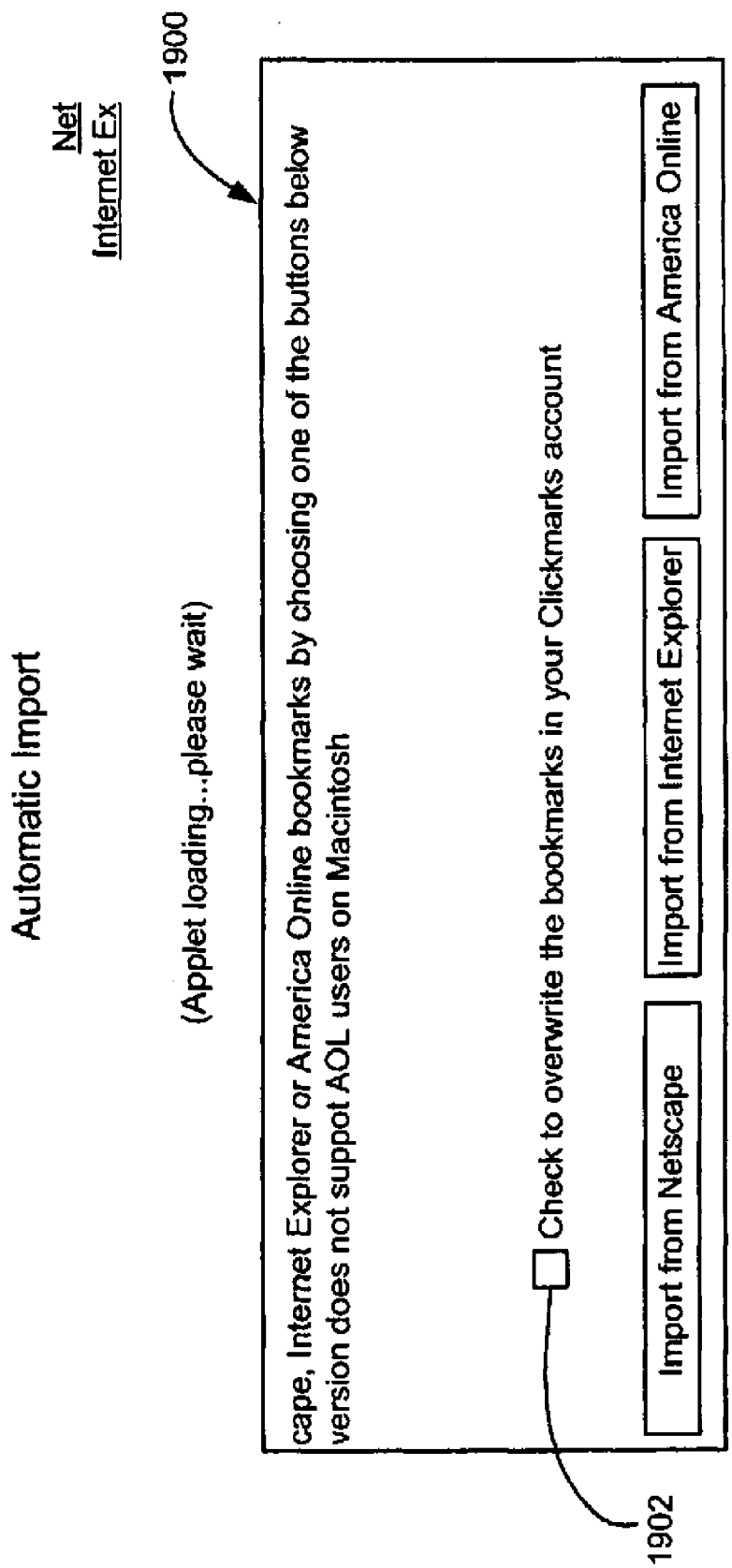
Figure 20:
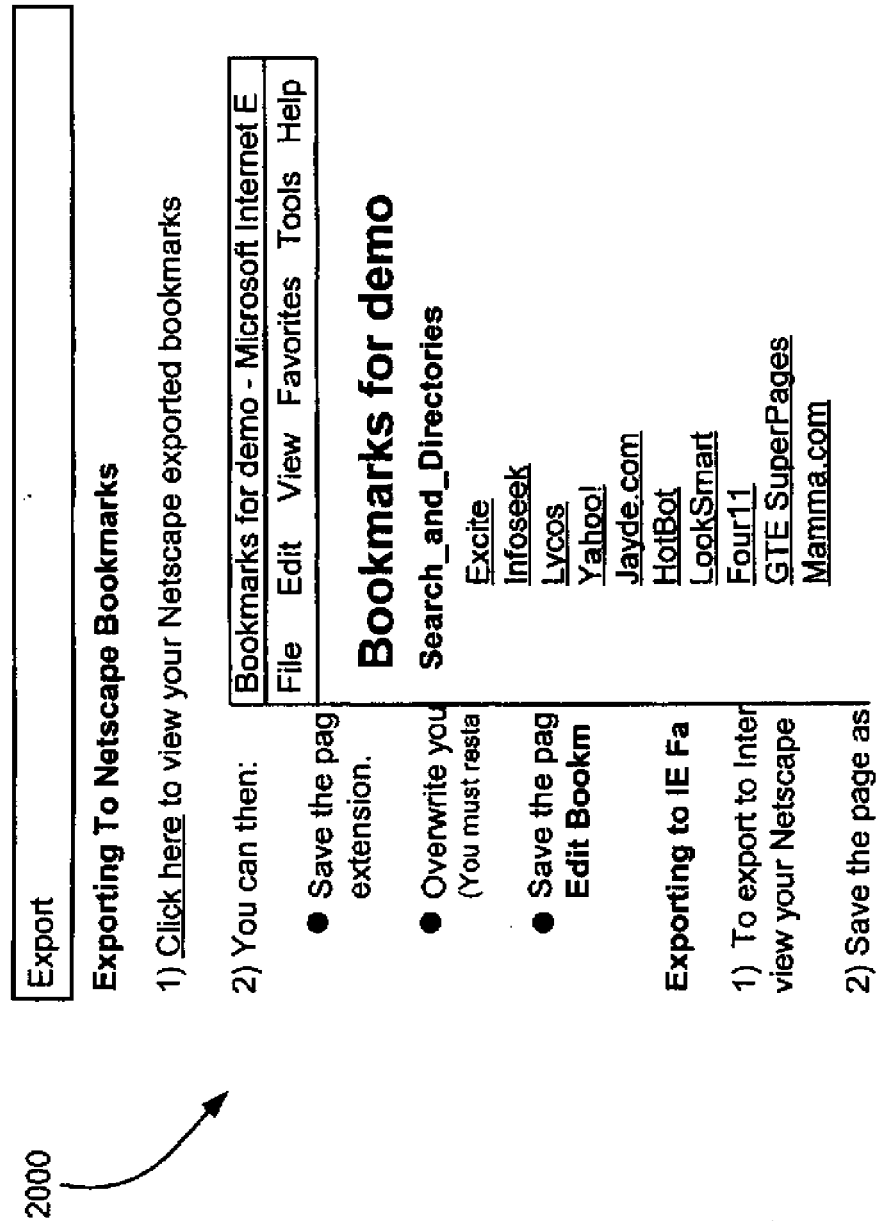
Figure 21:
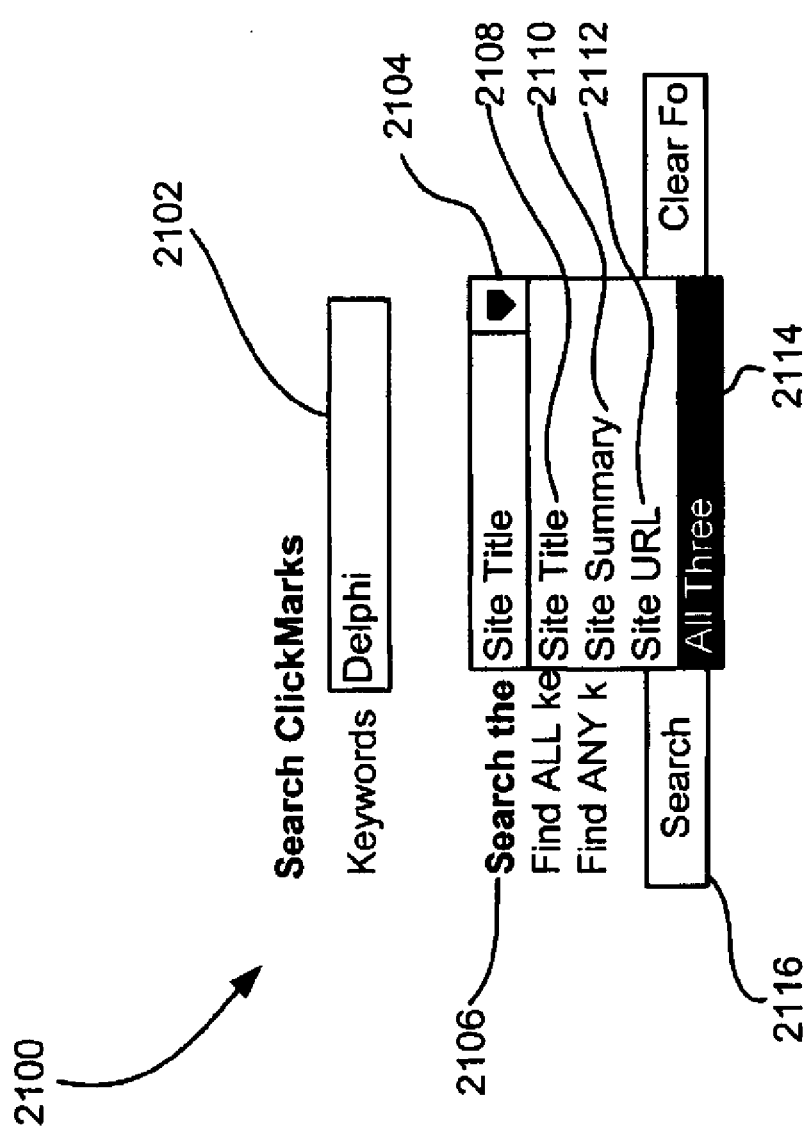
Figure 22:
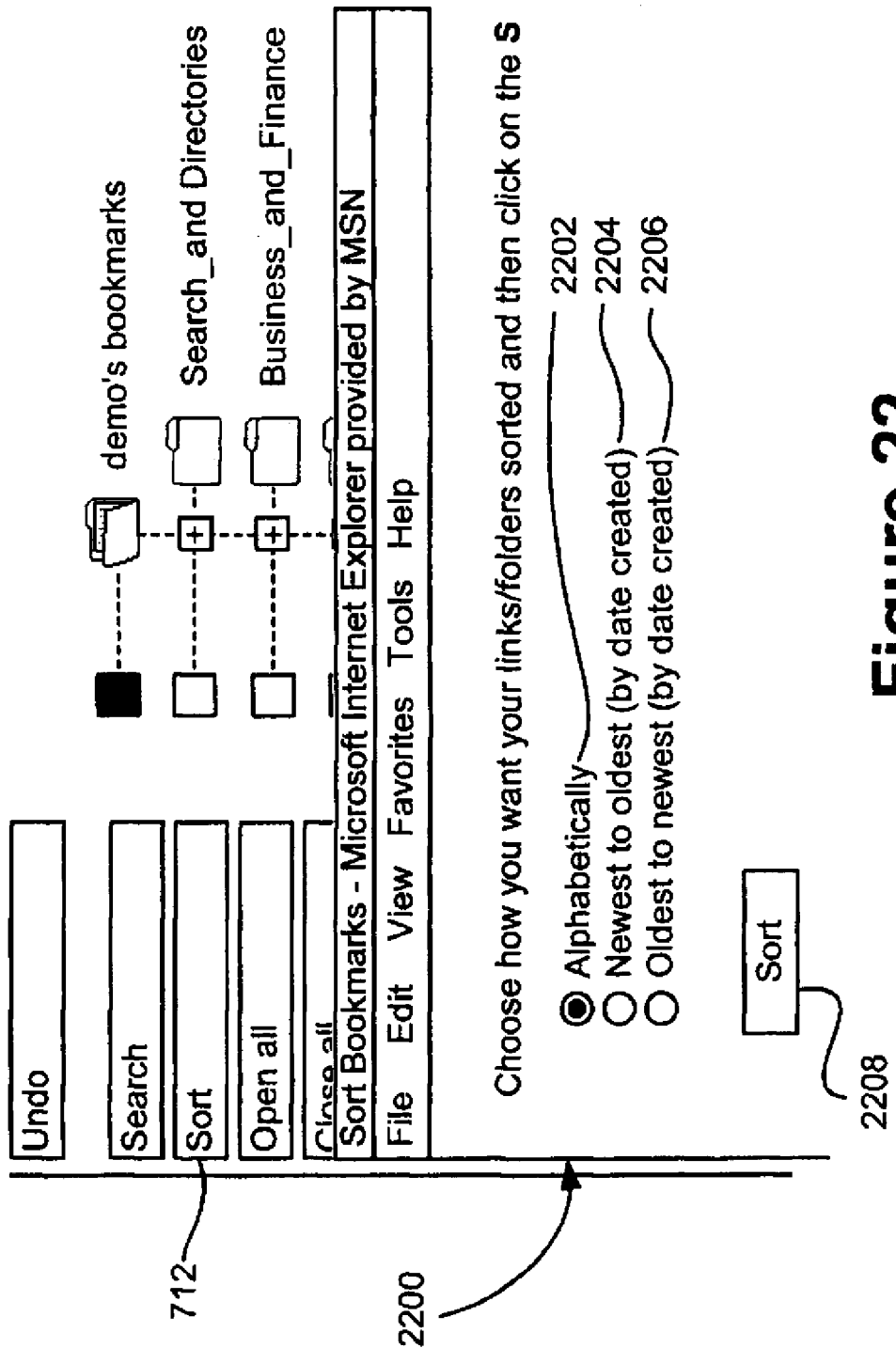
Figure 23:
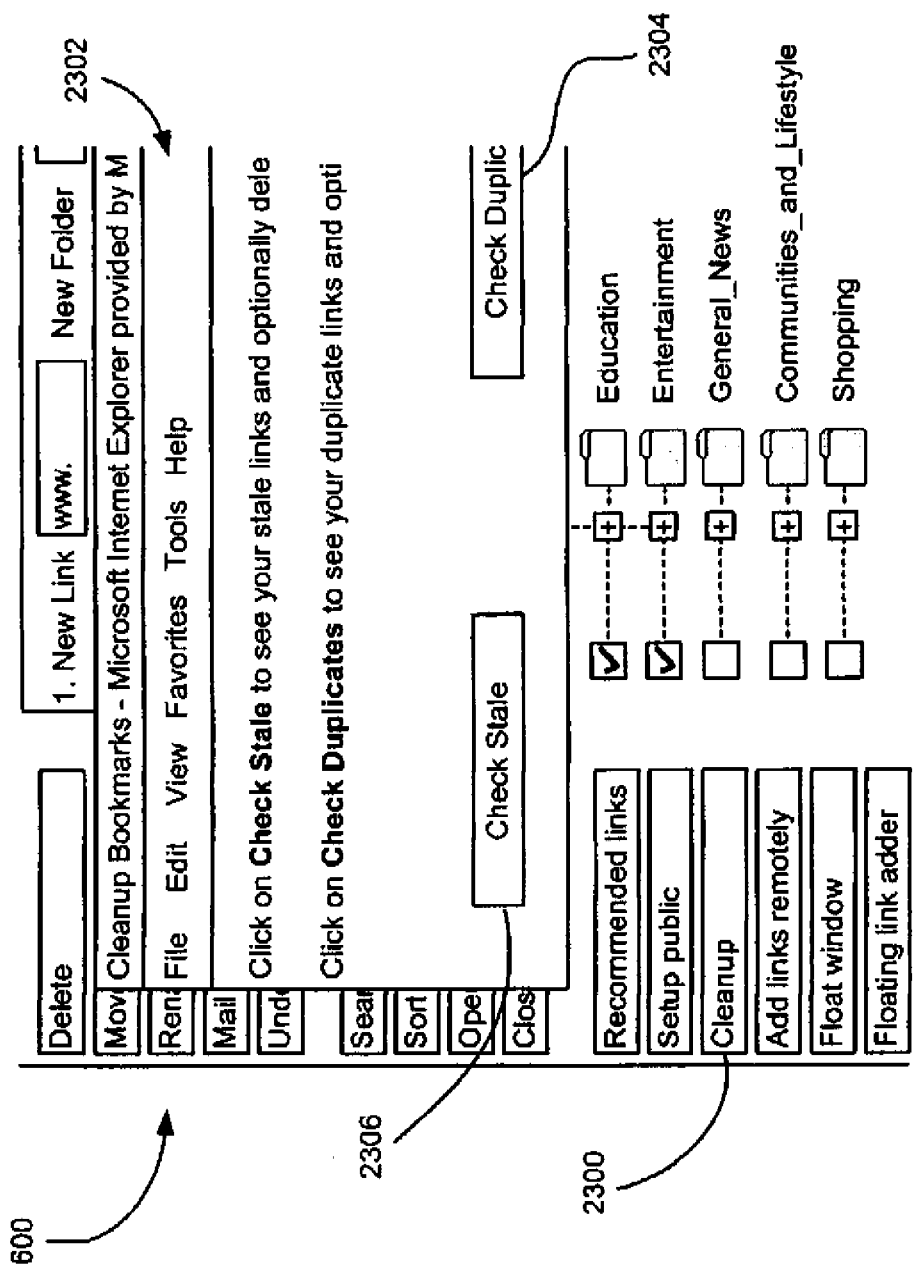
Figure 24:
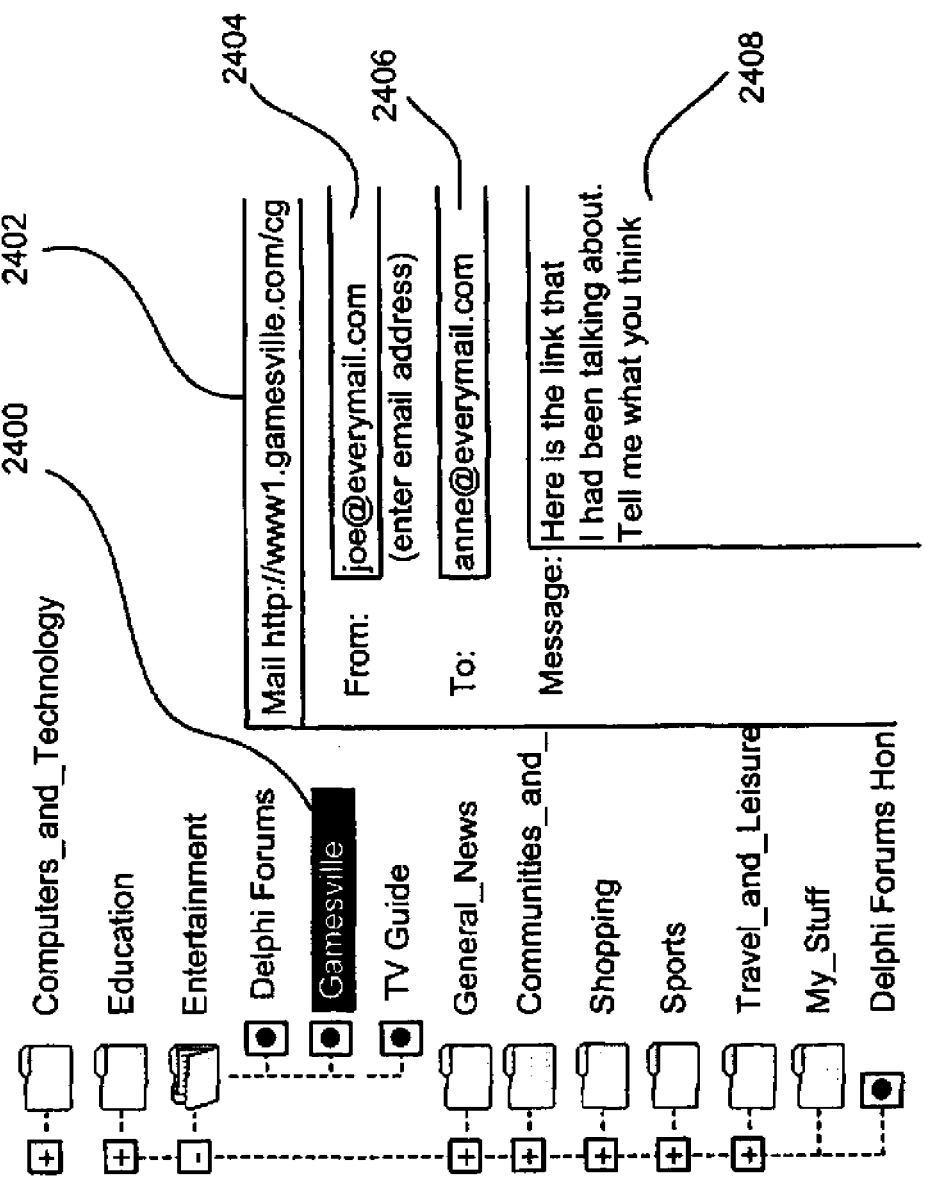

The present invention may also include a public bookmarks feature which lets users publish their own Internet Directories for the whole world to browse. As illustrated in FIG. 30, accessing this feature displays a list of users with public bookmarks 3000 that comprises, for example, a list of user name links 3002 in alphabetical order. Upon selection of one of the user name links, a welcome page 3100 for that particular user's public bookmarks may then be displayed as illustrated in FIG. 31. This welcome page may display all of the bookmarks 3102 and folders 3104 that have been made public by that particular user and which are therefore accessible to any user upon selection.

Security

In an embodiment of the present invention, every online bookmark account may be password protected. This means that users must begin by logging into their account, unless the users have opted for an auto-login feature. Logging into a user account in such an embodiment is possible only by users correctly entering an associated Login ID and password. In one such embodiment, a user may use between 3 to 20 characters for their login ID while there may be no restriction on the length of the user's password length. Cookies may also be used to identify users.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for generating a prioritized network site directory, comprising the steps of:
   (a) generating at least one link to a site on a network;
   (b) adding the site to a site directory having a set of categories comprising at least one category, each category including a plurality of links;
   (c) categorizing the site into one of the categories of the site directory;
   (d) ranking the categorized site in the category;
   (e) displaying the links in the category according to rank, the links including the at least one generated link;
   (e) displaying an identity of the creator of the at least one generated link to a second user upon display of the links to the second user; and
   (g) allowing the second user to send an information transmittal to the creator of the at least one link.

2. A method as recited in claim 1, wherein the step of adding the site to the site directory further comprises the steps of: comparing the site to pre-existing sites in the site directory; and generating a notification if the site matches one of the pre-existing sites of the site directory.

3. A method as recited in claim 1, wherein the step of categorizing the site into one of the categories of the site directory further comprises the steps of:
   generating a table of sites, wherein the table of sites comprises at least one pre-existing site ranked in the set of categories of the set directory;
   determining whether the site exists in the table of sites; and mapping the site to one of the categories of the set of categories if the site exists in the table of sites.

4. A method as recited in claim 3, wherein the step of categorizing the site into one of the categories of the site directory further comprises the step of
   searching the site for keywords relating to the categories of the set of categories if the site does not exist in the table of sites.

5. A method as recited in claim 3, wherein the step of categorizing the site into one of the categories of the site directory further comprises the steps of:
   selecting one of the categories into which the site is to be categorized;
   comparing the selected category to the category to which the site is mapped;
   and generating a notification if the selected category does not match the category to which the site is mapped.

6. A method as recited in claim 1, wherein the site is ranked in the category according to a type of ranking based on at least one of: the number of generated links to the site, the frequency that the site is accessed by selection of the links, and polling.

7. A method as recited in claim 6, further comprising the step of allowing a user to specify the type of ranking applied to the category, wherein the sites in the category are displayed according to the user-selected type of ranking.

8. A method as recited in claim 1, further comprising the steps of creating a sub-category into which the site is categorized; assigning a creator identity to the sub-category that includes information about a creator of the sub-category; granting the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

9. A method as recited in claim 1, wherein the information transmittal is selected from a group consisting of: an electronic mail message and an instant message.

10. A method as recited in claim 8, wherein the step of adding the site directory further comprises: comparing the site to pre-existing site directory; and generating a notification if the sites matches one of the pre-existing sites of the site directory.

11. A method as recited in claim 8, wherein categorizing the site into one of the categories of the site directory further comprises: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

12. A method as recited in claim 11, wherein categorizing the site into one of the categories of the site directory further comprises: selecting one of the categories into which the site is to be categorized; comparing the selected category to the category to which the site is mapped; and generating a notification if the selected category does not match the category to which the site is mapped.

13. A method as recited in claim 11, wherein categorizing the site into one of the categories of the site directory further comprises searching the site for keywords relating to the categories of the set of categories if the site does not exist in the table of sites.

14. A method as recited in claim 8, wherein the site is ranked in the category according to a type of ranking based on at least one of: the number of generated links to the site, the frequency that the site is accessed by selection of the links, and polling.

15. A method as recited in claim 14, further comprising allowing a user to specify the type of ranking applied to the category, wherein the sites in the category are displayed according to the user-selected type of ranking.

16. A method for generating a prioritized network site directory, comprising the steps of:
  (a) generating at least one link to a site on a network;
  (b) adding the site to a site directory having a set of categories comprising at least one category, each category including a plurality of links;
  (c) comparing the site to pre-existing sites in the site directory;
  (d) generating a notification if the site matches one of the pre-existing sites of the site directory;
  (e) categorizing the site into one of the categories of the site directory, wherein the step of categorizing the site into one of the categories of the site directory further comprises the step of:
    i. generating a table of sites, whether the table of sites comprises at least one pre-existing site ranked in the set of categories of the set directory;
    ii. determining whether the site exists in the table of sites;
    iii. mapping the site to one of the categories of the set of categories if the site exists in the table of sites;
    iv. searching the site for keywords relating to the categories of the set of categories if the site does not exist in the table of sites;
    v. selecting one of the categories into which the site is to be categorized;
    vi. comparing the selected category to the category to which the site is mapped;
    vii. generating a notification if the selected category does not match the category to which the site is mapped;
  (f) ranking the categorized site in the category, wherein the site is ranked in the category according to a type of ranking based on at least one of: the number of generated links to the site stored in online bookmark accounts, the frequency that the site is accessed by selection of the links, and polling;
  (g) allowing a user to specify the type of ranking applied to the category, wherein sites in the category are displayed according to the user-selected type of ranking;
  (h) displaying the links in the category according to rank, the links including the at least one generated link;
  (i) associating an identity of a creator of the at least one link with the at least one generated link;
  (j) displaying the identity of the creator to a second user upon display of the links to the second user;
  (k) allowing the second user to send an information transmittal to the creator of the at least one link, wherein the information transmittal is selected from a group consisting of: an electronic mail message and an instant message;
  (l) creating a sub-category into which the site is categorized;
  (m) assigning a creator identity to the sub-category that includes information about a creator of the sub-category;
  (n) granting the creator of the sub-category at least one privilege selected from a group consisting of: recommending to accept or reject additional sites into and additional sub-categories under the sub-category, receiving information transmittals from users of site in the sub-category, and transmitting information to users of sites in the sub-category; and
  (o) associating a mode of communication with the category, the mode of communication being selected from a group consisting of: a forum and a chat room.

17. A computer program embodied on a computer readable medium for generating a prioritized network site directory, comprising:
  (a) a code segment that generates at least one link to a site on a network;
  (b) a code segment that adds the site to a site directory having a set of categories comprising at least one category, each category including a plurality of links;
  (c) a code segment that categorizes the site into one of the categories of the site directory;
  (d) a code segment that ranks the categorized site in the category;
  (e) a code segment that displays the links in the category according to rank, the links including the at least one generated link;
  (f) a code segment that displays an identity of the creator of the at least one generated link to a second user upon display of the links to the second user;
  (g) a code segment that allows the second user to send an information transmittal to the creator of the at least one link.
  (h) a code segment that creates a sub-category into which the site is categorized;
  (i) a code segment that assigns a creator identity to the sub-category that includes information about a creator of the sub-category; and
  (j) a code segment that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

18. A computer program as recited in claim 17, further comprising a code segment that grants the creator of the sub-category at least one of the privileges consisting of: recommending to accept or reject additional sites into and additional sub-categories under the sub-category, receiving information transmittals from users of site in the sub-category, and transmitting information to users of sites in the sub-category.

19. A system for generating a prioritized network site directory, comprising:
  (a) a logic that generates at least one link to a site on a network;

(b) a logic that adds the site to a site directory having a set of categories comprising at least one category, each category including a plurality of links;

(c) a logic that categorizes the site into one of the categories of the site directory;

(d) a logic that ranks the categorized site in the category;

(e) a logic that displays the links in the category according to rank, the links including the at least one generated link;

(f) a logic that displays an identity of the creator of the at least one generated link to a second user upon display of the links to the second user;

(g) a logic that allows the second user to send an information transmittal to the creator of the at least one link;

(h) a logic that creates a sub-category into which the site is categorized;

(i) a logic that assigns a creator identity to the sub-category that includes information about a creator of the sub-category; and (j) a logic that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

20. A method as recited in claim 1, further comprising the step of associating a mode of communication with the category; the mode of communication being selected from a group consisting of: a forum and a chat room.

\* \* \* \* \*

UNITED STATES PATENT AND TRADEMARK OFFICE
CERTIFICATE OF CORRECTION

| | | |
|---|---|---|
| PATENT NO. | : 6,546,393 B1 | |
| APPLICATION NO. | : 09/414992 | |
| DATED | : April 8, 2003 | |
| INVENTOR(S) | : Khan | |

It is certified that error appears in the above-identified patent and that said Letters Patent is hereby corrected as shown below:

Please delete patent 6,546,393 in its entirety and insert patent 6,546,393 in its entirety.

Signed and Sealed this
Twenty-fifth Day of December, 2012

David J. Kappos
*Director of the United States Patent and Trademark Office*

(12) United States Patent
Khan

(10) Patent No.: US 6,546,393 B1
(45) Date of Patent: Apr. 8, 2003

(54) SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

(75) Inventor: Umair Khan, Fremont, CA (US)

(73) Assignee: Clickmarks, Inc., Fremont, CA (US)

( * ) Notice: Subject to any disclaimer, the term of this patent is extended or adjusted under 35 U.S.C. 154(b) by 0 days.

(21) Appl. No.: 09/414,992

(22) Filed: Oct. 7, 1999

(51) Int. Cl.[7] .............................................. G06F 17/30
(52) U.S. Cl. ........................................ 707/10; 709/203
(58) Field of Search .......................... 707/501, 1, 203, 707/201, 4, 10; 709/203

(56) References Cited

U.S. PATENT DOCUMENTS

| | | | | |
|---|---|---|---|---|
| 6,032,162 A | * | 2/2000 | Burke | 707/501 |
| 6,163,778 A | * | 12/2000 | Fogg et al. | 707/10 |
| 6,314,423 B1 | * | 11/2001 | Himmel et al. | 707/10 |
| 6,321,228 B1 | * | 11/2001 | Crandall et al. | 707/10 |
| 6,324,566 B1 | * | 11/2001 | Himmel et al. | 709/203 |

OTHER PUBLICATIONS

Keller et al. "A Bookmarking Service for Organizing and Sharing URLs," Computer Networks and ISDN Systems. vol. 29, No. 8–13, pp. 1103–1114, Sep. 1997.*
Maarek et al. Automatically Organizing Bookmarks Per Contents; Computer Networks and ISDN Systems; vol. 28, No. 7–11, pp. 1321–1333, May 1996.*

* cited by examiner

Primary Examiner—Charles Rones
(74) Attorney, Agent, or Firm—Silicon Valley IP Group, LLC; Dominic M. Kotab

(57) ABSTRACT

A system, method and article of manufacture are provided for generating a prioritized network site directory. A link to a site on a network is generated. The site is then added to a site directory that includes a set of categories. The site is categorized into one of the categories of the site directory. The site is also ranked in the category. Sub-categories may also be created into which the site is categorized under one of the categories of the site directory. The site may additionally be ranked in the category according to: the number of generated links to the site, the frequency that the site is accessed by selection of the generated links, and/or polling.

20 Claims, 30 Drawing Sheets

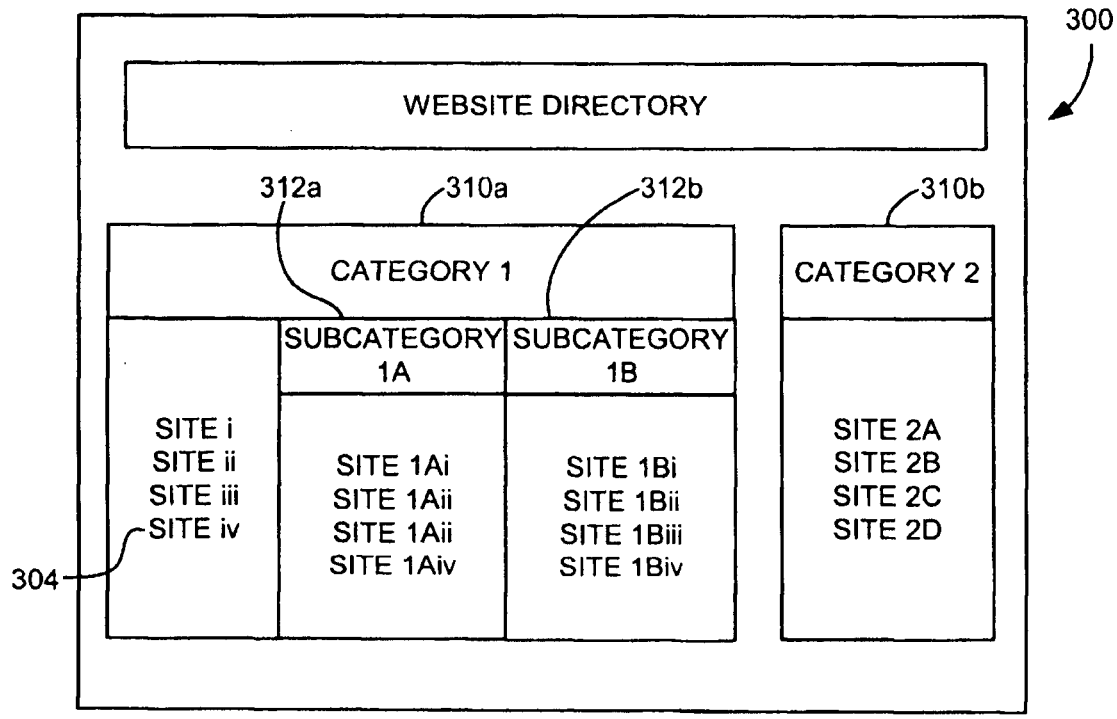

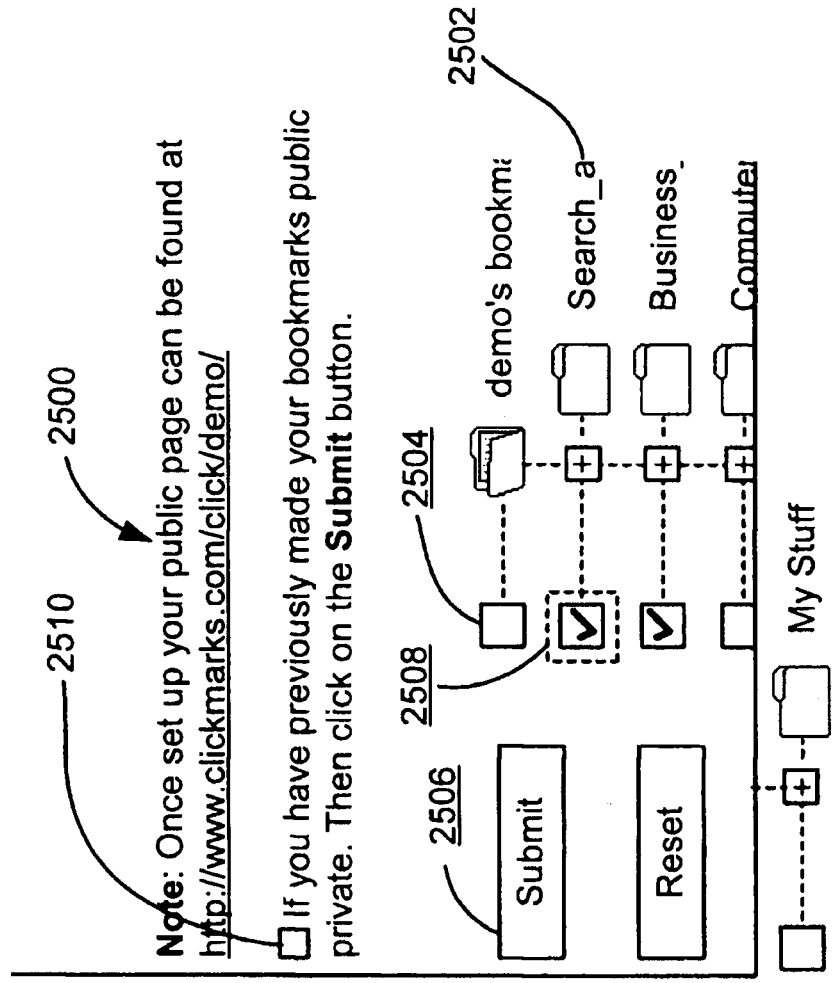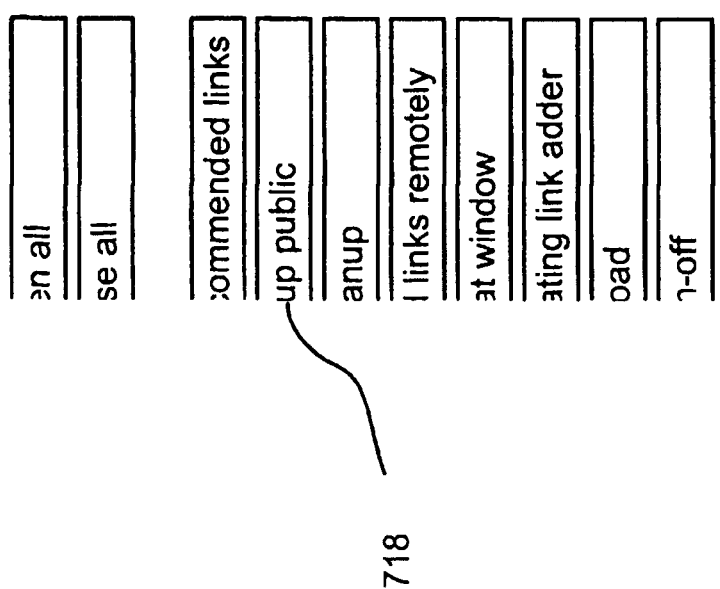
Figure 25

Hot List

2900

Hot Search Sites
Looksmart
Yahoo!
Excite
Jayde.com
Mamma.com - The Mother of All Search Engines
Ask Jeeves
Northern Light
Dogpile

Hot Directories Sites
Bigfoot
Four11
WhoWhere?
Switchboard
Infospace.com

Hot Business Sites
Business Week
CNNfn
Edgar Online
Monster Board Job Database
Headhunter.net
Fast Company

Hot Finance Sites
StockMaster
The Motley Fool: Finance and Folly
Yahoo! Finance
Bloomberg Online
Quote.com
Quicken Financial Network
OANDA Currency Converters
The Street
E*TRADE
IRS Homepage

Hot Computers_and_Technology Sites
W3C - The World Wide Web Consortium
Developer.com - Resources for programmers and developers
CMP TechWeb
Internet Sourcebook

Figure 29

3000 Users with Public Bookmarks

<u>a</u> <u>b</u> <u>c</u> <u>d</u> <u>e</u> <u>f</u> <u>g</u> <u>h</u> <u>i</u> <u>j</u> <u>k</u> <u>l</u> <u>m</u> <u>n</u> <u>o</u> <u>p</u> <u>q</u> <u>r</u> <u>s</u> <u>t</u> <u>u</u> <u>v</u> <u>w</u> <u>x</u> <u>y</u> <u>z</u> <u>0</u> <u>1</u> <u>2</u> <u>3</u> <u>4</u> <u>5</u> <u>6</u> <u>7</u> <u>8</u> <u>9</u> a
<u>asic_design</u> (user from clickmarks)
<u>atv</u> (user from clickmarks)
<u>aeonflux</u> (user from clickmarks)
<u>andre</u> (user from clickmarks)
<u>austinpow</u> (user from clickmarks)
<u>anupun</u> (user from thaiicq)
3002   <u>alanm</u> (user from clickmarks)
<u>andros1</u> (user from delphi)
<u>akibe</u> (user from urduweb)
<u>Andy</u> (user from clickmarks)
<u>ACSO</u> (user from clickmarks)
<u>Asim</u> (user from pakistane)
<u>AmberJade</u> (user from clickmarks)

<u>return to top</u>

Figure 30

SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

FIELD OF THE INVENTION

The present invention relates to internet website directories and more particularly to dynamically user generated internet search directories based on prioritized server-sided user bookmarks.

BACKGROUND OF THE INVENTION

The World Wide Web was initially developed at CERN. which is a particle physics laboratory based in Geneva in Switzerland. The initial work began in 1989 and centered on the development of the HyperText Transmission Protocol (HTTP), which is a network protocol for requesting and transmitting web files and documents which both web servers and browsers can understand. By December 1990. CERN had developed a web server, a text-based browser and a browser for NExTStep computers. In March 1991, the software for the text based browser was made available to a limited audience. In January 1992, an updated version of the browser (version 1.1) was made freely available on the Internet. By January 1993, there were 50 web servers in existence and freely available graphical browser software had been made available for the Apple Macintosh. By February 1993, the World Wide Web was accounting for 0.1 percent of all Internet traffic.

One factor in the rapid acceptance and growth of the World Wide Web was the work done at the National Center for Supercomputer Applications (NCSA) at the University of Illinois in Urbana-Champaign in the USA. Their Software Development Group created a graphical web browser called Mosaic. In September 1993, they released versions of this software for Microsoft Windows running on PCs, Apple Macintoshes and Unix computers running X Windows. Each of the versions looked at and handled files in a very similar manner with images and text interspaced in the same document, allowing organizations to create visually exciting documents that could be viewed in very similar formats on the three main types of computer in use at that time.

Many members of the team who developed the original versions of Mosaic now work for Netscape Communications Corporation, a company which has developed the Netscape Web browser, which was estimated to account for around 70 percent of all the Web browsers in use in May 1995. Following Netscape, Microsoft launched a range of Internet browsers and servers.

A directory is, in general, an approach to organizing information, the most familiar example being a telephone directory. On the World Wide Web, a Internet search directory (also known as a web directory) is a subject guide, typically organized by major topics and subtopics. There are many Internet search directories, from the mega search directories such as Yahoo (www.yahoo.com) and Lycos (www.lycos.com) with millions of links to small niche directories such as South Asia Milan (www.samilan.com). These directories are structured as a multilevel tree of categories and subcategories, with website links, titles and possibly descriptions within subcategories, usually at the "leaf nodes" (final level subcategories).

There are several shortcomings with the implementations of such types of search directories. A web directory is typically compiled by listing any and all sites submitted for inclusion under a category by their webmaster. Quality assurance relating to the usefulness of a site to a visitor is usually either largely skipped or handled cursorily by the web directory administrator. Also, users of such directories are restricted to the categorization set once and for all by the webmaster. Because of this, users wishing to add sites to such directories are unable create their own custom category under which to put a new site.

SUMMARY OF THE INVENTION

A system, method and article of manufacture are provided for generating a prioritized network site directory. A link to a site on a network is generated. The site is then added to a site directory that includes a set of categories. The site is categorized into one of the categories of the site directory. The site is also ranked in the category.

In an embodiment of the present invention, the addition of the site to the site directory may also require the comparing of the site to pre-existing sites in the site directory and then generating a notification if the site matches one of the pre-existing sites of the site directory. In another embodiment of the present invention, categorizing of the site into one of the categories of the site directory may also include generating a table of sites where pre-existing site are ranked in the set of categories of the set directory and then determining whether the site exists in the table of sites. If the site already exists in the table of sites, the site may then be mapped to one of the categories of the set of categories. Further, if the site does not exist in the table of sites, the site may be searched for keywords relating to the categories of the set of categories.

In a further embodiment of the present invention, categorization of the site into one of the categories of the site directory may also include the selecting one of the categories into which the site is to be categorized and then comparing the selected category to the category to which the site is mapped. If the selected category does not match the category to which the site is mapped, then a notification may be generated.

In an aspect of the present invention, the site may be ranked in the category according to: the number of generated links to the site, the frequency that the site is accessed by selection of the generated links, and/or polling. In another aspect of the present invention, a mode of communication may be associated with one or more of the categories of the site directory.

In a further embodiment of the present invention, a sub-category may be created into which the site is categorized under one of the categories of the site directory. An added option to this embodiment, a creator identity may be assigned to the sub-category that includes information about a creator of the sub-category. In such an option, the creator of the sub-category may further be granted privileges such as recommending to accept or reject additional sites into and additional sub-categories under the sub-category, receiving information transmittals from users of site in the sub-category, and transmitting information to users of sites in the sub-category.

BRIEF DESCRIPTION OF THE DRAWINGS

Figure 18:
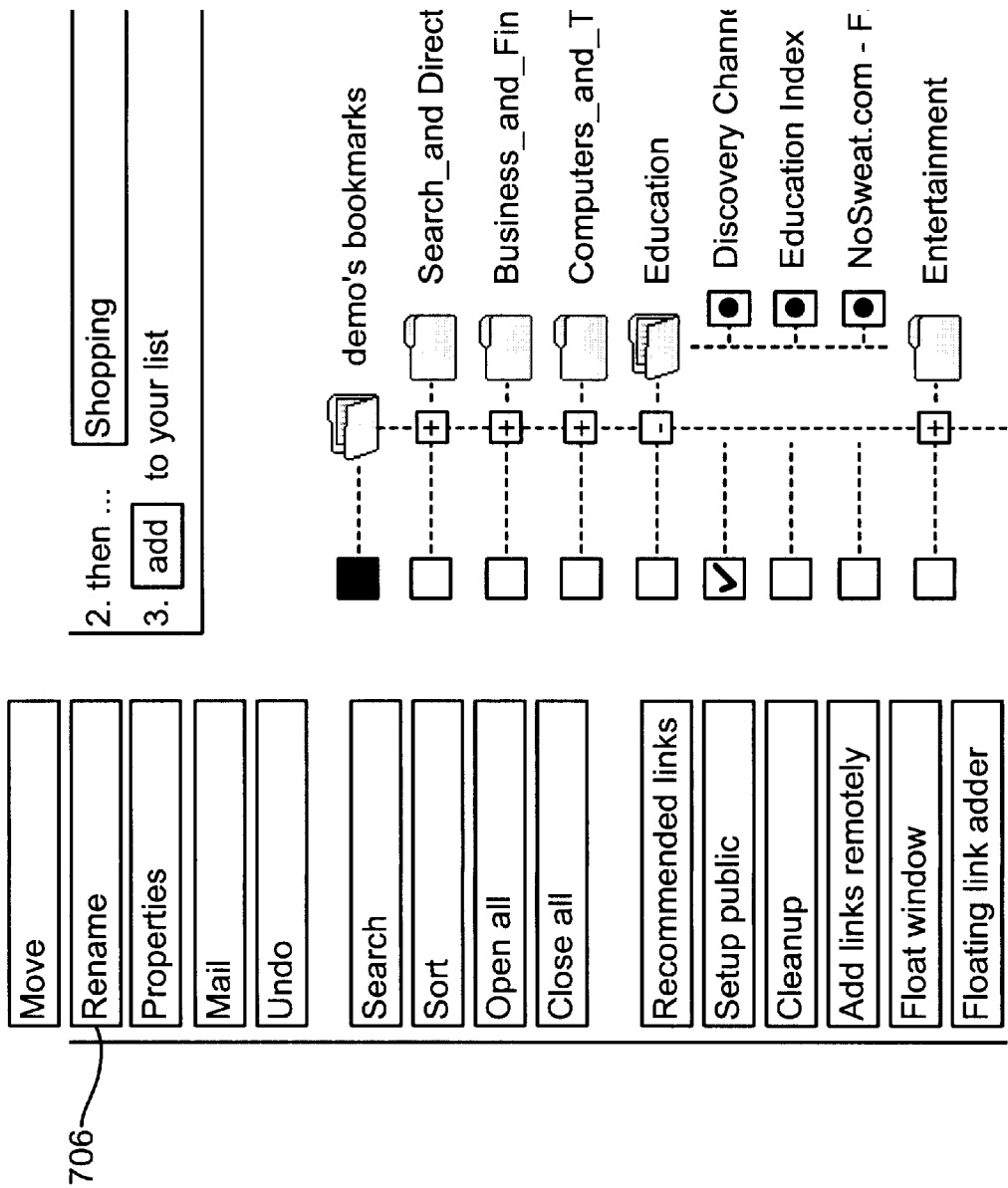
FIG. 18 illustrates portion for an online bookmark account used for renaming a folder in the online bookmark account in accordance with an embodiment of the present invention.

The invention will be better understood when consideration is give to the following detailed description thereof Such description makes reference to the annexed drawings wherein:

FIG. 1 is a schematic diagram of a hardware implementation of an embodiment of the present invention;

FIG. 2 illustrates a flowchart for a method for generating a prioritized network site directory from user generated links to sites on a network in accordance with an embodiment of the present invention;

FIG. 3 is a schematic illustration illustrating the creation of an exemplary website directory derived from bookmarks submitted from users' online bookmark accounts in accordance with an embodiment of the present invention;

FIG. 4 is a schematic illustration of an exemplary embodiment of a website directory with sites categorized in user created and defined categories and subcategories in accordance with an embodiment of the present invention;

FIG. 5 is a schematic illustration of an exemplary website directory where the sites of a category are displayed with their rankings according to number of users who have the site bookmarked, frequency that the site is visited by users, and popularity determined by user voting in accordance with an embodiment of the present invention;

FIG. 6 illustrates an exemplary display of a online bookmark account page of a user in accordance with an embodiment of the present invention;

FIG. 7 illustrates tools displayed on a user's online bookmark account page in accordance with an embodiment of the present invention;

FIG. 8 illustrates an exemplary online bookmark account page with drop and drag capability in accordance with an embodiment of the present invention;

FIG. 9 illustrates a remote addition feature for adding bookmarks to a user's online bookmark account page in accordance with an embodiment of the present invention;

FIG. 10 illustrates an importation feature of an online bookmark account page for importing Internet browser bookmarks or favorites into the online bookmark account page in accordance with an embodiment of the present invention;

FIG. 11 illustrates a user's online bookmark account page and a public bookmark page derived from the online bookmark account page in accordance with an embodiment of the present invention;

FIG. 12 illustrates a direct addition of a bookmark to an online bookmark account page in accordance with an embodiment of the present invention;

FIG. 13 illustrates a remote addition of a bookmark to an online bookmark account page in accordance with an embodiment of the present invention;

FIG. 14 illustrates a Floating Link Adder pop-up window for adding bookmarks to an online bookmark account in accordance with an embodiment of the present invention;

FIG. 15 illustrates an online bookmark account and, in particular, features for creating a folder in accordance with an embodiment of the present invention;

FIG. 16 illustrates portion for an online bookmark account while deleting a bookmark or folder from the online bookmark account in accordance with an embodiment of the present invention;

FIG. 17 illustrates portion for an online bookmark account while moving a folder in the online bookmark account in accordance with an embodiment of the present invention;

FIG. 18 illustrates portion for an online bookmark account used for renaming a folder in the online bookmark account in accordance with an embodiment of the present invention;

FIG. 19 illustrates a display for automatic importing of bookmarks into a user's online bookmark account in accordance with an embodiment of the present invention;

FIG. 20 illustrates a display displayed upon a selection for exporting bookmarks from a user's online bookmark account in accordance with an embodiment of the present invention;

FIG. 21 illustrates a dialog box for a search feature for keyword searching of bookmarks in a user's online bookmark account in accordance with an embodiment of the present invention;

FIG. 22 illustrates a dialog box for a sort feature for sorting bookmarks in a user's online bookmark account in accordance with an embodiment of the present invention;

FIG. 23 illustrates a dialog box for a cleanup feature for checking for stale and duplicate bookmarks in a user's online bookmark account in accordance with an embodiment of the present invention;

FIG. 24 illustrates a portion of a frame of an e-mail feature of a user's online bookmark account in accordance with an embodiment of the present invention;

FIG. 25 illustrates a portion of a frame for making a user's private bookmarks public and a user's public bookmarks private in accordance with an embodiment of the present invention;

FIG. 26 illustrates a Float Window in accordance with an embodiment of the present invention;

FIG. 27 illustrates a Floating Link Adder Pop-up Window in accordance with an embodiment of the present invention;

FIG. 28 illustrates an exemplary display of a online bookmark account page of a user with a button for a recommended links feature in accordance with an embodiment of the present invention;

FIG. 29 illustrates a page displaying a list of popular sites displayed subsequent the selection of the recommended links feature in accordance with an embodiment of the present invention;

FIG. 30 illustrates a page displaying a list of users with public bookmarks in accordance with an embodiment of the present invention;

FIG. 31 illustrates an exemplary welcome page a particular user's public bookmarks in accordance with an embodiment of the present invention;

DETAILED DESCRIPTION OF THE INVENTION

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine: its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

- Objects can represent physical objects, such as automobiles in a traffic-flow simulation, electrical components in a circuit-design program, countries in an economics model, or aircraft in an air-traffic-control system.
- Objects can represent elements of the computer-user environment such as windows, menus or graphics objects.
- An object can represent an inventory, such as a personnel file or a table of the latitudes and longitudes of cities.
- An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H. Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

User-Generated Internet Search Directory Based on User Online Bookmarks

Users surf the Internet at an ever increasing rate and webpages get added to the World Wide Web at an exorbitant rate. The ability to bookmark a webpage or website that a user found particularly useful is an invaluable aid to surfing the web efficiently. The value of a bookmark to the user who owns it is clear. But there is an additional value attached to the bookmarking of a site. A bookmark is the result of an analysis of and positive judgment on a website by a visitor interested in a particular interest topic. However, the knowledge that a site is good enough to be bookmarked is locked away in a user's private bookmark set. Creating a web directory where each category contains not just sites recommended for listing by webmasters, but sites taken from within Internet user's bookmarks sets, unlocks the knowledge hidden away in private bookmarks sets distributed across standalone computers worldwide. Users are able to search via keyword or traverse the category hierarchy to get to bookmarks pertaining to their area of interest.

The present invention includes the following concepts for implementing a searchable web directories:

Search Domain: The domain of links/websites categorized in the directory comprising of users' bookmarks Dynamic restructuring: The user has the ability to create their own categories to best identify the location of their bookmark(s) within the web directory.

Site Ranking: Each bookmark may be ranked by: (a) the number of people who have bookmarked the site, and (b) the frequency of access to this site by the bookmarkers.

Category guides and owners: Each category created by the user as well as each link added by users from their bookmark set may be associated with the user's name, allowing users to find not only relevant sites but people with similar interests FIG. 2 illustrates a flowchart for a method 200 for generating a prioritized network site directory from user generated links to sites on a network (see operation 202). The site related to the link is added to a site directory that includes a set of categories in operation 204. The site is categorized into one of the categories of the site directory in operation 206 and also ranked in the particular category that it is placed under in operation 208.

Search Domain

FIG. 3 is a schematic illustration illustrating the creation of an exemplary website directory 300 of the present invention derived from bookmarks submitted from users' online bookmark accounts 302a, 302b, 302c. In the present invention, sites 304 added to the web directory 300 exist as bookmarks 306 in a user's bookmark set of the user's online bookmark account. Thus, the only people allowed to add links to the web directory are users who host their bookmarks or favorite sites in online bookmark accounts 302a, 302b, 302c on an online bookmark management server. This also helps to eliminate the "spamming" of the web directory by overzealous webmasters. A user first registers with the online bookmark management service and import their browser bookmarks, or favorite links off an existing webpage. Optionally, a user may create a fresh set of bookmarks in their server based bookmarks account. Once the user has a server side bookmark account set up and populated, the user may add part or all of the user's bookmarks to the web directory as represented in FIG. 3 by arrows 308a, 308b, and 308c. The user may choose manual or automatic categorization while adding part or all of their bookmark.

Manual Categorization

Under manual categorization, the user determines the category 310a, 310b, 310c under which to file a bookmark or a set of bookmarks. These bookmarks as well as the suggested categorization are reviewed by the directory's editorial staff for correctness of categorization. After this screening, the sites are made part of the directory under the user recommended category or a editor selected classification, and the user is notified.

Automatic Categorization

In automatic categorization, the user may specify which part of the user's bookmark set is to be included in the directory. All unique links in this set that do not already exist in the directory are then considered for addition under categories determined by the staff. With automatic categorization, the user does not have to determine and submit the appropriate categorization of the submitted bookmarks.

Website Addition

The website addition process may automated with at least two manners. First, an automatic filtering step may be executed to determine whether the submitted link already exists in the search directory. In this step, the submitted site is compared to pre-existing sites in the site directory to see if it matches one of the pre-existing sites of the site directory. As an option, if the user attempts to add a link manually under a category, the user may be alerted (by for example the generation of a notification to the user) when the link already exists in that category or even elsewhere in the directory. After such an alter, the user may be allowed a choice to proceed and submit the link. A final determination on whether to replicate links across categories may subsequently then be made by the editorial staff.

NEED MORE INFORMATION ON THIS ASPECT

Second, in the determination of the right categorization, the editorial staff may be aided by a website profiling procedure. The website profiling algorithm will be similar to the interest clustering techniques detailed in the patent "Method and Apparatus User Preference Profiling and Transient Detection on Content and User Access of Web Bookmarks", filed separately.

Each bookmarked website submitted to the directory (manual or automatic submission) is looked up in a generated table of sites that have been ranked in a set of categories. This ranking is done using the interest clustering algorithm mentioned above. If the site exists in the table, its ranking is then mapped to the best category for it to be listed under. On the other hand, if the site does not exist in the table, the interest clustering engine is used to search the site on a variety of keyword baskets. Each keyword basket represents a particular interest category. The results from this search are then entered into the table of ranked sites and used to determine the final categorization of the site in the web directory. As an option, if the selected category does not match the category to which the site is mapped, then a notification may be generated. As a further option, manual inspection by the editorial staff may also be conducted as a double check of the categorization procedure.

Dynamic Restructuring

FIG. 4 is a schematic illustration of an exemplary embodiment of a website directory 300 of the present invention with sites 304 categorized in user created and defined categories 310a, 310b and subcategories 312a, 312b. In such an embodiment of the present invention, a sub-category may be created into which the site is categorized under one of the categories of the site directory. In adding niche and focused sites to a web directory, a major stumbling block has been the lack of flexibility for permitting users to make their own custom categories under which to add a favorite site. The present invention gives a user the ability to dynamically grow the hierarchical categorization tree. In the case of a bookmark based website directory, one of the underlying assumptions of such a search metaphor is that the user adding the bookmark has a keen interest in and some knowledge of the theme and/or subject of the bookmarked site.

In order to exploit this user knowledge properly, the user is allowed the option to grow the categorization tree by adding "nodes" or "subcategories" that best capture the category for the bookmarks they wish to add. Each added node may have the creator's ID (i.e., the user's online bookmarks account's username) and contain at least one site under it (i.e., users may not be able create an empty node). These features also create a dynamic interactive web directory. "Dynamic" here does not simply imply frequent addition of links, but frequent additions to the basic categorization structure.

These features may also be conducted under the manual inspection of the editorial staff. In such an embodiment, requests from a user to create a new node in the category tree may be queued for approval by an editor of the site directory. If the new sub-category is found to add value to the web directory, its addition is then finalized and included in the site directory.

Site Ranking

FIG. 5 is a schematic illustration of an exemplary website directory 300 of the present invention where the sites 304 of a category 310b of the website directory are displayed with their rankings according to number of users who have the site bookmarked 314, frequency that the site is visited by users 316 and popularity determined by user voting 318. A benefit of using bookmarked sites as a basis or domain for a web directory is that it creates two natural ranking metrics. As bookmarks are displayed in a category or as the result of a keyword search, they may be prioritized or ranked according the following metrics:

1. How often does a bookmark appear in online bookmark accounts 314 (i.e., how many users in the server side bookmarks community have bookmarked this site); and
2. How often do people who have bookmarked this site access the site from their account 316.

The more the bookmarks accounts in which a particular site appears, the higher it may be ranked in its interest category. Likewise if the traffic to one bookmarked site is much higher than others that belong in the same interest category, the high traffic site may be ranked above (and possibly placed above in a search result or category listing page) the other sites. This may greatly increases the utility of the web directory. It may also be an important way to exploit the knowledge that is locked up in user bookmarks. Not only are the sites that are interesting enough to have been bookmarked by users simply displayed, but the sites are displayed in a manner for users of the site directory to differentiate which may be more relevant and content/ information rich from among a pool of sites displayed in a particular category.

As an option, an additional ranking mechanism may also be built into the site directory by allowing users to vote on the usefulness of any site 318. In such an embodiment, all three ranks may be displayed alongside the particular link to allow users to have the option to prioritize their selection of a link on the search page by: (a) number of people who have it bookmarked, (b) traffic frequency or (c) voting results.

Category Guides and Owners

When a user adds a site 304 or creates a new subcategory 312a, 312b, they may be given the option to assign their identity (i.e., their username to their online bookmarks account) to the added category or site. As a further option, the user may also be granted additional privileges as creators of a new category, such as the right to recommend to accept or reject new sites/subcategories under the new category (with or without a further safeguard option of leaving the final determination with the directory editors). This option adds a dimension of interactivity and expertise to the web directory. With such an option, users of the site direction are able to find not only relevant websites but also users with similar or identical interests.

The site directory's users may also be allowed to send information transmittals such as an instant message or e-mail to these "experts" or guides whose username is associated with the particular category or link they entered into the directory. With such a feature, the online bookmarks accounts of these guides may also include features that give them the capacity to receive these communiques and transmit replies back to sender. As a further option, associated with each category may be a forum or chat room where users with like interests are allowed to communicate with each other.

Online Bookmarks Managing System

The following portion of the present specification is included to provide further clarification to various aspects and portions of the present invention through discussion of exemplary embodiments of the present invention. In particular, the following portion of the present specification includes further information regarding the user and maintenance an online bookmarks managing system and user online bookmark accounts of the system.

In an embodiment of the present invention, as soon as a user signs up, the user may be set up with a personal, password-protected, web-based online bookmark account.

Every time the user accesses the Internet, wherever the user is, the user is able to sign in and see the user's complete bookmarks selection. No matter what browser, no matter which operating system, the user's favorite links are there via the user's online bookmark account for the user to use.

FIG. 6 illustrates an exemplary display of a online bookmark account page 600 of a user. This exemplary page 600 has a central area 602, a left menu bar 604 and a top menu bar 606. Also displayed may be a bookmark adding area 608.

With continuing reference to FIG. 6, in this exemplary embodiment of the present invention, the icon 610 with the circle in the middle located in the central area 602 is used to represent a bookmark (also known as a favorite, a link, or a shortcut) of the user. A bookmark is a saved link to a web site that, when selected, accesses the linked website. Next to this icon 610 may be a text 612 providing further indication of the site to which the particular bookmark provides a link to.

In this exemplary embodiment, the icon 614 similar to a folder is the icon for a folder in which a user may organize their bookmarks. A folder's usage is similar to the use of directories in a computer's desktop; namely, to allow a user to group similar items together. These icons are similar to a closed folder when the contents of the folder are not being displayed. A user may view the contents of the folder by clicking on the "+" sign 616 to the left of the closed folder icon. This changes the icon to an "open folder" icon, the "+" sign to "−" sign 618, and displays the contents of the folder. A user may then close the folder by clicking on the "−" sign to the left of the open folder. This will close the folder once again.

When folder icons 614 are present, bookmark icons 610 may appear under the folder in which it is stored. Note that the display uses various levels of indentation and connecting lines 620 to indicate the specific folder under which the bookmark is filed.

Accessing Links/Bookmarks
How to Use/access Bookmarks

To visit the bookmarked site, a user clicks on a bookmark icon 610. Clicking on the bookmark icon will open up a new window and take the user to the bookmarked site. To return to the bookmark list, a user may either close the new window that had opened up or the user may switch back to the browser window with the a session of the present invention active.

Displaying Bookmarks

To allow users unlimited bookmarks and to present them more efficiently, bookmarks may be broken up and displayed in separate pages. In an illustrative embodiment, a default of approximately 250 bookmarks may be displayed on each page. A user may change the number of bookmarks they want displayed on each page. To do so, the user clicks on the User Options button 622 displayed on the online bookmark account page 600 (see FIG. 6) and make changes in "View Size" form that is subsequently displayed.

Accessing Bookmarks of a User Account from Another Computer

As a web-based bookmarks service, the present invention may available from any computer connected to the Internet. This enables a user to access, and edit their bookmarks from anywhere in the world. A user does not need to login from the same computer every time the user wishes to use their bookmarks to browse the Internet. Nor does a user need to sign up again or transfer any files when they switch computers.

Managing Links

FIG. 7 illustrates tools displayed on a user's bookmark page 600 of the present invention that are included to help a user manage their bookmarks. Some examples include:

- add, delete, or rename functions 702, 704, 706;
- a move function 708 for organizing a user's links;
- duplicate or stale (i.e. broken or inactive) bookmark detectors;
- search and sorting functions 710, 712 to help a user find bookmarks that the user may be looking for; and
- an e-mailing function 716 for transmitting information utilizing a network.

Drag & Drop Functionality

In embodiments of the present invention with such a this feature, the pains associated with managing information online may be reduced. With reference to FIG. 8, users may click, drag and drop their bookmarks 610 (and folders 614) to move them anywhere within their account. One-touch management of links, folders and link properties to make the user's life easier. Select one link 610 or more to display a box 806, choose the appropriate function 808*a*, 808*b*, 808*c*, 808*d* from the box and the function is then executed.

Remote Addition

With particular reference to FIG. 9, a user may also add bookmarks to their online bookmark account without even being on the online bookmark provider's webpage by using an "Adding Bookmarks Remotely" feature 902 that may be included on a user's web browser 900. This feature lets a user add links while surfing on the internet by clicking on the function 902 as shown in FIG. 9.

Accessing Bookmarks Added through the "Adding Bookmarks Remotely" Feature

All the URLs that users add to their current online bookmark account through the "Adding Bookmarks Remotely" feature may be stored in their online bookmark account and are accessible from any computer on the Internet, just like all their other bookmarks in their online bookmark account. When a user wishes to bookmark a particular page using this function, the user first accesses the particular page through their browser. Once the user is thereat the particular page, the user may add a bookmark remotely by clicking on, for example, the ADD2My__Stuff favorite/bookmark in their current browser. The URL of the particular page is then stored in their My__Stuff folder.

Import/Export Bookmarks

A user may import their current Netscape "Bookmarks" or Internet Explorer "Favorites" directly into their online bookmarks account 600. The user may either add them to the online bookmark provider's default list of bookmarks, or replace the links with the imported links 1000 as shown in FIG. 10. This way, the user may import from multiple sources, whenever they want, and even however many times they want.

Sharing Bookmarks

A user may also be able to choose to share their bookmarks with friends—or any surfer by:

- e-mailing links to others; and
- setting selected bookmarks as public. As best illustrated in FIG. 11, this feature lets users publish their own Internet directories at the touch of a button. Users may choose the links they wish to set as public from their bookmarks 600 and publish them on the Internet 1100.

Add Links/Folders

A user may add links to their account in three ways:

- adding directly (from the account page);
- adding links remotely; and
- adding links through a pop-up window.

Adding Directly

With reference to FIG. 12, a user may add bookmarks by typing the URL (web site address) into the box 1200 next to "New Link" and then clicking on "Add" 702. A user may add folders in the same way, by typing the new folder's name into the box 1204 next to "New Folder" and then clicking on "Add" 702. Both new bookmarks and new folders may be placed inside other folders. A user may do this by clicking on the down arrow 1206 on the "choose location of new url/folder" box 1208 and selecting the folder 1210 users want to move the new item into.

Adding Links Remotely

A user does not have to be in their account to add bookmarks. Users may actually add them while they surf the Internet. First, the user needs to set up the Adding Links Remotely function. With reference to FIG. 13, once the Adding Bookmarks Remotely function is set up, the user may see a new bookmark called "Add2Clickmarks" 1300 on their browser 1302. This means that the Netscape Bookmarks list or their Internet Explorer Favorites list will have this new "Add2Clickmarks" bookmark. While a user surfs the Internet, if the user finds a web site he or she wants to add to their account, the user just clicks on the browser bookmark called "Add2Clickmarks" and the site will be automatically added to their online bookmark account.

Adding Links through a Pop-Up Window

To add links to a user account without coming back to the user account page, a user may use the Floating Link Adder pop-up window 1400 which is illustrated in FIG. 14. This feature is useful when using the present invention from a computer that is not the user's regular workstation.

With reference to FIG. 7, a Floating Link Adder button 722 may be clicked on from a user account page for displaying of the Floating Link Adder pop-up window 1400 illustrated in FIG. 14. In the pop-up window 1400, the user may then input in box 1402 the URL that they want to add. By default, the new link will be added to the top level folder in the user's account. The user may also choose the specific folder that users want the new link to be added to by selection of a folder displayed in box 1404. Clicking on the Add URL button 1406 adds the link to the user's account.

Add & Manage Folders
Creating a Folder

With reference to FIG. 15, to create a folder, a user may first type the name of the folder the user wants to be created in "New Folder" space 1204 in the bookmark adding area 608. The user may then click on the "Add" 702 to created the new folder. When their folder is created, the new folder is displayed with the other folders of the user in the central area 602.

Creating Folders within Folders

Users may nest folders within folders if so required. To create a new folder within an existing folder, a user may first choose the destination folder from the drop-down menu labeled "File Under" located above their displayed bookmarks of the page. This will ensure that the new folder the user creates will be placed in the folder that the user has chosen. The user then types the name of the folder the user wants to be created in the space to the right of the button titled "New Folder" and then clicks on the "New Folder" link in the top navigation bar. When their folder is created, the user should see that it has been added to their list of current folders.

Undeleting Bookmarks/folders

A user may undo the effects of the last editing step that the user took off their page. To do so, the user clicks on the "undo" button 724 in the left menu bar 604 (see FIG. 7). This will undo the effect of the last step that the user had executed. Note that undo feature may be used only for the last edit step that the user took. Clicking on undo the second time may redo the step that users had undone.

Viewing the Contents of a Folder

If the contents of their folders are not already visible, click on the "+" sign 616 next to the left of the icon and name of the folder (see FIG. 6). Note that the icon should represent a closed folder, and the sign next to it should be a "−" sign 618 when the list of bookmarks and folders within this folder is not being displayed. Clicking on the "+" to the left of the closed folder icon should change that icon to an open folder icon, a "+" sign to a "−" sign , and should display the contents of that particular folder including all the bookmarks and folders. To view the contents of any one of the folders within the current folder, click on the "+" sign to the left of the folder icon and the folders contents will be displayed as well.

Hiding Contents of a Folder

If the contents of their folders are being shown, click on the "−" sign 618 next to the left of the icon and name of the folder. Note that the icon should represent an open folder, and the sign next to it should be a "+" sign when the list of bookmarks and folders within this folder is being displayed. Clicking on the − to the left of the open folder icon should change that icon to a closed folder icon, a "−" sign to a "+" sign, and should hide the contents of that particular folder. To hide the contents of any folder within an open folder, just click on the "−" sign to the left of the folder icon. Doing so will hide the contents of this folder from the current display.

Editing Links/Folders

Users may edit their bookmarks with a single click in their user accounts. This may be accomplished by choosing the links that the user wants to edit and then pressing the button corresponding to the desired function. In an embodiment of the present invention, the user may choose to:

delete links and folders;

move links and folders; and rename links and folders.

Deleting Links/Folders

With reference to FIG. 16, there may be two ways to delete links or folders in the drag and drop embodiment of the present invention:

Selection of the link(s)/folder(s) by highlighting them 1600 and then using the "delete" button 704 on the left menu bar. The chosen bookmarks are then removed immediately; and/or Clicking on the link/folder so that it is highlighted and then right-clicking a mouse-type input device. From the drop-down menu that appears upon the right-click "delete" is then chosen. The links/folders are then removed from the account immediately.

Moving Links/Folders

With reference to FIG. 17, to move links/folders within an account, a user first selects the link(s)/folder(s) by highlighting them 1700 with their mouse-type input device. As an option, the user may also use the Ctrl and Shift keys to make multiple selections as in the windows desktop environment. The selections may then be moved 1702 by holding down the left-click button on the mouse which may then be released wherever the user wishes the links to be placed. As an option, to move within a folder, release of the left-click button may be done when the destination folder is highlighted.

Renaming Links/Folders

There may be two ways a user may rename links or folders in a drag and drop embodiment of the present invention. To rename links/folders within a user account, the individual link/folder is selected by highlighting it with an input device such as a mouse-type input device. As an option, a user may not be able to rename multiple selections in one operation.

In one embodiment, upon right-clicking on the link with the user's mouse displays a drop down menu with a rename selection. The choosing of the rename selection from the drop down menu. The title will be replaced by a rename box into which a new title for the link may be entered. With reference FIG. 18, as another option, once the link/folder is highlighted, clicking on rename selection 706 from the left hand menu bar displays a drop down menu with a rename selection which, upon selection, replaces the title box with a rename box into which a new title for the link may be entered.

Importing Bookmarks

A user may import Netscape "Bookmarks" or Internet Explorer "Favorites" directly into their user account. A user may either add them ("append" them) to the user's current list of bookmarks, or the user may "overwrite" the user's current list with the ones that the user imports. In an exemplarily embodiment of the present invention importation may be accomplished with the following steps: (1) Go to the "Import/Export" box 714 on the top panel (see FIG. 7); and then (2) Select either "automatic" or "manual" to indicate how to import the bookmarks.

Automatic Importing Bookmarks

Automatic Import allows a user to import bookmarks automatically from their desktop browser. Once automatic import is selected, a Java Applet will load. Note that it may take a little time to do that. Once the applet is loaded, the user may be asked via a dialog box 1900 to select the browser as illustrated in FIG. 19. The user then may choose whether they want to overwrite or append to the existing bookmarks with the selection 1902. The bookmarks may then be imported immediately.

Manually Importing Bookmarks

In an exemplary embodiment of the present invention, to manually import bookmarks, a user first selects the Import/Export button 714 displayed on the top control menu bar on the user account page. The user then follows the following instructions corresponding to the particular browser the user is using:

Importing from the Netscape Browser

In the Netscape browser, select Bookmarks from the top menu.

Click on Edit Bookmarks.

A new window will open up with all of the user's bookmarks visible therein.

From the bookmarks editing window select Save As from the File menu.

This will save the user's bookmarks file in the directory users specify.

Enter the desired file name.

Note the path to the file by clicking on the select arrow next to the Save in: field.

Also note the bookmark file name.

Now return to the Bookmarks Import page in their online bookmark account.

Use the Browse button given on the page to locate the bookmarks file that the user created and saved in the previous steps, outlined above.

Select the bookmarks file.

Press Submit.

The bookmark file will be imported into their online bookmark account.

Importing from the Internet Explorer IE.5

A user first converts their Microsoft favorites to an HTML file.

On the user's browser, go to the File menu and select Import and Export.

Choose Export Favorites when it gives the Import/Export Selection window.

Click Next until users get to the Export Favorites Destination.

Select Export to a File or Address and enter:
C:\My Documents\clickmarks.html

Click Next and then click on Finish.

In the text field of the Browse button on the Import page, type C:\My Documents\clickmarks.html If the user has saved it on some other place and named it something else, then type that in.

Click on Submit Options.

Return to the Bookmarks Import page in their online bookmark account.

Use the Browse button given on the page to locate the bookmarks file that users created and saved in the previous steps, outlined above.

Select the bookmarks file.

Press Submit.

The user's bookmark file is then be imported into their online bookmark account.

Exporting Bookmarks/Favorites

The present invention also enables users to export their bookmarks/favorites back to the desktop browser. A method that a user may use to export the bookmarks from their user account back to their Netscape or Internet Explorer browser is described as follows: (1) Choose "Import/Export" 714 from the top menu bar (see FIG. 7) to display a page with a "Export Your Bookmark" selection. Upon selection of this selection, a set of instructions 2000 are displayed as illustrated in FIG. 20 which a user may then follow to export their bookmarks.

Export Bookmarks into to Netscape

To export to Netscape, click on the Import image. From the import page click on the "export their bookmarks" link. Follow the Exporting To Netscape Bookmarks steps. In the two step process users first view the Netscape style bookmarks as an HTML file, then save the file on their local drive.

Export Bookmarks to Internet Explorer

To export to Internet Explorer, click on the Import image. From the import page click on the "export their bookmarks" link. Follow the Exporting To IE Favorites steps. In the three step process users first view and save their online bookmark account as Netscape style bookmarks. The final step requires users to convert the saved Netscape bookmarks file to Internet Explorer favorites using a freely downloadable Microsoft utility.

Managing Bookmarks

The present invention may also provide a user with functions to help the user manage their account. A user may "Sort" their links, "Search" their bookmarks for keywords, and/or "Clean Up" their user account by removing stale and duplicate links.

Search

A user may search through their bookmarks for keywords. In an embodiment of the present invention, this may be accomplished by first clicking on the "Search" button 710 on the left menu bar (see FIG. 7) so that a search dialog box 2100 is displayed as depicted in FIG. 21. A keyword(s) may then be entered in the keyword box 2102 and then search area may be chosen for those words by clicking on the down arrow 2104 next to "Search the" 2106 and selecting either Site Title 2108, Site Summary 2110, Site URL 2112, or All Three 2114. A user may also select whether they want to search for links that contain ALL of the keywords or for links that contain ANY of the keywords. To execute the search, the Search Bookmarks button 2116 is then selected.

In an embodiment of the present invention, the search process may display all of the bookmarks in their current bookmark files corresponding to the search keywords that users have entered. In such an embodiment, there may be no limit to the number of bookmarks that will be displayed as a result of their search.

Sorting

A user may sort their bookmarks in several orders. In an embodiment of the present invention, this may be accomplished by first clicking on the Sort button 712 on the left menu bar 604 (see FIG. 7) to display a Sort screen 2200 as illustrated in FIG. 22. The Sort screen 2200 may display a plurality of sort order choices 2202, 2204, 2206 that a user may select to choose the sort order they users want. Once a sort order is select, the user may then click on Sort button 2208 to execute the sort function.

In one embodiment, when the alphabetical sort is selected, the bookmarks may be sorted by the first word in the description that appears to the right of the icon for the bookmark. When a sorting by date of creation (newest to oldest) is selected, the bookmarks may be sorted such that the bookmarks most recently created appear first. When a sorting by date of creation (oldest to newest) is selected, the user's bookmarks may be sorted so that the bookmarks most recently created appear last.

Checking for Duplicates or Stale Links

In one embodiment of the present invention, a cleanup feature 2300 may be included in the left menu bar of the user's online bookmark account 600 to check for duplicate or stale links. Upon selection of the cleanup feature, a cleanup bookmarks screen 2302 may be displayed as illustrated in FIG. 23. This screen 2302, may display two buttons: a "Check Duplicates" button 2304 and "Check Stale" button 2306.

Selection of the "Check Duplicates" button 2304 executes the duplicate bookmark checking function which checks the user's bookmark collection for duplicate bookmarks and then displays a list of any duplicated bookmarks. The user may then be given an option to delete the duplicate bookmarks from their bookmark collection. The duplicate bookmark checking function helps users remove duplicate links from their accounts. Organizing bookmarks into different folders and sub-folders increases the difficulty of keeping track of duplicate bookmarks within their bookmark files. By comparing all the bookmarks and their titles/summaries stored, the bookmark management system identifies duplicate bookmarks stored in an user's online bookmark account, regardless of the folders that they may be stored in and the different titles that they may exist with. A user may therefore remove all the duplicate links that might lead to the same URL. This may be also useful in removing bookmarks that point to old locations of sites, although users may already have the correct updated URL in their files.

Selection of the "Check Stale" button 2306 executes the stale bookmark checking function which checks the user's bookmark collection for old or stale bookmarks (i.e., bookmarks that are broken or have moved) and then displays a list of any stale bookmarks in the user's bookmark collection. The user may then be provided the options of Renaming, Deleting, or Doing Nothing with the listed stale bookmarks. The stale bookmark checking function helps a user remove bookmarks that have expired since the user last used them.

E-mailing Bookmarks

This feature provides a handy way for a user to e-mail a their bookmarks to friends without having to cut and paste the URLs into e-mail messages. As best illustrated in FIG. 24, this function may be accomplished by first selecting all the bookmarks and folders 2400 to be e-mailed (multiple selections may be made using the Ctrl and Shift keys as in a windows desktop environment) and then selecting the mail button 716 displayed on the user's bookmark account page (see FIG. 7). Upon selection of the mail button 716, an e-mail screen 2402 may then be displayed into which a sender's and receiver's e-mail addresses may be entered in the appropriate boxes 2404, 2406. As an option, a message box 2408 may also be included for permitting the adding of a note to accompany the links. A "send" button may also be included for executing the transmission of the e-mail.

Making Bookmarks Public

In one embodiment of the present invention a user's account and all the bookmarks in it may be private by default. However, if a user wants to share certain bookmarks or folders with other users, the user may opt to make their bookmarks public. Also, if the user has already made certain links public, the user may also use this function to make their public bookmarks private again. In one such embodiment of the present invention, this feature may be carried out by first selecting a "Setup Public" button 718 on the left menu bar (see FIG. 7) to display a list 2500 of the user's bookmarks and folders 2502 as illustrated in FIG. 25. Also displayed with the list adjacent each bookmark and folder is a checkmark box 2504. To select which bookmarks/folders are to be made public, the user clicks on the checkmark boxes next to the bookmarks or folders the user wants to make public so that a checkmark 2506 appears in the selected checkmark box. The user then clicks on a "Submit" button 2508 also displayed with the list to execute the public function which then displays the selected bookmarks is a public bookmark screen/page.

To make a public link private again, a user may click on the checkmark box next to the particular link and then select a box 2510 above the "Submit" button and then click on "Submit" to execute the public function to remove from display the selected bookmark(s) from the public bookmark screen/page.

Floating Windows

The "Float Window" button 720 on the left menu bar (see FIG. 7) displays up a miniature version (i.e., "floating window") 2600 of the user's online bookmark account page as illustrated in FIG. 26. This floating window 2600 gives the user a view of the user's account while surfing on the Internet and permits the user to add new bookmarks to their account. This window displays a user's links without most of the other controls found on their full size account page. Having a smaller window open frees up monitor space and may be optimal for a user if the user is not actively managing their bookmarks. A user may return to their main user page by clicking on the "Go To Home & Close" link 2602. Two other controls may also be included to allow a user to refresh the page ("Reload" 2604), and to simply close the window "Close" 2606).

Floating Link Adder

The "Floating Link Adder" button 722 on the left menu bar (see FIG. 7) pops up a window 2700 as illustrated in FIG. 27 that lets a user add and file bookmarks to their user account while they are surfing the Internet without having to return to their online bookmarks account page. To add a bookmark with this window, a user simply types the web site address in box 2702 and clicks on "Add URL" 2704 to execute this function and add a bookmark for this site to the user's account. A user may also choose which folder the user wants the bookmark to go into by using the "File Under" pull-down menu 2706.

Recommended Links

As illustrated in FIG. 28, an embodiment of the present invention may include a "Recommended Links" feature 2800 in the left menu bar 604 of a user's online bookmark account page 600. Upon selection of the Recommended Links feature, a page may be displayed as illustrated in FIG. 29 that displays a list of popular sites 2900 which other users may have found useful. In such an embodiment, the bookmark management system may track popular links in many interest categories. These recommended links may be organized by various categories. A user may select any of these links to add to their account. A user may also choose which folder in their account page into which the recommended links are stored. As a further option, users may also be able choose to inform the bookmark management system that they do not wish to receive any future recommendations for a given interest category. In

Public Bookmarks Feature

The present invention may also include a public bookmarks feature which lets users publish their own Internet Directories for the whole world to browse. As illustrated in FIG. 30, accessing this feature displays a list of users with public bookmarks 3000 that comprises, for example, a list of user name links 3002 in alphabetical order. Upon selection of one of the user name links, a welcome page 3100 for that particular user's public bookmarks may then be displayed as illustrated in FIG. 31. This welcome page may display all of the bookmarks 3102 and folders 3104 that have been made public by that particular user and which are therefore accessible to any user upon selection.

Security

In an embodiment of the present invention, every online bookmark account may be password protected. This means that users must begin by logging into their account, unless the users have opted for an auto-login feature. Logging into a user account in such an embodiment is possible only by users correctly entering an associated Login ID and password. In one such embodiment, a user may use between 3 to 20 characters for their login ID while there may be no restriction on the length of the user's password length. Cookies may also be used to identify users.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for generating a prioritized network site directory, comprising the steps of:

(a) generating at least one link to a site on a network;

(b) adding the site to a site directory having a set of categories comprising at least one category, each category including a plurality of links;

(c) categorizing the site into one of the categories of the site directory;

(d) ranking the categorized site in the category;

(e) displaying the links in the category according to rank, the links including the at least one generated link;

(e) displaying an identity of the creator of the at least one generated link to a second user upon display of the links to the second user; and (g) allowing the second user to send an information transmittal to the creator of the at least one link.

2. A method as recited in claim 1, wherein the step of adding the site to the site directory further comprises the steps of: comparing the site to pre-existing sites in the site directory; and generating a notification if the site matches one of the pre-existing sites of the site directory.

3. A method as recited in claim 1, wherein the step of categorizing the site into one of the categories of the site directory further comprises the steps of:

generating a table of sites, wherein the table of sites comprises at least one pre-existing site ranked in the set of categories of the set directory;

determining whether the site exists in the table of sites; and mapping the site to one of the categories of the set of categories if the site exists in the table of sites.

4. A method as recited in claim 3, wherein the step of categorizing the site into one of the categories of the site directory further comprises the step of searching the site for keywords relating to the categories of the set of categories if the site does not exist in the table of sites.

5. A method as recited in claim 3, wherein the step of categorizing the site into one of the categories of the site directory further comprises the steps of:

selecting one of the categories into which the site is to be categorized;

comparing the selected category to the category to which the site is mapped;

and generating a notification if the selected category does not match the category to which the site is mapped.

6. A method as recited in claim 1, wherein the site is ranked in the category according to a type of ranking based on at least one of: the number of generated links to the site, the frequency that the site is accessed by selection of the links, and polling.

7. A method as recited in claim 6, further comprising the step of allowing a user to specify the type of ranking applied to the category, wherein the sites in the category are displayed according to the user-selected type of ranking.

8. A method as recited in claim 1, further comprising the steps of creating a sub-category into which the site is categorized; assigning a creator identity to the sub-category that includes information about a creator of the sub-category; granting the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

9. A method as recited in claim 1, wherein the information transmittal is selected from a group consisting of: an electronic mail message and an instant message.

10. A method as recited in claim 8, wherein the step of adding the site directory further comprises: comparing the site to pre-existing site directory; and generating a notification if the sites matches one of the pre-existing sites of the site directory.

11. A method as recited in claim 8, wherein categorizing the site into one of the categories of the site directory further comprises: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

12. A method as recited in claim 11, wherein categorizing the site into one of the categories of the site directory further comprises: selecting one of the categories into which the site is to be categorized; comparing the selected category to the category to which the site is mapped; and generating a notification if the selected category does not match the category to which the site is mapped.

13. A method as recited in claim 11, wherein categorizing the site into one of the categories of the site directory further comprises searching the site for keywords relating to the categories of the set of categories if the site does not exist in the table of sites.

14. A method as recited in claim 8, wherein the site is ranked in the category according to a type of ranking based on at least one of: the number of generated links to the site, the frequency that the site is accessed by selection of the links, and polling.

15. A method as recited in claim 14, further comprising allowing a user to specify the type of ranking applied to the category, wherein the sites in the category are displayed according to the user-selected type of ranking.

16. A method for generating a prioritized network site directory, comprising the steps of:

(a) generating at least one link to a site on a network;

(b) adding the site to a site directory having a set of categories comprising at least one category, each category including a plurality of links;

(c) comparing the site to pre-existing sites in the site directory;

(d) generating a notification if the site matches one of the pre-existing sites of the site directory;

(e) categorizing the site into one of the categories of the site directory, wherein the step of categorizing the site into one of the categories of the site directory further comprises the step of:

i. generating a table of sites, whether the table of sites comprises at least one pre-existing site ranked in the set of categories of the set directory;

ii. determining whether the site exists in the table of sites;

iii. mapping the site to one of the categories of the set of categories if the site exists in the table of sites;

iv. searching the site for keywords relating to the categories of the set of categories if the site does not exist in the table of sites;

v. selecting one of the categories into which the site is to be categorized;

vi. comparing the selected category to the category to which the site is mapped;

vii. generating a notification if the selected category does not match the category to which the site is mapped;

(f) ranking the categorized site in the category, wherein the site is ranked in the category according to a type of ranking based on at least one of: the number of generated links to the site stored in online bookmark accounts, the frequency that the site is accessed by selection of the links, and polling;

(g) allowing a user to specify the type of ranking applied to the category, wherein sites in the category are displayed according to the user-selected type of ranking;

(h) displaying the links in the category according to rank, the links including the at least one generated link;

(i) associating an identity of a creator of the at least one link with the at least one generated link;

(j) displaying the identity of the creator to a second user upon display of the links to the second user;

(k) allowing the second user to send an information transmittal to the creator of the at least one link, wherein the information transmittal is selected from a group consisting of: an electronic mail message and an instant message;

(l) creating a sub-category into which the site is categorized;

(m) assigning a creator identity to the sub-category that includes information about a creator of the sub-category;

(n) granting the creator of the sub-category at least one privilege selected from a group consisting of: recommending to accept or reject additional sites into and additional sub-categories under the sub-category, receiving information transmittals from users of site in the sub-category, and transmitting information to users of sites in the sub-category; and (o) associating a mode of communication with the category, the mode of communication being selected from a group consisting of: a forum and a chat room.

17. A computer program embodied on a computer readable medium for generating a prioritized network site directory, comprising:

(a) a code segment that generates at least one link to a site on a network;

(b) a code segment that adds the site to a site directory having a set of categories comprising at least one category, each category including a plurality of links;

(c) a code segment that categorizes the site into one of the categories of the site directory;

(d) a code segment that ranks the categorized site in the category;

(e) a code segment that displays the links in the category according to rank, the links including the at least one generated link;

(f) a code segment that displays an identity of the creator of the at least one generated link to a second user upon display of the links to the second user;

(g) a code segment that allows the second user to send an information transmittal to the creator of the at least one link.

(h) a code segment that creates a sub-category into which the site is categorized;

(i) a code segment that assigns a creator identity to the sub-category that includes information about a creator of the sub-category; and (j) a code segment that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

18. A computer program as recited in claim 17, further comprising a code segment that grants the creator of the sub-category at least one of the privileges consisting of: recommending to accept or reject additional sites into and additional sub-categories under the sub-category, receiving information transmittals from users of site in the sub-category, and transmitting information to users of sites in the sub-category.

19. A system for generating a prioritized network site directory, comprising:

(a) a logic that generates at least one link to a site on a network;

(b) a logic that adds the site to a site directory having a set of categories comprising at least one category, each category including a plurality of links;

(c) a logic that categorizes the site into one of the categories of the site directory;

(d) a logic that ranks the categorized site in the category;

(e) a logic that displays the links in the category according to rank, the links including the at least one generated link;

(f) a logic that displays an identity of the creator of the at least one generated link to a second user upon display of the links to the second user;

(g) a logic that allows the second user to send an information transmittal to the creator of the at least one link;

(h) a logic that creates a sub-category into which the site is categorized;

(i) a logic that assigns a creator identity to the sub-category that includes information about a creator of the sub-category; and (j) a logic that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

20. A method as recited in claim 1, further comprising the step of associating a mode of communication with the category; the mode of communication being selected from a group consisting of: a forum and a chat room.

* * * * *

UNITED STATES PATENT AND TRADEMARK OFFICE
CERTIFICATE OF CORRECTION

PATENT NO.        : 6,546,393 B1
APPLICATION NO.   : 09/414992
DATED             : April 8, 2003
INVENTOR(S)       : Khan It is certified that error appears in the above-identified patent and that said Letters Patent is hereby corrected as shown below:

Please delete patent 6,546,393 in its entirety and insert patent 6,546,393 in its entirety.

This certificate supersedes the Certificate of Correction issued December 25, 2012.

Signed and Sealed this
Nineteenth Day of March, 2013

Teresa Stanek Rea
*Acting Director of the United States Patent and Trademark Office*

(12) United States Patent
Khan

(10) Patent No.: US 6,546,393 B1
(45) Date of Patent: Apr. 8, 2003

(54) SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

(75) Inventor: Umair Khan, Fremont, CA (US)

(73) Assignee: Clickmarks, Inc., Fremont, CA (US)

( * ) Notice: Subject to any disclaimer, the term of this patent is extended or adjusted under 35 U.S.C. 154(b) by 0 days.

(21) Appl. No.: 09/414,992

(22) Filed: Oct. 7, 1999

(51) Int. Cl.⁷ .................................. G06F 17/30
(52) U.S. Cl. ........................ 707/10; 709/203
(58) Field of Search .................. 707/501, 1, 203, 707/201, 4, 10; 709/203

(56) References Cited

U.S. PATENT DOCUMENTS

| | | | | |
|---|---|---|---|---|
| 6,032,162 A | * | 2/2000 | Burke | 707/501 |
| 6,163,778 A | * | 12/2000 | Fogg et al. | 707/10 |
| 6,314,423 B1 | * | 11/2001 | Himmel et al. | 707/10 |
| 6,321,228 B1 | * | 11/2001 | Crandall et al. | 707/10 |
| 6,324,566 B1 | * | 11/2001 | Himmel et al. | 709/203 |

OTHER PUBLICATIONS

Keller et al. "A Bookmarking Service for Organizing and Sharing URLs," Computer Networks and ISDN Systems. vol. 29, No. 8–13, pp. 1103–1114, Sep. 1997.*
Maarek et al. Automatically Organizing Bookmarks Per Contents; Computer Networks and ISDN Systems; vol. 28, No. 7–11, pp. 1321–1333, May 1996.*

* cited by examiner

Primary Examiner—Charles Rones
(74) Attorney, Agent, or Firm—Silicon Valley IP Group, LLC; Dominic M. Kotab

(57) ABSTRACT

A system, method and article of manufacture are provided for generating a prioritized network site directory. A link to a site on a network is generated. The site is then added to a site directory that includes a set of categories. The site is categorized into one of the categories of the site directory. The site is also ranked in the category. Sub-categories may also be created into which the site is categorized under one of the categories of the site directory. The site may additionally be ranked in the category according to: the number of generated links to the site, the frequency that the site is accessed by selection of the generated links, and/or polling.

20 Claims, 30 Drawing Sheets

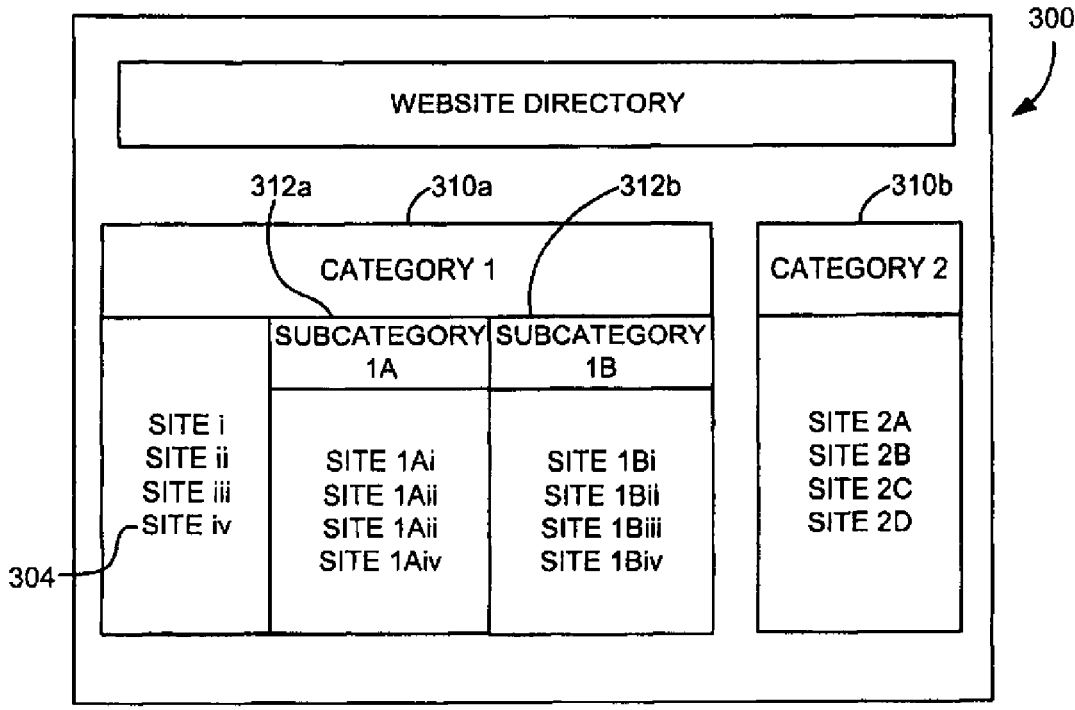

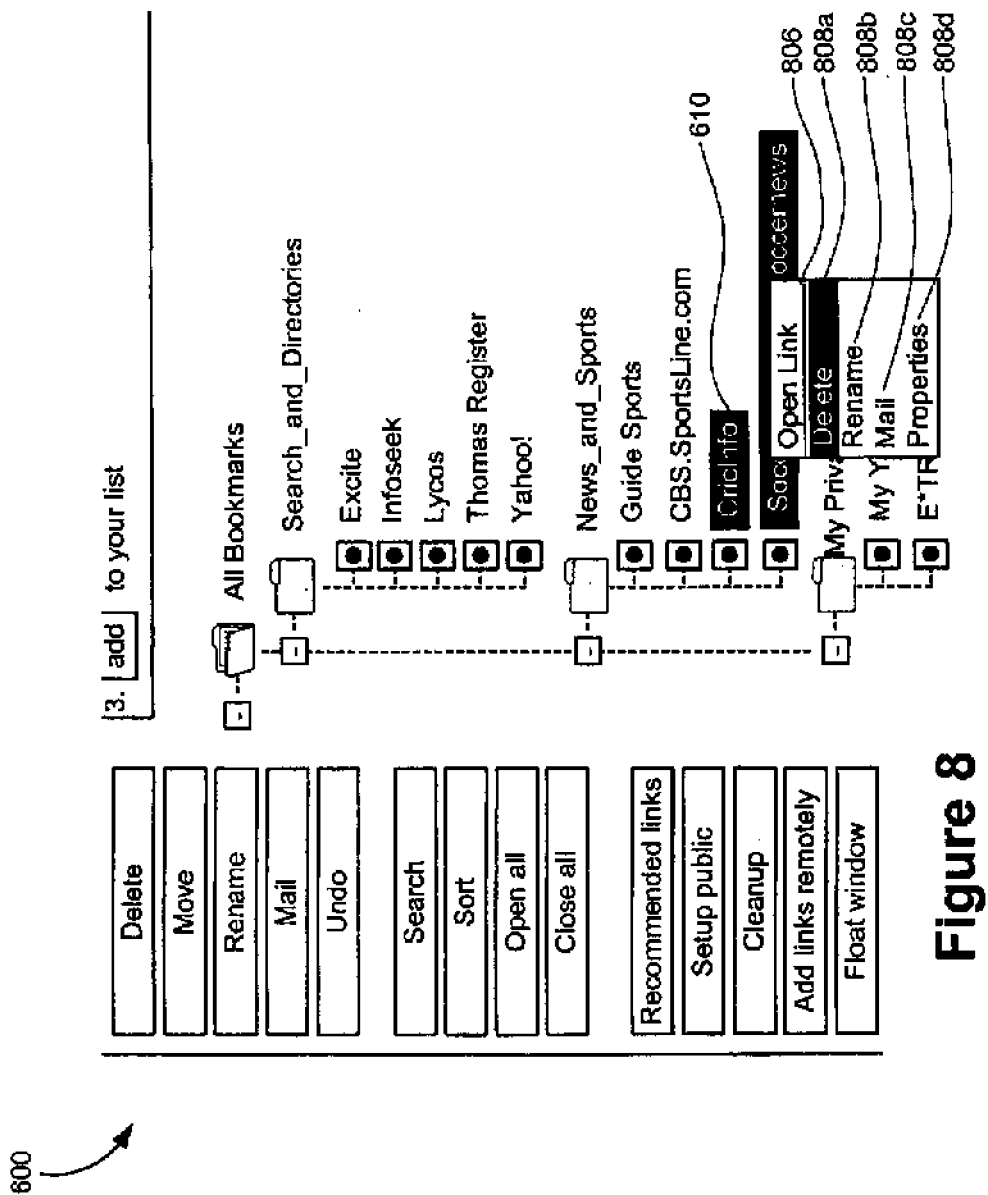

2900

Hot List

Hot Search Sites
Looksmart
Yahoo!
Excite
Jayde.com
Mamma.com - The Mother of All Search Engines
Ask Jeeves
Northern Light
Dogpile

Hot Directories Sites
Bigfoot
Four11
WhoWhere?
Switchboard
Infospace.com

Hot Business Sites
Business Week
CNNfn
Edgar Online
Monster Board Job Database
Headhunter.net
Fast Company

Hot Finance Sites
StockMaster
The Motley Fool: Finance and Folly
Yahoo! Finance
Bloomberg Online
Quote.com
Quicken Financial Network
OANDA Currency Converters
The Street
E*TRADE
IRS Homepage

Hot Computers_and_Technology Sites
W3C - The World Wide Web Consortium
Developer.com - Resources for programmers and developers
CMP TechWeb
Internet Sourcebook

Figure 29

3000 *Users with Public Bookmarks* a b c d e f g h i j k l m n o p q r s t u v w x y z 0 1 2 3 4 5 6 7 8 9 a
asic_design (user from clickmarks)
atv (user from clickmarks)
aeonflux (user from clickmarks)
andre (user from clickmarks)
austinpow (user from clickmarks)
anupun (user from thaiicq)
3002 alanm (user from clickmarks)
andros1 (user from delphi)
akibe (user from urduweb)
Andy (user from clickmarks)
ACSO (user from clickmarks)
Asim (user from pakistane)
AmberJade (user from clickmarks)

return to top

Figure 30

SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

FIELD OF THE INVENTION

The present invention relates to internet website directories and more particularly to dynamically user generated internet search directories based on prioritized server-sided user bookmarks.

BACKGROUND OF THE INVENTION

The World Wide Web was initially developed at CERN, which is a particle physics laboratory based in Geneva in Switzerland. The initial work began in 1989 and centered on the development of the HyperText Transmission Protocol (HTTP), which is a network protocol for requesting and transmitting web files and documents which both web servers and browsers can understand. By December 1990, CERN had developed a web server, a text-based browser and a browser for NExTStep computers. In March 1991, the software for the text based browser was made available to a limited audience. In January 1992, an updated version of the browser (version 1.1) was made freely available on the Internet. By January 1993, there were 50 web servers in existence and freely available graphical browser software had been made available for the Apple Macintosh. By February 1993, the World Wide Web was accounting for 0.1 percent of all Internet traffic.

One factor in the rapid acceptance and growth of the World Wide Web was the work done at the National Center for Supercomputer Applications (NCSA) at the University of Illinois in Urbana-Champaign in the USA. Their Software Development Group created a graphical web browser called Mosaic. In September 1993, they released versions of this software for Microsoft Windows running on PCs, Apple Macintoshes and Unix computers running X Windows. Each of the versions looked at and handled files in a very similar manner with images and text interspaced in the same document, allowing organizations to create visually exciting documents that could be viewed in very similar formats on the three main types of computer in use at that time.

Many members of the team who developed the original versions of Mosaic now work for Netscape Communications Corporation, a company which has developed the Netscape Web browser, which was estimated to account for around 70 percent of all the Web browsers in use in May 1995. Following Netscape, Microsoft launched a range of Internet browsers and servers.

A directory is, in general, an approach to organizing information, the most familiar example being a telephone directory. On the World Wide Web, a Internet search directory (also known as a web directory) is a subject guide, typically organized by major topics and subtopics. There are many Internet search directories, from the mega search directories such as Yahoo (www.yahoo.com) and Lycos (www.lycos.com) with millions of links to small niche directories such as South Asia Milan (www.samilan.com). These directories are structured as a multilevel tree of categories and subcategories, with website links, titles and possibly descriptions within subcategories, usually at the "leaf nodes" (final level subcategories).

There are several shortcomings with the implementations of such types of search directories. A web directory is typically compiled by listing any and all sites submitted for inclusion under a category by their webmaster. Quality assurance relating to the usefulness of a site to a visitor is usually either largely skipped or handled cursorily by the web directory administrator. Also, users of such directories are restricted to the categorization set once and for all by the webmaster. Because of this, users wishing to add sites to such directories are unable create their own custom category under which to put a new site.

SUMMARY OF THE INVENTION

A system, method and article of manufacture are provided for generating a prioritized network site directory. A link to a site on a network is generated. The site is then added to a site directory that includes a set of categories. The site is categorized into one of the categories of the site directory. The site is also ranked in the category.

In an embodiment of the present invention, the addition of the site to the site directory may also require the comparing of the site to pre-existing sites in the site directory and then generating a notification if the site matches one of the pre-existing sites of the site directory. In another embodiment of the present invention, categorizing of the site into one of the categories of the site directory may also include generating a table of sites where pre-existing site are ranked in the set of categories of the set directory and then determining whether the site exists in the table of sites. If the site already exists in the table of sites, the site may then be mapped to one of the categories of the set of categories. Further, if the site does not exist in the table of sites, the site may be searched for keywords relating to the categories of the set of categories.

In a further embodiment of the present invention, categorization of the site into one of the categories of the site directory may also include the selecting one of the categories into which the site is to be categorized and then comparing the selected category to the category to which the site is mapped. If the selected category does not match the category to which the site is mapped, then a notification may be generated.

In an aspect of the present invention, the site may be ranked in the category according to: the number of generated links to the site, the frequency that the site is accessed by selection of the generated links, and/or polling. In another aspect of the present invention, a mode of communication may be associated with one or more of the categories of the site directory.

In a further embodiment of the present invention, a sub-category may be created into which the site is categorized under one of the categories of the site directory. An added option to this embodiment, a creator identity may be assigned to the sub-category that includes information about a creator of the sub-category. In such an option, the creator of the sub-category may further be granted privileges such as recommending to accept or reject additional sites into and additional sub-categories under the sub-category, receiving information transmittals from users of site in the sub-category, and transmitting information to users of sites in the sub-category.

BRIEF DESCRIPTION OF THE DRAWINGS

The invention will be better understood when consideration is give to the following detailed description thereof Such description makes reference to the annexed drawings wherein:

FIG. 1 is a schematic diagram of a hardware implementation of an embodiment of the present invention;

FIG. 2 illustrates a flowchart for a method for generating a prioritized network site directory from user generated links to sites on a network in accordance with an embodiment of the present invention;

FIG. 3 is a schematic illustration illustrating the creation of an exemplary website directory derived from bookmarks submitted from users' online bookmark accounts in accordance with an embodiment of the present invention;

FIG. 4 is a schematic illustration of an exemplary embodiment of a website directory with sites categorized in user created and defined categories and subcategories in accordance with an embodiment of the present invention;

FIG. 5 is a schematic illustration of an exemplary website directory where the sites of a category are displayed with their rankings according to number of users who have the site bookmarked, frequency that the site is visited by users, and popularity determined by user voting in accordance with an embodiment of the present invention;

FIG. 6 illustrates an exemplary display of a online bookmark account page of a user in accordance with an embodiment of the present invention;

FIG. 7 illustrates tools displayed on a user's online bookmark account page in accordance with an embodiment of the present invention;

FIG. 8 illustrates an exemplary online bookmark account page with drop and drag capability in accordance with an embodiment of the present invention;

FIG. 9 illustrates a remote addition feature for adding bookmarks to a user's online bookmark account page in accordance with an embodiment of the present invention;

FIG. 10 illustrates an importation feature of an online bookmark account page for importing Internet browser bookmarks or favorites into the online bookmark account page in accordance with an embodiment of the present invention;

FIG. 11 illustrates a user's online bookmark account page and a public bookmark page derived from the online bookmark account page in accordance with an embodiment of the present invention;

FIG. 12 illustrates a direct addition of a bookmark to an online bookmark account page in accordance with an embodiment of the present invention;

FIG. 13 illustrates a remote addition of a bookmark to an online bookmark account page in accordance with an embodiment of the present invention;

FIG. 14 illustrates a Floating Link Adder pop-up window for adding bookmarks to an online bookmark account in accordance with an embodiment of the present invention;

FIG. 15 illustrates an online bookmark account and, in particular, features for creating a folder in accordance with an embodiment of the present invention;

FIG. 16 illustrates portion for an online bookmark account while deleting a bookmark or folder from the online bookmark account in accordance with an embodiment of the present invention;

FIG. 17 illustrates portion for an online bookmark account while moving a folder in the online bookmark account in accordance with an embodiment of the present invention;

FIG. 18 illustrates portion for an online bookmark account used for renaming a folder in the online bookmark account in accordance with an embodiment of the present invention;

FIG. 19 illustrates a display for automatic importing of bookmarks into a user's online bookmark account in accordance with an embodiment of the present invention;

FIG. 20 illustrates a display displayed upon a selection for exporting bookmarks from a user's online bookmark account in accordance with an embodiment of the present invention;

FIG. 21 illustrates a dialog box for a search feature for keyword searching of bookmarks in a user's online bookmark account in accordance with an embodiment of the present invention;

FIG. 22 illustrates a dialog box for a sort feature for sorting bookmarks in a user's online bookmark account in accordance with an embodiment of the present invention;

FIG. 23 illustrates a dialog box for a cleanup feature for checking for stale and duplicate bookmarks in a user's online bookmark account in accordance with an embodiment of the present invention;

FIG. 24 illustrates a portion of a frame of an e-mail feature of a user's online bookmark account in accordance with an embodiment of the present invention;

FIG. 25 illustrates a portion of a frame for making a user's private bookmarks public and a user's public bookmarks private in accordance with an embodiment of the present invention;

FIG. 26 illustrates a Float Window in accordance with an embodiment of the present invention;

FIG. 27 illustrates a Floating Link Adder Pop-up Window in accordance with an embodiment of the present invention;

FIG. 28 illustrates an exemplary display of a online bookmark account page of a user with a button for a recommended links feature in accordance with an embodiment of the present invention;

FIG. 29 illustrates a page displaying a list of popular sites displayed subsequent the selection of the recommended links feature in accordance with an embodiment of the present invention;

FIG. 30 illustrates a page displaying a list of users with public bookmarks in accordance with an embodiment of the present invention;

FIG. 31 illustrates an exemplary welcome page a particular user's public bookmarks in accordance with an embodiment of the present invention;

DETAILED DESCRIPTION OF THE INVENTION

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/

95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

User-Generated Internet Search Directory Based on User Online Bookmarks

Users surf the Internet at an ever increasing rate and webpages get added to the World Wide Web at an exorbitant rate. The ability to bookmark a webpage or website that a user found particularly useful is an invaluable aid to surfing the web efficiently. The value of a bookmark to the user who owns it is clear. But there is an additional value attached to the bookmarking of a site. A bookmark is the result of an analysis of and positive judgment on a website by a visitor interested in a particular interest topic. However, the knowledge that a site is good enough to be bookmarked is locked away in a user's private bookmark set. Creating a web directory where each category contains not just sites recommended for listing by webmasters, but sites taken from within Internet user's bookmarks sets, unlocks the knowledge hidden away in private bookmarks sets distributed across standalone computers worldwide. Users are be able to search via keyword or traverse the category hierarchy to get to bookmarks pertaining to their area of interest.

The present invention includes the following concepts for implementing a searchable web directories:

Search Domain: The domain of links/websites categorized in the directory comprising of users' bookmarks Dynamic restructuring: The user has the ability to create their own categories to best identify the location of their bookmark(s) within the web directory.

Site Ranking: Each bookmark may be ranked by: (a) the number of people who have bookmarked the site, and (b) the frequency of access to this site by the bookmarkers.

Category guides and owners: Each category created by the user as well as each link added by users from their bookmark set may be associated with the user's name, allowing users to find not only relevant sites but people with similar interests FIG. 2 illustrates a flowchart for a method 200 for generating a prioritized network site directory from user generated links to sites on a network (see operation 202). The site related to the link is added to a site directory that includes a set of categories in operation 204. The site is categorized into one of the categories of the site directory in operation 206 and also ranked in the particular category that it is placed under in operation 208.

Search Domain

FIG. 3 is a schematic illustration illustrating the creation of an exemplary website directory 300 of the present invention derived from bookmarks submitted from users' online bookmark accounts 302a, 302b, 302c. In the present invention, sites 304 added to the web directory 300 exist as bookmarks 306 in a user's bookmark set of the user's online bookmark account. Thus, the only people allowed to add links to the web directory are users who host their bookmarks or favorite sites in online bookmark accounts 302a, 302b, 302c on an online bookmark management server. This also helps to eliminate the "spamming" of the web directory by overzealous webmasters. A user first registers with the online bookmark management service and import their browser bookmarks, or favorite links off an existing webpage. Optionally, a user may create a fresh set of bookmarks in their server based bookmarks account. Once the user has a server side bookmark account set up and populated, the user may add part or all of the user's bookmarks to the web directory as represented in FIG. 3 by arrows 308a, 308b, and 308c. The user may choose manual or automatic categorization while adding part or all of their bookmark.

Manual Categorization

Under manual categorization, the user determines the category 310a, 310b, 310c under which to file a bookmark or a set of bookmarks. These bookmarks as well as the suggested categorization are reviewed by the directory's editorial staff for correctness of categorization. After this screening, the sites are made part of the directory under the user recommended category or a editor selected classification, and the user is notified.

Automatic Categorization

In automatic categorization, the user may specify which part of the user's bookmark set is to be included in the directory. All unique links in this set that do not already exist in the directory are then considered for addition under categories determined by the staff. With automatic categorization, the user does not have to determine and submit the appropriate categorization of the submitted bookmarks.

Website Addition

The website addition process may automated with at least two manners. First, an automatic filtering step may be executed to determine whether the submitted link already exists in the search directory. In this step, the submitted site is compared to pre-existing sites in the site directory to see if it matches one of the pre-existing sites of the site directory. As an option, if the user attempts to add a link manually under a category, the user may be alerted (by for example the generation of a notification to the user) when the link already exists in that category or even elsewhere in the directory. After such an alter, the user may be allowed a choice to proceed and submit the link. A final determination on whether to replicate links across categories may subsequently then be made by the editorial staff.

Second, in the determination of the right categorization, the editorial staff may be aided by a website profiling procedure. The website profiling algorithm will be similar to the interest clustering techniques detailed in the patent "Method and Apparatus User Preference Profiling and Transient Detection on Content and User Access of Web Bookmarks", filed separately.

Each bookmarked website submitted to the directory (manual or automatic submission) is looked up in a generated table of sites that have been ranked in a set of categories. This ranking is done using the interest clustering algorithm mentioned above. If the site exists in the table, its ranking is then mapped to the best category for it to be listed under. On the other hand, if the site does not exist in the table, the interest clustering engine is used to search the site on a variety of keyword baskets. Each keyword basket represents a particular interest category. The results from this search are then entered into the table of ranked sites and used to determine the final categorization of the site in the web directory. As an option, if the selected category does not match the category to which the site is mapped, then a notification may be generated. As a further option, manual inspection by the editorial staff may also be conducted as a double check of the categorization procedure.

Dynamic Restructuring

FIG. 4 is a schematic illustration of an exemplary embodiment of a website directory 300 of the present invention with sites 304 categorized in user created and defined categories 310a, 310b and subcategories 312a, 312b. In such an embodiment of the present invention, a sub-category may be created into which the site is categorized under one of the categories of the site directory. In adding niche and focused sites to a web directory, a major stumbling block has been the lack of flexibility for permitting users to make their own custom categories under which to add a favorite site. The present invention gives a user the ability to dynamically grow the hierarchical categorization tree. In the case of a bookmark based website directory, one of the underlying assumptions of such a search metaphor is that the user adding the bookmark has a keen interest in and some knowledge of the theme and/or subject of the bookmarked site.

In order to exploit this user knowledge properly, the user is allowed the option to grow the categorization tree by adding "nodes" or "subcategories" that best capture the category for the bookmarks they wish to add. Each added node may have the creator's ID (i.e., the user's online bookmarks account's username) and contain at least one site under it (i.e., users may not be able create an empty node). These features also create a dynamic interactive web directory. "Dynamic" here does not simply imply frequent addition of links, but frequent additions to the basic categorization structure.

These features may also be conducted under the manual inspection of the editorial staff. In such an embodiment, requests from a user to create a new node in the category tree may be queued for approval by an editor of the site directory. If the new sub-category is found to add value to the web directory, its addition is then finalized and included in the site directory.

Site Ranking

FIG. 5 is a schematic illustration of an exemplary website directory 300 of the present invention where the sites 304 of a category 310b of the website directory are displayed with their rankings according to number of users who have the site bookmarked 314, frequency that the site is visited by users 316 and popularity determined by user voting 318. A benefit of using bookmarked sites as a basis or domain for a web directory is that it creates two natural ranking metrics. As bookmarks are displayed in a category or as the result of a keyword search, they may be prioritized or ranked according the following metrics:

1. How often does a bookmark appear in online bookmark accounts 314 (i.e., how many users in the server side bookmarks community have bookmarked this site); and
2. How often do people who have bookmarked this site access the site from their account 316.

The more the bookmarks accounts in which a particular site appears, the higher it may be ranked in its interest category. Likewise if the traffic to one bookmarked site is much higher than others that belong in the same interest category, the high traffic site may be ranked above (and possibly placed above in a search result or category listing page) the other sites. This may greatly increases the utility of the web directory. It may also be an important way to exploit the knowledge that is locked up in user bookmarks. Not only are the sites that are interesting enough to have been bookmarked by users simply displayed, but the sites are displayed in a manner for users of the site directory to differentiate which may be more relevant and content/information rich from among a pool of sites displayed in a particular category.

As an option, an additional ranking mechanism may also be built into the site directory by allowing users to vote on the usefulness of any site 318. In such an embodiment, all three ranks may be displayed alongside the particular link to allow users to have the option to prioritize their selection of a link on the search page by: (a) number of people who have it bookmarked, (b) traffic frequency or (c) voting results.

Category Guides and Owners

When a user adds a site 304 or creates a new subcategory 312a, 312b, they may be given the option to assign their identity (i.e., their username to their online bookmarks account) to the added category or site. As a further option, the user may also be granted additional privileges as creators of a new category, such as the right to recommend to accept or reject new sites/subcategories under the new category (with or without a further safeguard option of leaving the final determination with the directory editors). This option adds a dimension of interactivity and expertise to the web directory. With such an option, users of the site direction are able to find not only relevant websites but also users with similar or identical interests.

The site directory's users may also be allowed to send information transmittals such as an instant message or e-mail to these "experts" or guides whose username is associated with the particular category or link they entered into the directory. With such a feature, the online bookmarks accounts of these guides may also include features that give them the capacity to receive these communiques and transmit replies back to sender. As a further option, associated with each category may be a forum or chat room where users with like interests are allowed to communicate with each other.

Online Bookmarks Managing System

The following portion of the present specification is included to provide further clarification to various aspects and portions of the present invention through discussion of exemplary embodiments of the present invention. In particular, the following portion of the present specification includes further information regarding the user and maintenance an online bookmarks managing system and user online bookmark accounts of the system.

In an embodiment of the present invention, as soon as a user signs up, the user may be set up with a personal, password-protected, web-based online bookmark account.

Every time the user accesses the Internet, wherever the user is, the user is able to sign in and see the user's complete bookmarks selection. No matter what browser, no matter which operating system, the user's favorite links are there via the user's online bookmark account for the user to use.

FIG. 6 illustrates an exemplary display of a online bookmark account page 600 of a user. This exemplary page 600 has a central area 602, a left menu bar 604 and a top menu bar 606. Also displayed may be a bookmark adding area 608.

With continuing reference to FIG. 6, in this exemplary embodiment of the present invention, the icon 610 with the circle in the middle located in the central area 602 is used to represent a bookmark (also known as a favorite, a link, or a shortcut) of the user. A bookmark is a saved link to a web site that, when selected, accesses the linked website. Next to this icon 610 may be a text 612 providing further indication of the site to which the particular bookmark provides a link to.

In this exemplary embodiment, the icon 614 similar to a folder is the icon for a folder in which a user may organize their bookmarks. A folder's usage is similar to the use of directories in a computer's desktop: namely, to allow a user to group similar items together. These icons are similar to a closed folder when the contents of the folder are not being displayed. A user may view the contents of the folder by clicking on the "+" sign 616 to the left of the closed folder icon. This changes the icon to an "open folder" icon, the "+" sign to "−" sign 618, and displays the contents of the folder. A user may then close the folder by clicking on the "−" sign to the left of the open folder. This will close the folder once again.

When folder icons 614 are present, bookmark icons 610 may appear under the folder in which it is stored. Note that the display uses various levels of indentation and connecting lines 620 to indicate the specific folder under which the bookmark is filed.

Accessing Links/Bookmarks

How to Use/access Bookmarks

To visit the bookmarked site, a user clicks on a bookmark icon 610. Clicking on the bookmark icon will open up a new window and take the user to the bookmarked site. To return to the bookmark list, a user may either close the new window that had opened up or the user may switch back to the browser window with the a session of the present invention active.

Displaying Bookmarks

To allow users unlimited bookmarks and to present them more efficiently, bookmarks may be broken up and displayed in separate pages. In an illustrative embodiment, a default of approximately 250 bookmarks may be displayed on each page. A user may change the number of bookmarks they want displayed on each page. To do so, the user clicks on the User Options button 622 displayed on the online bookmark account page 600 (see FIG. 6) and make changes in "View Size" form that is subsequently displayed.

Accessing Bookmarks of a User Account from Another Computer

As a web-based bookmarks service, the present invention may be available from any computer connected to the Internet. This enables a user to access, and edit their bookmarks from anywhere in the world. A user does not need to login from the same computer every time the user wishes to use their bookmarks to browse the Internet. Nor does a user need to sign up again or transfer any files when they switch computers.

Managing Links

FIG. 7 illustrates tools displayed on a user's bookmark page 600 of the present invention that are included to help a user manage their bookmarks. Some examples include:

- add, delete, or rename functions 702, 704, 706;
- a move function 708 for organizing a user's links;
- duplicate or stale (i.e. broken or inactive) bookmark detectors;
- search and sorting functions 710, 712 to help a user find bookmarks that the user may be looking for; and
- an e-mailing function 716 for transmitting information utilizing a network.

Drag & Drop Functionality

In embodiments of the present invention with such a this feature, the pains associated with managing information online may be reduced. With reference to FIG. 8, users may click, drag and drop their bookmarks 610 (and folders 614) to move them anywhere within their account. One-touch management of links, folders and link properties to make the user's life easier. Select one link 610 or more to display a box 806, choose the appropriate function 808a, 808b, 808c, 808d from the box and the function is then executed.

Remote Addition

With particular reference to FIG. 9, a user may also add bookmarks to their online bookmark account without even being on the online bookmark provider's webpage by using an "Adding Bookmarks Remotely" feature 902 that may be included on a user's web browser 900. This feature lets a user add links while surfing on the internet by clicking on the function 902 as shown in FIG. 9.

Accessing Bookmarks Added through the "Adding Bookmarks Remotely" Feature

All the URLs that users add to their current online bookmark account through the "Adding Bookmarks Remotely" feature may be stored in their online bookmark account and are accessible from any computer on the Internet, just like all their other bookmarks in their online bookmark account. When a user wishes to bookmark a particular page using this function, the user first accesses the particular page through their browser. Once the user is thereat the particular page, the user may add a bookmark remotely by clicking on, for example, the ADD2My_Stuff favorite/bookmark in their current browser. The URL of the particular page is then stored in their My_Stuff folder.

Import/Export Bookmarks

A user may import their current Netscape "Bookmarks" or Internet Explorer "Favorites" directly into their online bookmarks account 600. The user may either add them to the online bookmark provider's default list of bookmarks, or replace the links with the imported links 1000 as shown in FIG. 10. This way, the user may import from multiple sources, whenever they want, and even however many times they want.

Sharing Bookmarks

A user may also be able to choose to share their bookmarks with friends—or any surfer by:

- e-mailing links to others; and
- setting selected bookmarks as public. As best illustrated in FIG. 11, this feature lets users publish their own Internet directories at the touch of a button. Users may choose the links they wish to set as public from their bookmarks 600 and publish them on the Internet 1100.

Add Links/Folders

A user may add links to their account in three ways:

- adding directly (from the account page);
- adding links remotely; and
- adding links through a pop-up window.

Adding Directly

With reference to FIG. 12, a user may add bookmarks by typing the URL (web site address) into the box 1200 next to "New Link" and then clicking on "Add" 702. A user may add folders in the same way, by typing the new folder's name into the box 1204 next to "New Folder" and then clicking on "Add" 702. Both new bookmarks and new folders may be placed inside other folders. A user may do this by clicking on the down arrow 1206 on the "choose location of new url/folder" box 1208 and selecting the folder 1210 users want to move the new item into.

Adding Links Remotely

A user does not have to be in their account to add bookmarks. Users may actually add them while they surf the Internet. First, the user needs to set up the Adding Links Remotely function. With reference to FIG. 13, once the Adding Bookmarks Remotely function is set up, the user may see a new bookmark called "Add2Clickmarks" 1300 on their browser 1302. This means that the Netscape Bookmarks list or their Internet Explorer Favorites list will have this new "Add2Clickmarks" bookmark. While a user surfs the Internet, if the user finds a web site he or she wants to add to their account, the user just clicks on the browser bookmark called "Add2Clickmarks" and the site will be automatically added to their online bookmark account.

Adding Links through a Pop-Up Window

To add links to a user account without coming back to the user account page, a user may use the Floating Link Adder pop-up window 1400 which is illustrated in FIG. 14. This feature is useful when using the present invention from a computer that is not the user's regular workstation.

With reference to FIG. 7, a Floating Link Adder button 722 may be clicked on from a user account page for displaying of the Floating Link Adder pop-up window 1400 illustrated in FIG. 14. In the pop-up window 1400, the user may then input in box 1402 the URL that they want to add. By default, the new link will be added to the top level folder in the user's account. The user may also choose the specific folder that users want the new link to be added to by selection of a folder displayed in box 1404. Clicking on the Add URL button 1406 adds the link to the user's account.

Add & Manage Folders

Creating a Folder

With reference to FIG. 15, to create a folder, a user may first type the name of the folder the user wants to be created in "New Folder" space 1204 in the bookmark adding area 608. The user may then click on the "Add" 702 to created the new folder. When their folder is created, the new folder is displayed with the other folders of the user in the central area 602.

Creating Folders within Folders

Users may nest folders within folders if so required. To create a new folder within an existing folder, a user may first choose the destination folder from the drop-down menu labeled "File Under" located above their displayed bookmarks of the page. This will ensure that the new folder the user creates will be placed in the folder that the user has chosen. The user then types the name of the folder the user wants to be created in the space to the right of the button titled "New Folder" and then clicks on the "New Folder" link in the top navigation bar. When their folder is created, the user should see that it has been added to their list of current folders.

Undeleting Bookmarks/folders

A user may undo the effects of the last editing step that the user took off their page. To do so, the user clicks on the "undo" button 724 in the left menu bar 604 (see FIG. 7). This will undo the effect of the last step that the user had executed. Note that undo feature may be used only for the last edit step that the user took. Clicking on undo the second time may redo the step that users had undone.

Viewing the Contents of a Folder

If the contents of their folders are not already visible, click on the "+" sign 616 next to the left of the icon and name of the folder (see FIG. 6). Note that the icon should represent a closed folder, and the sign next to it should be a "–" sign 618 when the list of bookmarks and folders within this folder is not being displayed. Clicking on the "+" to the left of the closed folder icon should change that icon to an open folder icon, a "+" sign to a "–" sign , and should display the contents of that particular folder including all the bookmarks and folders. To view the contents of any one of the folders within the current folder, click on the "+" sign to the left of the folder icon and the folders contents will be displayed as well.

Hiding Contents of a Folder

If the contents of their folders are being shown, click on the "–" sign 618 next to the left of the icon and name of the folder. Note that the icon should represent an open folder, and the sign next to it should be a "+" sign when the list of bookmarks and folders within this folder is being displayed. Clicking on the – to the left of the open folder icon should change that icon to a closed folder icon, a "–" sign to a "+" sign, and should hide the contents of that particular folder. To hide the contents of any folder within an open folder, just click on the "–" sign to the left of the folder icon. Doing so will hide the contents of this folder from the current display.

Editing Links/Folders

Users may edit their bookmarks with a single click in their user accounts. This may be accomplished by choosing the links that the user wants to edit and then pressing the button corresponding to the desired function. In an embodiment of the present invention, the user may choose to:

delete links and folders;

move links and folders; and rename links and folders.

Deleting Links/Folders

With reference to FIG. 16, there may be two ways to delete links or folders in the drag and drop embodiment of the present invention:

Selection of the link(s)/folder(s) by highlighting them 1600 and then using the "delete" button 704 on the left menu bar. The chosen bookmarks are then removed immediately; and/or Clicking on the link/folder so that it is highlighted and then right-clicking a mouse-type input device. From the drop-down menu that appears upon the right-click "delete" is then chosen. The links/folders are then removed from the account immediately.

Moving Links/Folders

With reference to FIG. 17, to move links/folders within an account, a user first selects the link(s)/folder(s) by highlighting them 1700 with their mouse-type input device. As an option, the user may also use the Ctrl and Shift keys to make multiple selections as in the windows desktop environment. The selections may then be moved 1702 by holding down the left-click button on the mouse which may then be released wherever the user wishes the links to be placed. As an option, to move within a folder, release of the left-click button may be done when the destination folder is highlighted.

Renaming Links/Folders

There may be two ways a user may rename links or folders in a drag and drop embodiment of the present invention. To rename links/folders within a user account, the individual link/folder is selected by highlighting it with an input device such as a mouse-type input device. As an option, a user may not be able to rename multiple selections in one operation.

In one embodiment, upon right-clicking on the link with the user's mouse displays a drop down menu with a rename selection. The choosing of the rename selection from the drop down menu. The title will be replaced by a rename box into which a new title for the link may be entered. With reference FIG. 18, as another option, once the link/folder is highlighted, clicking on rename selection 706 from the left hand menu bar displays a drop down menu with a rename selection which, upon selection, replaces the title box with a rename box into which a new title for the link may be entered.

Importing Bookmarks

A user may import Netscape "Bookmarks" or Internet Explorer "Favorites" directly into their user account. A user may either add them ("append" them) to the user's current list of bookmarks, or the user may "overwrite" the user's current list with the ones that the user imports. In an exemplarily embodiment of the present invention importation may be accomplished with the following steps: (1) Go to the "Import/Export" box 714 on the top panel (see FIG. 7); and then (2) Select either "automatic" or "manual" to indicate how to import the bookmarks.

Automatic Importing Bookmarks

Automatic Import allows a user to import bookmarks automatically from their desktop browser. Once automatic import is selected, a Java Applet will load. Note that it may take a little time to do that. Once the applet is loaded, the user may be asked via a dialog box 1900 to select the browser as illustrated in FIG. 19. The user then may choose whether they want to overwrite or append to the existing bookmarks with the selection 1902. The bookmarks may then be imported immediately.

Manually Importing Bookmarks

In an exemplary embodiment of the present invention, to manually import bookmarks, a user first selects the Import/Export button 714 displayed on the top control menu bar on the user account page. The user then follows the following instructions corresponding to the particular browser the user is using:

Importing from the Netscape Browser

In the Netscape browser, select Bookmarks from the top menu.

Click on Edit Bookmarks.

A new window will open up with all of the user's bookmarks visible therein.

From the bookmarks editing window select Save As from the File menu.

This will save the user's bookmarks file in the directory users specify.

Enter the desired file name.

Note the path to the file by clicking on the select arrow next to the Save in: field.

Also note the bookmark file name.

Now return to the Bookmarks Import page in their online bookmark account.

Use the Browse button given on the page to locate the bookmarks file that the user created and saved in the previous steps, outlined above.

Select the bookmarks file.

Press Submit.

The bookmark file will be imported into their online bookmark account.

Importing from the Internet Explorer IE.5

A user first converts their Microsoft favorites to an HTML file.

On the user's browser, go to the File menu and select Import and Export.

Choose Export Favorites when it gives the Import/Export Selection window.

Click Next until users get to the Export Favorites Destination.

Select Export to a File or Address and enter:

C:\My Documents\clickmarks.html

Click Next and then click on Finish.

In the text field of the Browse button on the Import page, type C:\My Documents\clickmarks.html If the user has saved it on some other place and named it something else, then type that in.

Click on Submit Options.

Return to the Bookmarks Import page in their online bookmark account.

Use the Browse button given on the page to locate the bookmarks file that users created and saved in the previous steps, outlined above.

Select the bookmarks file.

Press Submit.

The user's bookmark file is then be imported into their online bookmark account.

Exporting Bookmarks/Favorites

The present invention also enables users to export their bookmarks/favorites back to the desktop browser. A method that a user may use to export the bookmarks from their user account back to their Netscape or Internet Explorer browser is described as follows: (1) Choose "Import/Export" 714 from the top menu bar (see FIG. 7) to display a page with a "Export Your Bookmark" selection. Upon selection of this selection, a set of instructions 2000 are displayed as illustrated in FIG. 20 which a user may then follow to export their bookmarks.

Export Bookmarks into to Netscape

To export to Netscape, click on the Import image. From the import page click on the "export their bookmarks" link. Follow the Exporting To Netscape Bookmarks steps. In the two step process users first view the Netscape style bookmarks as an HTML file, then save the file on their local drive.

Export Bookmarks to Internet Explorer

To export to Internet Explorer, click on the Import image. From the import page click on the "export their bookmarks" link. Follow the Exporting To IE Favorites steps. In the three step process users first view and save their online bookmark account as Netscape style bookmarks. The final step requires users to convert the saved Netscape bookmarks file to Internet Explorer favorites using a freely downloadable Microsoft utility.

Managing Bookmarks

The present invention may also provide a user with functions to help the user manage their account. A user may "Sort" their links, "Search" their bookmarks for keywords, and/or "Clean Up" their user account by removing stale and duplicate links.

Search

A user may search through their bookmarks for keywords. In an embodiment of the present invention, this may be accomplished by first clicking on the "Search" button 710 on the left menu bar (see FIG. 7) so that a search dialog box 2100 is displayed as depicted in FIG. 21. A keyword(s) may then be entered in the keyword box 2102 and then search area may be chosen for those words by clicking on the down arrow 2104 next to "Search the" 2106 and selecting either Site Title 2108, Site Summary 2110, Site URL 2112, or All Three 2114. A user may also select whether they want to search for links that contain ALL of the keywords or for links that contain ANY of the keywords. To execute the search, the Search Bookmarks button 2116 is then selected.

In an embodiment of the present invention, the search process may display all of the bookmarks in their current bookmark files corresponding to the search keywords that users have entered. In such an embodiment, there may be no limit to the number of bookmarks that will be displayed as a result of their search.

Sorting

A user may sort their bookmarks in several orders. In an embodiment of the present invention, this may be accomplished by first clicking on the Sort button 712 on the left menu bar 604 (see FIG. 7) to display a Sort screen 2200 as illustrated in FIG. 22. The Sort screen 2200 may display a plurality of sort order choices 2202, 2204, 2206 that a user may select to choose the sort order they users want. Once a sort order is select, the user may then click on Sort button 2208 to execute the sort function.

In one embodiment, when the alphabetical sort is selected, the bookmarks may be sorted by the first word in the description that appears to the right of the icon for the bookmark. When a sorting by date of creation (newest to oldest) is selected, the bookmarks may be sorted such that the bookmarks most recently created appear first. When a sorting by date of creation (oldest to newest) is selected, the user's bookmarks may be sorted so that the bookmarks most recently created appear last.

Checking for Duplicates or Stale Links

In one embodiment of the present invention, a cleanup feature 2300 may be included in the left menu bar of the user's online bookmark account 600 to check for duplicate or stale links. Upon selection of the cleanup feature, a cleanup bookmarks screen 2302 may be displayed as illustrated in FIG. 23. This screen 2302, may display two buttons: a "Check Duplicates" button 2304 and "Check Stale" button 2306.

Selection of the "Check Duplicates" button 2304 executes the duplicate bookmark checking function which checks the user's bookmark collection for duplicate bookmarks and then displays a list of any duplicated bookmarks. The user may then be given an option to delete the duplicate bookmarks from their bookmark collection. The duplicate bookmark checking function helps users remove duplicate links from their accounts. Organizing bookmarks into different folders and sub-folders increases the difficulty of keeping track of duplicate bookmarks within their bookmark files. By comparing all the bookmarks and their titles/summaries stored, the bookmark management system identifies duplicate bookmarks stored in an user's online bookmark account, regardless of the folders that they may be stored in and the different titles that they may exist with. A user may therefore remove all the duplicate links that might lead to the same URL. This may be also useful in removing bookmarks that point to old locations of sites, although users may already have the correct updated URL in their files.

Selection of the "Check Stale" button 2306 executes the stale bookmark checking function which checks the user's bookmark collection for old or stale bookmarks (i.e., bookmarks that are broken or have moved) and then displays a list of any stale bookmarks in the user's bookmark collection. The user may then be provided the options of Renaming, Deleting, or Doing Nothing with the listed stale bookmarks. The stale bookmark checking function helps a user remove bookmarks that have expired since the user last used them.

E-mailing Bookmarks

This feature provides a handy way for a user to e-mail a their bookmarks to friends without having to cut and paste the URLs into e-mail messages. As best illustrated in FIG. 24, this function may be accomplished by first selecting all the bookmarks and folders 2400 to be e-mailed (multiple selections may be made using the Ctrl and Shift keys as in a windows desktop environment) and then selecting the mail button 716 displayed on the user's bookmark account page (see FIG. 7). Upon selection of the mail button 716, an e-mail screen 2402 may then be displayed into which a sender's and receiver's e-mail addresses may be entered in the appropriate boxes 2404, 2406. As an option, a message box 2408 may also be included for permitting the adding of a note to accompany the links. A "send" button may also be included for executing the transmission of the e-mail.

Making Bookmarks Public

In one embodiment of the present invention a user's account and all the bookmarks in it may be private by default. However, if a user wants to share certain bookmarks or folders with other users, the user may opt to make their bookmarks public. Also, if the user has already made certain links public, the user may also use this function to make their public bookmarks private again. In one such embodiment of the present invention, this feature may be carried out by first selecting a "Setup Public" button 718 on the left menu bar (see FIG. 7) to display a list 2500 of the user's bookmarks and folders 2502 as illustrated in FIG. 25. Also displayed with the list adjacent each bookmark and folder is a checkmark box 2504. To select which bookmarks/folders are to be made public, the user clicks on the checkmark boxes next to the bookmarks or folders the user wants to make public so that a checkmark 2506 appears in the selected checkmark box. The user then clicks on a "Submit" button 2508 also displayed with the list to execute the public function which then displays the selected bookmarks is a public bookmark screen/page.

To make a public link private again, a user may click on the checkmark box next to the particular link and then select a box 2510 above the "Submit" button and then click on "Submit" to execute the public function to remove from display the selected bookmark(s) from the public bookmark screen/page.

Floating Windows

The "Float Window" button 720 on the left menu bar (see FIG. 7) displays up a miniature version (i.e., "floating window") 2600 of the user's online bookmark account page as illustrated in FIG. 26. This floating window 2600 gives the user a view of the user's account while surfing on the Internet and permits the user to add new bookmarks to their account. This window displays a user's links without most of the other controls found on their full size account page Having a smaller window open frees up monitor space and may be optimal for a user if the user is not actively managing their bookmarks. A user may return to their main user page by clicking on the "Go To Home & Close" link 2602. Two other controls may also be included to allow a user to refresh the page ("Reload" 2604), and to simply close the window "Close" 2606).

Floating Link Adder

The "Floating Link Adder" button 722 on the left menu bar (see FIG. 7) pops up a window 2700 as illustrated in FIG. 27 that lets a user add and file bookmarks to their user account while they are surfing the Internet without having to return to their online bookmarks account page. To add a bookmark with this window, a user simply types the web site address in box 2702 and clicks on "Add URL" 2704 to execute this function and add a bookmark for this site to the user's account. A user may also choose which folder the user wants the bookmark to go into by using the "File Under" pull-down menu 2706.

Recommended Links

As illustrated in FIG. 28, an embodiment of the present invention may include a "Recommended Links" feature 2800 in the left menu bar 604 of a user's online bookmark account page 600. Upon selection of the Recommended Links feature, a page may be displayed as illustrated in FIG. 29 that displays a list of popular sites 2900 which other users may have found useful. In such an embodiment, the bookmark management system may track popular links in many interest categories. These recommended links may be organized by various categories. A user may select any of these links to add to their account. A user may also choose which folder in their account page into which the recommended links are stored. As a further option, users may also be able choose to inform the bookmark management system that they do not wish to receive any future recommendations for a given interest category. In

Public Bookmarks Feature

The present invention may also include a public bookmarks feature which lets users publish their own Internet Directories for the whole world to browse. As illustrated in FIG. 30, accessing this feature displays a list of users with public bookmarks 3000 that comprises, for example, a list of user name links 3002 in alphabetical order. Upon selection of one of the user name links, a welcome page 3100 for that particular user's public bookmarks may then be displayed as illustrated in FIG. 31. This welcome page may display all of the bookmarks 3102 and folders 3104 that have been made public by that particular user and which are therefore accessible to any user upon selection.

Security

In an embodiment of the present invention, every online bookmark account may be password protected. This means that users must begin by logging into their account, unless the users have opted for an auto-login feature. Logging into a user account in such an embodiment is possible only by users correctly entering an associated Login ID and password. In one such embodiment, a user may use between 3 to 20 characters for their login ID while there may be no restriction on the length of the user's password length. Cookies may also be used to identify users.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for generating a prioritized network site directory, comprising the steps of:
   (a) generating at least one link to a site on a network;
   (b) adding the site to a site directory having a set of categories comprising at least one category;
   (c) categorizing the site into one of the categories of the site directory;
   (d) ranking the categorized site in the category;
   (e) creating a sub-category into which the site is categorized;
   (f) assigning a creator identity to the sub-category that includes information about a creator of the sub-category; and
   (g) granting the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

2. A method as recited in claim 1, wherein the step of adding the site to the site directory further comprises the steps of: comparing the site to pre-existing sites in the site directory; and generating a notification if the site matches one of the pre-existing sites of the site directory.

3. A method as recited in claim 1, wherein the step of categorizing the site into one of the categories of the site directory further comprises the steps of: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

4. A method as recited in claim 3, wherein the step of categorizing the site into one of the categories of the site directory further comprises the step of searching the site for keywords relating to the categories of the set of categories if the site does not exist in the table of sites.

5. A method as recited in claim 3, wherein the step of categorizing the site into one of the categories of the site directory further comprises the steps of: selecting one of the categories into which the site is to be categorized; comparing the selected category to the category to which the site is mapped; and generating a notification if the selected category does not match the category to which the site is mapped.

6. A method as recited in claim 1, wherein the site is ranked in the category according to a type of ranking based on at least one of: the number of generated links to the site, the frequency that the site is accessed by selection of the links, and polling.

7. A method as recited in claim 6, further comprising the step of allowing a user to specify the type of ranking applied to the category, wherein the sites in the category are displayed according to the user-selected type of ranking.

8. A method for generating a prioritized network site directory, comprising:
   (a) generating at least one link to a site on a network;
   (b) adding the site to a site directory having a set of categories comprising at least one category, each category including a plurality of links;
   (c) categorizing the site into one of the categories of the site directory;
   (d) ranking the categorized site in the category;
   (e) displaying the links in the category according to rank, the links including the at least one generarted link;
   (f) displaying an identity of the creator of the at least one generated link to a second user upon display of the links to the second user;
   (g) allowing the second user to send an information transmittal to the creator of the at least one link;
   (h) creating a sub-category into which the site is categorized;
   (i) assigning a creator identity to the sub-category that includes information about a creator of the sub-category; and
   (j) granting the creator of the sub-category at least one privilege selected from a group consisting of: recommending to accept or reject additional sites into and additional sub-categories under the sub-category, receiving information transmitals from users of the site into the sub-category, and transmitting information to users of sites in the sub-category.

9. A method as recited in claim 8, wherein the information transmittal is selected from a group consisting of: an electronic mail message and an instant message.

10. A method as recited in claim 8, further comprising the step of associating a mode of communication with the category; the mode of communication being selected from a group consisting of: a forum and a chat room.

11. A method as recited in claim 8, wherein the step of adding the site to the site directory further comprises: comparing the site to pre-existing sites in the site directory; and generating a notification if the site matches one of the pre-existing sites of the site directory.

12. A method as recited in claim 8, wherein categorizing the site into one of the categories of the site directory further comprises: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

13. A method as recited in claim 12, wherein categorizing the site into one of the categories of the site directory further comprises searching the site for keywords relating to the categories of the set of categories if the site does not exist in the table of sites.

14. A method as recited in claim 12, wherein categorizing the site into one of the categories of the site directory further comprises: selecting one of the categories into which the site is to be categorized; comparing the selected category to the category to which the site is mapped; and generating a notification if the selected category does not match the category to which the site is mapped.

15. A method as recited in claim 8, wherein the site is ranked in the category according to a type of ranking based on at least one of: the number of generated links to the site, the frequency that the site is accessed by selection of the links, and polling.

16. A method as recited in claim 15, further comprising allowing a user to specify the type of ranking applied to the category, wherein the sites in the category are displayed according to the user-selected type of ranking.

17. A computer program embodied on a computer readable medium for generating a prioritized network site directory, comprising:

(a) a code segment that generates at least one link to a site on a network;

(b) a code segment that adds the site to a site directory having a set of categories comprising at least one category, each category including a plurality of links;

(c) a code segment that categorizes the site into one of the categories of the site directory;

(d) a code segment that ranks the categorized site in the category;

(e) a code segment that displays the links in the category according to rank, the links including the at least one generated link;

(f) a code segment that displays an identity of the creator of the at least one generated link to a second user upon display of the links to the second user;

(g) a code segment that allows the second user to send an information transmittal to the creator of the at least one link.

(h) a code segment that creates a sub-category into which the site is categorized;

(i) a code segment that assigns a creator identity to the sub-category that includes information about a creator of the sub-category; and (j) a code segment that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

18. A computer program as recited in claim 17, further comprising a code segment that grants the creator of the sub-category at least one of the privileges consisting of: recommending to accept or reject additional sites into and additional sub-categories under the sub-category, receiving information transmittals from users of site in the sub-category, and transmitting information to users of sites in the sub-category.

19. A system for generating a prioritized network site directory, comprising:

(a) a logic that generates at leasat one link to a site on a network;

(b) a logic that adds the site to a site directory having a set of categories comprising at least one category, each category including a plurality of links;

(c) a logic that categorizes the site into one of the categories of the site directory;

(d) a logic that ranks the categorized site in the category;

(e) a logic that displays the links in the category according to rank, the links including the at least one generated link;

(f) a logic that displays an identity of the creator of the at least one generated link to a second user upon display of the links to the second user;

(g) a logic that allows the second user to send an information transmittal to the creator of the at least one link;

(h) a logic that creates a sub-category into which the site is categorized;

(i) a logic that assigns a creator identity to the sub-category that includes information about a creator of the sub-category; and (j) a logic that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

20. A method for generating a prioritized network site directory, comprising the steps of:

(a) generating at least one link to a site on a network;

(b) addting the site to a site directory having a set of categories comprising at least one category, each category including a plurality of links;

(c) comparing the site to pre-existing sites in the site directory;

(d) generating a notifiation if the site matches one of the pre-existing sites of the site directory;

(e) categorizing the site into one of the categories of the site directory, wherein the step of categorizing the site into one of the categories of the site directory further comprises the step of:

i. generating a table of sites, wherein the table of sites comprises at least one pre-existing site ranked in the set of categories of the set directory;

ii. determining whether the site exists in the table of sites;

iii. mapping the site to one of the categories of the set of categories if the site exists in the table of sites;

iv. searching the site for keywords relating to the categories of the set of categories if the site does not exist in the table of sites;

v. selecting one of the categories into which the site is to be categorized;

vi. comparing the selected category to the category to which the site is mapped;

vii. generating a notification if the selected category does not match the category to which the site is mapped;

(f) ranking the categorized site in the category, whrein the site is ranked in the category according to a type of ranking based on at least one of: the number of generated links to the site stored in online bookmark accounts, the frequency that the site is accessed by selection of the links, and polling;

(g) allowing a user to specify the type of ranking applied to the category, wherein sites in the category are displayed according to the user-selected type of ranking;

(h) displaying the links in the category according to rank, the links including the at least one generated link;

(i) associating an identity of a creator of the at least one link with the at least one generated link;

(j) displaying the identity of the creator to a second user upon display of the links to the second user;

(k) allowing the second user to send an information transmittal to the creator of the at least one link, wherein the information transmittal is selected from a group consisting of: an electronic mail message and an instant message;

(l) creating a sub-category into which the site is categorized;

(m) assigning a creator identity to the sub-category that includes information about a creator of the sub-category;

(n) granting the creator of the sub-category at least one privilege selected from a group consisting of: recommending to accept or reject additional sites into and additional sub-categories under the sub-category, receiving information transmittals from users of site in the sub-category, and transmitting information to users of sites in the sub-category; and (o) associating a mode of communication with the category, the mode of communication being selected from a group consisting of: a forum and a chat room.

* * * * *

UNITED STATES PATENT AND TRADEMARK OFFICE
CERTIFICATE OF CORRECTION

PATENT NO.         : 6,546,393 B1
APPLICATION NO.    : 09/414992
DATED              : April 8, 2003
INVENTOR(S)        : Umair Khan It is certified that error appears in the above-identified patent and that said Letters Patent is hereby corrected as shown below:

Please delete Patent No. 6,546,393 B1 in its entirety and insert Patent No. 6,546,393 B1 in its entirety as attached.

This certificate supersedes the Certificate of Correction issued December 25, 2012 and March 19, 2013.

Signed and Sealed this
Twenty-fourth Day of September, 2013

Teresa Stanek Rea
*Deputy Director of the United States Patent and Trademark Office*

(12) United States Patent
Khan

(10) Patent No.: US 6,546,393 B1
(45) Date of Patent: Apr. 8, 2003

(54) SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

(75) Inventor: Umair Khan, Fremont, CA (US)

(73) Assignee: Clickmarks, Inc., Fremont, CA (US)

(*) Notice: Subject to any disclaimer, the term of this patent is extended or adjusted under 35 U.S.C. 154(b) by 0 days.

(21) Appl. No.: 09/414,992

(22) Filed: Oct. 7, 1999

(51) Int. Cl.⁷ .................................................. G06F 17/30
(52) U.S. Cl. ........................................ 707/10; 709/203
(58) Field of Search ............................ 707/501, 1, 203, 707/201, 4, 10; 709/203

(56) References Cited

U.S. PATENT DOCUMENTS

| | | | | |
|---|---|---|---|---|
| 6,032,162 A | * | 2/2000 | Burke | 707/501 |
| 6,163,778 A | * | 12/2000 | Fogg et al. | 707/10 |
| 6,314,423 B1 | * | 11/2001 | Himmel et al. | 707/10 |
| 6,321,228 B1 | * | 11/2001 | Crandall et al. | 707/10 |
| 6,324,566 B1 | * | 11/2001 | Himmel et al. | 709/203 |

OTHER PUBLICATIONS

Keller et al. "A Bookmarking Service for Organizing and Sharing URLs," Computer Networks and ISDN Systems. vol. 29, No. 8–13, pp. 1103–1114, Sep. 1997.*
Maarek et al. Automatically Organizing Bookmarks Per Contents; Computer Networks and ISDN Systems; vol. 28, No. 7–11, pp. 1321–1333, May 1996.*

* cited by examiner

*Primary Examiner*—Charles Rones
(74) *Attorney, Agent, or Firm*—Silicon Valley IP Group, LLC; Dominic M. Kotab

(57) ABSTRACT

A system, method and article of manufacture are provided for generating a prioritized network site directory. A link to a site on a network is generated. The site is then added to a site directory that includes a set of categories. The site is categorized into one of the categories of the site directory. The site is also ranked in the category. Sub-categories may also be created into which the site is categorized under one of the categories of the site directory. The site may additionally be ranked in the category according to: the number of generated links to the site, the frequency that the site is accessed by selection of the generated links, and/or polling.

20 Claims, 30 Drawing Sheets

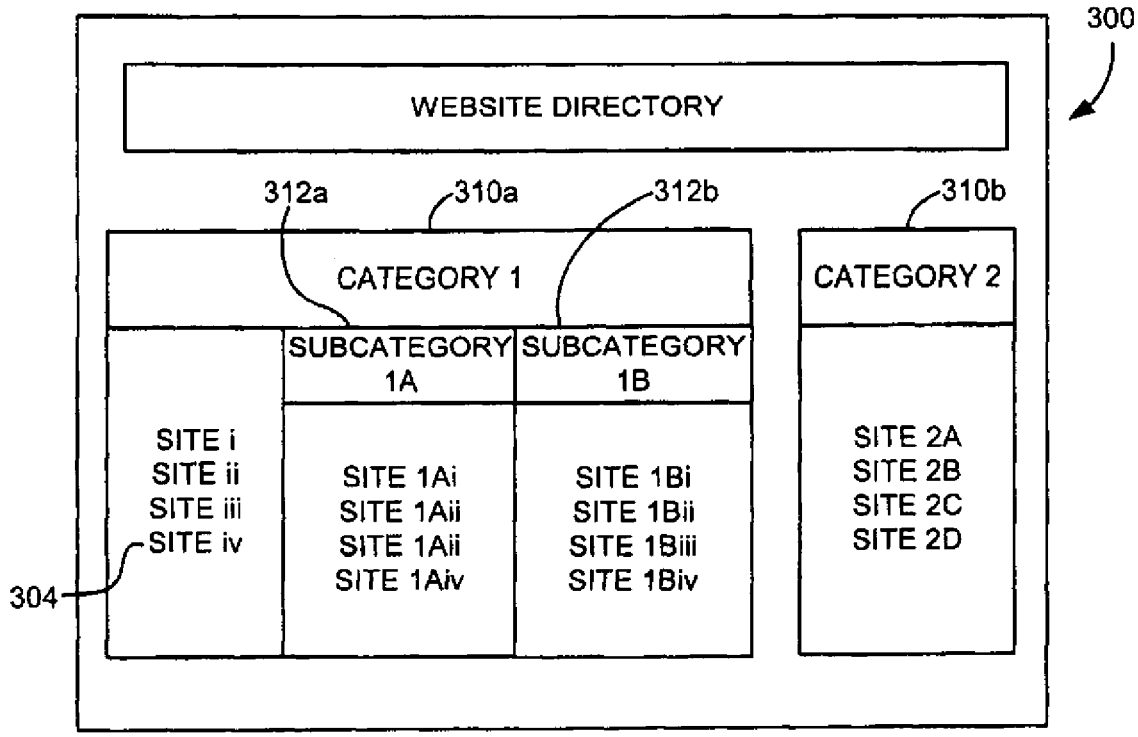

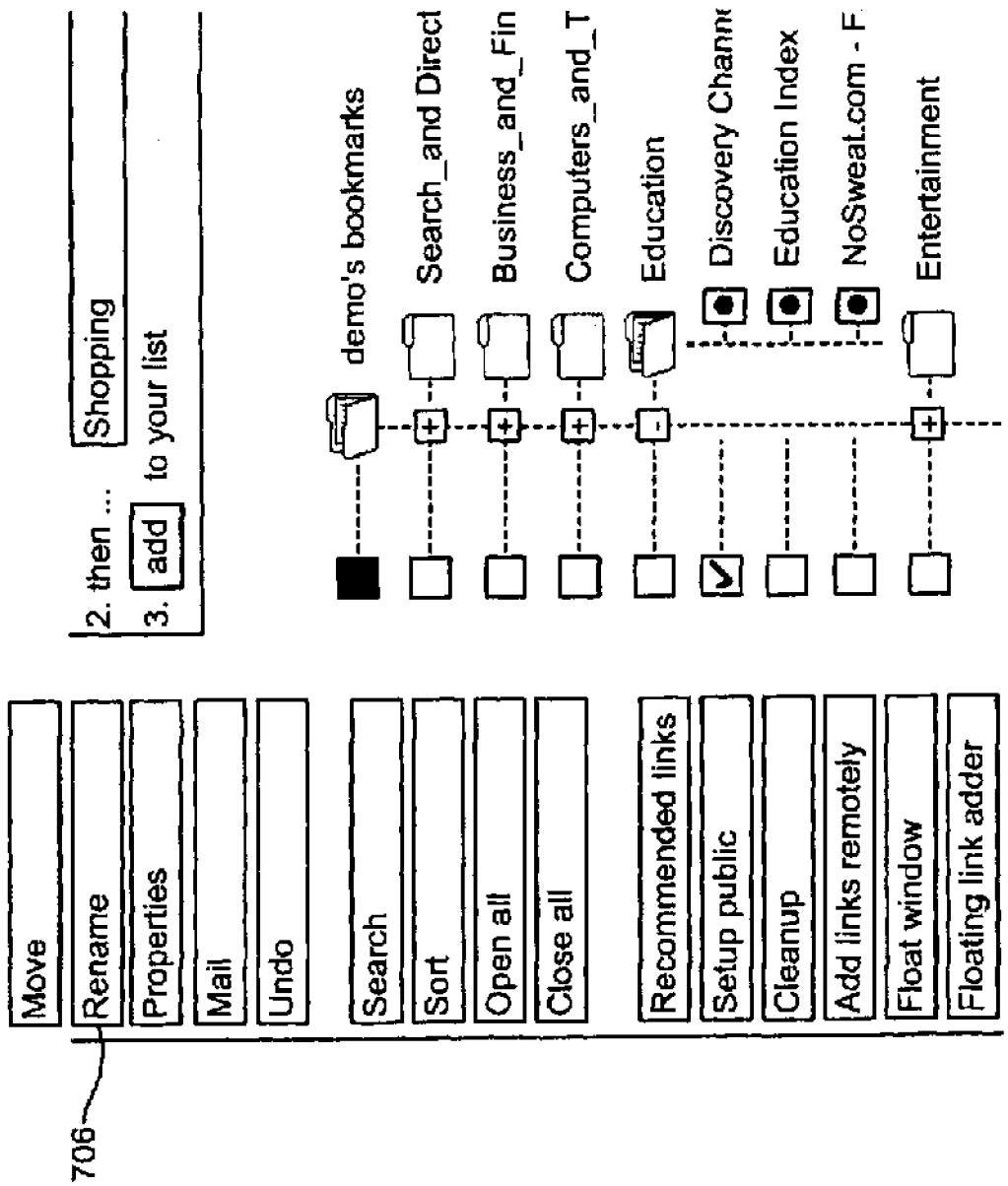

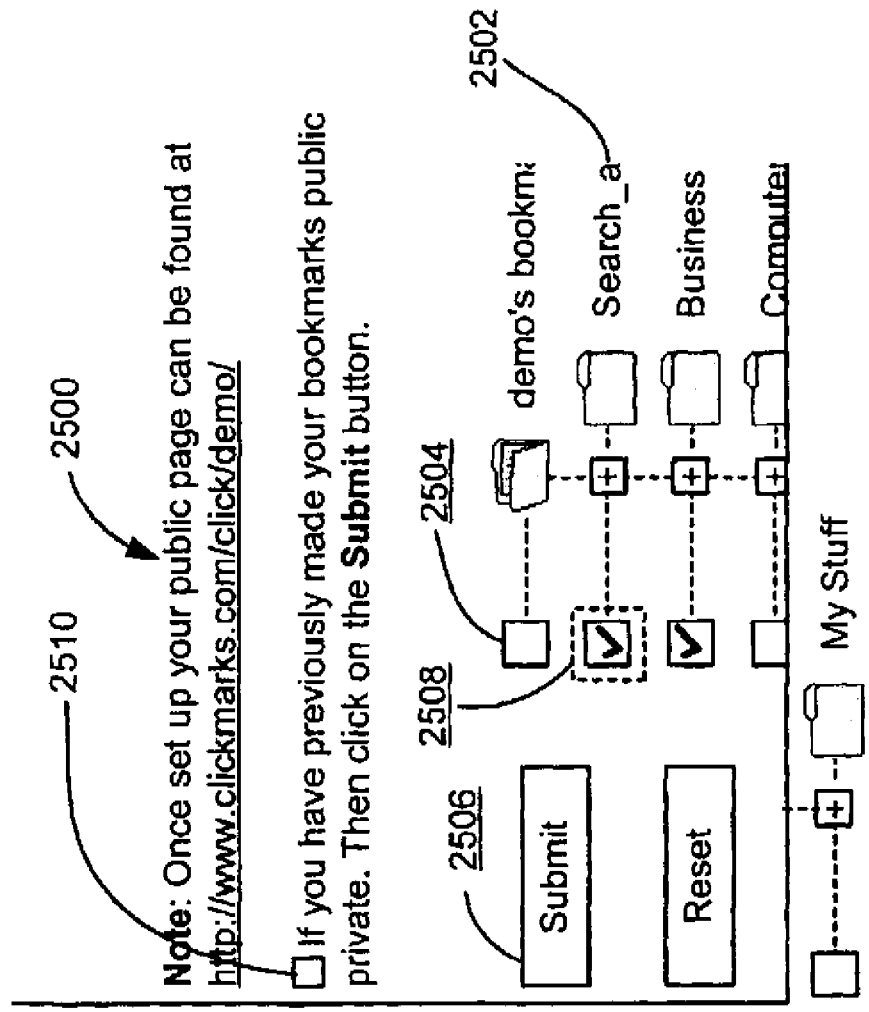
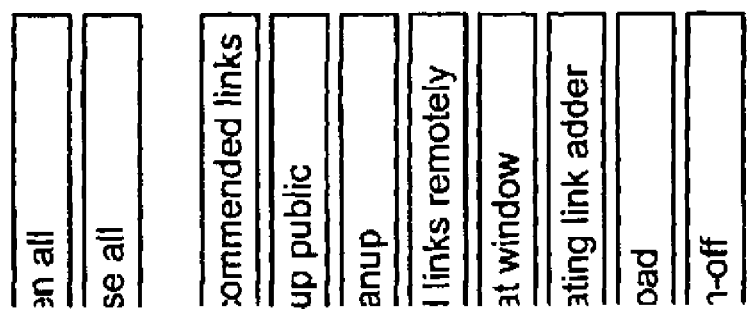
Figure 25

2900

Hot List

Hot Search Sites
Looksmart
Yahoo!
Excite
Jayde.com
Mamma.com - The Mother of All Search Engines
Ask Jeeves
Northern Light
Dogpile

Hot Directories Sites
Bigfoot
Four11
WhoWhere?
Switchboard
Infospace.com

Hot Business Sites
Business Week
CNNfn
Edgar Online
Monster Board Job Database
Headhunter.net
Fast Company

Hot Finance Sites
StockMaster
The Motley Fool: Finance and Folly
Yahoo! Finance
Bloomberg Online
Quote.com
Quicken Financial Network
OANDA Currency Converters
The Street
E*TRADE
IRS Homepage

Hot Computers_and_Technology Sites
W3C - The World Wide Web Consortium
Developer.com - Resources for programmers and developers
CMP TechWeb
Internet Sourcebook

Figure 29

3000 Users with Public Bookmarks a b c d e f g h i j k l m n o p q r s t u v w x y z 0 1 2 3 4 5 6 7 8 9 a
asic_design (user from clickmarks)
atv (user from clickmarks)
aeonflux (user from clickmarks)
andre (user from clickmarks)
austinpow (user from clickmarks)
anupun (user from thaiicq)
3002 alanm (user from clickmarks)
androsl (user from delphi)
akibe (user from urduweb)
Andy (user from clickmarks)
ACSO (user from clickmarks)
Asim (user from pakistane)
AmberJade (user from clickmarks)

return to top

Figure 30

SYSTEM METHOD AND ARTICLE OF MANUFACTURE FOR DYNAMICALLY USER-GENERATED INTERNET SEARCH DIRECTORY BASED ON PRIORITIZED SERVER-SIDED USER BOOKMARKS

FIELD OF THE INVENTION

The present invention relates to internet website directories and more particularly to dynamically user generated internet search directories based on prioritized server-sided user bookmarks.

BACKGROUND OF THE INVENTION

The World Wide Web was initially developed at CERN, which is a particle physics laboratory based in Geneva in Switzerland. The initial work began in 1989 and centered on the development of the HyperText Transmission Protocol (HTTP), which is a network protocol for requesting and transmitting web files and documents which both web servers and browsers can understand. By December 1990, CERN had developed a web server, a text-based browser and a browser for NExTStep computers. In March 1991, the software for the text based browser was made available to a limited audience. In January 1992, an updated version of the browser (version 1.1) was made freely available on the Internet. By January 1993, there were 50 web servers in existence and freely available graphical browser software had been made available for the Apple Macintosh. By February 1993, the World Wide Web was accounting for 0.1 percent of all Internet traffic.

One factor in the rapid acceptance and growth of the World Wide Web was the work done at the National Center for Supercomputer Applications (NCSA) at the University of Illinois in Urbana-Champaign in the USA. Their Software Development Group created a graphical web browser called Mosaic. In September 1993, they released versions of this software for Microsoft Windows running on PCs, Apple Macintoshes and Unix computers running X Windows. Each of the versions looked at and handled files in a very similar manner with images and text interspaced in the same document, allowing organizations to create visually exciting documents that could be viewed in very similar formats on the three main types of computer in use at that time.

Many members of the team who developed the original versions of Mosaic now work for Netscape Communications Corporation, a company which has developed the Netscape Web browser, which was estimated to account for around 70 percent of all the Web browsers in use in May 1995. Following Netscape, Microsoft launched a range of Internet browsers and servers.

A directory is, in general, an approach to organizing information, the most familiar example being a telephone directory. On the World Wide Web, a Internet search directory (also known as a web directory) is a subject guide, typically organized by major topics and subtopics. There are many Internet search directories, from the mega search directories such as Yahoo (www.yahoo.com) and Lycos (www.lycos.com) with millions of links to small niche directories such as South Asia Milan (www.samilan.com). These directories are structured as a multilevel tree of categories and subcategories, with website links, titles and possibly descriptions within subcategories, usually at the "leaf nodes" (final level subcategories).

There are several shortcomings with the implementations of such types of search directories. A web directory is typically compiled by listing any and all sites submitted for inclusion under a category by their webmaster. Quality assurance relating to the usefulness of a site to a visitor is usually either largely skipped or handled cursorily by the web directory administrator. Also, users of such directories are restricted to the categorization set once and for all by the webmaster. Because of this, users wishing to add sites to such directories are unable create their own custom category under which to put a new site.

SUMMARY OF THE INVENTION

A system, method and article of manufacture are provided for generating a prioritized network site directory. A link to a site on a network is generated. The site is then added to a site directory that includes a set of categories. The site is categorized into one of the categories of the site directory. The site is also ranked in the category.

In an embodiment of the present invention, the addition of the site to the site directory may also require the comparing of the site to pre-existing sites in the site directory and then generating a notification if the site matches one of the pre-existing sites of the site directory. In another embodiment of the present invention, categorizing of the site into one of the categories of the site directory may also include generating a table of sites where pre-existing site are ranked in the set of categories of the set directory and then determining whether the site exists in the table of sites. If the site already exists in the table of sites, the site may then be mapped to one of the categories of the set of categories. Further, if the site does not exist in the table of sites, the site may be searched for keywords relating to the categories of the set of categories.

In a further embodiment of the present invention, categorization of the site into one of the categories of the site directory may also include the selecting one of the categories into which the site is to be categorized and then comparing the selected category to the category to which the site is mapped. If the selected category does not match the category to which the site is mapped, then a notification may be generated.

In an aspect of the present invention, the site may be ranked in the category according to: the number of generated links to the site, the frequency that the site is accessed by selection of the generated links, and/or polling. In another aspect of the present invention, a mode of communication may be associated with one or more of the categories of the site directory.

In a further embodiment of the present invention, a sub-category may be created into which the site is categorized under one of the categories of the site directory. An added option to this embodiment, a creator identity may be assigned to the sub-category that includes information about a creator of the sub-category. In such an option, the creator of the sub-category may further be granted privileges such as recommending to accept or reject additional sites into and additional sub-categories under the sub-category, receiving information transmittals from users of site in the sub-category, and transmitting information to users of sites in the sub-category.

BRIEF DESCRIPTION OF THE DRAWINGS

The invention will be better understood when consideration is give to the following detailed description thereof Such description makes reference to the annexed drawings wherein:

FIG. 1 is a schematic diagram of a hardware implementation of an embodiment of the present invention;

FIG. 2 illustrates a flowchart for a method for generating a prioritized network site directory from user generated links to sites on a network in accordance with an embodiment of the present invention;

FIG. 3 is a schematic illustration illustrating the creation of an exemplary website directory derived from bookmarks submitted from users' online bookmark accounts in accordance with an embodiment of the present invention;

FIG. 4 is a schematic illustration of an exemplary embodiment of a website directory with sites categorized in user created and defined categories and subcategories in accordance with an embodiment of the present invention;

FIG. 5 is a schematic illustration of an exemplary website directory where the sites of a category are displayed with their rankings according to number of users who have the site bookmarked, frequency that the site is visited by users, and popularity determined by user voting in accordance with an embodiment of the present invention;

FIG. 6 illustrates an exemplary display of a online bookmark account page of a user in accordance with an embodiment of the present invention;

FIG. 7 illustrates tools displayed on a user's online bookmark account page in accordance with an embodiment of the present invention;

FIG. 8 illustrates an exemplary online bookmark account page with drop and drag capability in accordance with an embodiment of the present invention;

FIG. 9 illustrates a remote addition feature for adding bookmarks to a user's online bookmark account page in accordance with an embodiment of the present invention;

FIG. 10 illustrates an importation feature of an online bookmark account page for importing Internet browser bookmarks or favorites into the online bookmark account page in accordance with an embodiment of the present invention;

FIG. 11 illustrates a user's online bookmark account page and a public bookmark page derived from the online bookmark account page in accordance with an embodiment of the present invention;

FIG. 12 illustrates a direct addition of a bookmark to an online bookmark account page in accordance with an embodiment of the present invention;

FIG. 13 illustrates a remote addition of a bookmark to an online bookmark account page in accordance with an embodiment of the present invention;

FIG. 14 illustrates a Floating Link Adder pop-up window for adding bookmarks to an online bookmark account in accordance with an embodiment of the present invention;

FIG. 15 illustrates an online bookmark account and, in particular, features for creating a folder in accordance with an embodiment of the present invention;

FIG. 16 illustrates portion for an online bookmark account while deleting a bookmark or folder from the online bookmark account in accordance with an embodiment of the present invention;

FIG. 17 illustrates portion for an online bookmark account while moving a folder in the online bookmark account in accordance with an embodiment of the present invention;

FIG. 18 illustrates portion for an online bookmark account used for renaming a folder in the online bookmark account in accordance with an embodiment of the present invention;

FIG. 19 illustrates a display for automatic importing of bookmarks into a user's online bookmark account in accordance with an embodiment of the present invention;

FIG. 20 illustrates a display displayed upon a selection for exporting bookmarks from a user's online bookmark account in accordance with an embodiment of the present invention;

FIG. 21 illustrates a dialog box for a search feature for keyword searching of bookmarks in a user's online bookmark account in accordance with an embodiment of the present invention;

FIG. 22 illustrates a dialog box for a sort feature for sorting bookmarks in a user's online bookmark account in accordance with an embodiment of the present invention;

FIG. 23 illustrates a dialog box for a cleanup feature for checking for stale and duplicate bookmarks in a user's online bookmark account in accordance with an embodiment of the present invention;

FIG. 24 illustrates a portion of a frame of an e-mail feature of a user's online bookmark account in accordance with an embodiment of the present invention;

FIG. 25 illustrates a portion of a frame for making a user's private bookmarks public and a user's public bookmarks private in accordance with an embodiment of the present invention;

FIG. 26 illustrates a Float Window in accordance with an embodiment of the present invention;

FIG. 27 illustrates a Floating Link Adder Pop-up Window in accordance with an embodiment of the present invention;

FIG. 28 illustrates an exemplary display of a online bookmark account page of a user with a button for a recommended links feature in accordance with an embodiment of the present invention;

FIG. 29 illustrates a page displaying a list of popular sites displayed subsequent the selection of the recommended links feature in accordance with an embodiment of the present invention;

FIG. 30 illustrates a page displaying a list of users with public bookmarks in accordance with an embodiment of the present invention;

FIG. 31 illustrates an exemplary welcome page a particular user's public bookmarks in accordance with an embodiment of the present invention;

DETAILED DESCRIPTION OF THE INVENTION

FIG. 1 is a schematic diagram of one possible hardware implementation by which the present invention may be carried out. As shown, the present invention may be practiced in the context of a personal computer such as an IBM compatible personal computer, Apple Macintosh computer or UNIX based workstation.

A representative hardware environment is depicted in FIG. 1, which illustrates a typical hardware configuration of a workstation in accordance with one embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation typically has resident thereon an operating system such as the Microsoft Windows NT or Windows/

95 Operating System (OS), the IBM OS/2 operating system, the MAC OS, or UNIX operating system. Those skilled in the art will appreciate that the present invention may also be implemented on other platforms and operating systems.

A preferred embodiment of the present invention is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when one wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the abovementioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

User-Generated Internet Search Directory Based on User Online Bookmarks

Users surf the Internet at an ever increasing rate and webpages get added to the World Wide Web at an exorbitant rate. The ability to bookmark a webpage or website that a user found particularly useful is an invaluable aid to surfing the web efficiently. The value of a bookmark to the user who owns it is clear. But there is an additional value attached to the bookmarking of a site. A bookmark is the result of an analysis of and positive judgment on a website by a visitor interested in a particular interest topic. However, the knowledge that a site is good enough to be bookmarked is locked away in a user's private bookmark set. Creating a web directory where each category contains not just sites recommended for listing by webmasters, but sites taken from within Internet user's bookmarks sets, unlocks the knowledge hidden away in private bookmarks sets distributed across standalone computers worldwide. Users are be able to search via keyword or traverse the category hierarchy to get to bookmarks pertaining to their area of interest.

The present invention includes the following concepts for implementing a searchable web directories:

Search Domain: The domain of links/websites categorized in the directory comprising of users' bookmarks Dynamic restructuring: The user has the ability to create their own categories to best identify the location of their bookmark(s) within the web directory.

Site Ranking: Each bookmark may be ranked by: (a) the number of people who have bookmarked the site, and (b) the frequency of access to this site by the bookmarkers.

Category guides and owners: Each category created by the user as well as each link added by users from their bookmark set may be associated with the user's name, allowing users to find not only relevant sites but people with similar interests FIG. 2 illustrates a flowchart for a method 200 for generating a prioritized network site directory from user generated links to sites on a network (see operation 202). The site related to the link is added to a site directory that includes a set of categories in operation 204. The site is categorized into one of the categories of the site directory in operation 206 and also ranked in the particular category that it is placed under in operation 208.

Search Domain

FIG. 3 is a schematic illustration illustrating the creation of an exemplary website directory 300 of the present invention derived from bookmarks submitted from users' online bookmark accounts 302a, 302b, 302c. In the present invention, sites 304 added to the web directory 300 exist as bookmarks 306 in a user's bookmark set of the user's online bookmark account. Thus, the only people allowed to add links to the web directory are users who host their bookmarks or favorite sites in online bookmark accounts 302a, 302b, 302c on an online bookmark management server. This also helps to eliminate the "spamming" of the web directory by overzealous webmasters. A user first registers with the online bookmark management service and import their browser bookmarks, or favorite links off an existing webpage. Optionally, a user may create a fresh set of bookmarks in their server based bookmarks account. Once the user has a server side bookmark account set up and populated, the user may add part or all of the user's bookmarks to the web directory as represented in FIG. 3 by arrows 308a, 308b, and 308c. The user may choose manual or automatic categorization while adding part or all of their bookmark.

Manual Categorization

Under manual categorization, the user determines the category 310a, 310b, 310c under which to file a bookmark or a set of bookmarks. These bookmarks as well as the suggested categorization are reviewed by the directory's editorial staff for correctness of categorization. After this screening, the sites are made part of the directory under the user recommended category or a editor selected classification, and the user is notified.

Automatic Categorization

In automatic categorization, the user may specify which part of the user's bookmark set is to be included in the directory. All unique links in this set that do not already exist in the directory are then considered for addition under categories determined by the staff. With automatic categorization, the user does not have to determine and submit the appropriate categorization of the submitted bookmarks.

Website Addition

The website addition process may automated with at least two manners. First, an automatic filtering step may be executed to determine whether the submitted link already exists in the search directory. In this step, the submitted site is compared to pre-existing sites in the site directory to see if it matches one of the pre-existing sites of the site directory. As an option, if the user attempts to add a link manually under a category, the user may be alerted (by for example the generation of a notification to the user) when the link already exists in that category or even elsewhere in the directory. After such an alter, the user may be allowed a choice to proceed and submit the link. A final determination on whether to replicate links across categories may subsequently then be made by the editorial staff.

Second, in the determination of the right categorization, the editorial staff may be aided by a website profiling procedure. The website profiling algorithm will be similar to the interest clustering techniques detailed in the patent "Method and Apparatus User Preference Profiling and Transient Detection on Content and User Access of Web Bookmarks", filed separately.

Each bookmarked website submitted to the directory (manual or automatic submission) is looked up in a generated table of sites that have been ranked in a set of categories. This ranking is done using the interest clustering algorithm mentioned above. If the site exists in the table, its ranking is then mapped to the best category for it to be listed under. On the other hand, if the site does not exist in the table, the interest clustering engine is used to search the site on a variety of keyword baskets. Each keyword basket represents a particular interest category. The results from this search are then entered into the table of ranked sites and used to determine the final categorization of the site in the web directory. As an option, if the selected category does not match the category to which the site is mapped, then a notification may be generated. As a further option, manual inspection by the editorial staff may also be conducted as a double check of the categorization procedure.

Dynamic Restructuring

FIG. 4 is a schematic illustration of an exemplary embodiment of a website directory 300 of the present invention with sites 304 categorized in user created and defined categories 310a, 310b and subcategories 312a, 312b. In such an embodiment of the present invention, a sub-category may be created into which the site is categorized under one of the categories of the site directory. In adding niche and focused sites to a web directory, a major stumbling block has been the lack of flexibility for permitting users to make their own custom categories under which to add a favorite site. The present invention gives a user the ability to dynamically grow the hierarchical categorization tree. In the case of a bookmark based website directory, one of the underlying assumptions of such a search metaphor is that the user adding the bookmark has a keen interest in and some knowledge of the theme and/or subject of the bookmarked site.

In order to exploit this user knowledge properly, the user is allowed the option to grow the categorization tree by adding "nodes" or "subcategories" that best capture the category for the bookmarks they wish to add. Each added node may have the creator's ID (i.e., the user's online bookmarks account's username) and contain at least one site under it (i.e., users may not be able create an empty node). These features also create a dynamic interactive web directory. "Dynamic" here does not simply imply frequent addition of links, but frequent additions to the basic categorization structure.

These features may also be conducted under the manual inspection of the editorial staff. In such an embodiment, requests from a user to create a new node in the category tree may be queued for approval by an editor of the site directory. If the new sub-category is found to add value to the web directory, its addition is then finalized and included in the site directory.

Site Ranking

FIG. 5 is a schematic illustration of an exemplary website directory 300 of the present invention where the sites 304 of a category 310b of the website directory are displayed with their rankings according to number of users who have the site bookmarked 314, frequency that the site is visited by users 316 and popularity determined by user voting 318. A benefit of using bookmarked sites as a basis or domain for a web directory is that it creates two natural ranking metrics. As bookmarks are displayed in a category or as the result of a keyword search, they may be prioritized or ranked according the following metrics:

1. How often does a bookmark appear in online bookmark accounts 314 (i.e., how many users in the server side bookmarks community have bookmarked this site); and
2. How often do people who have bookmarked this site access the site from their account 316.

The more the bookmarks accounts in which a particular site appears, the higher it may be ranked in its interest category. Likewise if the traffic to one bookmarked site is much higher than others that belong in the same interest category, the high traffic site may be ranked above (and possibly placed above in a search result or category listing page) the other sites. This may greatly increases the utility of the web directory. It may also be an important way to exploit the knowledge that is locked up in user bookmarks. Not only are the sites that are interesting enough to have been bookmarked by users simply displayed, but the sites are displayed in a manner for users of the site directory to differentiate which may be more relevant and content/information rich from among a pool of sites displayed in a particular category.

As an option, an additional ranking mechanism may also be built into the site directory by allowing users to vote on the usefulness of any site 318. In such an embodiment, all three ranks may be displayed alongside the particular link to allow users to have the option to prioritize their selection of a link on the search page by: (a) number of people who have it bookmarked, (b) traffic frequency or (c) voting results.

Category Guides and Owners

When a user adds a site 304 or creates a new subcategory 312a, 312b, they may be given the option to assign their identity (i.e., their username to their online bookmarks account) to the added category or site. As a further option, the user may also be granted additional privileges as creators of a new category, such as the right to recommend to accept or reject new sites/subcategories under the new category (with or without a further safeguard option of leaving the final determination with the directory editors). This option adds a dimension of interactivity and expertise to the web directory. With such an option, users of the site direction are able to find not only relevant websites but also users with similar or identical interests.

The site directory's users may also be allowed to send information transmittals such as an instant message or e-mail to these "experts" or guides whose username is associated with the particular category or link they entered into the directory. With such a feature, the online bookmarks accounts of these guides may also include features that give them the capacity to receive these communiques and transmit replies back to sender. As a further option, associated with each category may be a forum or chat room where users with like interests are allowed to communicate with each other.

Online Bookmarks Managing System

The following portion of the present specification is included to provide further clarification to various aspects and portions of the present invention through discussion of exemplary embodiments of the present invention. In particular, the following portion of the present specification includes further information regarding the user and maintenance an online bookmarks managing system and user online bookmark accounts of the system.

In an embodiment of the present invention, as soon as a user signs up, the user may be set up with a personal, password-protected, web-based online bookmark account.

Every time the user accesses the Internet, wherever the user is, the user is able to sign in and see the user's complete bookmarks selection. No matter what browser, no matter which operating system, the user's favorite links are there via the user's online bookmark account for the user to use.

FIG. 6 illustrates an exemplary display of a online bookmark account page 600 of a user. This exemplary page 600 has a central area 602, a left menu bar 604 and a top menu bar 606. Also displayed may be a bookmark adding area 608.

With continuing reference to FIG. 6, in this exemplary embodiment of the present invention, the icon 610 with the circle in the middle located in the central area 602 is used to represent a bookmark (also known as a favorite, a link, or a shortcut) of the user. A bookmark is a saved link to a web site that, when selected, accesses the linked website. Next to this icon 610 may be a text 612 providing further indication of the site to which the particular bookmark provides a link to.

In this exemplary embodiment, the icon 614 similar to a folder is the icon for a folder in which a user may organize their bookmarks. A folder's usage is similar to the use of directories in a computer's desktop: namely, to allow a user to group similar items together. These icons are similar to a closed folder when the contents of the folder are not being displayed. A user may view the contents of the folder by clicking on the "+" sign 616 to the left of the closed folder icon. This changes the icon to an "open folder" icon, the "+" sign to "−" sign 618, and displays the contents of the folder. A user may then close the folder by clicking on the "−" sign to the left of the open folder. This will close the folder once again.

When folder icons 614 are present, bookmark icons 610 may appear under the folder in which it is stored. Note that the display uses various levels of indentation and connecting lines 620 to indicate the specific folder under which the bookmark is filed.

Accessing Links/Bookmarks

How to Use/access Bookmarks

To visit the bookmarked site, a user clicks on a bookmark icon 610. Clicking on the bookmark icon will open up a new window and take the user to the bookmarked site. To return to the bookmark list, a user may either close the new window that had opened up or the user may switch back to the browser window with the a session of the present invention active.

Displaying Bookmarks

To allow users unlimited bookmarks and to present them more efficiently, bookmarks may be broken up and displayed in separate pages. In an illustrative embodiment, a default of approximately 250 bookmarks may be displayed on each page. A user may change the number of bookmarks they want displayed on each page. To do so, the user clicks on the User Options button 622 displayed on the online bookmark account page 600 (see FIG. 6) and make changes in "View Size" form that is subsequently displayed.

Accessing Bookmarks of a User Account from Another Computer

As a web-based bookmarks service, the present invention may available from any computer connected to the Internet. This enables a user to access, and edit their bookmarks from anywhere in the world. A user does not need to login from the same computer every time the user wishes to use their bookmarks to browse the Internet. Nor does a user need to sign up again or transfer any files when they switch computers.

Managing Links

FIG. 7 illustrates tools displayed on a user's bookmark page 600 of the present invention that are included to help a user manage their bookmarks. Some examples include:

- add, delete, or rename functions 702, 704, 706;
- a move function 708 for organizing a user's links;
- duplicate or stale (i.e. broken or inactive) bookmark detectors;
- search and sorting functions 710, 712 to help a user find bookmarks that the user may be looking for; and
- an e-mailing function 716 for transmitting information utilizing a network.

Drag & Drop Functionality

In embodiments of the present invention with such a this feature, the pains associated with managing information online may be reduced. With reference to FIG. 8, users may click, drag and drop their bookmarks 610 (and folders 614) to move them anywhere within their account. One-touch management of links, folders and link properties to make the user's life easier. Select one link 610 or more to display a box 806, choose the appropriate function 808a, 808b, 808c, 808d from the box and the function is then executed.

Remote Addition

With particular reference to FIG. 9, a user may also add bookmarks to their online bookmark account without even being on the online bookmark provider's webpage by using an "Adding Bookmarks Remotely" feature 902 that may be included on a user's web browser 900. This feature lets a user add links while surfing on the internet by clicking on the function 902 as shown in FIG. 9.

Accessing Bookmarks Added through the "Adding Bookmarks Remotely" Feature

All the URLs that users add to their current online bookmark account through the "Adding Bookmarks Remotely" feature may be stored in their online bookmark account and are accessible from any computer on the Internet, just like all their other bookmarks in their online bookmark account. When a user wishes to bookmark a particular page using this function, the user first accesses the particular page through their browser. Once the user is thereat the particular page, the user may add a bookmark remotely by clicking on, for example, the ADD2My_Stuff favorite/bookmark in their current browser. The URL of the particular page is then stored in their My_Stuff folder.

Import/Export Bookmarks

A user may import their current Netscape "Bookmarks" or Internet Explorer "Favorites" directly into their online bookmarks account 600. The user may either add them to the online bookmark provider's default list of bookmarks, or replace the links with the imported links 1000 as shown in FIG. 10. This way, the user may import from multiple sources, whenever they want, and even however many times they want.

Sharing Bookmarks

A user may also be able to choose to share their bookmarks with friends—or any surfer by:

- e-mailing links to others; and
- setting selected bookmarks as public. As best illustrated in FIG. 11, this feature lets users publish their own Internet directories at the touch of a button. Users may choose the links they wish to set as public from their bookmarks 600 and publish them on the Internet 1100.

Add Links/Folders

A user may add links to their account in three ways:

- adding directly (from the account page);
- adding links remotely; and
- adding links through a pop-up window.

Adding Directly

With reference to FIG. 12, a user may add bookmarks by typing the URL (web site address) into the box 1200 next to "New Link" and then clicking on "Add" 702. A user may add folders in the same way, by typing the new folder's name into the box 1204 next to "New Folder" and then clicking on "Add" 702. Both new bookmarks and new folders may be placed inside other folders. A user may do this by clicking on the down arrow 1206 on the "choose location of new url/folder" box 1208 and selecting the folder 1210 users want to move the new item into.

Adding Links Remotely

A user does not have to be in their account to add bookmarks. Users may actually add them while they surf the Internet. First, the user needs to set up the Adding Links Remotely function. With reference to FIG. 13, once the Adding Bookmarks Remotely function is set up, the user may see a new bookmark called "Add2Clickmarks" 1300 on their browser 1302. This means that the Netscape Bookmarks list or their Internet Explorer Favorites list will have this new "Add2Clickmarks" bookmark. While a user surfs the Internet, if the user finds a web site he or she wants to add to their account, the user just clicks on the browser bookmark called "Add2Clickmarks" and the site will be automatically added to their online bookmark account.

Adding Links through a Pop-Up Window

To add links to a user account without coming back to the user account page, a user may use the Floating Link Adder pop-up window 1400 which is illustrated in FIG. 14. This feature is useful when using the present invention from a computer that is not the user's regular workstation.

With reference to FIG. 7, a Floating Link Adder button 722 may be clicked on from a user account page for displaying of the Floating Link Adder pop-up window 1400 illustrated in FIG. 14. In the pop-up window 1400, the user may then input in box 1402 the URL that they want to add. By default, the new link will be added to the top level folder in

Add & Manage Folders

Creating a Folder

With reference to FIG. 15, to create a folder, a user may first type the name of the folder the user wants to be created in "New Folder" space 1204 in the bookmark adding area 608. The user may then click on the "Add" 702 to created the new folder. When their folder is created, the new folder is displayed with the other folders of the user in the central area 602.

Creating Folders within Folders

Users may nest folders within folders if so required. To create a new folder within an existing folder, a user may first choose the destination folder from the drop-down menu labeled "File Under" located above their displayed bookmarks of the page. This will ensure that the new folder the user creates will be placed in the folder that the user has chosen. The user then types the name of the folder the user wants to be created in the space to the right of the button titled "New Folder" and then clicks on the "New Folder" link in the top navigation bar. When their folder is created, the user should see that it has been added to their list of current folders.

Undeleting Bookmarks/folders

A user may undo the effects of the last editing step that the user took off their page. To do so, the user clicks on the "undo" button 724 in the left menu bar 604 (see FIG. 7). This will undo the effect of the last step that the user had executed. Note that undo feature may be used only for the last edit step that the user took. Clicking on undo the second time may redo the step that users had undone.

Viewing the Contents of a Folder

If the contents of their folders are not already visible, click on the "+" sign 616 next to the left of the icon and name of the folder (see FIG. 6). Note that the icon should represent a closed folder, and the sign next to it should be a "−" sign 618 when the list of bookmarks and folders within this folder is not being displayed. Clicking on the "+" to the left of the closed folder icon should change that icon to an open folder icon, a "+" sign to a "−" sign, and should display the contents of that particular folder including all the bookmarks and folders. To view the contents of any one of the folders within the current folder, click on the "+" sign to the left of the folder icon and the folders contents will be displayed as well.

Hiding Contents of a Folder

If the contents of their folders are being shown, click on the "−" sign 618 next to the left of the icon and name of the folder. Note that the icon should represent an open folder, and the sign next to it should be a "+" sign when the list of bookmarks and folders within this folder is being displayed. Clicking on the − to the left of the open folder icon should change that icon to a closed folder icon, a "−" sign to a "+" sign, and should hide the contents of that particular folder. To hide the contents of any folder within an open folder, just click on the "−" sign to the left of the folder icon. Doing so will hide the contents of this folder from the current display.

Editing Links/Folders

Users may edit their bookmarks with a single click in their user accounts. This may be accomplished by choosing the links that the user wants to edit and then pressing the button corresponding to the desired function. In an embodiment of the present invention, the user may choose to:

delete links and folders;

move links and folders; and rename links and folders.

Deleting Links/Folders

With reference to FIG. 16, there may be two ways to delete links or folders in the drag and drop embodiment of the present invention:

- Selection of the link(s)/folder(s) by highlighting them 1600 and then using the "delete" button 704 on the left menu bar. The chosen bookmarks are then removed immediately; and/or
- Clicking on the link/folder so that it is highlighted and then right-clicking a mouse-type input device. From the drop-down menu that appears upon the right-click "delete" is then chosen. The links/folders are then removed from the account immediately.

Moving Links/Folders

With reference to FIG. 17, to move links/folders within an account, a user first selects the link(s)/folder(s) by highlighting them 1700 with their mouse-type input device. As an option, the user may also use the Ctrl and Shift keys to make multiple selections as in the windows desktop environment. The selections may then be moved 1702 by holding down the left-click button on the mouse which may then be released wherever the user wishes the links to be placed. As an option, to move within a folder, release of the left-click button may be done when the destination folder is highlighted.

Renaming Links/Folders

There may be two ways a user may rename links or folders in a drag and drop embodiment of the present invention. To rename links/folders within a user account, the individual link/folder is selected by highlighting it with an input device such as a mouse-type input device. As an option, a user may not be able to rename multiple selections in one operation.

In one embodiment, upon right-clicking on the link with the user's mouse displays a drop down menu with a rename selection. The choosing of the rename selection from the drop down menu. The title will be replaced by a rename box into which a new title for the link may be entered. With reference FIG. 18, as another option, once the link/folder is highlighted, clicking on rename selection 706 from the left hand menu bar displays a drop down menu with a rename selection which, upon selection, replaces the title box with a rename box into which a new title for the link may be entered.

Importing Bookmarks

A user may import Netscape "Bookmarks" or Internet Explorer "Favorites" directly into their user account. A user may either add them ("append" them) to the user's current list of bookmarks, or the user may "overwrite" the user's current list with the ones that the user imports. In an exemplarily embodiment of the present invention importation may be accomplished with the following steps: (1) Go to the "Import/Export" box 714 on the top panel (see FIG. 7); and then (2) Select either "automatic" or "manual" to indicate how to import the bookmarks.

Automatic Importing Bookmarks

Automatic Import allows a user to import bookmarks automatically from their desktop browser. Once automatic import is selected, a Java Applet will load. Note that it may take a little time to do that. Once the applet is loaded, the user may be asked via a dialog box 1900 to select the browser as illustrated in FIG. 19. The user then may choose whether they want to overwrite or append to the existing bookmarks with the selection 1902. The bookmarks may then be imported immediately.

Manually Importing Bookmarks

In an exemplary embodiment of the present invention, to manually import bookmarks, a user first selects the Import/Export button 714 displayed on the top control menu bar on the user account page. The user then follows the following instructions corresponding to the particular browser the user is using:

Importing from the Netscape Browser
- In the Netscape browser, select Bookmarks from the top menu.
- Click on Edit Bookmarks.
- A new window will open up with all of the user's bookmarks visible therein.
- From the bookmarks editing window select Save As from the File menu.
- This will save the user's bookmarks file in the directory users specify.
- Enter the desired file name.
- Note the path to the file by clicking on the select arrow next to the Save in: field.
- Also note the bookmark file name.
- Now return to the Bookmarks Import page in their online bookmark account.
- Use the Browse button given on the page to locate the bookmarks file that the user created and saved in the previous steps, outlined above.
- Select the bookmarks file.
- Press Submit.
- The bookmark file will be imported into their online bookmark account.

Importing from the Internet Explorer IE.5
- A user first converts their Microsoft favorites to an HTML file.
- On the user's browser, go to the File menu and select Import and Export.
- Choose Export Favorites when it gives the Import/Export Selection window.
- Click Next until users get to the Export Favorites Destination.
- Select Export to a File or Address and enter:
- C:\My Documents\clickmarks.html
- Click Next and then click on Finish.
- In the text field of the Browse button on the Import page, type C:\My Documents\clickmarks.html
- If the user has saved it on some other place and named it something else, then type that in.
- Click on Submit Options.
- Return to the Bookmarks Import page in their online bookmark account.
- Use the Browse button given on the page to locate the bookmarks file that users created and saved in the previous steps, outlined above.
- Select the bookmarks file.
- Press Submit.
- The user's bookmark file is then be imported into their online bookmark account.

Exporting Bookmarks/Favorites

The present invention also enables users to export their bookmarks/favorites back to the desktop browser. A method that a user may use to export the bookmarks from their user account back to their Netscape or Internet Explorer browser is described as follows: (1) Choose "Import/Export" 714 from the top menu bar (see FIG. 7) to display a page with a "Export Your Bookmark" selection. Upon selection of this selection, a set of instructions 2000 are displayed as illustrated in FIG. 20 which a user may then follow to export their bookmarks.

Export Bookmarks into to Netscape

To export to Netscape, click on the Import image. From the import page click on the "export their bookmarks" link. Follow the Exporting To Netscape Bookmarks steps. In the two step process users first view the Netscape style bookmarks as an HTML file, then save the file on their local drive.

Export Bookmarks to Internet Explorer

To export to Internet Explorer, click on the Import image. From the import page click on the "export their bookmarks" link. Follow the Exporting To IE Favorites steps. In the three step process users first view and save their online bookmark account as Netscape style bookmarks. The final step requires users to convert the saved Netscape bookmarks file to Internet Explorer favorites using a freely downloadable Microsoft utility.

Managing Bookmarks

The present invention may also provide a user with functions to help the user manage their account. A user may "Sort" their links, "Search" their bookmarks for keywords, and/or "Clean Up" their user account by removing stale and duplicate links.

Search

A user may search through their bookmarks for keywords. In an embodiment of the present invention, this may be accomplished by first clicking on the "Search" button 710 on the left menu bar (see FIG. 7) so that a search dialog box 2100 is displayed as depicted in FIG. 21. A keyword(s) may then be entered in the keyword box 2102 and then search area may be chosen for those words by clicking on the down arrow 2104 next to "Search the" 2106 and selecting either Site Title 2108, Site Summary 2110, Site URL 2112, or All Three 2114. A user may also select whether they want to search for links that contain ALL of the keywords or for links that contain ANY of the keywords. To execute the search, the Search Bookmarks button 2116 is then selected.

In an embodiment of the present invention, the search process may display all of the bookmarks in their current bookmark files corresponding to the search keywords that users have entered. In such an embodiment, there may be no limit to the number of bookmarks that will be displayed as a result of their search.

Sorting

A user may sort their bookmarks in several orders. In an embodiment of the present invention, this may be accomplished by first clicking on the Sort button 712 on the left menu bar 604 (see FIG. 7) to display a Sort screen 2200 as illustrated in FIG. 22. The Sort screen 2200 may display a plurality of sort order choices 2202, 2204, 2206 that a user may select to choose the sort order they users want. Once a sort order is select, the user may then click on Sort button 2208 to execute the sort function.

In one embodiment, when the alphabetical sort is selected, the bookmarks may be sorted by the first word in the description that appears to the right of the icon for the bookmark. When a sorting by date of creation (newest to oldest) is selected, the bookmarks may be sorted such that the bookmarks most recently created appear first. When a sorting by date of creation (oldest to newest) is selected, the user's bookmarks may be sorted so that the bookmarks most recently created appear last.

Checking for Duplicates or Stale Links

In one embodiment of the present invention, a cleanup feature 2300 may be included in the left menu bar of the user's online bookmark account 600 to check for duplicate or stale links. Upon selection of the cleanup feature, a cleanup bookmarks screen 2302 may be displayed as illustrated in FIG. 23. This screen 2302, may display two buttons: a "Check Duplicates" button 2304 and "Check Stale" button 2306.

Selection of the "Check Duplicates" button 2304 executes the duplicate bookmark checking function which checks the user's bookmark collection for duplicate bookmarks and then displays a list of any duplicated bookmarks. The user may then be given an option to delete the duplicate bookmarks from their bookmark collection. The duplicate bookmark checking function helps users remove duplicate links from their accounts. Organizing bookmarks into different folders and sub-folders increases the difficulty of keeping track of duplicate bookmarks within their bookmark files. By comparing all the bookmarks and their titles/summaries stored, the bookmark management system identifies duplicate bookmarks stored in an user's online bookmark account, regardless of the folders that they may be stored in and the different titles that they may exist with. A user may therefore remove all the duplicate links that might lead to the same URL. This may be also useful in removing bookmarks that point to old locations of sites, although users may already have the correct updated URL in their files.

Selection of the "Check Stale" button 2306 executes the stale bookmark checking function which checks the user's bookmark collection for old or stale bookmarks (i.e., bookmarks that are broken or have moved) and then displays a list of any stale bookmarks in the user's bookmark collection. The user may then be provided the options of Renaming, Deleting, or Doing Nothing with the listed stale bookmarks. The stale bookmark checking function helps a user remove bookmarks that have expired since the user last used them.

E-mailing Bookmarks

This feature provides a handy way for a user to e-mail a their bookmarks to friends without having to cut and paste the URLs into e-mail messages. As best illustrated in FIG. 24, this function may be accomplished by first selecting all the bookmarks and folders 2400 to be e-mailed (multiple selections may be made using the Ctrl and Shift keys as in a windows desktop environment) and then selecting the mail button 716 displayed on the user's bookmark account page (see FIG. 7). Upon selection of the mail button 716, an e-mail screen 2402 may then be displayed into which a sender's and receiver's e-mail addresses may be entered in the appropriate boxes 2404, 2406. As an option, a message box 2408 may also be included for permitting the adding of a note to accompany the links. A "send" button may also be included for executing the transmission of the e-mail.

Making Bookmarks Public

In one embodiment of the present invention a user's account and all the bookmarks in it may be private by default. However, if a user wants to share certain bookmarks or folders with other users, the user may opt to make their bookmarks public. Also, if the user has already made certain links public, the user may also use this function to make their public bookmarks private again. In one such embodiment of the present invention, this feature may be carried out by first selecting a "Setup Public" button 718 on the left menu bar (see FIG. 7) to display a list 2500 of the user's bookmarks and folders 2502 as illustrated in FIG. 25. Also displayed with the list adjacent each bookmark and folder is a checkmark box 2504. To select which bookmarks/folders are to be made public, the user clicks on the checkmark boxes next to the bookmarks or folders the user wants to make public so that a checkmark 2506 appears in the selected checkmark box. The user then clicks on a "Submit" button 2508 also displayed with the list to execute the public function which then displays the selected bookmarks is a public bookmark screen/page.

To make a public link private again, a user may click on the checkmark box next to the particular link and then select a box 2510 above the "Submit" button and then click on "Submit" to execute the public function to remove from display the selected bookmark(s) from the public bookmark screen/page.

Floating Windows

The "Float Window" button 720 on the left menu bar (see FIG. 7) displays up a miniature version (i.e., "floating window") 2600 of the user's online bookmark account page as illustrated in FIG. 26. This floating window 2600 gives the user a view of the user's account while surfing on the Internet and permits the user to add new bookmarks to their account. This window displays a user's links without most of the other controls found on their full size account page Having a smaller window open frees up monitor space and may be optimal for a user if the user is not actively managing their bookmarks. A user may return to their main user page by clicking on the "Go To Home & Close" link 2602. Two other controls may also be included to allow a user to refresh the page ("Reload" 2604), and to simply close the window "Close" 2606).

Floating Link Adder

The "Floating Link Adder" button 722 on the left menu bar (see FIG. 7) pops up a window 2700 as illustrated in FIG. 27 that lets a user add and file bookmarks to their user account while they are surfing the Internet without having to return to their online bookmarks account page. To add a bookmark with this window, a user simply types the web site address in box 2702 and clicks on "Add URL" 2704 to execute this function and add a bookmark for this site to the user's account. A user may also choose which folder the user wants the bookmark to go into by using the "File Under" pull-down menu 2706.

Recommended Links

As illustrated in FIG. 28, an embodiment of the present invention may include a "Recommended Links" feature 2800 in the left menu bar 604 of a user's online bookmark account page 600. Upon selection of the Recommended Links feature, a page may be displayed as illustrated in FIG. 29 that displays a list of popular sites 2900 which other users may have found useful. In such an embodiment, the bookmark management system may track popular links in many interest categories. These recommended links may be organized by various categories. A user may select any of these links to add to their account. A user may also choose which folder in their account page into which the recommended links are stored. As a further option, users may also be able choose to inform the bookmark management system that they do not wish to receive any future recommendations for a given interest category. In

Public Bookmarks Feature

The present invention may also include a public bookmarks feature which lets users publish their own Internet Directories for the whole world to browse. As illustrated in FIG. 30, accessing this feature displays a list of users with public bookmarks 3000 that comprises, for example, a list of user name links 3002 in alphabetical order. Upon selection of one of the user name links, a welcome page 3100 for that particular user's public bookmarks may then be displayed as illustrated in FIG. 31. This welcome page may display all of the bookmarks 3102 and folders 3104 that have been made public by that particular user and which are therefore accessible to any user upon selection.

Security

In an embodiment of the present invention, every online bookmark account may be password protected. This means that users must begin by logging into their account, unless the users have opted for an auto-login feature. Logging into a user account in such an embodiment is possible only by users correctly entering an associated Login ID and password. In one such embodiment, a user may use between 3 to 20 characters for their login ID while there may be no restriction on the length of the user's password length. Cookies may also be used to identify users.

Although only a few embodiments of the present invention have been described in detail herein, it should be understood that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for generating a prioritized network site directory, comprising the steps of:
    (a) generating at least one link to a site on a network;
    (b) adding the site to a site directory having a set of categories comprising at least one category;
    (c) categorizing the site into one of the categories of the site directory;
    (d) ranking the categorized site in the category;
    (e) creating a sub-category into which the site is categorized;
    (f) assigning a creator identity to the sub-category that includes information about a creator of the sub-category; and
    (g) granting the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

2. A method as recited in claim 1, wherein the step of adding the site to the site directory further comprises the steps of: comparing the site to pre-existing sites in the site directory; and generating a notification if the site matches one of the pre-existing sites of the site directory.

3. A method as recited in claim 1, wherein the step of categorizing the site into one of the categories of the site directory further comprises the steps of: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

4. A method as recited in claim 3, wherein the step of categorizing the site into one of the categories of the site directory further comprises the step of searching the site for keywords relating to the categories of the set of categories if the site does not exist in the table of sites.

5. A method as recited in claim 3, wherein the step of categorizing the site into one of the categories of the site directory further comprises the steps of: selecting one of the categories into which the site is to be categorized; comparing the selected category to the category to which the site is mapped; and generating a notification if the selected category does not match the category to which the site is mapped.

6. A method as recited in claim 1, wherein the site is ranked in the category according to a type of ranking based on at least one of: the number of generated links to the site, the frequency that the site is accessed by selection of the links, and polling.

7. A method as recited in claim 6, further comprising the step of allowing a user to specify the type of ranking applied to the category, wherein the sites in the category are displayed according to the user-selected type of ranking.

8. A method for generating a prioritized network site directory, comprising:
    (a) generating at least one link to a site on a network;
    (b) adding the site to a site directory having a set of categories comprising at least one category, each category including a plurality of links;
    (c) categorizing the site into one of the categories of the site directory;
    (d) ranking the categorized site in the category;
    (e) displaying the links in the category according to rank, the links including the at least one generated link;
    (f) displaying an identity of the creator of the at least one generated link to a second user upon display of the links to the second user;
    (g) allowing the second user to send an information transmittal to the creator of the at least one link;
    (h) creating a sub-category into which the site is categorized;
    (i) assigning a creator identity to the sub-category that includes information about a creator of the sub-category; and
    (j) granting the creator of the sub-category at least one privilege selected from a group consisting of: recommending to accept or reject additional sites into and additional sub-categories under the sub-category, receiving information transmittals from users of the site into the sub-category, and transmitting information to users of sites in the sub-category.

9. A method as recited in claim 8, wherein the information transmittal is selected from a group consisting of: an electronic mail message and an instant message.

10. A method as recited in claim 8, further comprising the step of associating a mode of communication with the category; the mode of communication being selected from a group consisting of: a forum and a chat room.

11. A method as recited in claim 8, wherein the step of adding the site to the site directory further comprises: comparing the site to pre-existing sites in the site directory; and generating a notification if the site matches one of the pre-existing sites of the site directory.

12. A method as recited in claim 8, wherein categorizing the site into one of the categories of the site directory further comprises: generating a table of sites, wherein the table of sites comprises at least one pre-existing site ranked in the set of categories of the set directory; determining whether the site exists in the table of sites; and mapping the site to one of the categories of the set of categories if the site exists in the table of sites.

13. A method as recited in claim 12, wherein categorizing the site into one of the categories of the site directory further comprises searching the site for keywords relating to the categories of the set of categories if the site does not exist in the table of sites.

14. A method as recited in claim 12, wherein categorizing the site into one of the categories of the site directory further comprises: selecting one of the categories into which the site is to be categorized; comparing the selected category to the category to which the site is mapped; and generating a notification if the selected category does not match the category to which the site is mapped.

15. A method as recited in claim 8, wherein the site is ranked in the category according to a type of ranking based on at least one of: the number of generated links to the site, the frequency that the site is accessed by selection of the links, and polling.

16. A method as recited in claim 15, further comprising allowing a user to specify the type of ranking applied to the category, wherein the sites in the category are displayed according to the user-selected type of ranking.

17. A computer program embodied on a computer readable medium for generating a prioritized network site directory, comprising:
(a) a code segment that generates at least one link to a site on a network;
(b) a code segment that adds the site to a site directory having a set of categories comprising at least one category, each category including a plurality of links;
(c) a code segment that categorizes the site into one of the categories of the site directory;
(d) a code segment that ranks the categorized site in the category;
(e) a code segment that displays the links in the category according to rank, the links including the at least one generated link;
(f) a code segment that displays an identity of the creator of the at least one generated link to a second user upon display of the links to the second user;
(g) a code segment that allows the second user to send an information transmittal to the creator of the at least one link.
(h) a code segment that creates a sub-category into which the site is categorized;
(i) a code segment that assigns a creator identity to the sub-category that includes information about a creator of the sub-category; and
(j) a code segment that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

18. A computer program as recited in claim 17, further comprising a code segment that grants the creator of the sub-category at least one of the privileges consisting of: recommending to accept or reject additional sites into and additional sub-categories under the sub-category, receiving information transmittals from users of site in the sub-category, and transmitting information to users of sites in the sub-category.

19. A system for generating a prioritized network site directory, comprising:
(a) a logic that generates at least one link to a site on a network;
(b) a logic that adds the site to a site directory having a set of categories comprising at least one category, each category including a plurality of links;
(c) a logic that categorizes the site into one of the categories of the site directory;
(d) a logic that ranks the categorized site in the category;
(e) a logic that displays the links in the category according to rank, the links including the at least one generated link;
(f) a logic that displays an identity of the creator of the at least one generated link to a second user upon display of the links to the second user;
(g) a logic that allows the second user to send an information transmittal to the creator of the at least one link;
(h) a logic that creates a sub-category into which the site is categorized;
(i) a logic that assigns a creator identity to the sub-category that includes information about a creator of the sub-category; and
(j) a logic that grants the creator of the sub-category at least one privilege selected from a group consisting of: recommending to accept or reject additional sites into and additional sub-categories under the sub-category, receiving information transmittals from users of the site in the sub-category, and transmitting information to users of sites in the sub-category.

20. A method for generating a prioritized network site directory, comprising the steps of:
(a) generating at least one link to a site on a network;
(b) adding the site to a site directory having a set of categories comprising at least one category, each category including a plurality of links;
(c) comparing the site to pre-existing sites in the site directory;
(d) generating a notification if the site matches one of the pre-existing sites of the site directory;
(e) categorizing the site into one of the categories of the site directory, wherein the step of categorizing the site into one of the categories of the site directory further comprises the step of:
  i. generating a table of sites, wherein the table of sites comprises at least one pre-existing site ranked in the set of categories of the set directory;
  ii. determining whether the site exists in the table of sites;
  iii. mapping the site to one of the categories of the set of categories if the site exists in the table of sites;
  iv. searching the site for keywords relating to the categories of the set of categories if the site does not exist in the table of sites;
  v. selecting one of the categories into which the site is to be categorized;
  vi. comparing the selected category to the category to which the site is mapped;
  vii. generating a notification if the selected category does not match the category to which the site is mapped;

(f) ranking the categorized site in the category, wherein the site is ranked in the category according to a type of ranking based on at least one of: the number of generated links to the site stored in online bookmark accounts, the frequency that the site is accessed by selection of the links, and polling;

(g) allowing a user to specify the type of ranking applied to the category, wherein sites in the category are displayed according to the user-selected type of ranking;

(h) displaying the links in the category according to rank, the links including the at least one generated link;

(i) associating an identity of a creator of the at least one link with the at least one generated link;

(j) displaying the identity of the creator to a second user upon display of the links to the second user;

(k) allowing the second user to send an information transmittal to the creator of the at least one link, wherein the information transmittal is selected from a group consisting of: an electronic mail message and an instant message;

(l) creating a sub-category into which the site is categorized;

(m) assigning a creator identity to the sub-category that includes information about a creator of the sub-category;

(n) granting the creator of the sub-category at least one privilege selected from a group consisting of: recommending to accept or reject additional sites into and additional sub-categories under the sub-category, receiving information transmittals from users of site in the sub-category, and transmitting information to users of sites in the sub-category; and (o) associating a mode of communication with the category, the mode of communication being selected from a group consisting of: a forum and a chat room.

* * * * *